US008622813B2

(12) United States Patent
Okada

(10) Patent No.: US 8,622,813 B2
(45) Date of Patent: Jan. 7, 2014

(54) GAME SYSTEM AND CONTROL METHOD OF GAME SYSTEM, AND LINK SYSTEM

(75) Inventor: Kazuo Okada, Koto-ku (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 1208 days.

(21) Appl. No.: 12/505,049

(22) Filed: Jul. 17, 2009

(65) Prior Publication Data

US 2010/0056259 A1 Mar. 4, 2010

Related U.S. Application Data

(60) Provisional application No. 61/092,258, filed on Aug. 27, 2008, provisional application No. 61/092,188, filed on Aug. 27, 2008, provisional application No. 61/092,285, filed on Aug. 27, 2008, provisional application No. 61/092,301, filed on Aug. 27, 2008, provisional application No. 61/091,872, filed on Aug. 26, 2008, provisional application No. 61/091,939, filed on Aug. 26, 2008.

(51) Int. Cl.
*A63F 13/00* (2006.01)

(52) U.S. Cl.
USPC .................................. 463/25; 463/16; 463/20

(58) Field of Classification Search
USPC ................ 463/1, 6, 36, 37, 38, 46, 16, 20, 25
See application file for complete search history.

(56) References Cited

U.S. PATENT DOCUMENTS 6,634,946 B1 * 10/2003 Bridgeman et al. ............ 463/28
7,311,598 B2 12/2007 Kaminkow et al.
7,311,604 B2 12/2007 Kaminkow et al.
8,272,949 B2 * 9/2012 Dickerson ....................... 463/27
2009/0270168 A1 * 10/2009 Englman et al. ................ 463/27

FOREIGN PATENT DOCUMENTS

WO WO 99/03078 1/1999

* cited by examiner

*Primary Examiner* — Ronald Laneau
*Assistant Examiner* — Ross Williams
(74) *Attorney, Agent, or Firm* — KMF Patent Services, PLLC; S. Peter Konzel; Kenneth M. Fagin

(57) ABSTRACT

A game system of the present invention serves to: (a) compare a first predetermined count predetermined for first identification information with a reception count of input data, based upon the first identification information included in the input data of a first gaming machine among the plurality of gaming machines, and thereafter, execute a random determination process as to whether or not to award a first prize, in a case where the reception count has reached the first predetermined count; and (b) compare a second predetermined count predetermined for second identification information with a reception count of input data, based upon the second identification information included in the input data of a second gaming machine among the plurality of gaming machines, and thereafter, execute a random determination process as to whether or not to award a second prize, in a case where the reception count has reached the second predetermined count.

3 Claims, 95 Drawing Sheets

FIG.6A

| SLOT MACHINES | IDENTIFICATION INFORMATION |
|---|---|
| FIRST SLOT MACHINE | 10000001 |
| SECOND SLOT MACHINE | 10000010 |

FIG.6B

| IDENTIFICATION INFORMATION | PREDETERMINED COUNTS |
|---|---|
| 10000001 | FIRST PREDETERMINED COUNT |
| 10000010 | SECOND PREDETERMINED COUNT |

FIG.12A

| IDENTIFICATION INFORMATION | BET INFORMATION | FIRST PREDETERMINED COUNTS |
|---|---|---|
| 10000001 | Mega | FIRST PREDETERMINED COUNT "A" |
| | Major | FIRST PREDETERMINED COUNT "B" |
| | Mini | FIRST PREDETERMINED COUNT "C" |

FIG.12B

| IDENTIFICATION INFORMATION | BET INFORMATION | SECOND PREDETERMINED COUNTS |
|---|---|---|
| 10000010 | Mega | SECOND PREDETERMINED COUNT "A" |
| | Major | SECOND PREDETERMINED COUNT "B" |
| | Mini | SECOND PREDETERMINED COUNT "C" |

FIG.13A

| SLOT MACHINES | IDENTIFICATION DATA |
|---|---|
| FIRST SLOT MACHINE | FIRST IDENTIFICATION INFORMATION |
| SECOND SLOT MACHINE | SECOND IDENTIFICATION INFORMATION |

FIG.13B

| IDENTIFICATION DATA | PROBABILITY TABLES |
|---|---|
| FIRST IDENTIFICATION INFORMATION | FIRST PROBABILITY TABLE |
| SECOND IDENTIFICATION INFORMATION | SECOND PROBABILITY TABLE |

FIG.16A

| IDENTIFICATION INFORMATION | BET INFORMATION | FIRST PROBABILITY TABLES |
|---|---|---|
| FIRST IDENTIFICATION INFORMATION | Mega | FIRST PROBABILITY TABLE "A" |
| | Major | FIRST PROBABILITY TABLE "B" |
| | Mini | FIRST PROBABILITY TABLE "C" |

FIG.16B

| IDENTIFICATION INFORMATION | BET INFORMATION | SECOND PROBABILITY TABLES |
|---|---|---|
| SECOND IDENTIFICATION INFORMATION | Mega | SECOND PROBABILITY TABLE "A" |
| | Major | SECOND PROBABILITY TABLE "B" |
| | Mini | SECOND PROBABILITY TABLE "C" |

PROGRESSIVE LINK PARTICIPATION PROCESS

| Link Name | AMOUNT OF JACKPOT PRIZE MONEY | Rate($/game) |
|---|---|---|
| Link 1 | xxxxxx | 20 |
| Link 2 | xxxx | 1 |
| Link 3 | xxxxxxx | 110 |
| Link 4 | xxxxxx | 50 |
| Link 5 | xxxxx | 5 |

FIG.56

JACKPOT CONDITION SETTING TABLE IN CREATING NEW JACKPOT

| PATTERNS | NUMBER OF SETTINGS | FIXED NUMBER OF PARTICIPANTS | AMOUNT OF JACKPOT PRIZE MONEY | MINIMUM AMOUNT OF BET IN ONE GROUP |
|---|---|---|---|---|
| A | 1 | 101~500 | $1,000,001~$10,000,000 | $101~$500 |
| B | 2 | 51~100 | $100,001~$1,000,000 | $11~$100 |
| C | 2 | 10~50 | $10,000~$100,000 | $1~$10 |

| SEQUENCE | Machine NO. |
|---|---|
| 1 | 10a |
| 2 | 10b |
| 3 | 10c |
| 4 | 10d |
| 5 | 10e |

| SEQUENCE | Machine NO. |
|---|---|
| 1 | 10a |
| 2 | 10b |
| 3 | 10c |
| 4 | 10d |
| 5 | 10e |

GAME SYSTEM AND CONTROL METHOD OF GAME SYSTEM, AND LINK SYSTEM

CROSS-REFERENCE TO RELATED APPLICATIONS

This application claims priority of U.S. Provisional Application No. 61/092,301 filed on Aug. 27, 2008, U.S. Provisional Application No. 61/092,285 filed on Aug. 27, 2008, U.S. Provisional Application No. 61/091,939 filed on Aug. 26, 2008, U.S. Provisional Application No. 61/092,188 filed on Aug. 27, 2008, U.S. Provisional Application No. 61/092,258 filed on Aug. 27, 2008, U.S. Provisional Application No. 61/091,872 filed on Aug. 26, 2008. The contents of these applications are incorporated herein by reference in their entirety.

BACKGROUND OF THE INVENTION

1. Field of the Invention

The present invention relates to a game system and control method of the game system, and link system.

2. Description of the Related Art

A slot machine known as one kind of gaming machine is constituted so as to: start a game by a player inserting gaming mediums into a predetermined area of the slot machine; rearrange symbols in predetermined areas of the slot machine; and award a prize, based upon a combination of the rearranged symbols. In addition, the above slot machines are generally constituted to judge whether or not a winning combination allowed to award a prize is established, based upon whether or not a predetermined number of symbols of the same type (for example, "CHERRY" or "7") is arranged along a preset payline. In the conventional slot machine, in a case where a predetermined number or more of symbols of the same type are arranged, it has been a common routine to award a prize, based upon the number of the aforementioned arranged symbols, regardless of the payout line.

Further, a bonus awarded if a combination of special symbols has been rearranged is set, and a payout referred to as a so called jackpot is awarded. In this manner, entertainability of the slot machines is enhanced. Alternatively, a probability of winning a jackpot is generally kept down, and among players, such jackpot is known as an incidentally acquirable prize.

Conventionally, a plurality of gaming machines are provided which are linked via a network by a plurality of players and in which the players enjoy games while sharing a jackpot in groups. For example, International Patent WO99/03078 discloses a game system in which a plurality of gaming machines and a jackpot controller are connected via a network. In this system, the jackpot controller performs a process of selecting one of a plurality of gaming machines connected via a network, and then, changing a mode of a gaming machine selected as a feature game mode for winning a jackpot. While the jackpot controller controls gaming machines, games per se are always executed at these gaming machines.

U.S. Pat. Nos. 7,311,598 and 7,311,604 each disclose a game system in which: a plurality of gaming machines and a jackpot controller are interconnected via a network; and a shared jackpot payment display panel linked with layout of the gaming machines is provided. In this system, the jackpot controller selects one from among a plurality of networked gaming machines; further selects one from among various jackpot payment rates displayed on the jackpot payment display panel; and controls a jackpot payment condition for the selected gaming machine accordingly.

In the abovementioned game system, a condition for winning a prize such as a jackpot is that a network connection is established; and therefore, a probability of winning a prize is identical to another one irrespective of a reserved amount of gaming mediums betted on a prize. If a player with a small reserved amount of gaming mediums betted on a prize has won a prize, other players may feel unfairness. A so-called high roller with a large number of gaming mediums betted one time greatly contributes to the large reserved amount of gaming mediums betted on a prize, and however, there is a need to employ a configuration which is not disadvantageous to such high roller or that which is not advantageous than necessary to other players who are not such high roller.

The present invention has been made in view of the abovementioned circumstance, and aims to provide a game system which is capable of eliminating the feeling of unfairness in acquiring a prize commonly shared by a plurality of gaming machines by varying a probability of winning a prize.

SUMMARY OF THE INVENTION

An aspect of the present invention is directed to a link system, comprising: (i) a plurality of gaming machine groups, each of which executes a game for obtaining a progressive bonus; (ii) a memory which stores a progressive value for the progressive bonus and participation permission information indicating permission of participation in the progressive bonus game; and (iii) a center controller which are communicable with each of the plurality of gaming machines via a network; wherein the center controller is configured to: (a) update the progressive value stored in the memory, based upon the BET information received from any of the plurality of gaming machines; and (b) in response to a participation request from another gaming machine requesting participation in the plurality of gaming machine groups, determine whether to accept the participation request from said another gaming machine, referring to the participation permission information stored in the memory.

An aspect of the present invention is directed to a link system, comprising: (i) a plurality of gaming machines; (ii) a communication interface for interconnecting a plurality of gaming machines so that the gaming machines can be communicated with each other; (iii) a memory which stores a program exercising centralized control of a progressive bonus game executed in groups of the plurality of gaming machines, payment information including a payment value of the progressive bonus game stored in accordance of a BET input, in each of games executed in the groups of the plurality of gaming machines; and sequence information associated with identification information for each of the gaming machines, and exercising centralized control of the plurality of gaming machines; (iv) an input device for inputting withdrawal from a link in which the progressive bonus game is executed in the group of the plurality of gaming machines; and (v) a controller which executes the program stored in the memory, wherein the controller is configured to: (a) accumulatively update a payment of the progressive bonus game received via the communication interface, in response to BET input of a respective one of unit games executed at the plurality of gaming machines; (b) upon receipt of the input of link withdrawal from the input device, specify identification information of a gaming machine of which a participation sequence is next to that of a gaming machine exercising centralized control of the progressive bonus game, in response to the sequence information stored in the memory; and (c) in order to cause a memory of a corresponding gaming machine to store the specified identification information, transfer to the gaming machine the centralized control program, the sequence information, and the payment information, all of which are stored in the memory of (iii), via the communication interface.

An aspect of the present invention is directed to a game system, including: (i) a communication device for receiving input data from a plurality of gaming machines, each of which executes a game independently, the input data including part of a bet or a side-bet in the game and first or second identification information for identifying types of the gaming machines every time the game is executed; (ii) a storage device for storing as one accumulative value, part of a bet or a side-bet received from the plurality of gaming machines by means of the communication device; and (iii) a controller for randomly awarding a prize in association with input of the input data while it is triggered that the accumulative value stored in the storage device has reached a predetermined value, wherein the controller is configured to: (a) compare a first predetermined count predetermined for first identification information with a reception count of input data, based upon the first identification information included in the input data of a first gaming machine among the plurality of gaming machines, and thereafter, execute a random determination process as to whether or not to award a first prize, in a case where the reception count has reached the first predetermined count; and (b) compare a second predetermined count predetermined for second identification information with a reception count of input data, based upon the second identification information included in the input data of a second gaming machine among the plurality of gaming machines, and thereafter, execute a random determination process as to whether or not to award a second prize, in a case where the reception count has reached the second predetermined count.

According to the aforementioned game system, the controller executes the random determination process as to whether or not to award a prize, in a case where the predetermined count is predetermined, based upon the identification information included in the input data received from the plurality of gaming machines, and the input data reception count has then reached the predetermined count. Therefore, the game system can be provided that is capable of varying the probability of winning a prize by determining the count of executing the random determination process that is different depending upon the high roller's and non-high roller's gaming machines, the game system eliminating unfairness in winning prizes common to the plurality of gaming machines.

An aspect of the present invention is directed to a game system, including: (i) a communication device for receiving input data from a plurality of gaming machines, each of which executes a game independently, the input data including part of a bet or a side-bet in the game and first or second identification information for identifying types of the gaming machines every time the game is executed; (ii) a storage device for storing as one accumulative value, part of a bet or a side-bet received from the plurality of gaming machines by means of the communication device; and (iii) a controller for randomly awarding a prize in association with input of the input data while it is triggered that the accumulative value stored in the storage device has reached a predetermined value, wherein the controller is configured to: (a) compare a first predetermined count predetermined for first identification information with a reception count of input data, based upon the first identification information included in the input data of a first gaming machine among the plurality of gaming machines, and thereafter, execute a random determination process as to whether or not to award a first prize, in a case where the reception count has reached the first predetermined count; and (b) compare a second predetermined count predetermined for second identification information, which is greater than the first predetermined count, with a reception count of input data, based upon the second identification information included in the input data of a second gaming machine among the plurality of gaming machines, and thereafter, execute a random determination process as to whether or not to award a second prize which is greater than the first prize, in a case where the reception count has reached the second predetermined count.

According to the aforementioned game system, the controller executes the random determination process as to whether or not to award a prize in a case where the first predetermined count and the second predetermined count that is greater than the first one are predetermined, based upon the identification information included in the input data received from the plurality of gaming machines, and the input data reception count has reached the predetermined count. Therefore, the game system can be provided that is capable of employing a configuration, which is not disadvantageous to the high roller or that which is not advantageous to the non-high roller player than necessary, by determining the predetermined number of the non-high roller's gaming machines that is greater than that of the high-roller's gaming machines, the game system eliminating unfairness in winning prizes common to the plurality of gaming machines.

An aspect of the present invention is directed to a game system, including: (i) a communication device for receiving input data from a plurality of gaming machines, each of which executes a game independently, the input data including part of a bet or a side-bet in the game and first or second identification information for identifying types of the gaming machines every time the game is executed; (ii) a storage device for storing as one accumulative value, part of a bet or a side-bet received from the plurality of gaming machines by means of the communication device; and (iii) a controller for randomly awarding a prize in association with input of the input data while it is triggered that the accumulative value stored in the storage device has reached a predetermined value, wherein the controller is configured to: (a) compare a first predetermined count predetermined for first identification information with a reception count of input data, based upon the first identification information included in the input data of a first gaming machine among the plurality of gaming machines, and thereafter, execute a random determination process as to whether or not to award a first prize, in a case where the reception count has reached the first predetermined count; and (b) execute a random determination process as to whether or not to award a second prize which is smaller than the first prize every time the input data is received, in a case where the identification information obtained in the process (a) is not included in input data of a second gaming machine among the plurality of gaming machines.

According to the aforementioned game system, the controller executes the random determination process as to whether or not to award the second prize that is smaller than the first prize every time input data is received, in a case where the identification information of the first gaming machine is not included in the input data of the second gaming machine. Therefore, the game system can be provided in which the non-high roller's gaming machine can employ a configuration which is disadvantageous to the high roller or that which is not advantageous to the non-high roller player than necessary, by executing the random determination process every time the input data is received, the game system eliminating unfairness in winning prizes common to the plurality of gaming machines.

An aspect of the present invention is directed to a game system, including: (i) a plurality of gaming machines having a gaming machine which includes first identification information in input data and a gaming machine which includes second identification information in the input data, the gaming machines executing a progressive bonus game; (ii) a memory for storing a first probability table intended for the gaming machine which includes the first identification information and a second probability table intended for the gaming machine which includes the second identification information; and (iii) a controller which is communicable with respective ones of the first gaming machines via a network, wherein the controller is configured to: (a) judge which one of items of the first and second identification information is included in the input data when the input data is accepted by any of the respective ones of the plurality of gaming machines; (b) randomly determine whether or not to award a payment of the progressive bonus game to a gaming machine having transmitted the input data, referring to the first probability table stored in the memory, when it is judged that the first identification information is included in the input data accepted in the process (a); and (c) randomly determine whether or not to award a payment of the progressive bonus game to a gaming machine having transmitted the input data, referring to the second probability table stored in the memory, when it is judged that the second identification information is included in the input data accepted in the process (a).

According to the aforementioned game system, the controller randomly determines whether or not to award the payment of the progressive bonus, referring to the probability table, based upon the identification information included in the input data received from the plurality of gaming machines. Therefore, the game system can be provided that is capable of varying the probability of winning the progressive bonus, referring to the probability table that is different depending upon the high roller's and non-high roller's gaming machines, the game system eliminating unfairness in winning the progressive bonus common to the plurality of gaming machines.

An aspect of the present invention is directed to a game system control method, including the steps of: (i) by means of a communication device, receiving input data from a plurality of gaming machines, each of which executes a game independently, the input data including part of a bet or a side-bet in the game and first or second identification information for identifying types of the gaming machines every time the game is executed; (ii) by means of a storage device, storing as one accumulative value, part of a bet or a side-bet received from the plurality of gaming machines by means of the communication device; and (iii) by means of a controller, randomly awarding a prize in association with input of the input data while it is triggered that the accumulative value stored in the storage device has reached a predetermined value, wherein the controller is configured to further execute the steps of: (a) comparing a first predetermined count predetermined for first identification information with a reception count of input data, based upon the first identification information included in the input data of a first gaming machine among the plurality of gaming machines, and thereafter, executing a random determination process as to whether or not to award a first prize, in a case where the reception count has reached the first predetermined count; and (b) comparing a second predetermined count predetermined for second identification information with a reception count of input data, based upon the second identification information included in the input data of a second gaming machine among the plurality of gaming machines, and thereafter, executing a random determination process as to whether or not to award a second prize, in a case where the reception count has reached the second predetermined count.

According to the aforementioned game system control method, the controller executes the random determination process as to whether or not to award a prize, in a case where the predetermined count is predetermined, based upon the identification information included in the input data received from the plurality of gaming machines, and the input data reception count has reached the predetermined count. Therefore, the control method of the game system can be provided that is capable of varying the probability of winning a prize by determining the count of executing the random determination process that is different depending upon the high roller's and non-high roller's gaming machines, the game system eliminating unfairness in winning prizes common to the plurality of gaming machines.

An aspect of the present invention is directed to a game system control method including: (i) by means of a communication device, receiving input data from a plurality of gaming machines, each of which executes a game independently, the input data including part of a bet or a side-bet in the game and first or second identification information for identifying types of the gaming machines every time the game is executed; (ii) by means of a storage device, storing as one accumulative value, part of a bet or a side-bet received from the plurality of gaming machines by means of the communication device; and (iii) by means of a controller, randomly awarding a prize in association with input of the input data while it is triggered that the accumulative value stored in the storage device has reached a predetermined value, wherein the controller is configured to further execute the steps of: (a) comparing a first predetermined count predetermined for first identification information with a reception count of input data, based upon the first identification information included in the input data of a first gaming machine among the plurality of gaming machines, and thereafter, executing a random determination process as to whether or not to award a first prize, in a case where the reception count has reached the first predetermined count; and (b) comparing a second predetermined count predetermined for second identification information, which is greater than the first predetermined count, with a reception count of input data, based upon the second identification information included in the input data of a second gaming machine among the plurality of gaming machines, and thereafter, randomly determining whether or not to award a second prize which is greater than the first prize, in a case where the reception count has reached the second predetermined count.

According to the aforementioned game system control method, the controller executes the random determination process as to whether or not to award a prize, in a case where the first predetermined count and the second predetermined count that is greater than the first one are predetermined, based upon the identification information included in the input data received from the plurality of gaming machines, and the input data reception count has reached the predetermined count. Therefore, the control method of the game system can be provided that is capable of employing a configuration, which is not disadvantageous to the high roller or that which is not advantageous to the non-high roller player than necessary, by determining the predetermined number of the non-high roller's gaming machines that is greater than that of the high-roller's gaming machines, the game system eliminating unfairness in winning prizes common to the plurality of gaming machines.

An aspect of the present invention is directed to a game system control method, including the steps of: (i) by means of a communication device, receiving input data from a plurality of gaming machines, each of which executes a game independently, the input data including part of a bet or a side-bet in the game and first or second identification information for identifying types of the gaming machines every time the game is executed; (ii) by means of a storage device, storing as one accumulative value, part of a bet or a side-bet received from the plurality of gaming machines by means of the communication device; and (iii) by means of a controller, randomly awarding a prize in association with input of the input data while it is triggered that the accumulative value stored in the storage device has reached a predetermined value, wherein the controller is configured to further execute the steps of: (a) comparing a first predetermined count predetermined for first identification information with a reception count of input data, based upon the first identification information included in the input data of a first gaming machine among the plurality of gaming machines, and thereafter, executing a random determination process as to whether or not to award a first prize, in a case where the reception count has reached the first predetermined count; and (b) randomly determining whether or not to award a second prize which is smaller than the first prize every time the input data is received, in a case where the identification information obtained at the step (a) is not included in input data of a second gaming machine among the plurality of gaming machines.

According to the aforementioned game system control method, the controller executes the random determination process as to whether or not to award the second prize that is smaller than the first prize, every time the input data is received, in a case where the identification information of the first gaming machine is not included in the input data of the second gaming machine. Therefore, the control method of the game system can be provided in which the non-high roller's gaming machine can employ a configuration which is disadvantageous to the high roller or that which is not advantageous to the non-high roller player than necessary, by executing the random determination process every time the input data is received, the game system eliminating unfairness in winning prizes common to the plurality of gaming machines.

An aspect of the present invention is directed to a game system control method, including: (a) judging which one of items of the first and second identification information is included in input data when the input data is accepted by any of the respective ones of the plurality of gaming machines; (b) randomly determine whether or not to award a payment of the progressive bonus game to a gaming machine having transmitted the input data, referring to the first probability table stored in the memory, when it is judged that the first identification information is included in the input data accepted at the step (a); and (c) randomly determine whether or not to award a payment of the progressive bonus game to a gaming machine having transmitted the input data, referring to the second probability table stored in the memory, when it is judged that the second identification information is included in the input data accepted at the step (a).

According to the aforementioned game system control method, the controller randomly determines whether or not to award the payment of the progressive bonus, referring to the probability table, based upon the identification information included in the input data received from the plurality of gaming machines. Therefore, the control method of the game system can be provided that is capable of varying the probability of winning the progressive bonus, referring to the probability table that is different depending upon the high roller's and non-high roller's gaming machines, the game system eliminating unfairness in winning a progressive bonus common to the plurality of gaming machines.

The present invention provides a game system which eliminates unfairness in winning prizes common to a plurality of slot machines.

An aspect of the present invention is directed to a game system, comprising: (i) a plurality of first gaming machines which execute a first game for obtaining a first progressive bonus; (ii) a plurality of second gaming machines which execute a second game for obtaining a second progressive bonus; (iii) a memory which stores a first progressive value for the first progressive bonus and a second progressive value for the second progressive bonus; and (iv) a center controller which is inter-communicable with the pluralities of the first and second gaming machines via a network, the center controller is configured to: (a) receive BET information pertinent to the first or second game from any of the gaming machines of respective ones of the first and second gaming machines; (b) update the first or second progressive value stored in the memory, based upon the BET information received in the process (a); (c) merge the first and second games with each other to form one game, and add up the first and second progressive values so that the first and second progressive bonuses are integrated with each other, in a case where it is judged that a respective one of the first and second progressive values stored in the memory meets a preset predetermined condition, as a result of repeatedly executing the processes (a) and (b); (d) randomly determine whether or not to award the progressive bonuses in the process (c) in the game to any of the gaming machines participating in the game merged in the process (c); and (e) award a progressive bonus, which is responsive to the progressive value added up in the process (d), to a predetermined gaming machine determined in the process (d).

According to the aforementioned game system, in the game system, in a case where the stored first and second progressive values meet a predetermined condition, they can be added up. Thus, the scale of the progressive value increases, and an opportunity of obtaining a greater progressive value is given a player, making it possible to enhance entertainability.

An aspect of the present invention is directed to the game system, further including: a count memory which counts numbers of times of the games executed in the plurality of games, wherein the center controller judges whether or not a respective one of the numbers of times of the games executed in the plurality of games reaches a predetermined value, by referring to the count memory, and executes the process (c) in a case where it is judged that a respective one of the numbers of the games reaches the predetermined value as a result of the judgment.

According to the aforementioned game system, in the game system, the count memory counts the numbers of times of the games executed in a plurality of games, and a respective one of the numbers of times of the games reaches a predetermined value, whereby the first and second progressive values can be added up, thus making it possible to: increase the scale of the progressive value; give a player an opportunity of obtaining a greater progressive value; and enhance entertainability.

An aspect of the present invention is directed to the game system, wherein the predetermined conditions of the processes (c) and (d) are that: a respective one of the plurality of progressive values has reached a predetermined value or more; and that the respective progressive values are within a preset predetermined difference.

According to the aforementioned game system, in the game system, among a plurality of stored progressive values, a respective one of the first and second progressive values reaches a predetermined value, and these progressive values are within a preset predetermined difference, thereby making it possible to: substantially double the scale of the progressive value substantially doubles; give a player an opportunity of obtaining a greater progressive value; and enhance entertainability.

An aspect of the present invention is directed to the game system, further including a display device which displays the progressive values stored in the memory and is communicable with the center controller, wherein the center controller updates the progressive values stored in the memory, based upon the progressive value added up in the process (c) and causes the display device to display the progressive values added up in the process (c) and stored in the memory.

According to the aforementioned game system, in the game system, for example, the updated progressive value is displayed on the display device, thus making it possible to: provide information such as a current progressive value or merging of a plurality of progressive values; and enhance entertainability.

An aspect of the present invention is directed to a game system, including: (i) a plurality of first gaming machines which execute a first game for obtaining a first progressive bonus; (ii) a plurality of second gaming machines which execute a second game for obtaining a second progressive bonus; (iii) a memory which stores a first progressive value for the first progressive bonus and a second progressive value for the second progressive bonus; (iv) a center controller which is inter-communicable with the pluralities of the first and second gaming machines via a network; and (v) a count memory which counts the number of times of games executed in the plurality of games, wherein the center controller is configured to: (a) receive BET information pertinent to the first or second game from any of the gaming machines of respective ones of the first and second gaming machines; (b) update the first or second progressive value stored in the memory, based upon the BET information received in the process (a); (c) merge the first and second games with each other to form one game, and add up the first and second progressive values so that the first and second progressive bonuses are integrated with each other, in one of cases where it is judged that a respective one of the first and second progressive values stored in the memory meets a preset predetermined condition, as a result of repeatedly executing the processes (a) and (b), and where it is judged that a respective one of the numbers of times of the games reaches a predetermined value, as a result of a judgment as to whether or not a respective one of the numbers of times of the games executed in the plurality of games reaches the predetermined value, by referring to the count memory; (d) randomly determine whether or not to award the progressive bonuses in the process (c) in the game to any of the gaming machines participating in the game merged in the process (c); and (e) award a progressive bonus, which is responsive to the progressive value added up in the process (c), to a predetermined gaming machine determined in the process (d).

According to the aforementioned game system, in the game system, in a case where the stored first and second progressive values meet a predetermined condition, they can be added up, thus making it possible to: increase the scale of a progressive value; give a player an opportunity of obtaining a greater progressive value; and enhance entertainability. Further, the counter memory counts the numbers of times of the games executed in a plurality of games, and a respective one of the numbers of times of the games has reached a predetermined value, whereby the first and second progressive values can be added up, thus making it possible to: increase the scale of a progressive value; give a player an opportunity of obtaining a greater progressive value; and enhance entertainability.

An aspect of the present invention is directed to the game system, wherein the predetermined conditions of the processes (c) and (d) are that: a respective one of the plurality of progressive values has reached a predetermined value or more; and that the respective progressive values are within a preset predetermined difference.

According to the aforementioned game system, in the game system, among a plurality of stored progressive values, a respective one of the first and second progressive values reaches a predetermined value, and these progressive values are within a preset predetermined difference, thereby making it possible to: substantially double the scale of the progressive value; give a player an opportunity of obtaining a greater progressive value; and enhance entertainability.

An aspect of the present invention is directed to the game system, further including a display device which displays the progressive values stored in the memory and is communicable with the center controller, wherein the center controller updates the progressive values stored in the memory, based upon the progressive value added up in the process (e), and causes the display device to display the progressive values added up in the process (e) and stored in the memory.

According to the aforementioned game system, in the game system, for example, the updated progressive value is displayed on the display device, thus making it possible to: provide information such as a current progressive value or merging of a plurality of progressive values; and enhance entertainability.

An aspect of the present invention is directed to a game system, including: (i) a plurality of first gaming machines which execute a first game for obtaining a first progressive bonus; (ii) a plurality of second gaming machines which execute a second game for obtaining a second progressive bonus; (iii) a memory which stores a first progressive value for the first progressive bonus and a second progressive value for the second progressive bonus; (iv) a center controller which is inter-communicable with the pluralities of the first and second gaming machines via a network; (v) a count memory which counts numbers of times of the games executed in the plurality of games; and (vi) a display device which displays the progressive value stored in the memory and is communicable with the center controller, wherein the center controller is configured to: (a) receive BET information pertinent to the first or second game from any of the gaming machines of respective ones of the first and second gaming machines; (b) update the first or second progressive value stored in the memory, based upon the BET information received in the process (a); (c) merge the first and second games with each other to form one game, and add up the first and second progressive values so that the first and second progressive bonuses are integrated with each other, in one of cases where it is judged that a respective one of the first and second progressive values stored in the memory meets a preset predetermined condition, as a result of repeatedly executing the processes (a) and (b), and where it is judged that a respective one of the numbers of times of the games reaches a predetermined value, as a result of a judgment as to whether or not a respective one of the numbers of times of the games executed in the plurality of games reaches the predetermined value, by referring to the count memory; (d) randomly determine whether or not to award the progressive bonuses in the process (c) in the game to any of the gaming machines participating in the game merged in the process (c); (e) award a progressive bonus, which is responsive to the progressive value added up in the process (c), to a predetermined gaming machine determined in the process (d); and (f) update the progressive value stored in the memory based upon the progressive value added up in the process (c), and display, on the display device, the progressive values added up in the process (c) and stored in the memory.

According to the aforementioned game system, in the game system, in a case where the stored first and second progressive values meet a predetermined condition, they can be added up, thus making it possible to: increase the scale of a progressive value; give a player an opportunity of obtaining a greater progressive value; and enhance entertainability. Further, the counter memory counts the numbers of times of the games executed in a plurality of games, and a respective one of the numbers of times of the games has reached a predetermined value, whereby the first and second progressive values can be added up, thus making it possible to: increase the scale of a progressive value; give a player an opportunity of obtaining a greater progressive value; and enhance entertainability. Moreover, for example, the updated progressive value is displayed on the display device, thus making it possible to: provide information such as a current progressive value or merging of a plurality of progressive values; and enhance entertainability.

An aspect of the present invention is directed to the game system, wherein the predetermined conditions of the processes (c) and (d) are that: a respective one of the plurality of progressive values has reached a predetermined value or more; and that the respective progressive values are within a preset predetermined difference.

According to the aforementioned game system, in the game system, in a case where the stored first and second progressive values meet a predetermined condition, they can be added up, thus making it possible to: substantially double the scale of a progressive value; give a player an opportunity of obtaining a greater progressive value; and enhance entertainability.

An aspect of the present invention is directed to a gaming machine, including: (i) a memory which stores a first progressive value for a first progressive bonus and a second progressive value for a second progressive bonus; and (ii) a controller which is inter-communicable with the pluralities of other first and second gaming machines via a network, wherein the controller is configured to: (a) receive BET information pertinent to first and second games from any of said other first and second gaming machines; (b) update the first and second progressive values stored in the memory, based upon the BET information received in the process (a); (c) merge the first and second games with each other to form one game, and add up the first and second progressive values so that the first and second progressive bonuses are integrated with each other, in a case where it is judged that a respective one of the first and second progressive values stored in the memory meets a preset predetermined condition, as a result of repeatedly executing the processes (a) and (b); (d) randomly determine whether or not to award the progressive bonuses in the process (c) in the game to any of the gaming machines participating in the game merged in the process (c); and (e) award a progressive bonus, which is responsive to the progressive value added up in the process (c), to the gaming machine determined in the process (d).

According to the aforementioned game machine, in the gaming machine, in a case where the stored first and second progressive values meet a predetermined condition, they can be added up, thus making it possible to: increase the scale of a progressive value; give a player an opportunity of obtaining a greater progressive value; and enhance entertainability.

An aspect of the present invention is directed to the gaming machine, further including a count memory which counts the numbers of times of the games executed in the plurality of games, wherein the center controller judges whether or not a respective one of the numbers of times of the games executed in the plurality of games reaches a predetermined value, by referring to the count memory, and executes the process (c) in a case where it is judged that a respective one of the numbers of times of the games reaches the predetermined value as a result of the judgment.

According to the aforementioned game machine, in the gaming machine, the counter memory counts the numbers of times of the games executed in a plurality of games, and a respective one of the numbers of times of the games has reached a predetermined value, whereby the first and second progressive values can be added up, thus making it possible to: increase the scale of a progressive value; give a player an opportunity of obtaining a greater progressive value; and enhance entertainability.

An aspect of the present invention is directed to the gaming machine, wherein the predetermined conditions of the processes (c) and (d) are that: a respective one of the plurality of progressive values has reached a predetermined value or more; and that the respective progressive values are within a preset predetermined difference.

According to the aforementioned game machine, in the gaming machine, in a case where the stored first and second progressive values meet a predetermined condition, they can be added up, thus making it possible to: substantially double the scale of a progressive value; give a player an opportunity of obtaining a greater progressive value; and enhance entertainability.

An aspect of the present invention is directed to the gaming machine, further including a display device which displays the progressive values stored in the memory and is communicable with the center controller, wherein the center controller updates the progressive values stored in the memory, based upon the progressive value added up in the process (e) and causes the display device to display the progressive values added up in the process (e) and stored in the memory.

According to the aforementioned game machine, in the gaming machine, for example, the updated progressive value is displayed on the display device, thus making it possible to provide: information such as a current progressive value or merging of a plurality of progressive values; and enhance entertainability.

According to the present invention, in a case where the stored first and second progressive values meet a predetermined condition, they can be merged, thus making it possible to: increase the scale of a progressive value; give a player an opportunity of obtaining a greater progressive value; and enhance entertainability.

An aspect of the present invention is directed to a game system, including: (i) a plurality of gaming machines, each of which executes a game for obtaining a progressive bonus; (ii) a memory which stores a progressive value for the progressive bonus; and (iii) a center controller which are communicable with each of the plurality of gaming machines via a network; wherein the center controller is configured to: (a) judge whether or not there has been received a participation signal requesting midcourse participation in the game executed in the plurality of gaming machines from another gaming machine; (b) judge whether or not the progressive value stored in the memory reaches a preset predetermined value, in a case where the participation signal has been received in the process (a); (c) execute a process of rejecting participation in the game, of another gaming machine from which the participation signal has been received, in a case where it is judged that the progressive value reaches the predetermined value, as a result of the judgment in the process (b); (d) execute a process of allowing participation in the game, of such other gaming machine from which the participation signal has been received, in a case where it is judged that the progressive value fails to reach the predetermined value, as a result of the judgment in the process (b); (e) receive BET information transmitted from such other gaming machine allowed for participation in the game in the process (d); (f) update the progressive value stored in the memory, based upon the BET information received in the process (e); (g) randomly determine whether to award a progressive bonus for the game to any of the plurality of gaming machines participating in the game; and (h) award the progressive bonus corresponding to the progressive value updated in the process (f) to the gaming machine determined in the process (g).

According to the aforementioned game system, the center controller performs a process of accepting a participation signal for a nonparticipating gaming machine in a game for obtaining a progressive bonus, until a progressive value reaches a predetermined value, and performs a process of rejecting a participation signal when the progressive value reaches a preset value. Therefore, a progressive bonus can be awarded to a gaming machine having participated partway in a state the progressive values have been accumulated. Namely, a progressive bonus can be awarded to a gaming machine which has contributed to accumulation of the progressive values. In this manner, the player's feeling of unfairness in jackpot acquisition can be eliminated.

An aspect of the present invention is directed to the game system, wherein: each of the plurality of gaming machines including such another gaming machine has a display device; the center controller transmits a predetermined annunciation signal to another gaming machine whose participation in the game has been rejected, as a process of rejecting participation in the game of the process (c); and such another gaming machine display-controls the display device, based upon the predetermined annunciation signal received from the center controller.

According to the aforementioned game system, if the center controller transmits a predetermined annunciation signal of rejecting a participation signal, the fact is displayed on the display device of the gaming machine having received the annunciation signal. Therefore, the rejection of midcourse participation of the gaming machine having transmitted the participation signal can be notified to the player at the gaming machine.

An aspect of the present invention is directed to the game system, wherein: the center controller is further configured to: execute a game for obtaining another progressive bonus game except the game for obtaining the progressive bonus, in response to a request from such gaming machine whose participation in the game has been rejected in the process (c); and execute the processes (a) to (h) in the executed game for obtaining such another progressive bonus game.

According to the aforementioned game system, if the center controller performs a process of rejecting the participation signal after the progressive value has reached the predetermined value, no one can participate in a game. Therefore, by accepting participation in a newly generated game, an opportunity of enabling participation in the game can be increased.

An aspect of the present invention is directed to the game system, wherein: the center controller is further configured to: reset the progressive value stored in the memory, in a case where it is judged that the progressive bonus has been awarded in the process (h); and repeatedly execute the processes (a) to (h) in order to repeatedly perform a game for the progressive bonus.

According to the aforementioned game system, if the game for obtaining the progressive bonus has terminated, the center controller performs a process of resetting the progressive value and permitting participation in the gaming machine, allowing the players to increase the opportunity of enabling participation in the game.

An aspect of the present invention is directed to the game system, wherein: the center controller is further configured to: judge whether or not the progressive value stored in the memory reaches a preset rate as the predetermined value, in a case where it is judged that the progressive value fails to reach the predetermined value as a result of the judgment in the process (b); and transmit a predetermined annunciation signal pertinent to the preset rate as the predetermined value to the plurality of gaming machines participating in the game, based upon the result of the judgment.

According to the aforementioned game system, if the predetermined value reaches a preset rate in a case where the progressive value fails to reach the predetermined value, the center controller transmits the predetermined annunciation signal pertinent to the rate to the gaming machine participating in the game. Therefore, the players can easily predict a period of time left until participation in the game becomes impossible after the progressive value has reached the predetermined value.

An aspect of the present invention is directed to a game system, including: (i) a plurality of gaming machines which execute respective ones of games for obtaining a plurality of progressive bonuses; (ii) a memory which stores progressive values for the plurality of progressive bonuses; and (iii) a center controller which is communicable with each of the plurality of gaming machines via a network, wherein the center controller is configured to: (a) judge whether or not there has been received a participation signal requesting midcourse participation in the game executed in the plurality of gaming machines from another gaming machine; (b) judge whether or not a progressive value corresponding to the participation signal reaches a preset predetermined value, in a case where the progressive value reaches the predetermined value, as a result of the judgment in the process (b); (c) execute a process of rejecting participation in the game, of another gaming machine from which the participation signal has been received, in a case where it is judged that the progressive value reaches the predetermined value; (d) execute a process of allowing participation in the game, of such another gaming machine from which the participation signal has been received, in a case where it is judged that the progressive value fails to reach the predetermined value, as a result of the judgment in the process (b); (e) receive BET information transmitted from such another gaming machine allowed for participation in the game in the process (d); (f) update a progressive value corresponding to the participation signal stored in the memory, based upon the BET information received in the process (e); (g) randomly determine whether to award the progressive bonus for the game to any of the plurality of gaming machines participating in the game; and (h) award the progressive bonus corresponding to the progressive value updated in the process (f) to the gaming machine determined in the process (g).

According to the aforementioned game system, the games for obtaining a plurality of progressive bonuses are provided so that the players can select the games set in response to their individual needs. Further, the center controller performs a process of accepting the participation signal for gaming machines failing to participate in the games for obtaining the progressive bonus until the progressive value has reached the predetermined value, and performs a process of rejecting the participation permission signal if the progressive value has reached the predetermined value. This disables the progressive bonus to be awarded to the gaming machine that has participated partway in a state in which the progressive values have been accumulated. Namely, the progressive bonus can be awarded to the gaming machine that has contributed to the accumulation of the progressive values.

An aspect of the present invention is directed to the game system, wherein: each of the plurality of gaming machines including such another gaming machine has a display device; the center controller transmits a predetermined annunciation signal to another gaming machine whose participation in the game has been rejected, as a process of rejecting participation in the game in the process (c); and such another gaming machine display-controls the display device, based upon the predetermined annunciation signal received from the center controller.

According to the aforementioned game system, if the center controller transmits the predetermined annunciation signal of rejecting the participation signal, the fact is displayed on the display device of the gaming machine having received the annunciation signal. Therefore, the rejection of midcourse participation of the gaming machine having transmitted the participation signal can be easily notified to the player at the gaming machine.

An aspect of the present invention is directed to the game system, wherein: the center controller is further configured to: execute a game for obtaining another progressive bonus game except the game for obtaining the progressive bonus, in response to a request from such another gaming machine whose participation in the game has been rejected in the process (c); and execute the processes (a) to (h) in the executed game for another progressive bonus game.

According to the aforementioned game system, if the center controller performs a process of rejecting the participation signal after the progressive value has reached the predetermined value, no one can participate in a game. Therefore, by accepting participation in a newly generated game, an opportunity of enabling participation in the game can be increased.

An aspect of the present invention is directed to the game system, wherein: the center controller is further configured to: reset a progressive value corresponding to the participation signal stored in the memory, in a case where it is judged that the progressive bonus has been awarded in the process (h); and repeatedly execute the processes (a) to (h) in order to repeatedly perform a game for obtaining the progressive bonus.

According to the aforementioned game system, if the game for the progressive bonus has terminated, the center controller performs a process of resetting the progressive value and permitting the gaming machines to participate in a game, allowing the players to increase the opportunity of enabling participation in the game.

An aspect of the present invention is directed to the game system, wherein: the center controller is further configured to: judge whether or not the progressive value corresponding to the participation signal stored in the memory reaches a preset rate as the predetermined value, in a case where it is judged that the progressive value corresponding to the participation signal fails to reach the predetermined value, as a result of the judgment in the process (b); and transmit a predetermined annunciation signal pertinent to the preset rate as the predetermined value to the plurality of gaming machines participating in the game, based upon the result of the judgment.

According to the aforementioned game system, if the predetermined value reaches the preset rate in a case where the progressive value fails to reach the predetermined value, the center controller transmits the predetermined annunciation signal pertinent to the rate to the gaming machines participating in the game. Therefore, the players can easily predict a period of time left until participation in the game becomes impossible after the progressive value has reached the predetermined value.

An aspect of the present invention is directed to a gaming machine, including: (i) a memory which stores a progressive value for a progressive bonus; (ii) a communication device which communicates with another gaming machine via a network; and (iii) a controller which executes a game for obtaining the progressive bonus, wherein the controller is configured to: (a) judge whether or not there has been received a participation signal requesting midcourse participation in the game from such another gaming machine; (b) judge whether a progressive value of the memory reaches a preset predetermined value, in a case where it is judged that the participation signal has been received in the process (a); (c) execute a process of rejecting participation in the game, of such another gaming machine from which the participation signal has been received, in a case where it is judged that the progressive value fails to reach the predetermined value, as a result of the judgment in the process (b); (d) execute a process of allowing participation in the game, of such another gaming machine from which the participation signal has been received, in a case where it is judged that the progressive value fails to reach the predetermined value, as a result of the judgment in the process (b); (e) receive BET information transmitted from such another gaming machine allowed for participation in the game in the process (d); (f) update a progressive value corresponding to the participation signal stored in the memory, based upon the BET information received in the process (e); (g) randomly determine whether to award the progressive bonus for the game to any of the plurality of gaming machines participating in the game; and (h) award the progressive bonus corresponding to the progressive value updated in the process (f) to the gaming machine determined in the process (g).

According to the aforementioned gaming machine, the gaming machine performs a process of accepting the participation permission signal for the gaming machines failing to participate in the game for obtaining the progressive bonus until the progressive value has reached the predetermined value, and performs a process of rejecting the participation permission signal if the progressive value has reached the predetermined value. This disables the progressive bonus to be awarded to the gaming machine having participated partway in a state in which the progressive values have been accumulated. Namely, the progressive bonus can be awarded to the gaming machine that has contributed to accumulation of the progressive bonuses. Further, the game for obtaining the progressive bonus can be provided without employing the center controller.

An aspect of the present invention is directed to the gaming machine, further including a display device, wherein: the controller display-controls the display device so as to render a predetermined annunciation for another gaming machine whose participation in the game has been rejected, as a process of rejecting participation in the game in the process (c).

According to the aforementioned gaming machine, in the gaming machine, if the controller transmits the predetermined annunciation signal of rejecting the participation signal, the fact is displayed on the display device of the gaming machine having received the annunciation signal. Therefore, the rejection of midcourse participation of the gaming machine having transmitted the participation signal can be easily notified to the player at the gaming machine.

An aspect of the present invention is directed to the gaming machine, wherein: the controller is configured to: execute a game for obtaining another progressive bonus except the game for obtaining the progressive bonus, in response to a request from such another gaming machine whose participation in the game has been rejected in the process (c); and execute the processes (a) to (h) in the executed game for obtaining another progressive bonus game.

According to the aforementioned gaming machine, if the gaming machine performs a process of rejecting the participation signal after the progressive value has reached the predetermined value, no one can participate in a game. Therefore, by accepting participation in a newly generated game, an opportunity of enabling participation in the game can be increased.

An aspect of the present invention is directed to the gaming machine, wherein:

the center controller is further configured to: reset the progressive value stored in the memory, in a case where it is judged that the progressive bonus has been awarded in the process (h); and repeatedly execute the processes (a) to (h) in order to repeatedly perform a game for obtaining the progressive bonus.

According to the aforementioned gaming machine, if the game for obtaining the progressive bonus has terminated, the gaming machine performs a process of resetting the progressive value and permitting the gaming machine to participate in a game, thereby allowing the players to increase an opportunity of enabling participation in the game.

An aspect of the present invention is directed to the gaming machine, wherein:

the center controller is configured to: judge whether or not the progressive value corresponding to the participation signal stored in the memory reaches a preset rate as the predetermined value, in a case where it is judged that the progressive value corresponding to the participation signal fails to reach the predetermined value, as a result of the judgment in the process (b); and transmit a predetermined annunciation signal pertinent to the preset rate as the predetermined value to the plurality of gaming machines participating in the game, based upon the result of the judgment.

According to the aforementioned gaming machine, if the predetermined value reaches a preset rate in a case where the progressive value fails to reach the predetermined value, the gaming machine transmits the predetermined annunciation signal pertinent to the rate to the gaming machine participating in the game. Therefore, the players can easily predict a period of time left until participation in the game becomes impossible after the progressive value has reached the predetermined value.

An aspect of the present invention is directed to a game system, including: (i) a plurality of gaming machines which execute a plurality of games for obtaining a progressive bonus and include a display device for displaying a selection screen inquiring participation in the games; (ii) a memory which stores a progressive value for the progressive bonus; and (iii) a center controller which is communicable with each of the plurality of gaming machines via a network, wherein the center controller is configured to: (a) transmit a participant list, which is displayed on the selection screen of the display device and is pertinent to a plurality of currently participable games, to each of the plurality of gaming machines; (b) judge whether or not there has been received a participation signal requesting midcourse participation in the games executed in the plurality of gaming machines from another gaming machine; (c) judge whether or not the progressive value stored in the memory reaches a preset predetermined value, in a case where it is judged that the participation signal has been received in the process (b); (d) update the participant list so as to exclude a game whose progressive value has reached the predetermined value, in a case where it is judged that the progressive value has reached the predetermined value, as a result of the judgment in the process (c); (e) transmit the updated participant list to another gaming machine having transmitted the participation signal requesting midcourse participation in the games, so that the participant list updated in the process (d) is displayed on a display device of such another gaming machine; (f) update the participant list so as to herein include a game whose progressive value has reached the predetermined value, in a case where it is judged that the progressive value fails to reach the predetermined value, as a result of the judgment in the process (c); (g) transmit the updated participant list to such another gaming machine having transmitted the participation signal requesting midcourse participation in the games, so that the participant list is displayed on the display device of such another gaming machine; (h) receive BET information transmitted from such another gaming machine participating in the games partway; (i) update the progressive value stored in the memory, based upon the BET information received in the process (h); (j) randomly determine whether to award the progressive bonus for the games to any of the plurality of gaming machines having participated in the games; and (k) award a progressive bonus corresponding to the progressive value updated in the process (i), to the gaming machine determined in the process (i).

According to the aforementioned game system, the center controller performs a process of transmitting a participable game list to the gaming machine failing to participate in the game for obtaining the progressive bonus for obtaining the progressive bonus until the progressive value reaches the predetermined value and accepting the participation signal. When the progressive value reaches the preset value, the center controller performs a process of rejecting the participation signal, and further, deletes a game having rejected the participation signal from the participable game list. This disables the progressive bonus to be awarded to the gaming machine having participated partway in a state in which the progressive values have been accumulated. Namely, the progressive bonus can be awarded to the gaming machine that has contributed to accumulation of the progressive values.

According to the present invention, gaming machines and a game system can be provided which is capable of eliminating the player's feeling of unfairness in acquisition of a jackpot common to a plurality of slot machines, by limiting a period of time during which the players can participate in jackpots.

An aspect of the present invention is directed to a game system, including: (i) a first group of a plurality of gaming machines and a second group of a plurality of gaming machines, which execute a progressive bonus game; (ii) a memory including a fixed participant number storage area for the first group of the plurality of gaming machines and a fixed participant number storage area for the second group of plurality of the second gaming machines; and (iii) a controller which can communicate with the first and second groups of the plurality of gaming machines via a network, wherein the controller is configured to: (a) randomly determine a number of gaming machines participable in the first group of the plurality of gaming machines and a number of gaming machines participable in the second group of gaming machines; (b) store, in a respective one of the fixed participant number storage areas of the memory, the number of gaming machines participable by the game machine groups determined in the process (a); and (c) determine whether to accept a participation request, referring to the respective one of the fixed participant number storage areas of the memory, in response to the participation request from a participable gaming machine requesting participation in the first or second group of gaming machines.

According to the aforementioned game system, the controller can prevent reduction of an expectation value for awarding a bonus depending upon a progressive bonus game, by limiting the number of gaming machines participable in a respective one of the plurality of gaming machine groups. Further, the number of gaming machines participable in the plurality of gaming machine groups can be randomly determined. Thus, deviation occurs in the number of gaming machines participable in each of the plurality of gaming machine groups, and deviation occurs in the expectation value for awarding a bonus depending upon the progressive bonus game of each of the plurality of gaming machine groups. Therefore, in a gaming machine group with a large number of participable gaming machines, the progressive value rapidly increases, whereas the expectation value for awarding a bonus is lowered. Further, in the gaming machine group with a small number of participable gaming machines, the progressive value slowly increases, whereas the expectation value for awarding a bonus increases. In this manner, a plurality of various gaming machine groups can be provided, making it possible to cope with a variety of players' needs.

An aspect of the present invention is directed to the game system, wherein: the memory further comprises a participant number storage area for the first group of the plurality of gaming machines and a participant number storage area for the second group of the plurality of the second gaming machines, the controller is configured to: (a) store a number of currently participating gaming machines by gaming machine groups in a respective one of the participant number storage areas of the memory; and (b) award a progressive bonus to the gaming machine, based upon an outcome of a progressive bonus game of the gaming machine from which the participant request has been accepted in the process (c), and the process (c) includes: (c-1) in response to a request of participation in the plurality of the first or second group of gaming machines from a gaming machine, judging whether the number of currently participating gaming machines reaches the number of gaming machines participable in the gaming machine group in which the gaming machine attempts to participate, referring to the participation number storage area of the memory; (c-2) rejecting a participation request from the gaming machine, in a case where it is judged that the number of participable gaming machines has been reached, as a result of the judgment in the process (c-1); and (c-3) accepting the participation request from the gaming machine, in a case where it is judged that the number of participable gaming machines has not been reached, as a result of the judgment in the process (c-1).

According to the aforementioned game system, in order to acquire a progressive bonus, it is necessary to participate in a gaming machine group, and a predetermined number of gaming machines can be participated in the gaming machine group. Thus, even if a new player attempts to participate in a gaming machine group in which a progressive value has been accumulated, the number of participable gaming machines is already reached. Therefore, such new player cannot participate in the gaming machine group, disabling interception of the progressive bonus. Accordingly, the players participating in the gaming machine group never have the feeling of unfairness.

An aspect of the present invention is directed to the game system, wherein: the controller is included in a gaming machine participating in at least either one of the first and second groups of the pluralities of gaming machines.

According to the aforementioned game system, the controller can be provided in plurality, thus making it possible to avoid over-concentration of communication accesses in communication line or to prevent a communication error exerted by cross talk. Even if one controller fails due to an equipment problem, another controller can be substituted therefor. Thus, a fault-free smooth game system can be provided to players.

An aspect of the present invention is directed to a game system, including: (i) a first group of a plurality of gaming machines and a second group of a plurality of gaming machines, which execute a progressive bonus game; (ii) a memory including a fixed participant number storage area and a participant number storage area for the first group of the plurality of the gaming machines and a fixed participant number storage area and a participant number storage area for the second group of the plurality of the gaming machines; and (iii) a controller which can communicate with the first and second groups of the plurality of the gaming machines via a network, wherein the controller is configured to: (a) randomly determine a number of gaming machines participable in the first group of the plurality of the gaming machines and a number of gaming machines participable in the second group of the plurality of the gaming machines; (b) store, in a respective one of the fixed participant number storage areas of the memory, the number of gaming machines participable by the game machine groups determined in the process (a); (c) store a number of currently participating gaming machines by gaming machine groups in a respective one of the participant number storage areas of the memory; (d) determine whether to accept a participation request, referring to a respective one of the fixed participant number storage areas of the memory, in response to the participation request from a gaming machine requesting participation in the first or second group of the plurality of gaming machines; and (e) award a progressive bonus to a gaming machine, based upon an outcome of a progressive bonus game of the gaming machine from which the participation request has been accepted in the process (d), wherein the process (d) includes: (d-1) in response to a request of participation in the plurality of the first or second gaming machine groups from a gaming machine, judging whether the number of currently participating gaming machines reaches the number of gaming machines participable in the gaming machine group in which the gaming machine attempts to participate, referring to the participation number storage area of the memory; (d-2) rejecting a participation request from the gaming machine, in a case where it is judged that the number of participable gaming machines has been reached, as a result of the judgment in the process (d-1); and (d-3) accepting the participation request from the gaming machine, in a case where it is judged that the number of participable gaming machines has not been reached, as a result of the judgment in the process (d-3).

According to the aforementioned game system, the controller can prevent reduction of an expectation value for awarding a bonus depending upon a progressive bonus game, by limiting the number of gaming machines participable in a respective one of the plurality of gaming machine groups. Further, the number of gaming machines participable in the plurality of gaming machine groups can be randomly determined. Thus, deviation occurs in the number of gaming machines participable in each of the plurality of gaming machine groups, and deviation occurs in the expectation value for awarding a bonus depending upon the progressive bonus game of each of the plurality of gaming machine groups. Therefore, the plurality of various gaming machine groups can be provided, making it possible to cope with various players' needs. In order to acquire a progressive bonus, it is necessary to participate in a gaming machine group, and a predetermined number of gaming machines can be participate in the gaming machine group. Thus, even if a new player attempts to participate in a gaming machine group in which a progressive value has been accumulated, the number of participable gaming machines is already reached. Therefore, such new player cannot participate in the gaming machine group, disabling interception of the progressive bonus. Accordingly, the players participating in the gaming machine group never have the feeling of unfairness.

An aspect of the present invention is directed to the game system, wherein: the controller is included in a gaming machine participating in at least either one of the first and second groups of the plurality of gaming machines.

According to the aforementioned game system, the controller can be provided in plurality, thus making it possible to avoid over-concentration of communication accesses in communication line and prevent a communication error due to a cross talk. Even if one of the controllers is disabled due to an equipment problem, another one of the controllers can be substituted therefor. Thus, a smooth game system without a fault can be provided to the players.

An aspect of the present invention is directed to a game system control method, including the steps of: (a) randomly determining a number of gaming machines participable in a first group of a plurality of gaming machines and a number of gaming machines participable in a second group of a plurality of gaming machines; (b) storing, in a respective one of fixed participant number storage areas of a memory, the number of gaming machines participable by gaming machine groups determined at the step (a); and (c) determining whether to accept a participation request, referring to the respective one of the fixed participant number storage areas of a memory, in response to the participation request from a gaming machine requesting participation in the first or second group of the plurality of gaming machines.

According to the aforementioned game system control method, the controller can prevent reduction of the expectation value for awarding a bonus depending upon a progressive bonus game, by limiting the number of gaming machines participable in a plurality of gaming machine groups. Further, the number of gaming machines participable in the plurality of gaming machines is randomly determined, and thus, deviation occurs with the number of gaming machines participable in the plurality of gaming machine groups, and deviation occurs with the expectation value for awarding a bonus depending upon a progressive bonus game in the plurality of gaming machine groups. Thus, in a gaming machine group in which a large number of gaming machines can participate, the progressive value rapidly increases, whereas the expectation value for awarding a bonus decreases. Further, in a gaming machine group in which a small number of gaming machines can participate, the progressive value slowly increases, whereas the expectation value for awarding a bonus increases. In this manner, a plurality of various gaming machine groups can be provided, making it possible to cope with the players' various needs.

An aspect of the present invention is directed to the game system control method, including the steps of: (d) storing, in a respective one of participant number storage areas of the memory, a number of currently participating gaming machines by gaming machine groups; and (e) awarding a progressive bonus to a gaming machine, based upon an outcome of a progressive bonus game of the gaming machine from which the participation request has been accepted at the step (c), wherein the step (c) includes the steps of: (c-1) in response to a request of participation in the plurality of the first or second group of gaming machines from a gaming machine, judging whether the number of currently participating gaming machines reaches the number of gaming machines participable in the gaming machine group in which the gaming machine attempts to participate, referring to the participant number storage area of the memory; (c-2) rejecting the participation request from the gaming machine, in a case where it is judged that the number of participable gaming machines has been reached, as a result of the judgment at the step (c-1); and (c-3) accepting the participation request from the gaming machine, in a case where it is judged that the number of participable gaming machines has not been reached, as a result of the judgment at the step (c-1).

According to the aforementioned game system control method, there is a need to participating in the gaming machine group in order to acquire a progressive bonus, and the predetermined number of gaming machines can participate in the gaming machine group. Thus, if a new player attempts to participate in a gaming machine group in which progressive values have been accumulated, the number of participable gaming machines has already been reached. Thus, such new player cannot participable in the gaming machine group, disabling interception of the progressive bonus. This disables the players participating in the gaming machine group to have the feeling of unfairness.

According to the present invention, a game system and a gaming machine can be provided which eliminate the players' feeling of unfairness in acquisition of the progressive bonuses for the jackpots accumulated by betting from a plurality of slot machines, by limiting the number of gaming machines participable in the jackpots.

An aspect of the present invention is directed to a gaming machine, comprising: (i) a communication interface for interconnecting a plurality of gaming machines so that the gaming machines can be communicated with each other; (ii) a memory which stores a program for exercising centralized control of a progressive bonus game executed in a group of the plurality of gaming machines and a sequence of participating in a progressive bonus game executed in the group of the plurality of gaming machines, in association with identification information of a respective one of the gaming machines; (iii) an input device for inputting withdrawal from a link in which the progressive bonus game is executed in the group of the plurality of gaming machines; and (iv) a controller which executes the program stored in the memory, wherein the controller is configured to: (a) accumulatively store game history data in the memory, the game history data including numeric data associated with a payment of the progressive bonus game received via the communication interface, in response to BET input of a respective one of unit games executed at the plurality of gaming machines; (b) upon receipt of entry of withdrawal from the input device, specify identification information of a gaming machine of which a participation sequence is next to that of a gaming machine exercising centralized control of the progressive bonus game, in response to the participation sequence stored in the memory; and (c) transfer to the gaming machine the game history data and participation sequence data stored in the memory, via the communication interface, to store the specified identification information in a memory of a corresponding gaming machine.

According to the aforementioned gaming machine, when a gaming machine exercising centralized control of a progressive bonus game has withdrawn from the progressive bonus game transmits data required to centralize the progressive bonus game in accordance with a sequence of participation in the progressive bonus game, and changes the game machine exercising centralized control thereof. Therefore, even if a player having performed a game at a gaming machine exercising centralized control of a progressive bonus game terminates the game, the gaming machine exercising centralized control of the progressive bonus game can be efficiently changed.

An aspect of the present invention is directed to the gaming machine, further comprising a display device, wherein the controller is configured to: judge whether the program, the game history data, and the participation sequence data have been received; display on the display device a screen for setting a BET input amount of the progressive bonus, in a case of judging that the program, the game history data, and the participation sequence data has been received; and change the BET input amount of the progressive bonus in response to input information from the screen.

According to the aforementioned gaming machine, a new host slot machine can change a payment condition of a new progressive bonus game, thus making it possible to enhance interest of a player currently participating in the progressive bonus game.

An aspect of the present invention is directed to the gaming machine, wherein: the input device is a liquidation input device for liquidating a credit.

According to the aforementioned gaming machine, if a player liquidates a credit, a game is terminated in many cases. Therefore, upon the liquidation of the credit, the player deems that the game has terminated, and changes a gaming machine exercising the progressive bonus game, thus making it possible to smoothly conduct the game.

An aspect of the present invention is directed to the gaming machine, wherein: the input device is an input device which removably inserts an ID card for identifying a player.

According to the aforementioned gaming machine, if a player removes an ID card, a game is terminated in many cases. Therefore, upon the removal of the ID card, the player deems that the game has terminated, and changes a gaming machine exercising centralized control of a progressive bonus game, thus making it possible to smoothly conduct the game.

An aspect of the present invention is directed to the gaming machine, wherein: the input device is a touch panel button on a display screen displayed when a credit becomes zero.

According to the aforementioned gaming machine, if a credit becomes zero, a game is terminated in many cases. Therefore, when the credit becomes zero, predetermined touch panel buttons are displayed. The player judges that the game has terminated by operating the touch panel buttons, and changes the gaming machine exercising centralized control of a progressive bonus game, thus making it possible to smoothly conduct the game.

An aspect of the present invention is directed to a gaming machine, comprising: (i) a communication interface for interconnecting a plurality of gaming machines so that the gaming machines can be communicated with each other; (ii) a memory which stores a program for exercising centralized control of a progressive bonus game executed in a group of the plurality of gaming machines and a sequence of participating in a progressive bonus game executed in the group of the plurality of gaming machines, in association with identification information of a respective one of the gaming machines; (iii) an input device for inputting withdrawal from a link in which the progressive bonus game is executed in the group of the plurality of gaming machines; (iv) a controller which executes the program stored in the memory; and (v) a display device, wherein the controller is configured to: (a) accumulatively store game history data in the memory, the game history data including numeric data associated with a payment of the progressive bonus game received via the communication interface, in response to BET input of a respective one of unit games executed at the plurality of gaming machines; (b) upon receipt of entry of withdrawal from the input device, specify identification information of a gaming machine of which a participation sequence is next to that of a gaming machine exercising centralized control of the progressive bonus game, in response to the participation sequence stored in the memory; (c) transfer to the gaming machine the game history data and participation sequence data stored in the memory, via the communication interface, to store the specified identification information in a memory of a corresponding gaming machine; and (d) judge whether the program, the game history data, and the participation sequence data have been received, display on the display device a screen for setting a BET input amount of the progressive bonus in a case of judging that the program, the game history data, and the participation sequence data have been received, and change the BET input amount of the progressive bonus game in response to input information from the screen.

According to the aforementioned gaming machine, a new host slot machine can change a payment condition of a new progressive bonus game, thus making it possible to enhance interest of a player currently participating in the progressive bonus game.

An aspect of the present invention is directed to the gaming machine, wherein: the input device is a liquidation input device for liquidating a credit.

According to the aforementioned gaming machine, if a player liquidates a credit, a game is terminated in many cases. Therefore, upon the liquidation of the credit, the player deems that the game is terminated, and changes a gaming machine exercising centralized control of a progressive bonus game, thus making it possible to smoothly conduct the game.

An aspect of the present invention is directed to the gaming machine, wherein: the input device is an input device which removably inserts an ID card for identifying a player.

According to the aforementioned gaming machine, if a player removes an ID card, a game is terminated in many cases. Therefore, upon the removal of the ID card, the player deems that the game has terminated, and changes a gaming machine exercising centralized control of a progressive bonus game, thus making it possible to smoothly conduct the game.

An aspect of the present invention is directed to the gaming machine, wherein: the input device is a touch panel button on a display screen displayed when a credit becomes zero.

According to the aforementioned gaming machine, if a credit becomes zero, a game is terminated in many cases. Therefore, when the credit becomes zero, predetermined touch panel buttons are displayed. The player judges that the game has terminated by operating the touch panel buttons, and changes the gaming machine exercising centralized control of a progressive bonus game, thus making it possible to smoothly conduct the game.

An aspect of the present invention is directed to a link system of gaming machines, each of which comprises: (i) a communication interface for interconnecting a plurality of gaming machines so that the gaming machines can be communicated with each other; (ii) a memory which stores a program for exercising centralized control of a progressive bonus game executed in a group of the plurality of gaming machines and a sequence of participating in a progressive bonus game executed in the group of the plurality of gaming machines, in association with identification information of a respective one of the gaming machines; (iii) an input device for inputting withdrawal from a link in which the progressive bonus game is executed in the group of the plurality of gaming machines; and (iv) a controller which executes the program stored in the memory, wherein a controller of a first gaming machine among the plurality of gaming machines is configured to: (a) accumulatively store game history data in the memory, the game history data including numeric data associated to a payment of the progressive bonus game received via the communication interface, in response to BET input of a respective one of unit games executed at the plurality of gaming machines; (b) upon receipt of entry of withdrawal from the input device, specify identification information of a second gaming machine of which participation sequence is next to that of the first gaming machine exercising centralized control of the progressive bonus game, in response to the participation sequence stored in the memory; and (c) transfer to the second gaming machine the game history data and participation sequence stored in the memory, via the communication interface, to store the specified identification information in a memory of the second gaming machine; and wherein a controller of the second gaming machine storing the game history data and participation sequence in a memory is configured to: (d) on prestored game history data, accumulatively store numeric data associated with a payment of the progressive bonus game received via the communication interface, in response to BET input of a respective one of unit games executed at the plurality of gaming machines; (e) upon receipt of entry of withdrawal from the input device, specify identification information of a third gaming machine of which participation sequence is next to that of the second gaming machine exercising centralized control of the progressive bonus game, in response to the participation sequence stored in the memory; and (f) transfer to the third gaming machine the game history data and participation sequence stored in the memory, via the communication interface, to store the specified identification information.

According to the aforementioned link system of gaming machines, when a gaming machine exercising centralized control of a progressive bonus game has withdrawn from the progressive bonus game, data required to centralize the progressive bonus game is transmitted to another slot machine in accordance with a sequence of participation in the progressive bonus game, and a gaming machine exercising centralized control thereof is changed. Further, even in a case where a slot machine newly exercising centralized control of a progressive bonus game has withdrawn from the progressive bonus game, a slot machine exercising centralized control of the progressive bonus game can be changed similarly. Therefore, even if the gaming machine exercising control withdrawn from a progressive bonus game, the gaming machine exercising centralized control of the progressive bonus game can be changed efficiently and successively, and a progressive bonus game can be stably provided.

An aspect of the present invention is directed to the gaming machine, wherein: the input device is a liquidation input device for liquidating a credit.

According to the aforementioned gaming machine, if a player liquidates a credit, a game is terminated in many cases. Therefore, upon the liquidation of the credit, the player deems that the game has terminated, and changes a gaming machine exercising the progressive bonus game, thus making it possible to smoothly conduct the game.

An aspect of the present invention is directed to the gaming machine, wherein: the input device is an input device which removably inserts an ID card for identifying a player.

According to the aforementioned gaming machine, if a player removes an ID card, a game is terminated in many cases. Therefore, upon the removal of the ID card, the player deems that the game has terminated, and changes a gaming machine exercising centralized control of a progressive bonus game, thus making it possible to smoothly conduct the game.

An aspect of the present invention is directed to the gaming machine, wherein: the input device is a touch panel button on a display screen displayed when a credit becomes zero.

According to the aforementioned gaming machine, if a credit becomes zero, a game is terminated in many cases. Therefore, when the credit becomes zero, predetermined touch panel buttons are displayed. The player judges that the game has terminated by operating the touch panel buttons, and changes the gaming machine exercising centralized control of a progressive bonus game, thus making it possible to smoothly conduct the game.

An aspect of the present invention is directed to a gaming machine comprising: a communication interface connecting the gaming machine to a plurality of gaming machines so as to enable communication with each other; a memory storing a program to exercise centralized control of a progressive bonus game executed by a group of the plurality of gaming machines and payment information including a payment value of the progressive bonus game, the payout value being accumulated according to a BET input in a unit game executed by the group of the plurality of gaming machines, in association with identification information of each of the gaming machines; an input device for making an input indicating withdrawal from a link in which the progressive bonus game is executed by the group of the plurality of gaming machines; and a controller to execute the program stored in the memory, the controller being configured to: (a) specify, upon receipt of the input indicating withdrawal from the input device, identification information of a gaming machine of which a BET amount to the payment value is second to a BET amount to the payment value of the gaming machine exercising the centralized control of the progressive bonus game according to the payment information stored in the memory; and (b) transfer the program and payment information stored in the memory, via the communication interface, to a memory of the gaming machine corresponding to the specified identification information, to store the transferred program and payment information.

According to the aforementioned gaming machine, when a gaming machine exercising centralized control of a progressive bonus game withdraws from the progressive bonus game, data required to exercise centralized control of the progressive bonus game is transmitted to another slot machine in accordance with sequential orders of BET amounts relative to a payment value for the progressive bonus game, and the gaming machine exercising centralized control thereof is changed. Therefore, even if a player having played a game at the gaming machine exercising centralized control of the progressive bonus game terminates the game, the gaming machine exercising centralized control of the progressive bonus game can be efficiently changed.

An aspect of the present invention is directed to the gaming machine, wherein: the gaming machine further comprises a display device, and the controller judges whether the program and the payment information have been received, causes the display device to display a screen for setting a BET input amount of the progressive bonus game upon judging that the program and the payment information have been received, and change the BET input amount of the progressive bonus game in accordance with input information of the screen.

According to the aforementioned gaming machine, a slot machine as a new host can change a payment condition of a new progressive bonus game, thus making it possible to enhance interest of a player currently participating in the progressive bonus game.

An aspect of the present invention is directed to the gaming machine, wherein: the input device is a liquidation input device for liquidating credit.

According to the aforementioned gaming machine, if a player liquidates credit, a game often terminates. Thus, the player deems that the game has terminated upon such liquidation of credit, and changes a gaming machine exercising centralized control of a progressive bonus game, thus making it possible to smoothly conduct the game.

An aspect of the present invention is directed to the gaming machine, wherein: the input device is an input device intended to insert or remove an ID card for identifying a player.

According to the aforementioned gaming machine, if a player removes an ID card, a game often terminates. Therefore, the player deems that the game has terminated upon such removal of the card, and changes a gaming machine exercising centralized control of a progressive bonus game, thus making it possible to smoothly conduct the game.

An aspect of the present invention is directed to the gaming machine, wherein: the input device is a touch panel button on a display screen displayed when credit becomes zero.

According to the aforementioned gaming machine, if credit becomes zero, a game often terminates. A predetermined touch panel button is displayed, causing a player to operate the touch panel button, thereby allowing the player to judge that the game has terminated and change the gaming machine exercising centralized control of a progressive bonus game, so that the game can be smoothly controlled.

An aspect of the present invention is directed to a gaming machine comprising: a communication interface connecting the gaming machine to a plurality of gaming machines so as to enable communication with each other; a memory storing a program to exercise centralized control of a progressive bonus game executed by a group of the plurality of gaming machines and payment information including a payment value of the progressive bonus game accumulated according to a BET input in a unit game executed by the group of the plurality of gaming machines, in association with identification information by the gaming machines; an input device for making an input indicating withdrawal from a link in which the progressive bonus game is executed by the group of the plurality of gaming machines; a controller which executes the program stored in the memory; and a display device, the controller being configured to: (a) specify, upon receipt of entry of withdrawal from the input device, identification information of a gaming machine of which a BET amount relative to the payment value is second to a BET amount relative to the payment value of the gaming machine exercising the centralized control of the progressive bonus game, in accordance with the payment information stored in the memory; (b) transfer the program and payment information stored in the memory, via the communication interface, to a gaming machine, to store the transferred program and payment information in a memory of the gaming machine corresponding to the specified identification information; and (c) judge whether the program and the payment information have been received, and, when a result of the judgment is affirmative, cause the display device to display a screen for setting a BET input amount of the progressive bonus game, and thereafter, change the BET input amount of the progressive bonus game.

According to the aforementioned gaming machine, when a gaming machine exercising centralized control of a progressive bonus game withdraws from the progressive bonus game, data required to exercise centralized control of the progressive bonus game is transmitted to another slot machine in accordance with the sequential orders of BET amounts relative to a payment value for the progressive bonus game, and the gaming machine exercising centralized control thereof is changed. Therefore, even if a player having played a game at the gaming machine exercising centralized control of the progressive bonus game terminates the game, the gaming machine exercising centralized control of the progressive bonus game can be efficiently changed. Further, a slot machine as a new host machine can change a payment condition of a new progressive bonus game, thus making it possible to enhance interest of a player currently participating in the progressive bonus game.

An aspect of the present invention is directed to the gaming machine, wherein: the input device is a liquidation input device for liquidating credit.

According to the aforementioned gaming machine, if a player liquidates credit, a game often terminates. Thus, the player deems that the game has terminated upon such liquidation of credit, and changes a gaming machine exercising centralized control of a progressive bonus game, thus making it possible to smoothly conduct the game.

An aspect of the present invention is directed to the gaming machine, wherein: the input device is an input device intended to insert or remove an ID card for identifying a player.

According to the aforementioned gaming machine, if a player removes an ID card, a game often terminates. Therefore, the player deems that the game has terminated upon such removal of the card, and changes a gaming machine exercising centralized control of a progressive bonus game, thus making it possible to smoothly conduct the game.

An aspect of the present invention is directed to the gaming machine, wherein: the input device is a touch panel button on a display screen displayed when credit becomes zero.

According to the aforementioned gaming machine, if credit becomes zero, a game often terminates. A predetermined touch panel button is displayed, causing a player to operate the touch panel button, thereby allowing the player to judge that the game has terminated and change the gaming machine exercising centralized control of a progressive bonus game, so that the game can be smoothly controlled.

An aspect of the present invention is directed to a link system of gaming machines, a respective one of which comprises: a communication interface interconnecting the plurality of the gaming machines so as to enable communication with each other; a memory storing a program to exercise centralized control of a progressive bonus game executed in a group of the plurality of gaming machines and payment information including a payment value of the progressive bonus game accumulated according to a BET input in a unit game executed by the group of the plurality of gaming machines, in association with identification information by the gaming machines; an input device for making an input indicating withdrawal from a link in which the progressive bonus game is executed by the group of the plurality of gaming machines; and a controller which executes the program stored in the memory, wherein a controller of a first gaming machine in the plurality of gaming machines is configured to: (a) specify, upon receipt of entry of withdrawal from the input device, identification information of a second gaming machine of which a BET amount relative to the payment value is second to a BET amount relative to the payment value of the first gaming machine exercising centralized control of the progressive bonus game, in accordance with the payment information stored in the memory; and (b) transfer the program and payment information stored in the memory, via the communication interface, to the second gaming machine, to store the transferred program and payment information in a memory of the second gaming machine, and wherein: a controller of the second gaming machine storing the program and payment information in the memory is configured to: (c) specify, upon receipt of entry of withdrawal from the input device, identification information of a third gaming machine of which a BET amount relative to the payment value is second to the BET amount relative to the payment value of the second gaming machine exercising centralized control of the progressive bonus game, in accordance with the payment information stored in the memory; and (d) transfer the program and payment information stored in the memory, via the communication interface, to the third gaming machine, to store the transferred program and payment information in a memory of the third gaming machine.

According to the aforementioned link system of gaming machines, when a gaming machine exercising centralized control of a progressive bonus game withdraws from the progressive bonus game, data required to exercise centralized control of the progressive bonus game is transmitted to another slot machine in accordance with the sequential orders of BET amounts relative to a payment value for the progressive bonus game, and the gaming machine exercising centralized control thereof is changed. Therefore, even if a player having played a game at the gaming machine exercising centralized control of the progressive bonus game terminates the game, the gaming machine exercising centralized control of the progressive bonus game can be efficiently changed. Further, when a gaming machine newly exercising centralized control of a progressive bonus game withdraws from the progressive bonus game, the gaming machine exercising centralized control thereof can be changed similarly, thus allowing for continuous centralized control of the progressive bonus game.

An aspect of the present invention is directed to the link system of the gaming machines, wherein: a respective one of the gaming machines further comprises a display device, and the controller judges whether or not the program and the payment information have been received, causes the display device to display a screen for setting a BET input amount of the progressive bonus game upon judging that the program and the payment information have been received, and change the BET input amount of the progressive bonus game in accordance with input information of the screen.

According to the aforementioned link system of gaming machines, a slot machine as a new host can change a payment condition of a new progressive bonus game, thus making it possible to enhance interest of a player currently participating in the progressive bonus game.

An aspect of the present invention is directed to the link system of the gaming machines, wherein: the input device is a liquidation input device for liquidating credit.

According to the aforementioned link system of gaming machines, if a player liquidates credit, a game often terminates. Therefore, the player deems that the game has terminated upon such removal of the card, and changes a gaming machine exercising centralized control of a progressive bonus game, thus making it possible to smoothly conduct the game.

An aspect of the present invention is directed to the link system of the gaming machines, wherein: the input device is an input device intended to insert or remove an ID card for identifying a player.

According to the aforementioned link system of gaming machines, if a player removes an ID card, a game often terminates. Therefore, the player deems that the game has terminated upon such removal of the card, and changes a gaming machine exercising centralized control of a progressive bonus game, thus making it possible to smoothly conduct the game.

An aspect of the present invention is directed to the link system of the gaming machines, wherein: the input device is a touch panel button on a display screen displayed when credit becomes zero.

According to the aforementioned link system of gaming machines, if credit becomes zero, a game often terminates. A predetermined touch panel button is displayed, causing a player to operate the touch panel button, thereby allowing the player to judge that the game has terminated and change the gaming machine exercising centralized control of a progressive bonus game, so that the game can be smoothly controlled.

An aspect of the present invention is directed to a link system of gaming machines, a respective one of which comprises: a communication interface interconnecting the plurality of the gaming machines so as to enable communication with each other; a memory storing a program exercising centralized control of a progressive bonus game executed by a group of the plurality of gaming machines and payment information including a payment value of the progressive bonus game accumulated according to a BET input in a unit game executed by the group of the plurality of gaming machines, in association with identification information by the gaming machines; an input device for making an input indicating withdrawal from a link in which the progressive bonus game is executed by the group of the plurality of gaming machines; a controller to execute the program stored in the memory; and a display device, wherein a controller of a first gaming machine in the plurality of gaming machines is configured to: (a) specify, upon receipt of entry of withdrawal from the input device, identification information of a second gaming machine of which a BET amount relative to the payment value is second to a BET amount relative to the payment value of the first gaming machine exercising centralized control of the progressive bonus game, in accordance with the payment information stored in the memory; (b) transfer the program and payment information stored in the memory, via the communication interface, to the second gaming machine, to store the transferred program and payment information in a memory of the second gaming machine; and (c) judge whether the program and the payment information have been received, and, when a result of the judgment is affirmative, cause the display device to display a screen for setting a BET input amount of the progressive bonus game, and thereafter, change the BET input amount of the progressive bonus game, and wherein: a controller of the second gaming machine storing the program and payment information in the memory is configured to: (d) upon receipt of entry of withdrawal from the input device, specify identification information of a third gaming machine of which a BET amount relative to the payment value is second to the BET amount relative to the payment value of the second gaming machine exercising centralized control of the progressive bonus game, in accordance with the payment information stored in the memory; (e) transfer the program and payment information stored in the memory, via the communication interface, to the third gaming machine, to store the transferred program and payment information in a memory of the third gaming machine; and (f) judge whether the program and the payment information have been received, and, upon judging that the program and the payment information have been received, cause the display device to display the screen for setting the BET input amount of the progressive bonus game, and thereafter, change the BET input amount of the progressive bonus game.

According to the aforementioned link system of gaming machines, when a gaming machine exercising centralized control of a progressive bonus game withdraws from the progressive bonus game, data required to exercise centralized control of the progressive bonus game is transmitted to another slot machine in accordance with the sequential orders of BET amounts relative to a payment value for the progressive bonus game, and the gaming machine exercising centralized control thereof is changed. Therefore, even if a player having played a game at the gaming machine exercising centralized control of the progressive bonus game terminates the game, the gaming machine exercising centralized control of the progressive bonus game can be efficiently changed. Further, when a gaming machine newly exercising centralized control of a progressive bonus game withdraws from the progressive bonus game, the gaming machine exercising centralized control thereof can be changed similarly, thus allowing for continuous centralized control of the progressive bonus game. A slot machine as a new host can change a payment condition of a new progressive bonus game, thus making it possible to enhance interest of a player currently participating in the progressive bonus game.

An aspect of the present invention is directed to the link system of the gaming machines, wherein: the input device is a liquidation input device for liquidating credit.

According to the aforementioned link system of gaming machines, if a player liquidates credit, a game often terminates. Therefore, the player deems that the game has terminated upon such removal of the card, and changes a gaming machine exercising centralized control of a progressive bonus game, thus making it possible to smoothly conduct the game.

An aspect of the present invention is directed to the link system of the gaming machines, wherein: the input device is an input device intended to insert or remove an ID card for identifying a player.

According to the aforementioned link system of gaming machines, if a player removes an ID card, a game often terminates. Therefore, the player deems that the game has terminated upon such removal of the card, and changes a gaming machine exercising centralized control of a progressive bonus game, thus making it possible to smoothly conduct the game.

An aspect of the present invention is directed to the link system of the gaming machines, wherein: the input device is a touch panel button on a display screen displayed when credit becomes zero.

According to the aforementioned link system of gaming machines, if credit becomes zero, a game often terminates. A predetermined touch panel button is displayed, causing a player to operate the touch panel button, thereby allowing the player to judge that the game has terminated and change the gaming machine exercising centralized control of a progressive bonus game, so that the game can be smoothly controlled.

BRIEF DESCRIPTION OF THE DRAWINGS

FIG. 6A is a view showing a data table of slot machine identification information according to the first embodiment;

FIG. 6B is a predetermined-count data table according to the first embodiment;

FIG. 12A is a first predetermined count data table according to a second embodiment;

FIG. 12B is a view showing a second predetermined-count data table according to the second embodiment;

FIG. 13A is a view showing a data table of slot machine identification information according to a third embodiment;

FIG. 13B is a view showing a probability table according to the third embodiment;

FIG. 16A is a view showing a first probability table according to a fourth embodiment;

FIG. 16B is a view showing a second probability table according to the fourth embodiment.

FIG. 56 is an explanatory view showing an exemplary table used to newly create a progressive link according to the center controller;

FIG. 93 is a flowchart showing a subroutine of a client's process of verifying that the play of a game continues in a slot machine; and FIG. 94 is a flowchart showing a subroutine of game processing in a slot machine.

DESCRIPTION OF THE PREFERRED EMBODIMENTS

First Embodiment

Figure 1:
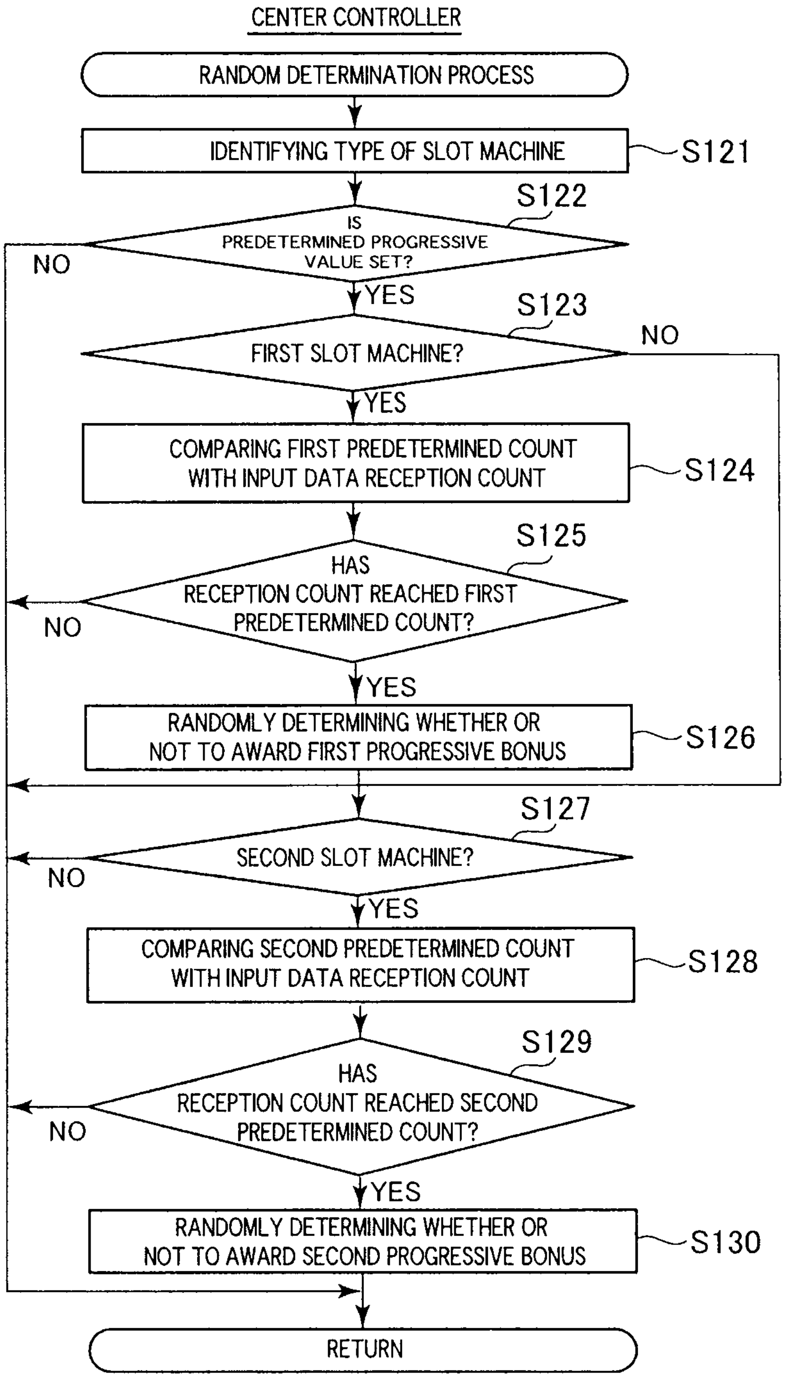
FIG. 1 is a flowchart showing a random determination process associated with a center controller according to a first embodiment.

A game system according to one embodiment of the present invention will be described in detail, referring to the drawings. FIG. 1 is an explanatory view of a random determination process.

First, an overview of games will be described. Slot machines 10 can perform: a standalone game which each player plays independently; and a progressive bonus game which a plurality of players plays simultaneously. The players who play games at the slot machines 10 can also play a progressive bonus game arbitrarily while playing a standalone game.

A game system 100 according to the embodiment is made up of: a center controller 200 having a RAM 203 which stores a progressive value paid as a prize in a progressive bonus game; and a plurality of slot machines 10 which is connected to the center controller 200 via a communication line and which can participate in a progressive bonus game in order to acquire a progressive value paid as a prize. The progressive value stored in the RAM 203 of the center controller 200 is updated so as to increase based upon BET information input from each of the slot machines 10.

A plurality of slot machines include: a first slot machine which executes a progressive bonus game for obtaining a first progressive bonus; and a second slot machine which executes a progressive bonus game for obtaining a progressive bonus greater than the first progressive bonus.

The center controller 200 compares a first predetermined count, which is predetermined for first identification information, with an input data reception count. This comparison is based upon the first identification information included in the input data transmitted from a first slot machine included in a plurality of gaming machines (steps S124 and S125). In a case where the reception count has reached the first predetermined count, a random determination process is executed as to whether or not to award the first progressive bonus (step S126). Alternatively, this controller compares a second predetermined count predetermined for second identification information, which is greater than the first predetermined count, with an input data reception count. This comparison is based upon the second identification information included in the input data that is transmitted from a second slot machine of the plurality of slot machines (steps S128 and S129). In a case where the reception count has reached the second predetermined count, a random determination process is executed as to whether or not to award the second progressive bonus that is greater than the first progressive bonus (step S130).

According to the first embodiment of the present invention, if the input data from the second slot machine fails to include the second identification information as the identification information included in the input data contained in the plurality of slot machines, the random determination process is executed as to whether or not to award the first progressive bonus every time input data is received.

Figure 2:
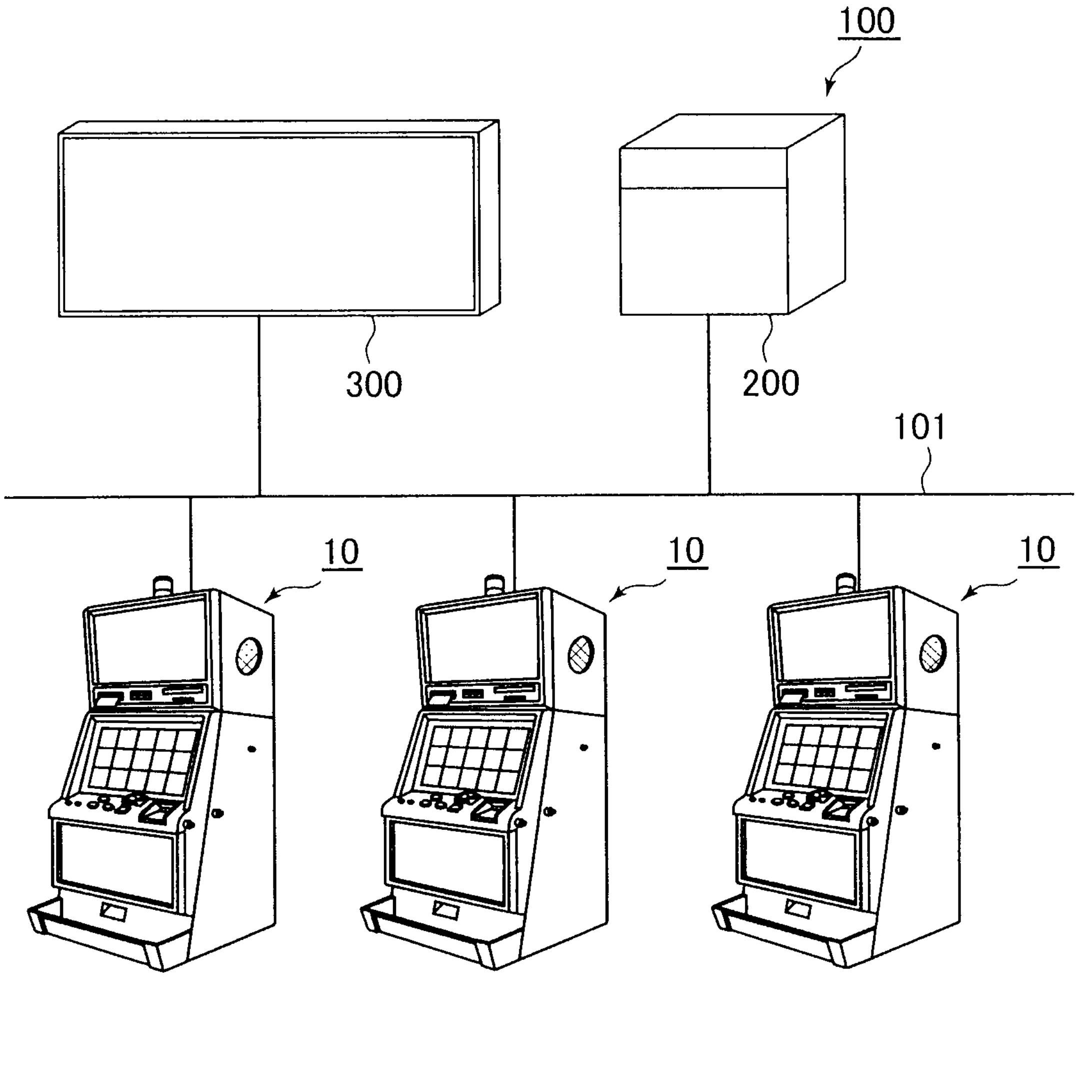
FIG. 2 is a schematic view showing an entire configuration of a game system according to the first embodiment.

Next, an entire configuration of a game system 100 in the first embodiment of the present invention will be described. FIG. 2 is a schematic view showing an entire configuration of the game system. As shown in FIG. 2, the game system 100 is provided with a plurality of slot machines 10, a center controller 200, and a common display device 300. The center controller 200 may be made up of a server, for example.

The plurality of slot machines 10 and a display device 300 are connected to the center controller 200 via a communication line 101. The plurality of slot machines 10 and the display device 300 can mutually transmit/receive data to/from the center controller 200 via the communication line 101. Further, the plurality of slot machines 10 are communicably interconnected via the communication line 101.

The plurality of slot machines 10 has: a first slot machine, which executes a progressive bonus game for obtaining a progressive bonus; and a second slot machine, which executes a progressive bonus game for obtaining a progressive bonus relatively greater than that of the first slot machine. The first slot machine is intended for players with a smaller number of bets on one standalone game than that of the second slot machine, and the second slot machine is a so called high-roller-oriented slot machine which is intended for players with a larger number of bets on one standalone game than that of the first slot machine.

The display device 300 is intended for displaying the amount of prize money in progressive bonus of a progressive link to be described later. This display device is installed at a position at which the players at the plurality of slot machine can visually recognize.

While the present embodiment describes a case in which the plurality of slot machines 10, the center controller 200, and the display device 300 are interconnected via a wire, the present invention is not limitative thereto. Data may be wirelessly transmitted or received. In other words, the communication line according to the present invention includes a wired transmission line and a wireless transmission line. While the present embodiment describes a case in which the game system 100 is installed in one gaming facility, slot machines 10 may be installed separately in other gaming facilities in the present invention.

Figure 3:
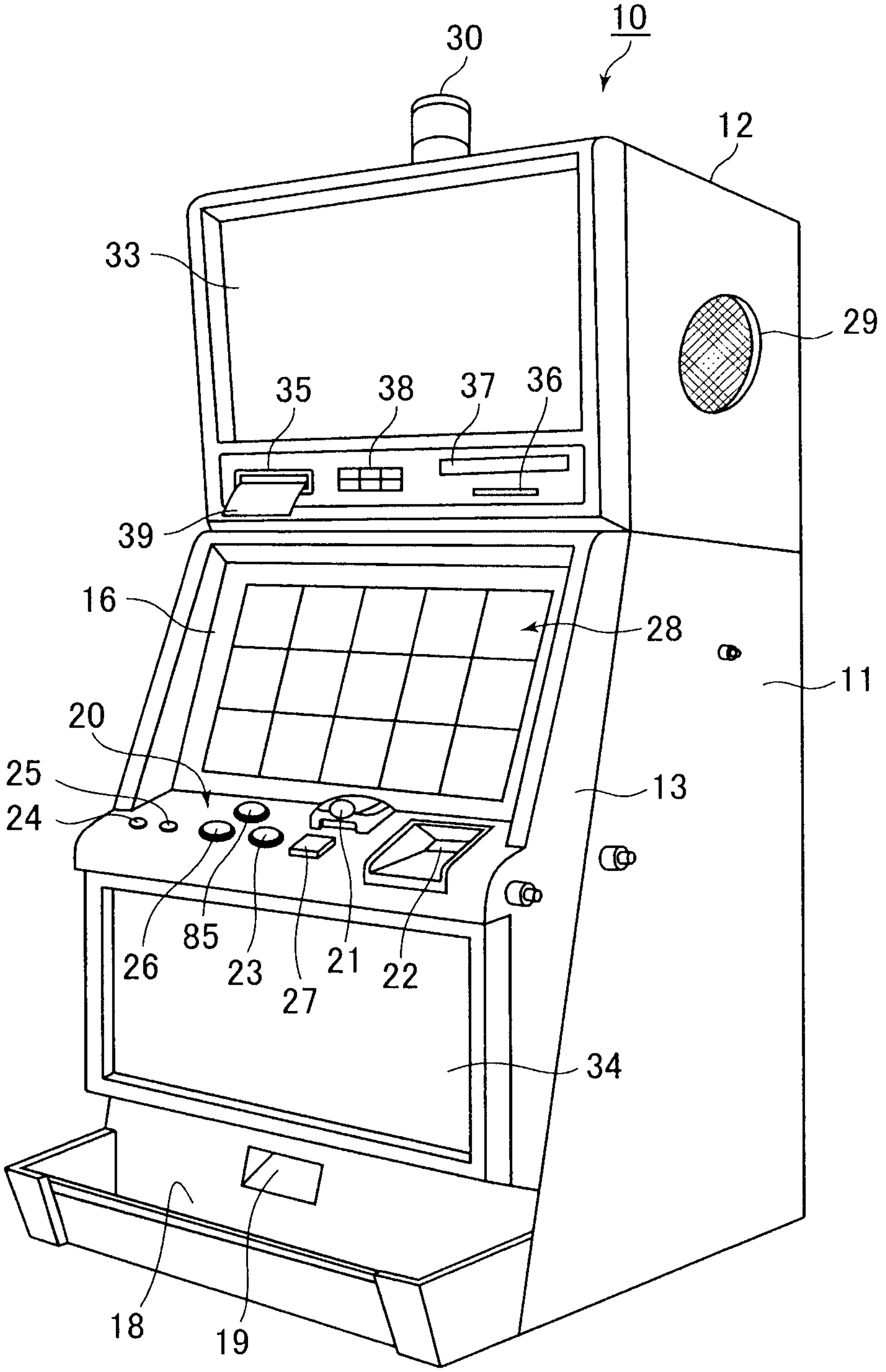
FIG. 3 is a perspective view schematically showing a slot machine according to the first embodiment.

FIG. 3 is a view schematically showing an appearance of a slot machine according to the first embodiment of the present invention. The gaming media used in the slot machine 10 include coins, bills, or electronic value information equivalent thereto. In the present invention, however, medals, tokens, electronic money, or tickets, for example, may be employed as gaming mediums without being limitative thereto in particular. The above tickets are not limitative in particular, and can include barcode-attached tickets or the like, as described later, for example.

The slot machine 10 is provided with: a cabinet 11; a top box 12 which is installed at an upper side of the cabinet 11; and a main door 13 which is provided on a front face of the cabinet 11.

A lower image display panel 16 serving as a display device is provided in front of a main door 13. The lower image display panel 16 is provided with a liquid crystal panel, which displays the symbol matrix 28 in three rows and five columns. One symbol is arranged on each cell of the symbol matrix 28, and a maximum of 15 symbols are displayed.

A control panel 20 is provided on which a plurality of buttons 23 to 27 and 85 for a player to enter instructions according to the progress of a game, a coin slot 21 for a player to insert coins into the cabinet 11, and a bill validator 22 are disposed downwardly of the lower image display panel 16 and at the center of a main door 13.

A start button 23 and a change button 24, a cashout button 25, a 1-BET button 26, a MAX-BET button 27, and a side-BET button 85 are provided on the control panel 20. The start button 23 is intended for entering an instruction for starting a standalone game. The change button 24 is intended for use in asking an attendant of the gaming facility for money exchange. The cashout button 25 is intended for entering an instruction for coins corresponding to credits reserved by a player from the coin slot 19 to a coin tray 18.

The 1-BET button 26 is intended for entering an instruction for betting the credit corresponding to one coin in a game. The MAX-BET button 27 is intended for entering an instruction for betting the credit corresponding to a maximum number of coins which can be bet on one game (50 coins in the embodiment) in a game. The side-BET button 85 is used to place a side-bet in a game other than a standalone game in which symbols are rearranged in the symbol matrix 28. In the present embodiment, part of the bets placed by the 1-BET button 26 and the MAX-BET button 27 or the value(s) of the bet(s) placed by the side-BET button 85 is (are) transmitted to the center controller 200 via a communication channel 101.

The bill validator 22 validates legitimacy of bills and accepts legitimate bills in the cabinet 11. The bill validator 22 may be configured so that a barcode-attached ticket 39 to be described later is readable thereby. A berry glass 34, on which characters of the slot machine 10 and the like are depicted, is provided on a lower front surface of the main door 13, that is, at a lower part of the control panel 20.

An upper image display panel 33 is provided on the front face of the top box 12. The upper image display panel 33 has a liquid crystal panel displaying images for introducing the contents of games or explaining the rules of games, for example.

Further, a lamp 30 and a speaker 29 are provided on the top box 12. A ticket printer 35, a card reader 36, a data display 37, and a keypad 38 are provided at the lower side of the upper image display panel 33. The ticket printer 35 prints, on tickets, bar codes containing coded data such as credit amount, date and time, or ID numbers of the slot machine 10, and the bar code-attached tickets 39 are output. A player can cause another slot machine to read a bar code-attached ticket 39, thereby performing a game at the slot machine, or alternatively, can exchange the bar code-attached ticket 39 with bills in a predetermined location of a gaming facility (for example, cashier in casino).

A card reader 36 reads/writes data from/into a smart card. The smart card is owned by a player, and stores data for identifying players or data pertinent to the history of games performed by players. The smart card may store data corresponding to coins, bills, or credits. A magnetic stripe card may be employed as an alternative of a smart card. A data display 37 is made up of a fluorescent display or the like, and displays data read by the card reader 36 or data input by a player via a keypad 38, for example. The keypad 38 is intended for entering the instructions or data pertinent to the issuance of tickets.

Figure 4A:
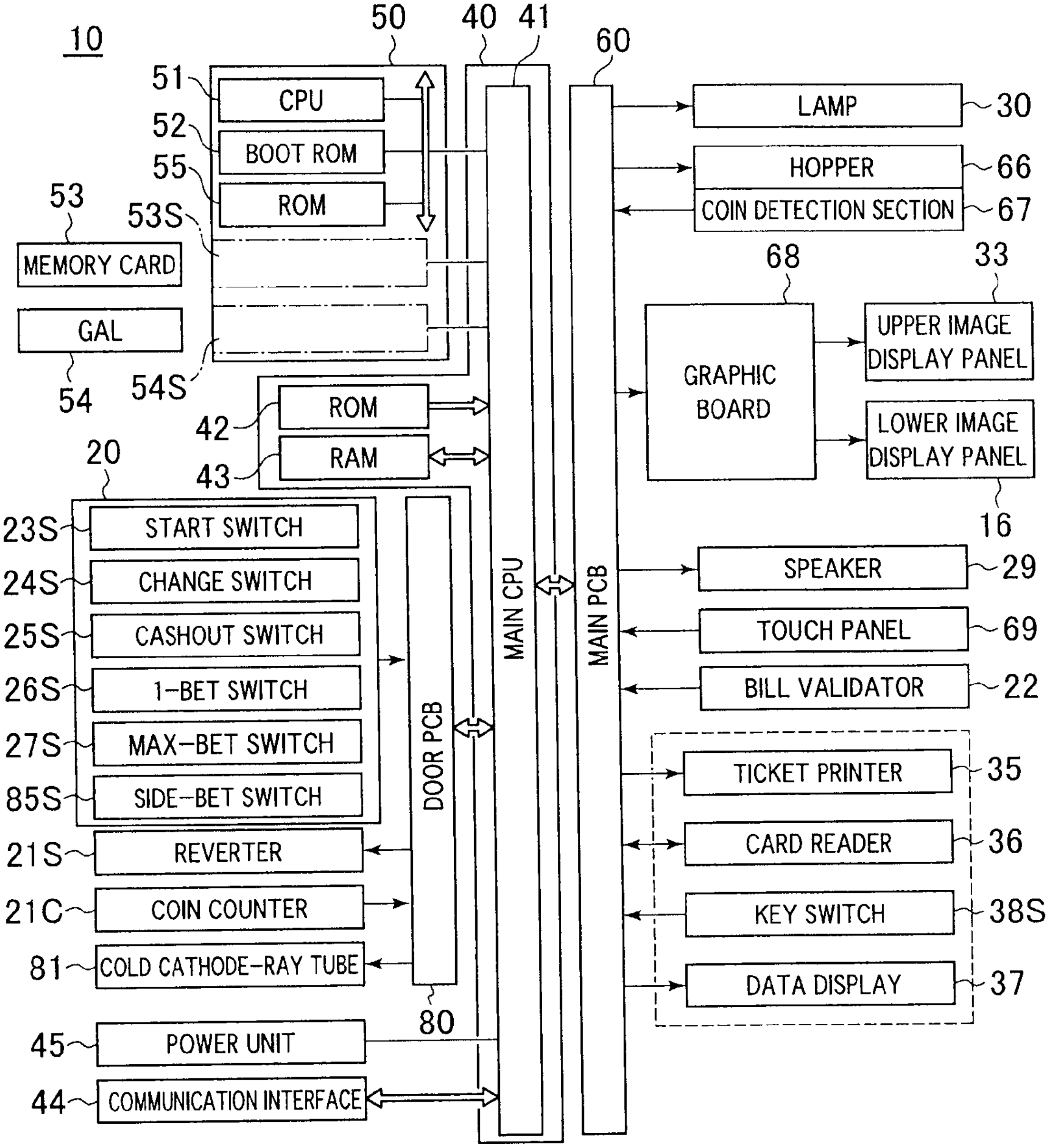
FIG. 4A is a view showing an internal configuration of a slot machine according to the first embodiment.

FIG. 4A is a block diagram depicting an internal configuration of the slot machine shown in FIG. 3. A gaming board 50 is provided with: a CPU (Central Processing Unit) 51 interconnected via an internal bus; a ROM (Read Only Memory) 55 and a boot ROM 52; a card slot 53S corresponding to a memory card 53; and an IC socket 54S corresponding to a GAL (Generic Array Logic) 54.

The memory card 53 is internally provided with a nonvolatile memory, and stores game programs. The game programs include a symbol selection program. The symbol selection program is intended for determining symbols to be rearranged in the symbol matrix 28. The abovementioned symbol selection program contains data, which is indicative of a correspondence relationship between symbols, and one or plural random number values belonging to a predetermined numeric range (0 to 255).

Further, the card slot 53S is constituted so as to removably insert the memory card 53, and is connected to a motherboard 40 via an IDE bus. Therefore, the memory card 53 is removed from the card slot 53S; other game program and game system program are written into the memory card 53; and the memory card 53 is then inserted into the card slot 53S, whereby the types of contents of games performed by the slot machines 10 can be varied. The game programs include those which are relevant to the operating procedures for performing games. Furthermore, the game program includes image data or sound data to be output during the game. The image data includes image data of symbols to be arranged in the symbol matrix 28.

The GAL 54 is one kind of PLD having an OR-fixed arrayed structure. The GAL 54 is provided with a plurality of IN ports and OUT ports. If predetermined items of data are input to the IN port, the corresponding data is output from the OUT port. Further, the IC socket 54S is constituted so as to removably insert the GAL 54, and is connected to the motherboard 40 via a PCI bus.

The CPU 51, the ROM 55, and the boot ROM 52 interconnected via the internal bus are connected to the motherboard 40 via the PCI bus. The PCI bus serves to transmit signals between the motherboard 40 and the gaming board 50 and supply power from the motherboard 40 to the gaming board 50.

The motherboard 40 is constituted using a commercially available motherboard (printed wiring board having basic components of personal computer mounted thereon). This motherboard is provided with a main CPU (Central Processing Unit) 41, a ROM (Read Only Memory) 42, a RAM (Random Access Memory) 43, and a communication interface 44.

The ROM 42 stores programs such as a BIOS (Basic Input/Output System) executed by means of the main CPU 41, and permanent data. When the main CPU 41 executes the BIOS, a process of initializing predetermined peripherals is performed, and an acquisition process is started via the gaming board 50 of the game program and game system program stored in the memory card 53. In the present invention, the contents of the ROM 42 may be rewritable or not.

The RAM 43 stores data or programs employed when the main CPU 41 is activated. The RAM 43 can also store game programs. Further, the RAM 43 stores the data of credit amounts and coin insertion numbers or payout numbers in one game. Every time a standalone game is executed, bet information pertinent to part of the bet(s) or side-BET(s) placed on the standalone game is stored as an accumulative value.

A main PCB (Printed Circuit Board) 60 and a door PCB 80 each are connected to the motherboard 40 via a USB. A power supply unit 45 is also connected to the motherboard 40.

To the main body PCB 60 and the door PCB 80, a device or equipment is connected which generates an input signal input to the main CPU 41, and a device or equipment is connected, an operation of which is controlled by means of a control signal output from the main CPU 41. The main CPU 41 executes the game programs stored in RAM 43, based upon an input signal that was input to the main CPU 41, thereby performing predetermined computational processing. Then, this CPU 41 stores results thereof into RAM 43; and transmits control signals to equipment and devices as control processing relative to the equipment and devices.

A lamp 30, a hopper 66, a coin detection section 67, a graphic board 68, a speaker 29, a touch panel 69, a bill validator 22, a ticket printer 35, a card reader 36, a key switch 38S, and a data display 37 are connected to the main body PCB 60. The lamp 30 lights in a predetermined pattern, based upon a control signal output from the main CPU 41.

The hopper 66 is installed inside of the cabinet 11, and pays out a predetermined count of coins from the coin slot 19 to the coin tray 18, based upon the control signal output from the main CPU 41. A coin detection section 67 is provided inside of the coin payout opening 19. This coin detection section outputs an input signal to the main CPU 41 upon detecting that a predetermined number of coins have been paid out from the coin payout opening 19.

The graphic board 68 controls an image to be displayed on the upper and lower image display panels 33 and 16, based upon the control signal output from the main CPU 41. The amount of credit that is stored in the RAM 43 is displayed at a credit amount display section 93*a* (see FIGS. 7A and 8A) of the lower image display panel 16. Further, the payout number of coins is displayed at a PAID number display section 93*d* (see FIGS. 7A and 8A) of the lower image display panel 16.

The graphic board 68 is provided with: a VDP (Video Display Processor), which generates image data, based upon the control signal output from the main CPU 41; and a video RAM or the like, which temporarily stores the image data that is generated by means of the VDP. The image data used when the image data is generated by the VDP is read from the memory card 53, and thereafter, is included in the game programs stored in the RAM 43.

A speaker 29 outputs a sound such as BGM (Background Music) in accordance with sound data output from the main CPU 41. Further, a touch panel 69 is provided on the front face of the lower image display panel 16, so that a player can enter a variety of instructions by operating a touch panel 69.

The bill validator 22 validates legitimacy of bills, and accepts legitimate bills in the cabinet 11. Upon accepting a legitimate bill, the bill validator 22 outputs an input signal to the main CPU 41, based upon the bill amount. The main CPU 41 stores in the RAM 43 the amount of credits responsive to the amount of bills transmitted by means of the input signal.

The ticket printer 35 prints, on tickets, bar codes including encoded data such as the credit amounts or date and time stored in the RAM 43 based upon the control signal output from the main CPU 41 and ID numbers of slot machines 10, and then, outputs them as bar code-attached tickets 39. The card reader 36 reads data from a smart card, thereby transmitting the read data to the main CPU 41 or writing data into the smart card, based upon the control signal from the main CPU 41. The key switch 38S is provided on the key pad 38, and outputs a predetermined input signal to the main CPU 41 when a player operates the key pad 38. The data display 37 displays, based upon a control signal output from the main CPU 41, the data read by means of the card reader 36, and the data input by a player through the key pad 38.

A control panel 20, a reverter 21S, a coin counter 21C, and a cathode-ray tube 81 are connected to the door PCB 80. On the control panel 20, there are provided: a start switch 23S corresponding to a start button 23; a change switch 24S corresponding to a change button 24; a cashout switch 25S corresponding to a cashout button 25; a 1-BET switch 26S corresponding to a 1-BET button 26; a MAX-BET button 27S corresponding to a MAX-BET button 27; and a side-BET switch 90S corresponding to a side-BET button 85. When the player has operated the buttons 23 to 27 and 85, the corresponding switches 23S to 27S and 90S output input signals to the main CPU 41, respectively.

The coin counter 21C is provided inside of the coin slot 21, and validates legitimacy of a coin inserted into the coin slot 21 by a player. This coin counter discriminates whether a coin inserted by a player into the coin receiving slot 19 is valid or invalid. The coin counter 21C also outputs an input signal to the main CPU 41 if a valid coin is detected.

The reverter 21S is operable based upon the control signal output from the main CPU 41. This reverter distributes the legitimate coins validated by the coin counter 21C to a cashbox (not shown) or a hopper 66 installed in a slot machine 10. In other words, if the hopper 66 is filled with coins, the legitimate coins are distributed to the cashbox by means of the reverter 21S. Otherwise, the legitimate coins are distributed to the hopper 66. The cold cathode-ray tube 81 functions as a backlight installed at the rear side of the lower and upper image display panels 16 and 33, and lights based upon the control signal that was output from the main CPU 41.

Figure 4B:
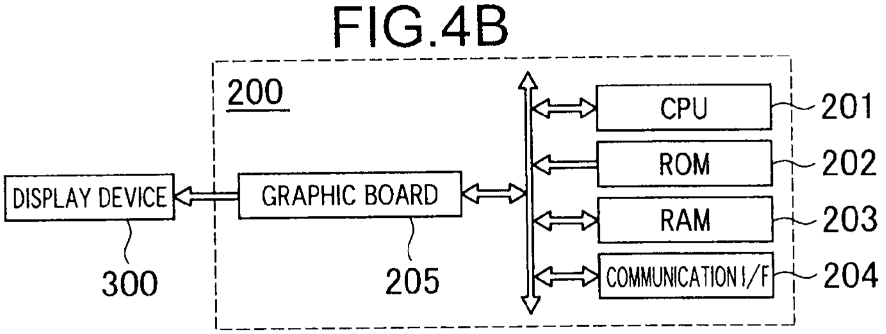
FIG. 4B is a view showing an internal configuration of a center controller according to the first embodiment.

FIG. 4B is a block diagram depicting an internal configuration of the center controller 200 shown in FIG. 2. The center controller 200 has: a CPU 201 functioning as: a controller which controls a plurality of slot machines 10; a ROM 202; a RAM 203; a communication interface 204 which makes communication with a main CPU 41 of the plurality of slot machines 10; and a graphic board 205 which controls a display device 300 to display an image.

The communication interface 204 functions as a receiver device which receives input data from the plurality of slot machines 10. This receiver device receives input data from the plurality of slot machines 10, each of which executes a standalone game independently. These items of input data include: part of a bet or a side-bet which is placed in a standalone game every time the game is executed; and identification information for identifying types of slot machines.

The ROM 202 stores programs, such as the BIOS (Basic Input/Output System) executed by the CPU 201, and permanent data. When the CPU 201 executes the BIOS, a process of initializing predetermined peripherals is performed. Further, the control program and game system program of the center controller 200 is read in the RAM 203. The ROM 202 stores: a data table of slot machine identification information; a predetermined count data table; and a probability table.

The RAM 203 stores, as one accumulative value, part of the bet or the side-BET placed in a standalone game, which is included in the input data received from the plurality of slot machines 10 by means of the communication interface 204.

The CPU 201 awards a progressive bonus randomly in association with an input of input data while it is triggered that the progressive value stored in the RAM 203 has reached a predetermined value. The graphic board 205 controls the common display device 300 to display an image, based upon the control signal output from the main CPU 201.

Figure 5:
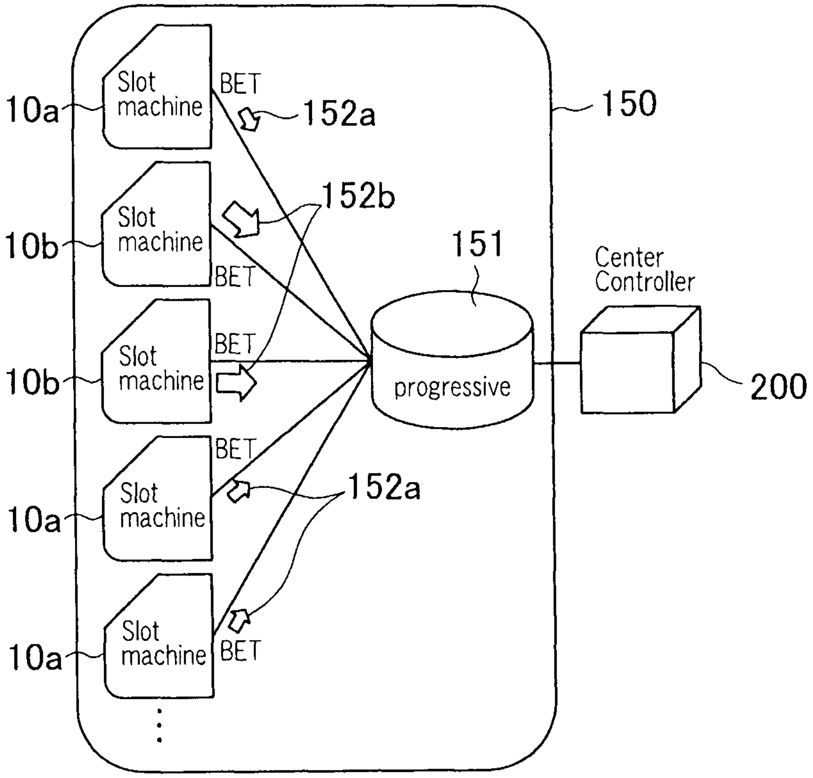
FIG. 5 is a schematic view showing a configuration of a progressive link controlled by the center controller according to the first embodiment.

Next, a configuration of a progressive link in the embodiment will be described. FIG. 5 is a schematic view showing the configuration of the progressive link that the center controller 200 controls. The game system of the present invention is provided with a plurality of gaming machines (progressive links 150) which execute a progressive bonus game.

As shown in FIG. 5, the center controller 200 provides a progressive bonus game in order to award a payment of a progressive bonus. A plurality of slot machines 10 participate in the progressive bonus game. These slot machines 10 that participate in one progressive bonus game are formed in one configuration, and are referred to as a progressive link 150.

The center controller 200 receives input data from the plurality of slot machines 10, each of which executes a standalone game independently. The items of input data include: part of the bet or the side-bet placed in a standalone game when the game is executed; and identification information for identifying types of slot machines 10. At the center controller 200, the RAM 203 is provided which stores one accumulative value obtained as a progressive value 151, for example, input data pertinent to part of the bets or a side-bet, the input data having been received from the plurality of slot machines 10. When the progressive value 151 has reached a predetermined value, a progressive bonus is awarded randomly in association with input of input data.

Referring to one example shown in FIG. 5, a first slot machine 10*a* and a second slot machine 10*b* participate in the progressive link 150. The first slot machine executes a progressive bonus game for obtaining a progressive bonus. The second slot machine executes a progressive bonus game for obtaining a progressive bonus which is relatively greater than that of the first slot machine. Therefore, the amounts of prize money (maximum payout amounts) are set differently at the first and second slot machines 10*a* and 10*b*.

A minimum bet number 152 for one standalone game, to be betted in a progressive bonus game from the plurality of slot machines 10, is set according to types of slot machines. A minimum bet number 152*b* of the second slot machine is set to be greater than a minimum bet number 152*a* of the first slot machine 10*a*. Therefore, the second slot machine 10*b* is a high-roller's slot machine having a larger number of bets than that of the first slot machine 10*a*, and highly contributes to a progressive bonus.

When the progressive value 151 has reached a predetermined value, the center controller 200 compares a first predetermined count, which is predetermined for the first identification information, with an input data reception count. This comparison is based upon the first identification information included in the input data of the first slot machine 10*a*. In a case where the reception count has reached the first predetermined count, a random determination process is executed as to whether or not to award the first progressive bonus.

Further, this center controller compares a second predetermined count predetermined for the second identification information, which is greater than the first predetermined count, with an input data reception count. This comparison is based upon the second identification information included in the input data of the second slot machine 10*b*. In a case where the reception count has reached the second predetermined count, a random determination process is executed as to whether or not to award a progressive bonus which is relatively greater than the first progressive bonus.

FIGS. 6A and 6B are views each showing a variety of data tables according to the first embodiment. FIG. 6A is a view showing a data table of slot machine identification information. FIG. 6B is a view showing a predetermined-count data table.

As shown in FIG. 6A, the data table of slot machine identification information is networked, and defines: a first slot machine from which a progressive bonus is to be paid out; a second slot machine from which a progressive bonus, which is relatively greater than that of the first slot machine, is to be paid out; and identification information for identifying types of the first and second slot machines.

The data table of slot machine identification information is stored in the ROM 202 of the center controller 200. This table is employed to identify the type of the first or second slot machine, based upon input data received every time each of the plurality of slot machines executes a standalone game independently. Specifically, the center controller 200 identifies the type of the first or second slot machine, based upon identification information for identifying slot machines 10 included in the input data received from the first or second slot machine. For instance, if the input data received from the first slot machine includes identification information such as "1000001", the center controller 200 identifies that the received input data is the first slot machine input data.

As shown in FIG. 6B, the predetermined count data table defines identification information for identifying the first or second slot machine and the predetermined count predetermined for identification information.

The predetermined-count data table is stored in the ROM 202 of the center controller 200. This table is employed to compare the predetermined count predetermined for identification information with the input data reception count. Specifically, the center controller 200 compares the predetermined count with an input count, and executes a random determination process as to whether or not to award a progressive bonus in a case where the reception count has reached the predetermined count. For instance, the center controller 200 executes a random determination process of determining a first predetermined count where input data includes identification information such as "10000001", and then, determining whether or not to award a progressive bonus where the input data reception count received from the first slot machine has reached the first predetermined count.

The first embodiment of the present invention defines that the second predetermined count is greater than the first predetermined count. Further, the first predetermined count can be defined so as to execute a random determination process as to whether or not to award a first progressive bonus every time input data is received.

Figure 7A:
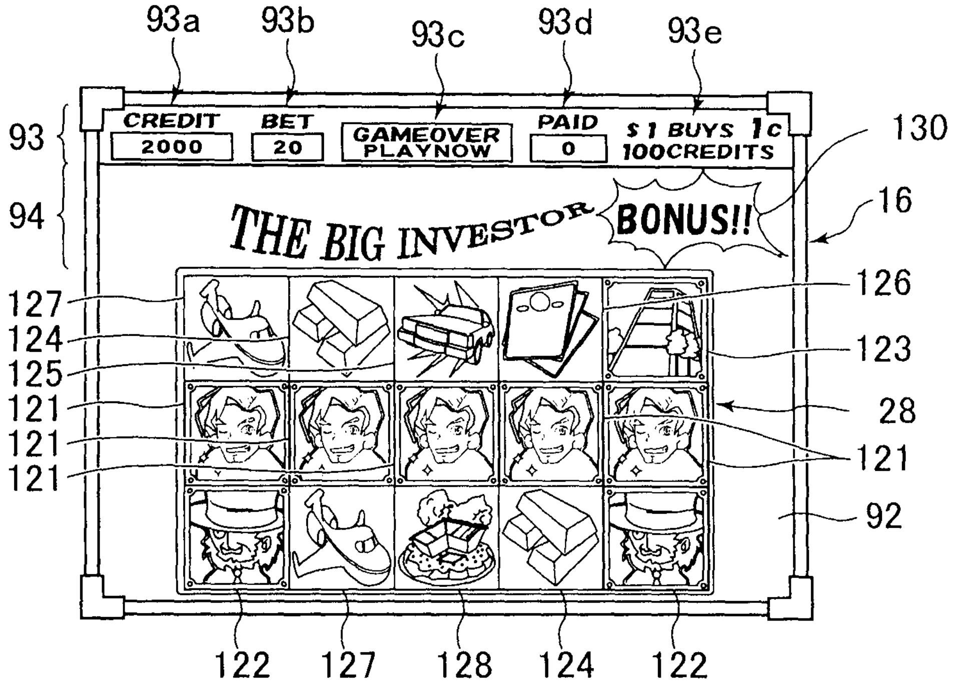
FIG. 7A is a view showing an exemplary image displayed at the slot machine according to the first embodiment.
Figure 7B:
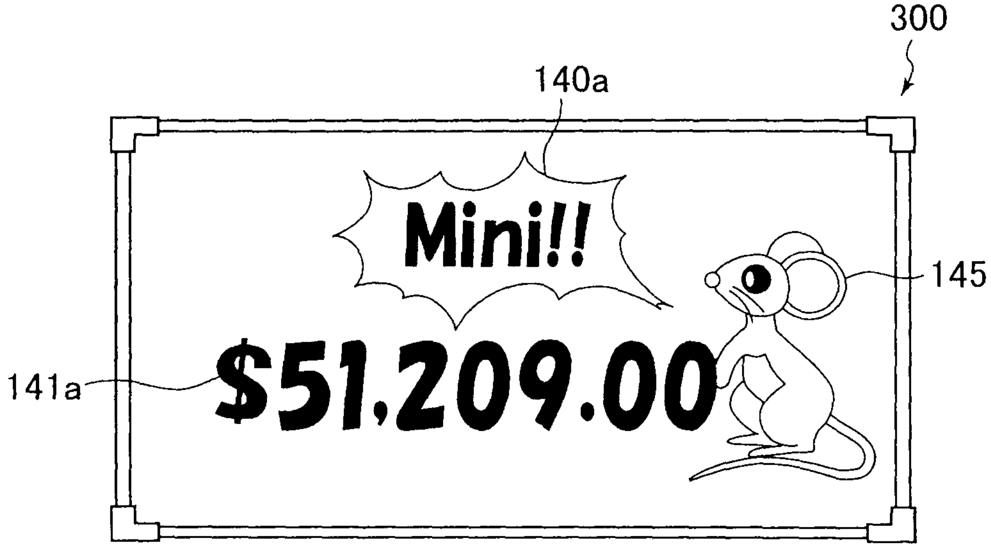
FIG. 7B is a view showing an exemplary image displayed at the slot machine according to the first embodiment.

FIGS. 7A and 7B are views each showing an exemplary image displayed on the lower image display panel 16 of the first slot machine 10 shown in FIG. 3 and an exemplary image displayed on the display device 300 connected to the center controller 200.

As shown in FIG. 7A, the lower image display panel 16 is made up of display sections such as a display area section 92, an information display section 93, an effect image display section 94. A symbol matrix 28 is displayed at the display area section 92. Further, icons for displaying the number of betted coins are disposed at both sides of the symbol matrix 28, and an icon corresponding to the number of bets is controlled to light. The information display section 93 is disposed upwardly of the display area section 92, and is made up of a credit amount display section 93*a*, a bet number display section 93*b*, a character information display section 93*c*, a PAID number display section 93*d*, and a charge display section 93*e*.

The credit amount display section 93*a* displays the number of currently credited coins, and the bet number display section 93*b* displays the number of coins betted in one standalone game. Further, the character information display section 93*c* displays character information which is indicative of a current state of a standalone game. While in the play of a game, letters "PLAY NOW" are displayed, and while not in the play, letters "GAME OVER" are displayed. The PAID number display section 93*d* displays the number of coins paid out in one standalone game, and the charge display section 93*e* displays a converted value of credit relative to a predetermined amount of money.

The effect image display section 94 displays an effect image responsive to the settings of a slot game. As shown in FIG. 7A, while in a progressive bonus game, a bonus display image 130, "BONUS!!" is displayed at the upper right of the effect image display section 94.

Any of the symbols indicative of a "main animation character" 121, a "sub animation character" 122, a "office building" 123, a "bullion" 124, a "car" 125, a "stock certificate" 126, a "jet" 127, and a "cottage" 128 are rearranged in the symbol matrix 28 displayed on the lower image display panel 16. A payout is determined depending upon how many symbols are displayed in the symbol matrix 28. Here, five symbols indicative of the main animation character" 121 have been rearranged at the center of the symbol matrix 28 of the first slot machine in a progressive bonus game. Thus, the first progressive bonus is awarded.

As shown in FIG. 7B, the display device 300 connected to the center controller 200 displays an image representing the amount of prize money as a progressive bonus. Here, the first progressive bonus has been awarded to the first slot machine. Thus, a first progressive bonus display image 140*a*, "Mini!!", and a prize money amount display image 141*a*, which is representative of the amount of prize money as a progressive bonus of "$51,209.00", are displayed. Further, if the first slot machine has won a progressive bonus, a mouse animation character 145 is displayed at the right of the display device 300.

Figure 8A:
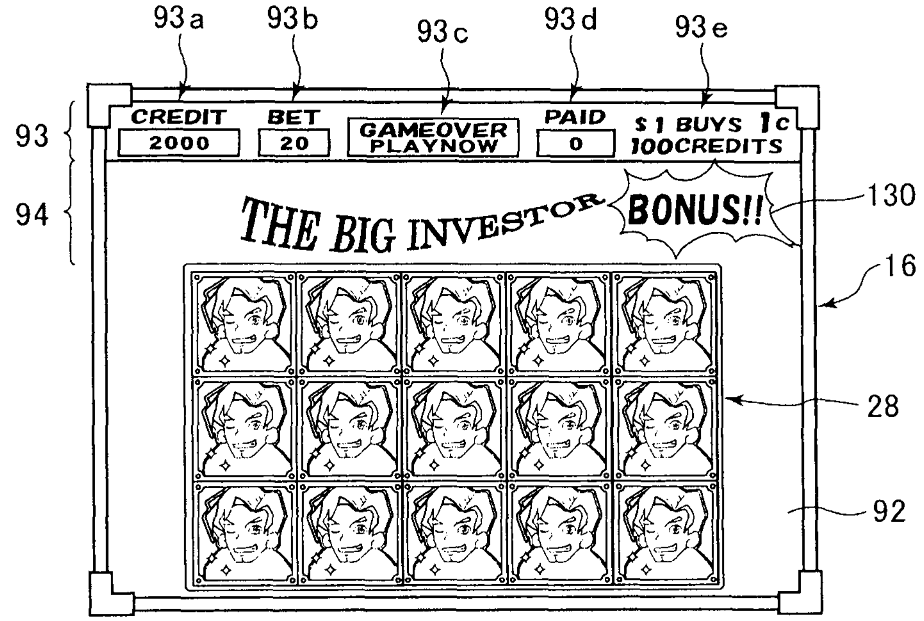
FIG. 8A is a view showing an exemplary image displayed at the slot machine according to the first embodiment.
Figure 8B:
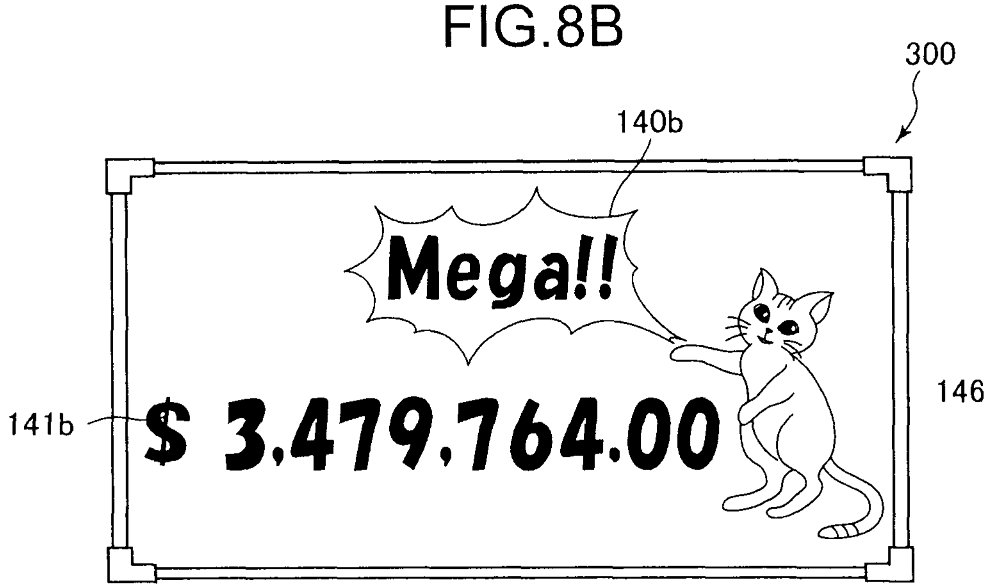
FIG. 8B is a view showing an exemplary image displayed at the slot machine according to the first embodiment.

FIGS. 8A and 8B are views each showing an exemplary image displayed on the lower image display panel 16 of the second slot machine 10 shown in FIG. 3 and an exemplary image displayed on the display device 300 connected to the center controller 200.

As shown in FIG. 8A, any of the symbols, i.e., a "main animation character" 121, a "sub animation character" 122, an "office building" 123, a "bullion" 124, a "car" 125, a "stock certificate" 126, a "jet" 127, and a "cottage" 128, are rearranged in the symbol matrix 28 displayed on the lower image display panel 16. A payout is determined depending upon how many symbols are displayed in the symbol matrix 28. Here, five symbols of the "main animation character" 121 have been rearranged in each of the lines of the symbol matrix 28 of the second slot machine in a game for obtaining a progressive bonus. Thus, the second progressive bonus is awarded.

As shown in FIG. 8B, an image representing the amount of prize money for a progressive bonus is displayed on the display device 300 connected to the center controller 200. Here, the progressive bonus has been awarded to the second slot machine. Thus, a progressive bonus display image 140*b* representative of "Mega!!" and a prize money amount display image 141*b* representative of the amount of prize money for a progressive bonus, "$3,479,764.00" are displayed. If the second slot machine has won a progressive bonus, a cat animation character 146 is displayed at the right of the display device 300.

Next, processes executed at the slot machine 10 and the center controller 200 according to the first embodiment of the present invention will be described in detail, referring to the drawings. The main CPU 41 controls a game progress by reading and executing the game program from the RAM 43. A CPU 201 of the center controller 200 entirely controls a game system 100 by reading and executing a predetermined program.

Figure 9:
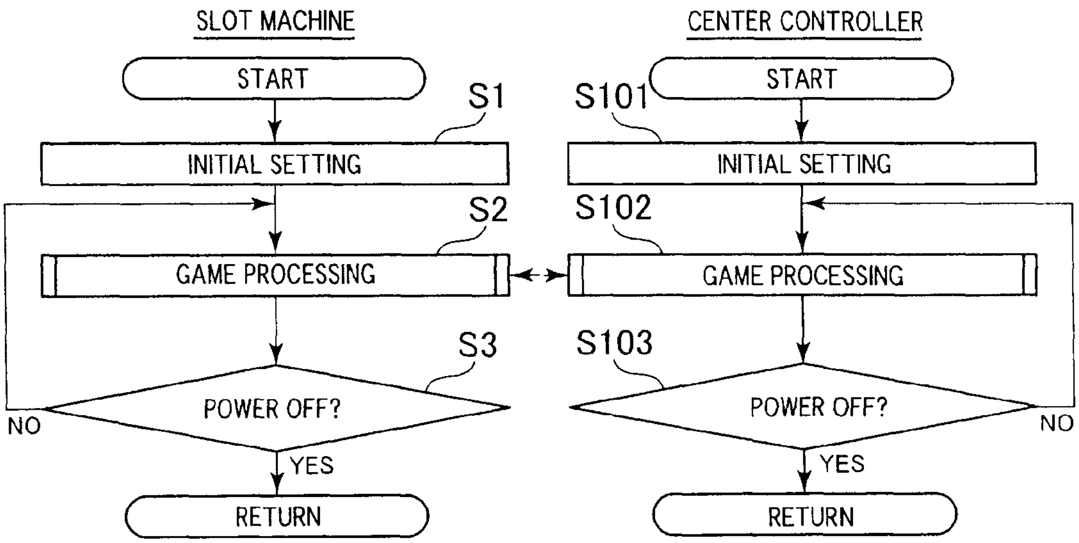
FIG. 9 is a flowchart showing a subroutine of main process according to the first embodiment.

FIG. 9 is a flowchart showing a subroutine of main processing of the slot machine 10 and the center controller 200. In the main processing of the slot machine 10, first, when a power switch is turned ON (when power is supplied), the motherboard 40 and the gaming board 50 are started up, respectively, and the CPU 51 then executes an initial setting process (step S1). In this initial setting process, the main CPU 41 executes the BIOS stored in the ROM 42, decompresses, in the RAM 43, the compressed data included in the BIOS, executes the BIOS decompressed in the RAM 43, and diagnoses and initializes each of the peripheral devices. Further, the main CPU writes programs such as a game program from the memory card 53 into the RAM 43, and acquires country identification information. The main CPU 41 also performs an authentication process for each program during execution of the initial setting process.

Next, the main CPU 41 performs game processing which will be described later referring to FIG. 10 (step S2). In this game processing, the main CPU 41 sequentially reads and executes programs such as game programs from the RAM 43, and then, performs processing of executing a standalone game and a progressive bonus game. The game processing described hereinafter is performed under the cooperative operation between the main CPU 41 of the slot machine 10 and the CPU 102 of the center controller 200. After game processing has terminated, the routine is reverted to game processing while power is supplied to the slot machine 10 (step S3). Namely, the main CPU 41 of the slot machine 10 judges whether or not power has been turned OFF (step S3). When the judgment result is affirmative (step S3: YES), main processing is terminated. Alternatively, when the judgment result is negative (step S3: NO), the routine is reverted to step S2.

In the main processing of the center controller 200, first, when the power switch is turned ON (when power is supplied), the CPU 201 executes an initial setting process (step S101). In this initial setting process, the CPU 201 executes the BIOS stored in the ROM 202; decomposes to the RAM 203, compressive data incorporated in the BIOS; executes the BIOS decompressed to the RAM 203; and diagnoses and initializes peripherals. Further, the CPU 201 acquires identification information for identifying a plurality of slot machines connected to a communication line, via a communication interface 204.

Next, the main CPU 201 performs game processing which will be described later referring to FIG. 10 (step S102). In this game processing, the CPU 201 responds to the game execution process performed by the slot machine 10. As described previously, a game execution process is performed under the cooperative operation between the main CPU 41 of the slot machine 10 and the CPU 201 of the center controller 200. After game processing has terminated, the routine is reverted to game processing while power is supplied to the slot machine 10 (step S102). Namely, the CPU 201 of the center controller 200 judges whether or not power has been turned OFF (step S103). When the judgment result is affirmative (step S103: YES), the main processing is terminated. Alternatively, when the judgment result is negative (step S103: NO), the routine is reverted to step S102.

Next, game processing will be described. FIG. 10 is a flowchart showing a subroutine of game processing invoked and executed at step S2 of the subroutine performed by the slot machine 10 shown in FIG. 9 and at step S102 of the subroutine performed by the center controller 200. The game processing described hereinafter is performed under the cooperative operation between the main CPU 41 of the slot machine 10 and the CPU 201 of the center controller 200.

The main CPU 41 of the slot machine 10 performs the processing at steps S11 to S22 that follow. First, the main CPU 41 judges whether or not coins have been betted (step S11). In this process, the main CPU 41 judges whether or not an input signal output from a 1-BET switch 26S at the time of operating a 1-BET button 26 has been received or judges whether or not an input signal output from a MAX-BET switch 27S at the time of operating the MAX-BET button 27 has been received. The main CPU 41 reverts to step S11 if no coins have been betted (step S11: NO).

Upon judging whether coins have been betted at step S11 (step S11: YES), the main CPU 41 of the slot machine 10 performs a process of subtracting the amount of credit stored in the RAM 43, in response to the number of betted coins (step S12). Further, the main CPU 41 stores in the RAM 43 the amount of credit after subtracted.

Next, the main CPU 41 of the slot machine 10 judges whether or not the SPIN button 23 has been set to ON (step 13). Specifically, the main CPU 41 judges whether or not the input signal outputted from the SPIN switch 23S has been received when the SPIN button 23 has been depressed. In a case where it is judged that the SPIN button 23 has not been set to ON (step S13: NO), the main CPU 41 reverts to step S11.

Alternatively, upon judging whether the SPIN button 23 has been set to ON (step S13: YES), the main CPU 41 of the slot machine 10 proceeds to step S14. Upon judging that the SPIN button 23 has not been set to ON (for example, in a case where an instruction for terminating a game has been entered without the SPIN button 23 being set to ON), the main CPU 41 cancels the process of subtracting the amount of credit performed at step S12.

Next, the main CPU 41 of the slot machine 10 transmits to the center controller 200 the BET information betted at step S11 and the first or second identification information for identifying slot machine 10 stored in the ROM 42, the identification information being stored in the ROM 42 (step S14).

Next, the main CPU 41 of the slot machine 10 judges whether or not a winning progressive bonus signal has been received (step S15). The center controller 200 determines a slot machine, which awards a progressive bonus, from among the plurality of slot machines, and then, transmits the winning progressive bonus signal to only the determined slot machine. Namely, only the slot machine, to which the progressive bonus is awarded, can receive the winning progressive bonus signal.

Upon judging that the winning progressive bonus signal has been received (step S15: YES), the main CPU 41 performs a process of determining the progressive bonus winning symbols (step S16). Specifically, the main CPU 41 determines a combination of symbols indicating a winning progressive bonus while it is triggered that the winning progressive bonus signal has been received at step S15. For example, if the first slot machine is determined to be a slot machine to which a progressive bonus is to be awarded, a combination of symbols rearranged is determined so that symbols of the "main animation character" 121 are rearranged on the center line of the symbol matrix 28 (see FIG. 7A). Alternatively, if the second slot machine is determined to be a slot machine to which a progressive bonus is to be awarded, a combination of symbols rearranged is determined so that symbols of the "main animation character" 121 are rearranged on all of the symbol matrix 28 (see FIG. 8A).

Next, the main CPU 41 of the slot machine 10 performs a process of displaying symbols in a scrolled manner to win a progressive bonus (step S17). Specifically, the main CPU 41 controls processing so that: displaying plural types of symbols in a scrolled manner is started; scrolling display of the symbols is stopped after en elapse of time; and the symbols equivalent to a symbol combination indicating the winning progressive bonus determined at step S16 are rearranged in the symbol matrix 28 accordingly.

Next, the main CPU 41 of the slot machine 10 performs a process of paying out the won progressive bonus (step S18). Specifically, the main CPU 41 pays out coins, based upon the amount of payout included in the winning progressive bonus signal received at step S15. After this process has been completed, this main CPU terminates game processing.

Upon judging that no winning progressive bonus signal has been received (step S15: NO), the main CPU 41 of the slot machine 10 performs a symbol determination process (step S19). Specifically, with respect to the symbols arranged in the symbol matrix 28, the main CPU 41 samples random number values from among those included in a predetermined numeric range. This sampling is accomplished by executing the program stored in the RAM 43. After that, this main CPU compares the sampled random number values with the range of random number values associated with symbols; and determines and rearranges the symbols rearranged in the symbol matrix 28, respectively.

Next, the main CPU 41 of the slot machine 10 performs a scroll display process (step S20). Specifically, the main CPU 41 controls processing so that: scroll-displaying of plural types of symbols is started; such scroll-displaying is stopped after an elapse of a predetermined time; and the symbols determined at step S19 are rearranged in the symbol matrix 28 accordingly.

Next, the main CPU 41 of the slot machine 10 judges whether or not a scatter prize is established (step S21). Specifically, the main CPU 41 judges whether or not the scatter prize is established by determining that three or more trigger symbols for the scatter prize are displayed in a stopped state in any frame of the symbol matrix 28. Upon judging that the scatter prize is established (S21: YES), the main CPU 41 performs a coin payout process (step S22).

Alternatively, upon judging that no scatter prize is established (step S21: NO), the main CPU 41 of the slot machine 10 terminates game processing without paying out coins.

Upon judging that no winning progressive bonus signal has been received (step S15: NO), and further, upon judging that no scatter prize is established (step S21: NO), the main CPU 41 determines that such player is a "loser". The word "loser" used herein denotes a case in which no coin payout is performed.

Next, an operation of the center controller 200 will be described. The CPU 201 of the center controller 200 performs the processes at steps S111 to S117 that follow. First, the CPU 201 receives items of bet information and machine identification information transmitted from the slot machine 10 at step S14 mentioned above (step S111). Specifically, the CPU 201 receives input data from the slot machines 10, each of which executes a standalone game independently. The items of input data include: part of the bets or side-bet(s), which are placed in the standalone game every time it is executed; and the first or second identification information for identifying types of the slot machines 10.

The RAM 203 stores bet information for a progressive bonus by slot machine 10, and the CPU 201 stores bet information in an area of the corresponding slot machine 10 of the RAM 203, based upon identification information for identifying the types of slot machines. Further, the CPU 201 stores in a predetermined area of the RAM 203: the first and second identification information for identifying types of slot machines 10, the information having been transmitted from the slot machines 10 at step S14 mentioned above; and an input data reception count.

Next, the CPU 201 of the center controller 200 performs a process of adding bet information to a progressive value (step S112). Specifically, the CPU 201 updates a progressive value by adding thereto bet information for the progressive bonus of each slot machine 10, the information having been stored in the RAM 203 at step S111. The updated progressive value is stored in the RAM 203. For example, assuming that two slot machines 10 have participated in a progressive bonus game, if they have betted 500 and 300 progressive bets, the center controller 200 adds up these bet numbers (500+300) and stores an added-up progressive value of "800" in the RAM 203.

Next, the CPU 201 of the center controller 200 performs a process of adding up an input data count (step S113). Specifically, with respect to the count of receiving input data stored in the RAM 203 at step S111 mentioned above, the CPU 201 adds up the input data count of the first or second slot machine, based upon identification information for identifying types of slot machines 10. The RAM 203 stores the added-up input data count of the first or second slot machine. For example, if two first slot machines 10 have received 10 times and 25 times as input data counts, respectively, the center controller 200 adds up these input data counts (10+25), and then, stores the added-up value of "35" in the RAM 203.

Next, the CPU 201 of the center controller 200 performs a random determination process which will be described later referring to FIG. 11 (step S114). In this random determination process, this CPU randomly determines whether or not to randomly award a progressive bonus in association with input of input data, while it is triggered that a predetermined progressive value has been reached.

Next, the CPU 201 of the center controller 200 judges whether or not a winning progressive bonus is established (step S115). Specifically, the CPU 201 determines a slot machine 10 to which a progressive bonus is to be awarded, at step S114, and then, judges whether or not a winning progressive bonus is established. Upon judging that no progressive bonus win is established (step S115: NO), the CPU 201 terminates game processing.

Alternatively, upon judging that a winning progressive bonus is established (step S115: YES), the CPU 201 of the center controller 200 transmits a winning progressive bonus signal (step S116). Specifically, where the random numbers sampled at step S114 coincide with specific numbers, the CPU 201 transmits a winning progressive bonus signal, as a winning progressive bonus, to a slot machine to which a specific number has been assigned.

Next, the CPU 201 of the center controller 200 updates a progressive value. Specifically, the CPU 201 updates the progressive values stored in the RAM 203; bet information assigned by slot machine 10; and the values of input data counts of the first or second slot machines (step S117). For example, for the progressive value, the amount of prize money derived when a progressive bonus is paid out is subtracted from the progressive value stored in the RAM 203. Further, the input data count of the first or second slot machine is cleared. Game processing is then terminated.

Figure 10:
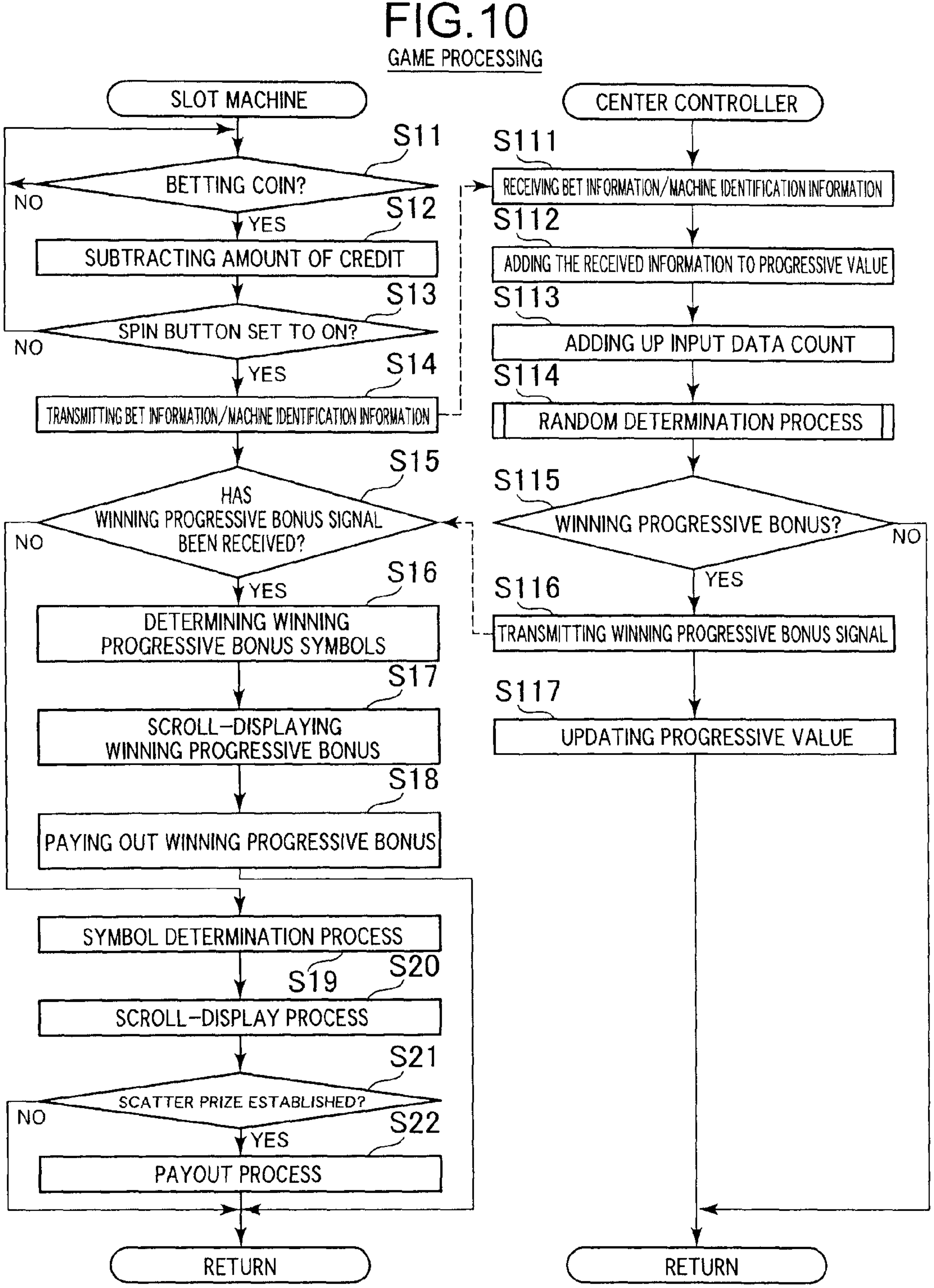
FIG. 10 is a flowchart showing a subroutine of game processing according to the first embodiment.
Figure 11:
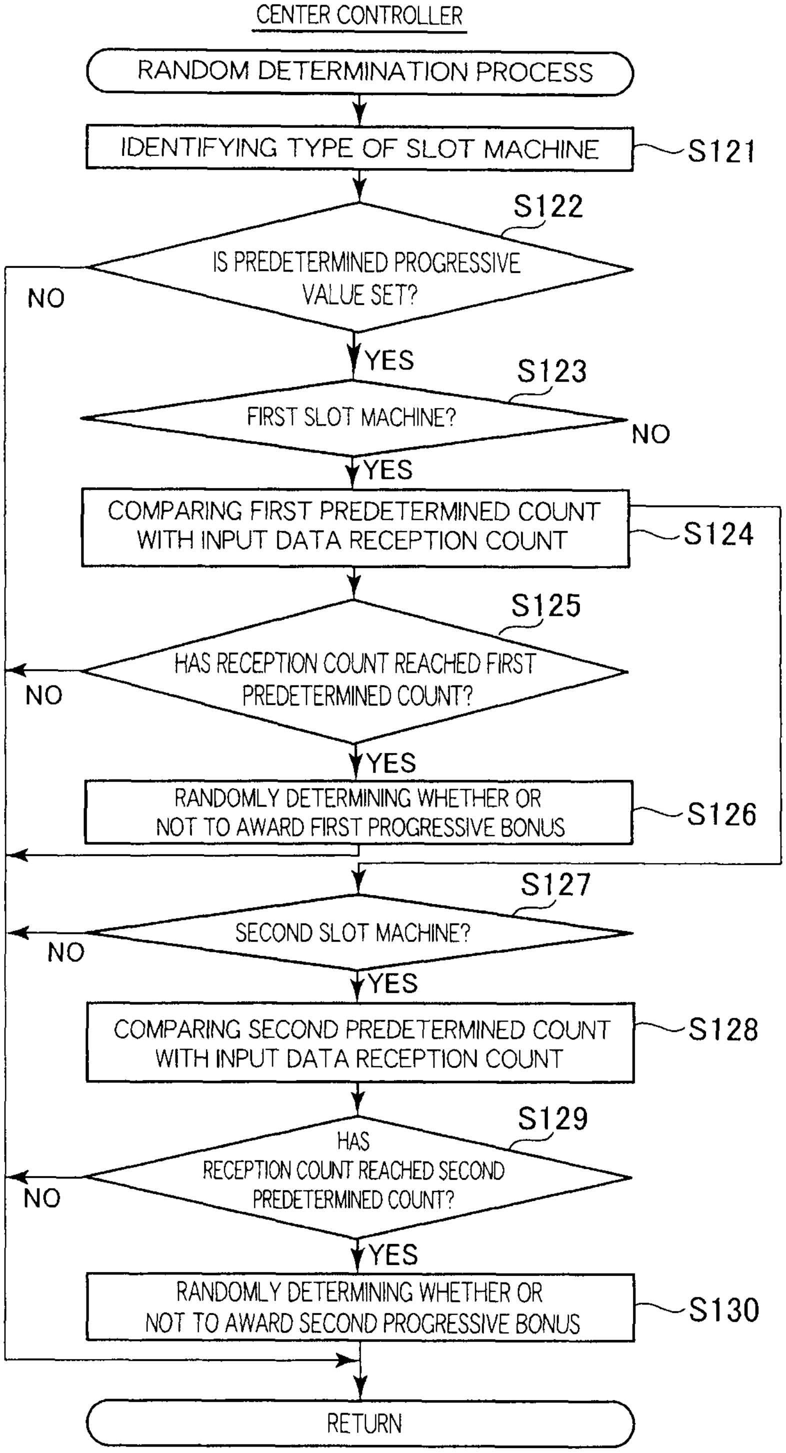
FIG. 11 is a flowchart showing a subroutine of the random determination process according to the first embodiment.

Like FIG. 1, FIG. 11 is a flowchart showing a subroutine of a random determination process invoked and executed at step S114 pertinent to the game processing in the center controller 200 shown in FIG. 10. First, the CPU 201 of the center controller 200 identifies a type of slot machine 10 (step S121). The type of slot machine 10 is identified by means of a data table of slot machine identification information (see FIG. 6A). This identifying process is based upon input data including the first or second identification information for identifying the type of slot machine 10 that the communication interface 204 has received every time each of the slot machines executes a standalone game independently.

Next, the CPU 201 of the center controller 200 judges whether or not a progressive value is a predetermined value (step S122). Specifically, the CPU 201 judges whether or not one accumulative value obtained as the progressive value stored in a storage device has reached a predetermined value. Upon judging that the progressive value is not the predetermined value (step S122: NO), the CPU 201 terminates the random determination process.

Alternatively, when the CPU 201 of the center controller 200 judges that the progressive value is the predetermined value (step S122: YES), the CPU 201 judges whether or not the machine type is the first slot machine (step S123). This judgment is made based upon the first identification information included in input data pertinent to the first slot machine included in the plurality of slot machines 10. Upon judging that the machine type is the first slot machine (step S123: YES), the CPU 201 compares the first predetermined count with the input data reception count (step S124). Specifically, the CPU compares the first predetermined count predetermined for the first identification information with the reception count of input data received every time a standalone game is executed. This comparison is accomplished referring to the predetermined count data table, based upon the first identification information included in the first slot machine (see FIG. 6B).

Next, the CPU 201 of the center controller 200 judges whether or not the reception count has reached the first predetermined count (step S125). When the judgment result is negative (step S125: NO), the CPU 201 terminates the random determination process.

Alternatively, when the judgment result is affirmative (step S125: YES), the CPU 201 of the center controller 200 randomly determines whether or not to award the first progressive bonus (step S126). Specifically, this CPU samples random number values from among those included in the predetermined numeric range by assigning specific numbers to slot machines 10 and executing programs. The CPU determines whether or not to award the first progressive bonus in comparison between the sampled random number values and the specific numbers assigned to the slot machines 10. After this process has been completed, the CPU terminates the random determination process.

Upon judging that the machine type is not the first slot machine (step S123: NO), the CPU 201 of the center controller 200 judges that the machine type is a second slot machine (step S127). This judgment is made based upon the second identification information included in input data pertinent to the second slot machine included in the plurality of slot machines 10. When the judgment result is affirmative (step S127: YES), the CPU 201 compares the second predetermined count with the input data reception count (step S128). Specifically, the CPU 201 compares the second predetermined count predetermined for the second identification information, which is greater than the first predetermined count, with the reception count of input data received every time a standalone game is executed. This comparison is accomplished referring to the predetermined count data table (see FIG. 6B), based upon the second identification information included in the second slot machine.

In this manner, the first predetermined count and the second predetermined count that is greater than the first one are predetermined, based upon the identification information included in the input data received from the plurality of gaming machines. Further, if the input data reception count has reached a predetermined count, a random determination process is executed as to whether or not to award a prize. Therefore, by determining a larger predetermined count of a gaming machine of a non-high roller than that of a high roller, it is possible to employ a configuration which is not disadvantageous to a high roller or that which is not more advantageous to a player who is not a high roller than necessary.

Next, the CPU 201 of the center controller 200 judges whether or not the reception count has reached the second predetermined count (step S129). When the judgment result is negative (step S129: NO), the CPU 201 terminates the random determination process.

Alternative, when the judgment result is affirmative (step S129: YES), the CPU 201 of the center controller 200 randomly determines whether or not to award a second progressive bonus. Specifically, the CPU 201 samples random number values from among those included in the predetermined numeric range by assigning specific numbers to the slot machines 10 and thereafter, executing programs (step S130). The CPU 201 determines whether or not to award the second progressive bonus in comparison between the sampled random number values and the specific numbers assigned to the slot machines 10. After that, this CPU terminates the random determination process.

In this manner, the predetermined count is predetermined based upon the identification information included in the input data received from the plurality of gaming machines. Further, if the input data reception count has reached the predetermined count, the random determination process is executed as to whether or not to award a prize. Therefore, a probability of winning prizes can be varied by determining the different counts of executing the random determination process, depending upon the gaming machines of high rollers or non-high rollers.

According to the first embodiment of the present invention, in the process of step S123, when it is judged that input data of the slot machine 10 fails to include the second identification information, it is possible to execute every time a random determination process as to whether or not to award a first progressive bonus every time input data is received with respect to the first predetermined count.

In this manner, the center controller 200 executes the random determination process as to whether or not to award a second prize smaller than a first prize every time input data is received, if the input data of the second gaming machine fails to include identification information for identifying the first gaming machine. Therefore, by executing the random determination process every time input data is received, it is possible to employ a configuration which is not disadvantageous to a high roller or which is not more advantageous to a player who is not a high roller than necessary.

While the first embodiment of the present invention described a case of so called high-roller-oriented slot machines in which the first slot machine is smaller than the second slot machine in the number of bets placed in one standalone game and the second slot machine is greater than the first slot machine in the number of bets placed in one standalone game, the present invention is not limitative thereto. The CPU 201 of the center controller 200 may be constituted so as to receive the second identification information as input data if the amount of bets stored as an accumulative value in the RAM 43 of the slot machine 10 has reached a predetermined count.

While the first embodiment of the present invention described a case of adding up the first or second slot machine input data and comparing the reception count of the first or second slot machine with a predetermined count, the present invention is not limitative thereto. The slot machines may be constituted so as to compare the input data count by slot machine 10 with the predetermined count without being limitative thereto.

While the first embodiment of the present invention described a case in which the first predetermined count predetermined for the first slot machine identification information can be defined so as to execute every time a random determination process as to whether or not to award the first progressive bonus every time input data is received, the present invention is not limitative thereto. The slot machines may be constituted so as to execute a random determination process every time input data is received if the second slot machine (high roller's slot machine) has not participated in a progressive link.

Next, a game system 100 in a second embodiment of the present invention will be described, referring to the drawings. The game system 100 of the second embodiment that follows determines one predetermined count from among pluralities of first or second predetermined counts, referring to the identification information for identifying types of slot machines and the bet information stored in the RAM 203. Further, the game system in the second embodiment has an appearance or a circuit construction, etc., which is substantially identical to that of the game system 100 according to the first embodiment of the present invention. Therefore, like constituent elements are not described hereinafter. Constituent elements corresponding to those of the game system 100 are assigned by like reference numerals and will be described.

Second Embodiment

FIGS. 12A and 12B are views each showing a variety of data tables according to the second embodiment. FIG. 12A is a view showing a first predetermined count data table. FIG. 12B is a view showing a second predetermined count data table.

As shown in FIG. 12A, the first predetermined data table defines: identification information; first slot machine bet information; and a plurality of the first predetermined counts corresponding to the bet information.

The first predetermined count data table is stored in the ROM 202 of the center controller 200, and is employed to determine the first predetermined count. The sizes of information, i.e., "Mega", "Major", and "Mini" are defined in sequential order from the largest bet amount as one accumulative value obtained as a progressive value. The first predetermined count is defined to be small if the bet amount is great. Thus, if the progressive value of the first slot machine is great, a progressive bonus is likely awarded. Specifically, from among the plurality of the first predetermined counts, the center controller 200 determines one corresponding to each of the sizes of bet information, i.e., "Mega", "Major", and "Mini". This determination is made referring to the first slot machine bet information stored in the RAM 203. For example, if the size of bet information is "Mega", the count corresponding to "the first predetermined count A" is determined as the first predetermined count.

As shown in FIG. 12B, the second predetermined count data table defines: identification information; the second slot machine bet information; and the first predetermined count data corresponding to the bet information.

The second predetermined count data table is stored in the ROM 202 of the center controller 200 and is employed to determine the second predetermined count. The sizes of information, i.e., "Mega", "Major", and "Mini" are defined in sequential order from the largest bet amount as one accumulative value obtained as a progressive value. The second predetermined count is defined to be small if the bet amount is great. Thus, if the progressive value of the second slot machine is great, a progressive bonus is likely awarded. Specifically, from among the plurality of the second predetermined counts, the center controller 200 determines one corresponding to each of the sizes of bet information i.e., "Mega", "Major", and "Mini". This determination is made referring to the second slot machine bet information stored in the RAM 203. For example, if the size of bet information is "Mega", the count corresponding to "the second predetermined count A" is determined as the second predetermined count.

In the second embodiment of the present invention, the second predetermined count data table is defined to be relatively greater in count than the second predetermined count data table. Namely, the first slot machine, which executes a random determination process as to whether or not to award the first progressive bonus if the first predetermined count has been reached, is defined to be greater in count of executing the random determination process than the second slot machine, which executes a random determination process as to whether or not to award the second progressive bonus if the second predetermined count has been reached.

Next, a game system 100 in a third embodiment of the present invention will be described, referring to the drawings. Upon accepting input data from any of the plurality of slot machines, the game system 100 in the third embodiment that follows controls processing so as to judge whether or not input data include either of the first and second identification information.

Upon judging that the accepted input data include the first identification information, the center controller 200 controls processing so as to randomly determine whether or not to award a payment of a progressive bonus game to a slot machine having transmitted input data. This control operation is accomplished, referring to the first probability table stored in the ROM 202. Upon judging that the second identification information is included, the center controller 200 controls processing so as to randomly determine whether or not to award a payment of a progressive bonus game to a slot machine having transmitted input data. This control operation is accomplished referring to the second probability table stored in the ROM 202.

The game system 100 in the third embodiment has an appearance or a circuit construction, etc., which is substantially identical to that of the game system 100 according to the first embodiment of the present invention. Like constituent elements are not described hereinafter. Like constituent elements corresponding to those of the game system 100 are designated by like reference numerals, and will be described.

Third Embodiment

FIGS. 13A and 13B are views each showing a variety of data tables according to the third embodiment. FIG. 13A is a view showing a data table of slot machine identification information. FIG. 13B is a view showing a probability table.

As shown in FIG. 13A, the data table of slot machine identification information is connected via a network. This table defines: a slot machine to which a progressive bonus is to be paid out; a second slot machine to which a progressive bonus relatively smaller than that of the first slot machine is to be paid out; and identification information included in the input data of the first and second slot machine.

The data table of slot machine identification information is stored in the ROM 202 of the center controller. This table is employed to judge which one of the items of the first and second identification information is included in the input data transmitted from the slot machine 10. Specifically, the center controller 200 identifies a type of the first or second slot machine, based upon the identification information included in the input data transmitted from the first or second slot machine. For example, if "the first identification information" is included in the input data transmitted from the slot machine 10, the center controller 200 identifies it as the input data transmitted from "the first slot machine".

As shown in FIG. 13B, identification information and the corresponding probability tables are defined.

The probability tables are stored in the ROM 202 of the center controller 200. A probability table to be referenced is determined based upon identification information. Specifically, the center controller 200 randomly determines whether or not to award a payment of a progressive bonus game to a slot machine having transmitted input data. This determination is made referring to the first or second probability table, based upon the identification information included in the input data transmitted from the first or second slot machine. For example, if input data include "the first identification information", the center controller 200 randomly determines whether or not to award a payment of a progressive bonus game. This determination is made referring to "the first probability table".

The first and second probability tables define predetermined random number value ranges. The first probability table defines a random number value range which is broader than that of the second probability table. Therefore, the first slot machine referencing the first probability table has a higher probability of awarding a payment of a progressive bonus game than that of the second slot machine referencing the second probability table.

Figure 14:
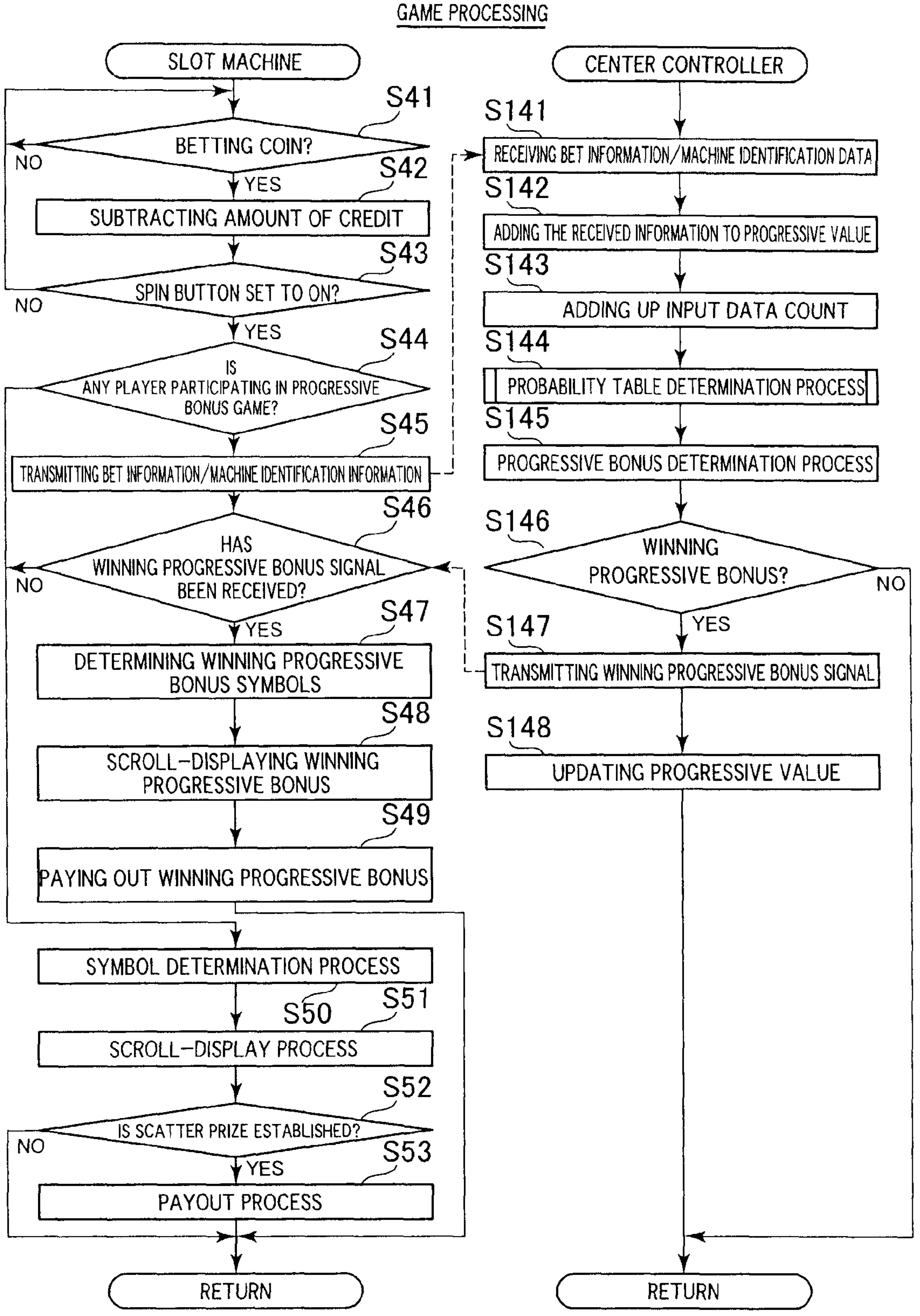
FIG. 14 is a flowchart showing a subroutine of game processing according to the third embodiment.

Next, game processing according to a third embodiment of the present invention will be described. FIG. 14 is a flowchart showing a subroutine of the game processing invoked and executed at step S2 relating to the subroutine of the slot machine 10 shown in FIG. 9 and at step S102 relating to the subroutine of the center controller 200. The game processing described hereinafter is performed under a cooperative operation between the main CPU 41 of the slot machine 10 and the CPU 201 of the center controller 200.

The main CPU 41 of the slot machine 10 performs the processes at steps S41 to S53 that follow. First, the main CPU 41 judges whether or not coins have been betted (step S41). In this process, the main CPU 41 judges whether or not an input signal output from a 1-BET switch 26S at the time of operating a 1-BET button 26 has been received or judges whether or not an input signal output from a MAX-BET switch 27S at the time of operating the MAX-BET button 27 has been received. Upon judging that no coin has been betted (step S41: NO), the main CPU 41 reverts to step S41.

Upon judgment that coins have been betted at step S41 (step S41: YES), the main CPU 41 of the slot machine 10 performs a process of subtracting the amount of credit stored in the RAM 43, in response to the number of betted coins. Further, the main CPU 41 stores in the RAM 43 the amount of credit after subtracted.

Next, the main CPU 41 of the slot machine 10 judges that the SPIN button 23 has been set to ON (step S43). Specifically, the main CPU 41 judges whether or not the input signal outputted from the SPIN switch 23S has been received when the SPIN button 23 has been depressed. If the judgment result is negative (step S43: NO), the main CPU 41 reverts to step S41.

Alternatively, when the judgment result is affirmative (step S43: YES), the main CPU 41 of the slot machine 10 proceeds to step S44. Upon judging that the SPIN button 23 has not been set to ON (for example, where an instruction for terminating a game has been entered without setting the SPIN button 23 to ON, for example), the main CPU 41 cancels subtraction of the amount of credit performed at step S42.

Next, the main CPU 41 of the slot machine 10 judges whether or not a player participates in a progressive bonus game (step S44). Specifically, the main CPU 41 transmits a participation signal, which is indicative of participation in a progressive bonus game, to the center controller 200, and judges whether or not the player participates therein accordingly. When the judgment result is affirmative (step S44: YES), the main CPU 41 of the slot machine 10 transmits to the center controller 200: the bet information to be betted on the progressive value, from among the number of coins betted at step S41; and identification information for identifying the slot machines 10, the information being stored in the ROM 42 (step S45).

Next, the main CPU 41 of the slot machine 10 judges whether or not a winning progressive bonus signal has been received (step S46). The center controller 200 determines a slot machine to which a progressive bonus is to be awarded, from the plurality of slot machines, and then, transmits a winning progressive bonus signal to only the determined slot machine. Namely, only the slot machine to which the progressive bonus is to be awarded can receive the winning progressive bonus signal.

Upon judging that the judgment result is affirmative (step S46: YES), the main CPU 41 performs a process of determining winning progressive bonus symbols (step S47). Specifically, the main CPU 41 determines a combination of symbols indicative of a winning progressive bonus while it is triggered that the winning progressive bonus signal has been received at step S46. For example, if the type of a slot machine 10 determined that a progressive bonus is to be awarded is the first slot machine, a combination of rearranged symbols is determined so that symbols of "the main animation character" 121 are rearranged on the center line of the symbol matrix 28 (see FIG. 7A). Alternatively, if the type of a slot machine 10 determined that a progressive bonus is to be awarded is the second slot machine, a combination of rearranged symbols is determined so that symbols of "the main animation character" 121 are rearranged on the center line of the symbol matrix 28 (see FIG. 8A).

Next, the main CPU 41 of the slot machine 10 performs a process of displaying a winning progressive bonus in a scrolled manner (step S48). Specifically, the main CPU 41 controls processing so that: scroll-display of plural types of symbols is started; such scroll display is stopped after an elapse of a predetermined time; and a combination of the symbols indicative of the winning progressive bonus determined at step S17 is rearranged in the symbol matrix 28 accordingly.

Next, the main CPU 41 of the slot machine 10 performs a process of paying out the won progressive bonus (step S49). Specifically, the main CPU 41 pays out coins, based upon the amount of payout included in the winning progressive bonus signal received at step S46. After this process has been completed, this CPU terminates game processing.

Alternatively, when it is judged that no player participates in a progressive bonus (step S44: NO) or when it is judged that no winning progressive bonus signal has been received (step S46: NO), the main CPU of the slot machine 10 performs a symbol determination process (step S50). Specifically, the main CPU 41 samples random number values from among those included in a predetermined numeric range. This sampling is accomplished by executing the programs stored in the RAM 43 with respect to the symbols arranged in the symbol matrix 28. This CPU determines and rearranges symbols respectively in the symbol matrix 28 while comparing the sampled random number values with the range of the random number values associated with the symbols.

Next, the main CPU 41 of the slot machine 10 performs a scroll display process (step S51). Specifically, the main CPU 41 controls processing so that: scroll displaying of plural types of symbols is started; such scroll-displaying is stopped after an elapse of a predetermined time; and the symbols determined at step S50 are rearranged in the symbol matrix 28 accordingly.

Next, the main CPU 41 of the slot machine 10 judges whether or not a scatter prize is established (step S52). Specifically, the main CPU 41 judges whether or not the scatter prize is established by determining that three or more trigger symbols for the scatter prize are displayed in a stopped state in any frame of the symbol matrix 28. When the judgment result is affirmative (S22: YES), the main CPU 41 performs a coin payout process (step S53).

Alternatively, when the judgment result is negative (step S52: NO), the main CPU 41 of the slot machine 10 terminates game processing without paying out coins.

Upon judging that no winning progressive bonus signal has been received (step S46: NO), and further, upon judging that no scatter prize is established (step S52: NO), the main CPU 41 determines that such player is a "loser". The word "loser" used herein denotes a case in which no coin payout is performed.

Next, an operation of the center controller 200 will be described. The CPU 201 of the center controller 200 performs the processing at steps S141 to S148 that follow. First, the CPU 201 receives items of the bet information and the machine identification information, that have been transmitted from the slot machine 10 at step S14 mentioned above (step S141). Specifically, the CPU 201 receives input data from the slot machine 10, each of which executes a standalone game independently. The input data includes: part of the bet or the side-bet placed in a standalone game every time the game is executed; and the first or second identification information for identifying the type of slot machine 10.

The RAM 203 stores progressive bonus bet information by slot machine 10. The CPU 201 stores bet information in an area of the corresponding slot machine 10 of the RAM 203, based upon identification information for identifying the type of slot machine. Further, the CPU 201 stores in a predetermined area of the RAM 203: the first and second identification information for identifying the type of the slot machine 10, the information having been transmitted from the slot machines 10 at step S45 mentioned above; and the reception count of the received input data.

Next, the CPU 201 of the center controller 200 performs a process of adding bet information to a progressive value (step S142). Specifically, the CPU 201 updates the progressive value by adding thereto the bet information for the progressive bonus of slot machines 10, the information having been stored in the RAM 203 at step S141. The updated progressive value is stored in the RAM 203. For example, after two slot machines 10 have participated in a progressive bonus game, if they have placed 500 progressive bets and 300 progressive bets, the center controller 200 adds up these bet numbers (500+300), and stores the added-up progressive value of "800" in the RAM 203.

Next, the CPU 201 of the center controller 200 performs a process of adding up an input data count (step S143). Specifically, the CPU 201 adds up the count of the first or second slot machine input data. This adding-up is based upon the reception count of the input data that is inclusive of the first or second identification information for identifying the type of slot machine 10, the information having been stored in the RAM 203 at step S141 mentioned above. The added-up count of the first or second slot machine input data is stored in the RAM 203. For example, if the input counts of the input data of the two first slot machines 10 are 10 times and 25 times, respectively, the center controller 200 adds up the counts of these input data (10+25), and then, stores the added-up value of "35" in the RAM 203.

Next, the CPU 201 of the center controller 200 performs a probability table determination process which will be described later referring to FIG. 15 (step S144). In this probability table determination process, this CPU references a probability table which is based upon identification information, and determines a probability table for randomly determining whether or not to award a payment of a progressive bonus game.

Next, the CPU 201 of the center controller 200 performs a progressive bonus determination process (step S145). In this progressive bonus determination process, this CPU determines a slot machine to which a progressive bonus is to be awarded, from among the first and second slot machines.

Next, the CPU 201 of the center controller 200 judges whether or not a winning progressive bonus is established (step S146). Specifically, the CPU 201 references the probability table determined at step S144 (see FIG. 13B) for a slot machine having transmitted bet information and machine identification information at step S45; assigns a specific number; and then, samples random numbers from a predetermined numeric range including the specific number. After this process has been completed, the CPU 201 judges whether or not the sampled random number coincides with the specific number. Upon judging that no winning progressive bonus is established (step S146: NO), the CPU 201 terminates game processing.

Alternatively, upon judging that a progressive bonus is established (step S146: YES), the CPU 201 of the center controller 200 transmits a winning progressive bonus signal (step S147). Specifically, upon judging that one of the random numbers sampled at step S146 coincides with the specific number, the CPU 201 transmits a winning progressive bonus signal, as a winning progressive bonus, to a slot machine to which the specific number has been assigned.

Next, the CPU 201 of the center controller 200 updates a progressive value. Specifically, the CPU 201 updates: the winning progressive value in the progressive bonus stored in the RAM 203; bet information by slot machine 10; and the value of the input data count of the slot machine 10 (step S148). For example, the amount of prize money obtained when the progressive bonus has been paid out is subtracted from the progressive value that is stored in the RAM 203. Further, the input data count of the first or second slot machine is cleared. After this process has been completed, the CPU terminates game processing.

Figure 15:
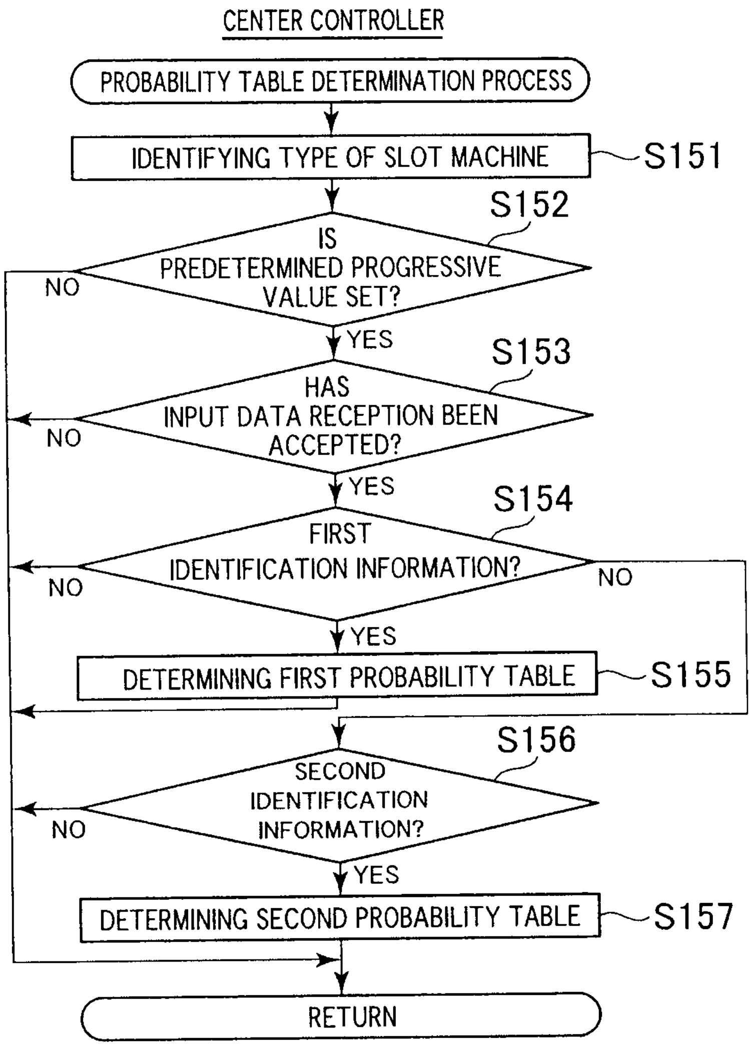
FIG. 15 is a flowchart showing a subroutine of a probability table determination process according to the third embodiment.

FIG. 15 is a flowchart showing a subroutine of a probability table determination process according to a third embodiment of the present invention. The probability table determination process is invoked and executed at step S144 relating to the game processing in the center controller 200, shown in FIG. 14. First, the CPU 201 of the center controller 200 judges types of slot machines 10 (step S151). As the types of slot machines 10, the types of the first and second slot machines are identified, based upon identification information (see FIG. 13A). The identification information is included in the input data transmitted from a plurality of gaming machines. These gaming machines execute a progressive bonus game in which slot machines including the first and second identification information in their input data participate.

Next, the CPU 201 of the center controller 200 judges whether or not a progressive value is a predetermined value (step S152). Specifically, the CPU 201 judges whether or not one accumulative value obtained as the progressive value stored in the storage device has reached a predetermined value. When the judgment result is negative (step S152: NO), the CPU 201 terminates the probability table determination process.

Alternatively, when the judgment result is affirmative (step S152: YES), the CPU 201 of the center controller 200 judges whether or not the input data has been accepted (step S153). Specifically, the CPU 201 judges whether or not the input data has been accepted including either of the items of the first and second identification information that the slot machine 10 has transmitted. When the judgment result is negative (step S153: NO), the CPU 201 terminates the probability table determination process.

Alternatively, when the judgment result is affirmative (step S153: YES), the CPU 201 of the center controller 200 judges whether or not first identification information exists (step S154). Specifically, the CPU 201 of the center controller 200 judges whether or not the identification information included in the received input data is the first identification information included in the first slot machine input data. When the judgment result is affirmative (step S154: YES), the CPU 201 determines a first probability table (step S155). Specifically, this CPU determines the first probability table that corresponds to the first identification information included in the first slot machine input data (see FIG. 13B). After this process has been completed, the CPU 201 terminates the probability table determination process.

When the judgment result is negative (step S154: NO), the CPU 201 of the center controller 200 judges whether or not the second identification information exists. Specifically, the CPU 201 of the center controller 200 judges that the identification information included in the received input data is the second identification information included in the second slot machine input data. When the judgment result is negative (step S156: NO), the CPU 201 determines a second probability table (step S157). Specifically, this CPU determines the second probability table that corresponds to the second identification information included in the second slot machine input data (see FIG. 13B). After this process has been completed, the CPU 201 terminates the probability table determination process.

Whether or not to award a payment of a progressive bonus is randomly determined, referring to the probability table. This determination is based upon the identification information included in the input data received from the plurality of gaming machines. Therefore, a probability of winning a progressive bonus can be varied referring to probability tables which are different depending upon the gaming machines of high rollers and non-high rollers.

Next, a game system 100 in a fourth embodiment of the present invention will be described, referring to the drawings. The game system 100 in the fourth embodiment that follows determines one probability table from among the pluralities of the first or second probability tables. This determination is made referring to the identification information for identifying types of slot machines and the bet information that is stored in the RAM 203. Further, the game system 100 in the third embodiment has an appearance or a circuit construction, etc., which is substantially identical to that of the game system 100 according to the first embodiment of the present invention. Therefore, like constituent elements are not described hereinafter. Further, like constituent elements corresponding to those of the game system 100 are designated by like reference numerals, and will be described hereinafter.

Fourth Embodiment

FIGS. 16A and 16B are views each showing a variety of data tables according to the fourth embodiment. FIG. 16A is a view showing the first probability tables. FIG. 16B is a view showing the second probability tables.

As shown in FIG. 16A, the first probability table defines: identification information; bet information pertinent to the first slot machine; and a plurality of first probability tables corresponding to the bet information.

The first probability tables are stored in the ROM 202 of the center controller 200, and are employed to randomly determine whether or not to award a payment of a progressive bonus game to the first slot machine. The items of the bet information, i.e., “Mega”, “Major”, and “Mini” are defined in sequential order from the largest amount of bet as one accumulative value which becomes a progressive value. In the first probability tables, the numeric range of random number values is defined so that, if the amount of bet is great, the probability is high. Thus, if the progressive value of the first slot machine is great, a progressive bonus is likely awarded. Specifically, the center controller 200 determines a first probability table corresponding to the size of bet information, i.e., “Mega”, “Major”, or “Mini”, from among the plurality of the first probability tables. This determination is made referring to the bet information pertinent to the first slot machine stored in the RAM 203. For example, if the size of the bet information is “Mega”, whether or not to award a payment of a progressive bonus game is randomly determined, referring to the numeric range of the random number values corresponding to “the first probability table A”.

As shown in FIG. 16B, identification information, second slot machine bet information, and a plurality of the second probability tables corresponding to the bet information, are defined.

The second probability tables are stored in the ROM 202 of the center controller 200. These tables are employed to randomly determine whether or not to award a payment of a progressive bonus game to the second slot machine. The items of bet information, i.e., “Mega”, “Major”, and “Mini” are defined in sequential order from the largest amount of bet as one accumulative value which becomes a progressive value. In the second probability tables, the numeric range of the random number values is defined so that, if the amount of bet is great, the probability is high. Thus, if the progressive value of the second slot machine is great, the progressive bonus is likely awarded. Specifically, the center controller 200 determines a second probability table corresponding to the size of bet information, i.e., “Mega”, “Major”, or “Mini” from the plurality of the second probability tables. This determination is made referring to the second slot machine bet information stored in the RAM 203. For example, if the size of the bet information is “Mega”, whether or not to award a payment of a progressive bonus game is randomly determined referring to the numeric range of random number values corresponding to “the second probability table A”.

Other Embodiment

Figure 17:
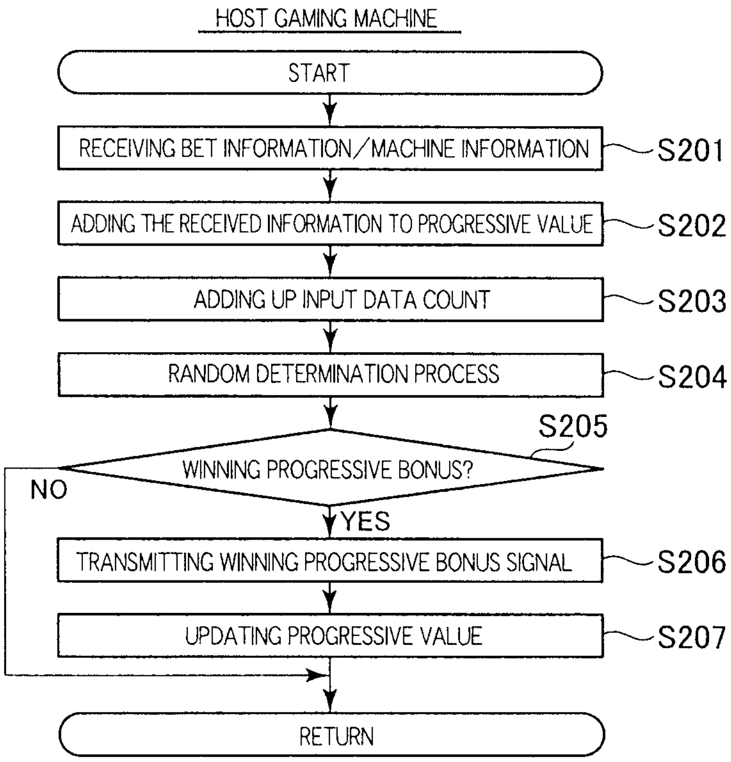
FIG. 17 is a flowchart explaining a process performed when varying a probability of awarding a progressive bonus at only a gaming machine without a center controller according to other embodiment.

Next, the configuration of a progressive link in an alternate embodiment of the present invention will be described. FIG. 17 is a flowchart illustrating a process performed when a probability of awarding a progressive bonus is varied with only gaming machines free of a center controller. In an alternate embodiment of the present invention, a plurality of gaming machines are interconnected to communicate with each other via a network, and slot machines 10 are provided with a communication interface 44 (see FIG. 4) which communicate with other gaming machines. At least one of the pluralities of slot machines 10 provides a progressive bonus game, and that slot machine serves as a host slot machine 10A to control other slot machines 10 which participate in the progressive bonus game. Namely, the host slot machine 10A controls a progressive link 150.

The host slot machine 10A is provided with a main CPU 41 which executes a progressive bonus game for obtaining a progressive bonus (see FIG. 4A). The host slot machine 10A is also provided with a RAM 43 which stores a progressive value for a progressive bonus (see FIG. 4A). Further, the host slot machine 10A receives input data from slot machines, each of which executes a standalone game independently. The input data includes: part of the bet or the side bet, which is placed in a standalone game when the game is executed; and the first or second identification information for identifying types of slot machines 10. The received input data is stored in the RAM 43.

Further, the host slot machine 10 performs a random determination process of identifying types of slot machines from which input data has been received, and determining whether or not to award a progressive bonus. This process is based upon the identification information. In the random determination process, a progressive link 150 is controlled so that probabilities are determined to be different depending upon a first slot machine and a second slot machine which is greater than the first slot machine in the lowest number of bets. Tables or the like used for the determination are stored in a ROM 55.

First, the main CPU 41 of the host slot machine 10A receives bet information and machine identification information which have been transmitted from slot machines 10 (step S201). Specifically, the CPU 41 receives input data from the slot machines, each of which executes a standalone game independently. The input data is obtained as part of the bet or the side-bet, which is placed in the standalone game every time the game is executed; and the first or second identification information for identifying the types of slot machines 10.

The RAM 43 of the host slot machine 10A stores bet information for each of the slot machines 10. The CPU 41 stores bet information in the area of the corresponding slot machine 10 of the RAM 43, based upon the identification information for identifying the types of the slot machines. Further, the CPU 41 stores, in a predetermined area of the RAM 43, the first or second identification information for identifying the types of the slot machines 10, the information having been transmitted from the slot machines 10 at the abovementioned step 201; and an input data reception count.

Next, the CPU 41 of the center controller 200 performs a process of adding bet information to a progressive value (step S202). Specifically, the CPU 41 updates a progressive value by adding thereto the based bet information pertinent to each of the slot machines 10, the information having been stored in the RAM 43 at step S201. The updated progressive value is stored in the RAM 43.

Next, the CPU 41 performs a process of adding up an input data count (step S203). Specifically, the CPU 201 adds up the reception count of the input data stored in the RAM 43 at the abovementioned step S201 and the input data count of the first or second slot machine, based upon the identification information for identifying the types of slot machines 10. The added-up input data count of the first or second slot machine is stored in the RAM 43.

Next, the CPU 41 performs a random determination process (step S204). In this random determination process, this CPU randomly determines whether or not to randomly award a progressive bonus in association with input of input data while it is triggered that the progressive value has reached a predetermined value. Specifically, a first predetermined count and a second predetermined count, which is greater than the first predetermined count, are predetermined, based upon identification information included in the input data. If the reception count of the input data has reached the predetermined count, random number values are sampled from among those included in the predetermined numeric range by assigning specific numbers to slot machines 10, and executing the relevant programs. Whether or not to award a first progressive bonus is determined by comparing the sampled random number values with the specific numbers assigned to the slot machines 10. After this process has been completed, the CPU 41 terminates the random determination process.

Next, the CPU 41 judges whether or not a winning progressive bonus is established (step S205). Specifically, at step S204, the CPU 41 determines a slot machine 10 to which a progressive bonus is to be awarded, and judges whether or not the winning progressive bonus is established. When the judgment result is negative (step S205: NO), this CPU terminates this subroutine.

Alternatively, when the judgment result is affirmative (step S205: YES), the CPU 41 transmits a winning progressive bonus signal (step S206). Specifically, if the random numbers sampled at step S204 coincide with specific numbers, the CPU 41 transmits a winning progressive bonus signal, as a winning progressive bonus, to slot machines to which the specific numbers have been assigned.

Next, the CPU 41 updates a progressive value. Specifically, the CPU 41 updates the progressive value stored in the RAM 43; bet information for each of the slot machines 10; and a value of the input data count of the first or second slot machines (step S207). For example, the amount of prize money obtained when a progressive bonus has been paid out is subtracted from the progressive value stored in the RAM 43. After this process has been completed, this CPU terminates this subroutine.

In an alternate embodiment of the present invention, even if the center controller is employed, the host slot machine 10A can control a progressive link 150 so as to perform a random determination process of identifying types of slot machines from which input data has been received, and determining whether or not to award a progressive bonus, based upon identification information.

While an alternate embodiment of the present invention described a case of executing a random determination process as to whether or not to award a prize, if the input data reception count has reached a predetermined count predetermined for each item of identification information, based upon the identification information included in the input data received from a plurality of gaming machines, the present invention is limitative thereto. It may be configured so as to judge which one of items of the first and second identification information is included in the input data, and perform the random determination process, referring to a probability table corresponding to the identification information.

While an alternate embodiment of the present invention described a case of executing a random determination process as to whether or not to award a prize if the input data reception count has reached a predetermined count predetermined for each item of identification information, based upon the identification information included in the input data received from a plurality of gaming machines, the present invention is limitative thereto. It may be configured so as to determine one of plural predetermined counts or one of the pluralities of the first and second publication tables and perform the random determination process, referring to bet information.

An alternate embodiment of the present invention may be configured so as to randomly determine a next host slot machine from among the plurality of slot machines from which signals have been received, when the host slot machine 10A has terminated a progressive bonus game.

While the present embodiments described a case in which the plurality of slot machines 10, the center controller 200 and the common display device 300 are connected with each other via a wire, the present invention is not limitative thereto. Data may be transmitted or received wirelessly. In other words, the communication lines according to the present invention include wired and wireless transmission lines.

While the present embodiments described a case in which the game system 100 is installed in one gaming facility, the slot machines 10 are separately installed in other gaming facilities in the present invention.

While the present embodiments described a case in which slot machines are employed as gaming machines, card game machines may be employed in the present invention.

While the present embodiments described a case in which the first and second slot machines with different amounts of bets are employed, three or more types of slot machines with different amounts of bets may be employed in the present invention.

Fifth Embodiment

Figure 18A:
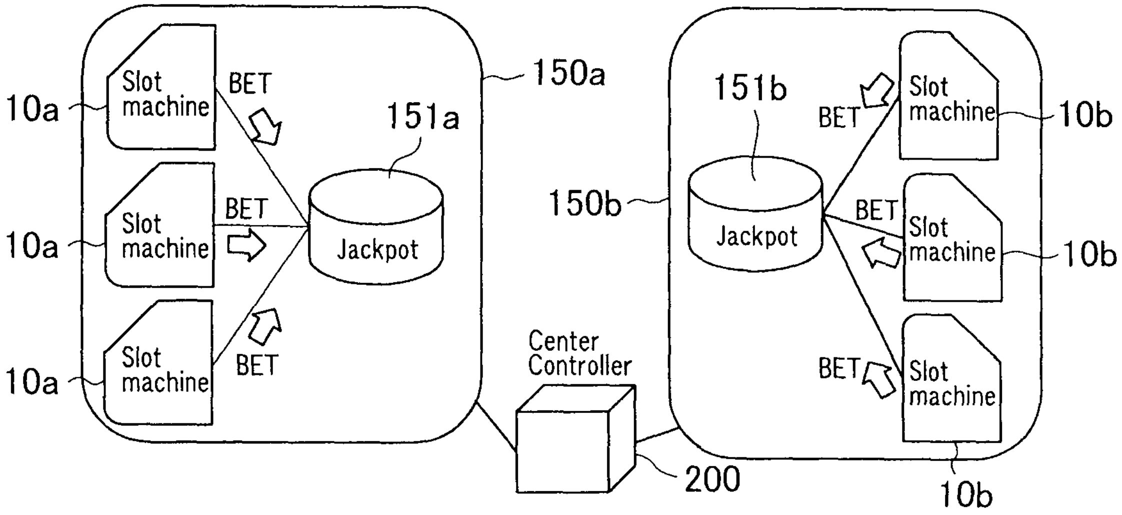
FIG. 18 is a schematic view showing a configuration of merged progressive links which a center controller controls.
Figure 18B:
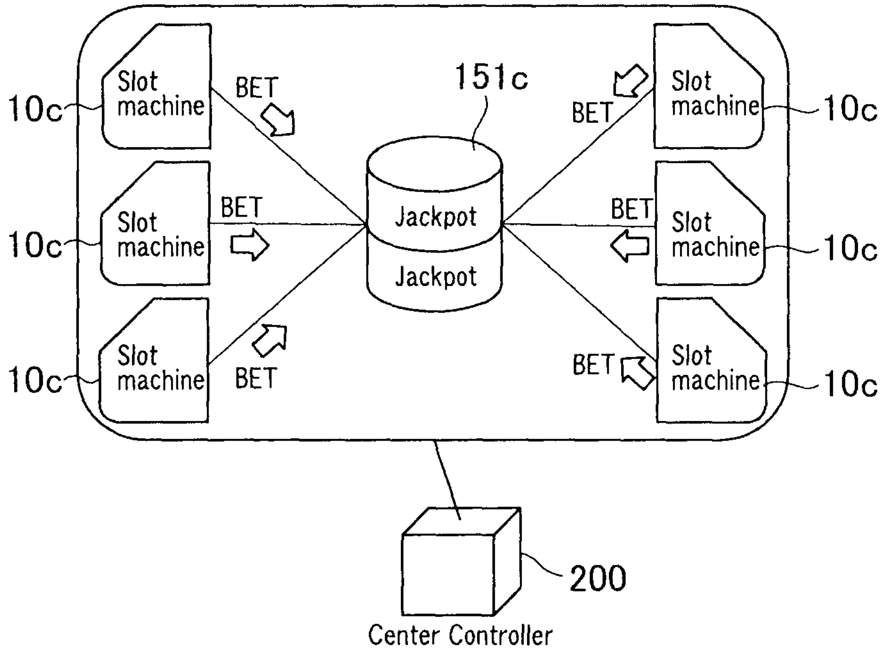

A game system according to embodiments of the present invention will be described in detail, referring to the drawings. As shown in FIG. 18, this game system is provided with: a plurality of first slot machines 10*a*, which executes a first link game for obtaining a first progressive bonus; and a plurality of second slot machines 10*b*, which executes a second link game for obtaining a second progressive bonus. A center controller 200, which is communicable with the slot machines 10, provides jackpots 151*a*, 151*b*, each of which serves a progressive bonus.

Hereinafter, an outline of games will be described. The slot machines 10 can perform: a standalone game which each of the players at the slot machines 10 plays alone; and a link game to be played by a plurality of players at the other slot machines 10. Those who play at the slot machines 10 can also arbitrarily play link games while playing standalone games.

When the players participate in link games as well as standalone games, the center controller 200 accumulatively updates and stores the progressive values included in jackpots 151, based upon BET information for the link games. The center controller 200 compares the progressive value of the jackpot 151*a* of the first progressive link 150*a* with that of the jackpot 151*b* of the second progressive link 150*b*. Further, this controller verifies whether or not the progressive values accumulated in the jackpots 151 have reached a predetermined value or more (for example, 50000) and whether or not the progressive value is within a predetermined difference (for example, a difference of ±10%). Further, the center controller 200 may verify whether or not the numbers of times of the games in link games of progressive links each have the predetermined value (for example, 5000).

Upon judging that the first and second jackpots 151*a* and 151*b* meet a predetermined condition, the center controller 200 merges two jackpots 151 and newly generates one jackpot 151*c*. At this time, this controller adds up the progressive values of the jackpots 151*a* and 151*b*, and defines a progressive value of the jackpot 151*c*. The pluralities of slot machines 10*a* and 10*b* are controlled to link with the jackpot 151*c* newly generated by merging the jackpots 151*a* and 151*b* with each other and to participate in a newly generated link game. Due to this merging, the scale of the jackpots 151 increases, so that the players can enhance anticipation for jackpot acquisition.

Figure 19:
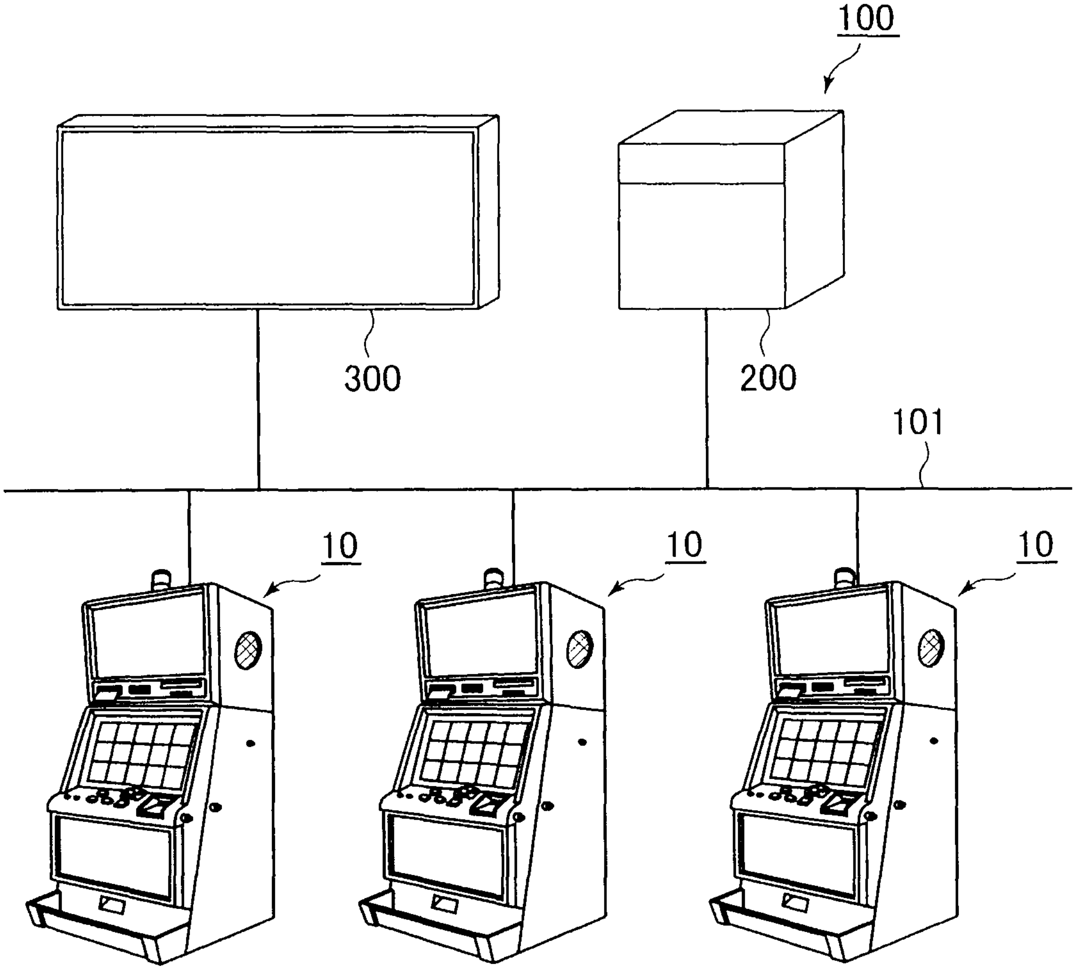
FIG. 19 is a schematic view showing an entire configuration of a game system.

Next, an entire configuration of a game system 100 in the embodiment will be described. FIG. 19 is a schematic view showing the entire configuration of the game system. As shown in FIG. 19, the game system 100 is provided with: a plurality of slot machines 10 (as gaming machines); a center controller 200; and a common display device 300 (as a display device). The plurality of slot machines 10 execute the respective ones of the link games for obtaining a plurality of progressive bonus. Each of these slot machines 10 is provided with a display device. In the present invention, the common display device 300 is equivalent to a display device which displays progressive values stored in memory and communicable with the center controller.

To the center controller 200, the plurality of slot machines 10 and the common display device 300 are connected via a communication line 101. The plurality of slot machines 10 and the display 300 can transmit/receive data to/from the center controller 200 via the communication line 101. Further, the plurality of slot machines 10 are communicably interconnected via the communication line 101. The plurality of slot machines 10 participate in a progressive link 150 to be described later, via the communication line 101.

The common display device 300 is intended for displaying the amount of prize money, etc., of the jackpot 151 of the progressive link 150 to be described later. This display device is installed at a position which is visually recognizable from the players at the plurality of slot machines 10.

While the present embodiment describes a case in which the plurality of slot machines 10, the center controller 200, and the common display device 300 are connected via a wire, the present invention is not limitative thereto. Data may be transmitted or received wirelessly. In other words, the communication lines according to the present invention include wired and wireless transmission lines. While the present embodiment describes a case in which the game system 100 is installed in one casino or gaming facility, the slot machines 10 may be separately installed in other casinos or gaming facilities in the present invention.

Figure 20:
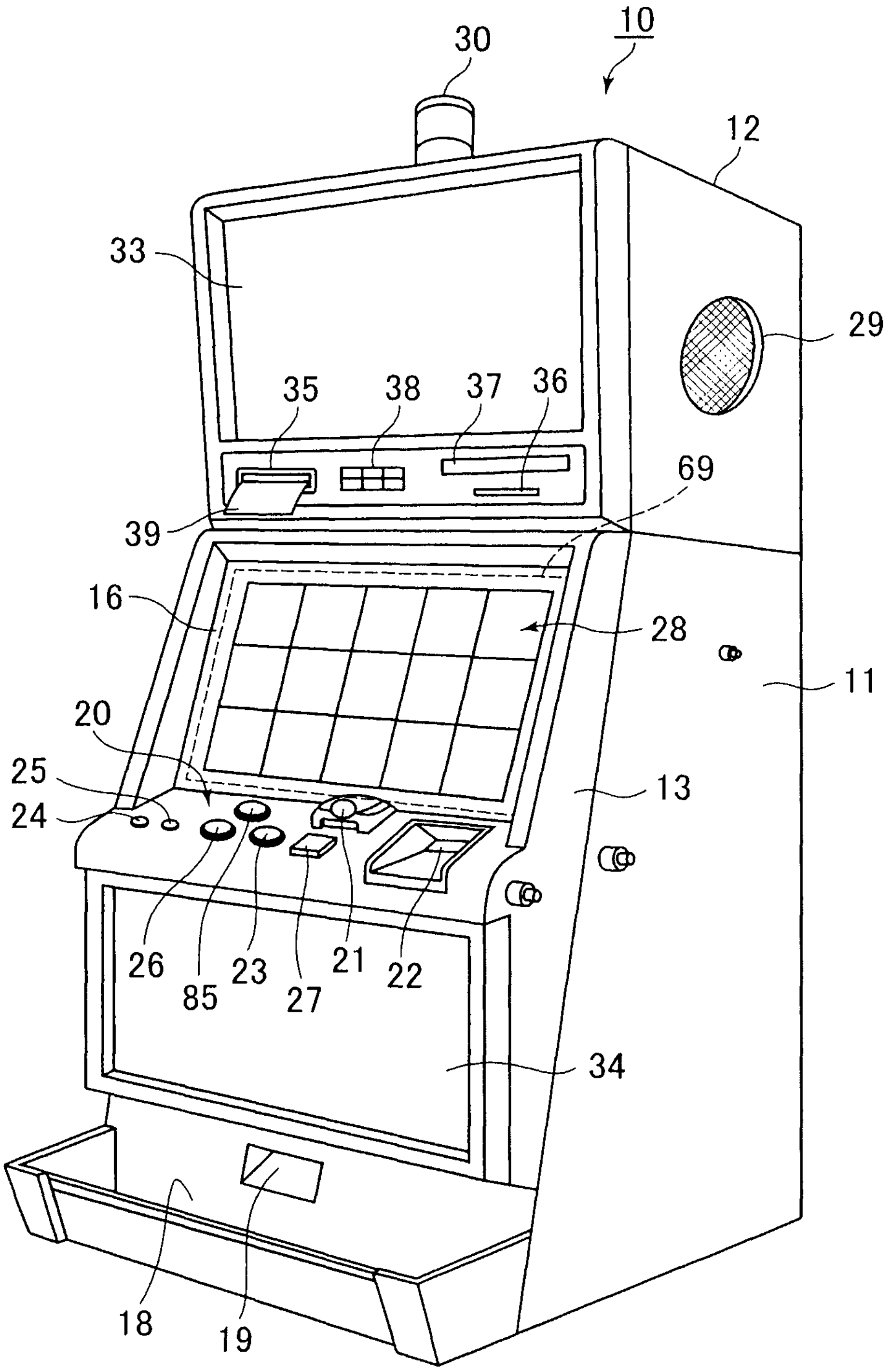
FIG. 20 is a perspective view schematically showing a slot machine.

FIG. 20 is a view schematically showing an appearance of a slot machine 10 according to the embodiment of the present invention. In the slot machines 10, coins, bills, or electronic securities information equivalent thereto are employed as gaming mediums. However, in the present invention, the gaming mediums can include medals, tokens, electronic money, and tickets, for example, without being limitative thereto in particular. The above tickets are not limitative in particular, and can include barcode-attached tickets or the like, as described later, for example.

The slot machine 10 is provided with: a cabinet 11; a top box 12 installed at the upper side of the cabinet 11; and a main door 13 provided at the front face of the cabinet 11. The lower image display panel 16 serving as a display device is provided in front of the main door 13. The lower image display panel 16 is provided with a liquid crystal panel, which displays the symbol matrix 28 in three rows and five columns. Symbols are arranged in cells of the symbol matrix 28, respectively, on a one-by-one basis, and a maximum of 15 symbols are displayed. A touch panel 69 is provided at the player side of a lower image display panel 16. The lower image display panel 16 serves to display image such as icons. This display panel also serves as touch panel buttons actuated by a player touching a partial area of the touch panel 69 on the image to enable judgment that the image has been selected by the player.

The lower image display panel 16 has a credit amount display section 93*a*, and displays, by way of image, a credit which is equivalent to the number of inserted coins. The payout display section 93*d* displays, by way of image, the number of coins paid out in a case where a combination of rearranged symbols and the number of symbols are the predetermined ones. Downwardly of the lower image display panel 16 and at the center of a main door 13, a control panel 20 is provided in which: a plurality of buttons 23 to 27 and 85 are disposed for a player to enter instructions associated with the progress of a game; a coin receiving slot 21 are disposed for receiving coins in a cabinet 11; and a bill validator 22 are disposed.

A start button 23, a change button 24, a cashout button 25, a 1-BET button 26, a MAX-BET button 27, and a side-BET button 85 are provided on the control panel 20. The start button 23 is intended for entering an instruction for starting a standalone game. The change button 24 is employed at the time of asking attendant in game facility for money exchange. The cashout button 25 is intended for entering an instruction for paying out coins corresponding to the player-reserved credit from a coin payout slot 19 to a coin tray 18.

The 1-BET button 26 is intended for entering an instruction for betting the credit corresponding to one coin in a standalone game. The MAX-BET button 27 is intended for entering an instruction for betting in a standalone game the credit corresponding to a maximum number of coins (50 coins in the embodiment) which can be betted in one standalone game. The side-BET button 85 is used to place a BET in the symbol matrix 28 in a standalone game, i.e., a secondary game other than a game in which symbols are rearranged. For example, in the embodiment, when a predetermined credit is betted by the side-BET button 85, it is possible to control the "CHANCE" symbol(s) to be rearranged in the symbol matrix 28. Further, part of the credit betted by these input means is integrated and stored in a memory space set in a RAM 43, and is defined as a standard for determining the amount of payout in the case where the jackpot 151 is acquired in a link game.

The bill validator 22 validates whether or not a bill is legitimate and accepts a legitimate bill into the cabinet 11. The bill validator 22 may be configured so that a barcode-attached ticket 39 described later is readable thereby. A berry glass 34, on which characters of the slot machine 10 and the like are depicted, is provided on a lower front surface of the main door 13, that is, at a lower part of the control panel 20.

An upper image display panel 33 is provided on the front face of the top box 12. The upper image display panel 33 is provided with a liquid crystal display panel, and displays an image representing an introduction of the contents of games or an explanation of the rules of games, for example.

Also, a lamp 30 and a speaker 29 are provided on the top box 12. A ticket printer 35, a card reader 36, a data display 37, and a keypad 38 are provided at the lower side of the upper image display panel 33. The ticket printer 35 prints, on tickets, bar codes containing coded data such as credit amount, date and time, or ID numbers of the slot machine 10, and the bar code-attached tickets 39 are output. A player causes another slot machine 10 to read bar code-attached tickets 39, thereby making it possible to perform games at the slot machines 10 and exchange the bar code-attached tickets 39 with cashes such as bills at a predetermined site of a game facility (for example, cashier in casino).

The card reader 36 reads data from and writes data into a smart card. The smart card is owned by the player, and stores data for identifying players and data pertinent to the history of games performed by the players. The smart card may store data equivalent to coins, bills, or credits. A magnetic stripe card may be employed as an alternative of a smart card. The data display 37 is made up of a fluorescent display or the like, and displays data read by the card reader 36 or data input by the player via a keypad 38. The keypad 38 is intended for entering the instructions or data pertinent to the issuance of tickets.

Figure 21A:
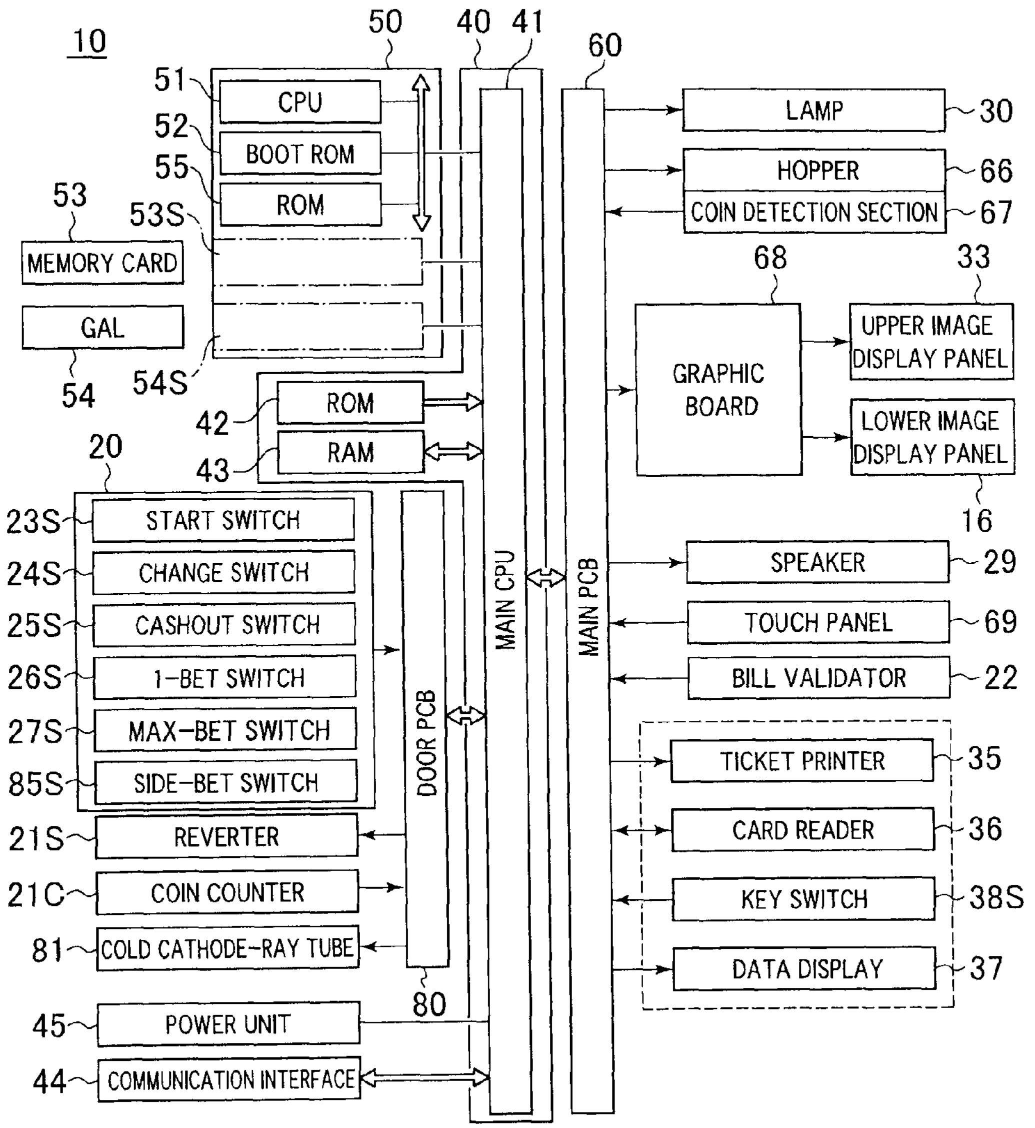
FIG. 21A is a view showing an internal configuration of the slot machine.

FIG. 21A is a block diagram depicting an internal configuration of the slot machine 10 shown in FIG. 20. A gaming board 50 is provided with: a CPU (Central Processing Unit) 51, which is interconnected via an internal bus; a ROM (Read Only Memory) 55 and a boot ROM 52; a card slot 53S corresponding to a memory card 53; and an IC socket 54S corresponding to a GAL (Generic Array Logic) 54.

The memory card 53 is internally provided with a nonvolatile memory, and stores game programs. The game programs include a symbol selection program. The symbol selection program is intended for determining symbols rearranged in the symbol matrix 28. The symbol selection program includes symbol weighing data corresponding to each of a plurality of kinds of payout ratios (for example, 80%, 84%, and 88%). The symbol-weighted data is indicative of the correspondence relationship between the respective symbols and one or more random numeric values which come under a predetermined numerical range (0 to 255). A payout rate is determined based upon payout rate setting data output from the GAL 54, and the symbols rearranged in the symbol matrix 28 are determined based upon the symbol-weighted data corresponding to the payout rate. Further, the game programs include table data indicating the correspondence relationship between each of the symbols and a payout.

In addition, the card slot 53S is constituted so as to removably insert the memory card 53, and is connected to the motherboard 40 by means of the IDE bus. Therefore, the types or contents of games performed at the slot machines 10 can be varied by removing the memory card 53 from the card slot 53S; writing other game programs and game system programs in the memory card 53; and inserting the memory card 53 into the card slot 53S. The game programs include a program associated with the progress of a game. Further, the game programs include image data or sound data output in a standalone game. The image data includes image data of symbols to be arranged in the symbol matrix 28.

The GAL 54 is a kind of PLD having an OR-fixed arrayed structure. The GAL 54 is provided with pluralities of IN ports and OUT ports. If predetermined items of data are input to the IN port, the corresponding data is output from the OUT port. The data output from the OUT port is equivalent to the above-described payout rate setting data. Further, the IC socket 54S is constituted so as to removably mount the GAL 54, and is connected to the motherboard 40 via the PCI bus. Therefore, the payout setting data can also be varied by replacing it with the replacement GAL 54.

The CPU 51, the ROM 55, and the boot ROM 52 that are interconnected via the internal bus are connected to the motherboard 40 via the PCI bus. The PCI bus not only performs signal transmission between the motherboard 40 and the gaming board 50, but also supplies power from the motherboard 40 to the gaming board 50.

The motherboard 40 is constituted using a commercially available motherboard (printed wiring board having basic parts of personal computer mounted thereon). This motherboard is provided with a main CPU (Central Processing Unit) 41; a ROM (Read Only Memory) 42; a RAM (Ransom Access Memory) 43; and a communication interface 44. The main CPU 41 is constituted to be inter-communicable with a plurality of gaming machines via a network 101 and a communication interface 44.

The ROM 42 stores therein a program such as BIOS (Basic Input/Output System) executed by the main CPU 41, and permanent data. Executing the BIOS by means of the main CPU 41 performs a process of initializing predetermined peripherals and starts an acquisition process via the gaming board 50 of the game programs and game system programs stored in the memory card 53. In the present invention, the contents of the ROM 42 may be rewritable or not.

The RAM 43 stores data and programs used when the main CPU 41 is activated. The RAM 43 can also store game programs. Further, the RAM 43 stores numeric data, such as the amount of credit or the input count or payout count in one standalone game. In the embodiment of the present invention, the RAM 43 (memory) stores each of the progressive values for a plurality of progressive bonuses.

Both a main body PCB (Printed Circuit Board) 60 and a door PCB 80 are connected to the motherboard 40 by means of a USB. Further, a power supply unit 45 is also connected to the motherboard 40.

To the main PCB 60 and the door PCB 80, a device or equipment is connected which generates an input signal input to the main CPU 41 and a device or equipment is connected, an operation of which is controlled by means of a control signal output from the main CPU 41. The main CPU 41 executes the game programs stored in RAM 43, based upon an input signal input to the main CPU 41, thereby performing a predetermined computational process. This main CPU 41 then stores results thereof in RAM 43; and transmits control signals to equipment and devices as a control process relative to the equipment and devices.

A lamp 30, a hopper 66, a coin detection section 67, a graphic board 68, a speaker 29, a touch panel 69, a bill validator 22, a ticket printer 35, a card reader 36, a key switch 38S, and a data display 37 are connected to the main body PCB 60. The lamp 30 lights in a predetermined pattern, based upon a control signal output from the main CPU 41.

The hopper 66 is installed in a cabinet 11, and a predetermined number of coins are paid out from the coin payout opening 19 to the coin tray 18, based upon the control signal output from the main CPU 41. A coin detecting section 67 is provided inside of the coin payout opening 19, and outputs an input signal to the main CPU 41, if it is detected that a predetermined number of coins have been paid out from the coin payout opening 19.

A graphic board 68 controls the images to be displayed on the upper and lower image display panels 33 and 16, based upon the control signal output from the main CPU 41. The amount-of-credit display section 31 on the lower image display panel 16 displays the amount of credits stored in the RAM 43. Further, the coin payout number is displayed at the payout number display section 31 of the lower image display panel 16. The graphic board 68 is provided with: a VDP (Video Display Processor), which generates image data, based upon the control signal output from the main CPU 41; and a temporary memory such as a video RAM, which temporarily stores image data generated by the VDP. The image data employed when the image data is generated by means of the VDP is read from the memory card 53, and thereafter, is included in the game programs stored in the RAM 43.

The bill validator 22 validates whether or not a bill is legitimate and accepts a legitimate bill into the cabinet 11. The bill validator 22, upon accepting a legitimate bill, outputs an input signal to the main CPU 41 based upon the bill amount. The main CPU 41 stores in the RAM 43 the amount of credits responsive to that of bills transmitted by the input signal.

Based upon a control signal output from the main CPU 41, the ticket printer 35 prints, on a ticket, a barcode having encoded thereon, data such as the credit amount, data and time, or the identification number of the slot machine 10 that is stored in the RAM 43. Further, this printer outputs the printed ticket as a barcode-attached ticket 39. The card reader 36 reads data from a smart card, thereby transmitting the read data to the main CPU 41 or writing data into the smart card, based upon the control signal from the main CPU 41. The key switch 38S is provided on the keypad 38, and outputs a predetermined input signal to the main CPU 41 when a player operates the keypad 38. Based upon a control signal output from the main CPU 41, the data display 37 displays the data read by the card reader 36 and the data input by a player through the keypad 38.

A control panel 20, a reverter 21S, a coin counter 21C, and a cold cathode-ray tube 81 are connected to the door PCB 80. On the control panel 20, there are provided: a start switch 23S corresponding to a start button 23; a change switch 24S corresponding to a change button 24; a cashout switch 25S corresponding to a cashout button 25; a 1-BET switch 26S corresponding to a 1-BET button 26; a MAX-BET switch 27 corresponding to a MAX-BET button 27; and a side-BET switch 90S corresponding to a side-BET button 85. When the player operates the buttons 23 to 27, and 85, the corresponding switches 23S to 27S and 90S output input signals to the main CPU 41, respectively.

The coin counter 21C is provided inside the coin receiving slot 21, and validates whether or not a legitimate coin is inserted into the coin receiving slot 21. Those other than the legitimate coins are discharged from the coin payout exit 19. The coin counter 21C outputs an input signal to the main CPU 41 when a legitimate coin is detected.

The reverter 21S is operable based upon the control signal output from the main CPU 41. This reverter distributes the coins recognized to be legitimate by the coin counter 21C, into a cashbox (not shown) or a hopper 66 which was installed in the slot machine 10. In other words, if the hopper 66 is filled with coins, the legitimate coins are distributed to the cashbox by means of the reverter 21S. Otherwise, the legitimate coins are distributed to the hopper 66. The cold cathode-ray tube 81 functions as a backlight installed at the rear side of the lower and upper image display panels 16 and 33. This backlight illuminates based upon the control signal that was output from the main CPU 41.

Figure 21B:
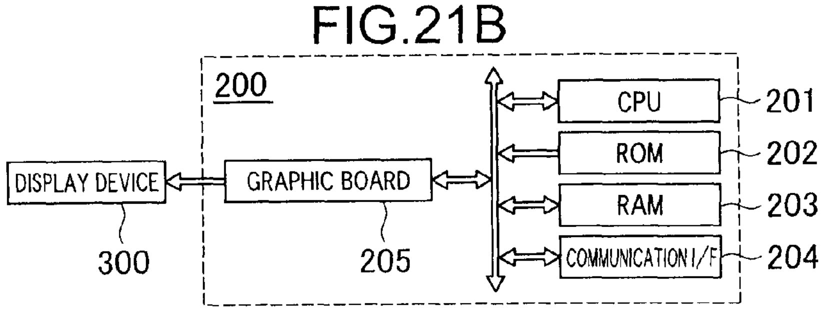
FIG. 21B is a view showing an internal configuration of the center controller.

FIG. 21B is a block diagram depicting an internal configuration of the center controller 200 shown in FIG. 18. The center controller 200 has: a CPU 201, which functions as a controller for controlling a plurality of slot machines 10 of the main CPU 41; a ROM 202; a RAM 203; a communication interface 204, which communicates with a main CPU of the plurality of slot machines 10; and a graphic board 205, which controls a common display device 300 to display an image. The CPU 201 of the center controller 200 is constituted to be inter-communicable with the pluralities of the first and second slot machines 10 via a network.

The ROM 202 internally stores a program such as BIOS (Basic Input/Output System) executed by the CPU 201, and permanent data. When the CPU 201 of the center controller 200 executes the BIOS, a process of initializing predetermined devices is performed, and the control program and game system program, of the center controller 200, are read in the RAM 203. Further, the RAM 203 stores: accumulative amounts of credits which slot machines possess; and link game data such as bonus points, participant list information, progressive link information, and link game counts. For example, the RAM 203 stores value data such as the first progressive value for the first jackpot 151*a* or the second progressive value for the second jackpot 151*b*. The items of information pertinent to the progressive links 150 include: the amount of prize money of the jackpots 151 by progressive link 150 (maximum value of payout amount of money); the minimum BET amount in one standalone game; the number of slot machines that currently participate in games; and slot machine identification information. Further, the RAM 203 also functions as a count memory in the present invention, and the count memory counts and stores the game count of standalone games paid out for link games (hereinafter, referred to as a link game count).

The graphic board 205 controls an image to be displayed on the common display device 300, based upon the control signal output from the CPU 201. In the present invention, the common display device 300 is equivalent to a display device which displays the progressive values stored in the RAM 203, and which is communicable with the CPU 201 of the center controller 200 or the main CPU 41. The communication interface (communication unit) communicates with another slot machine 10 via a network.

Figure 22A:
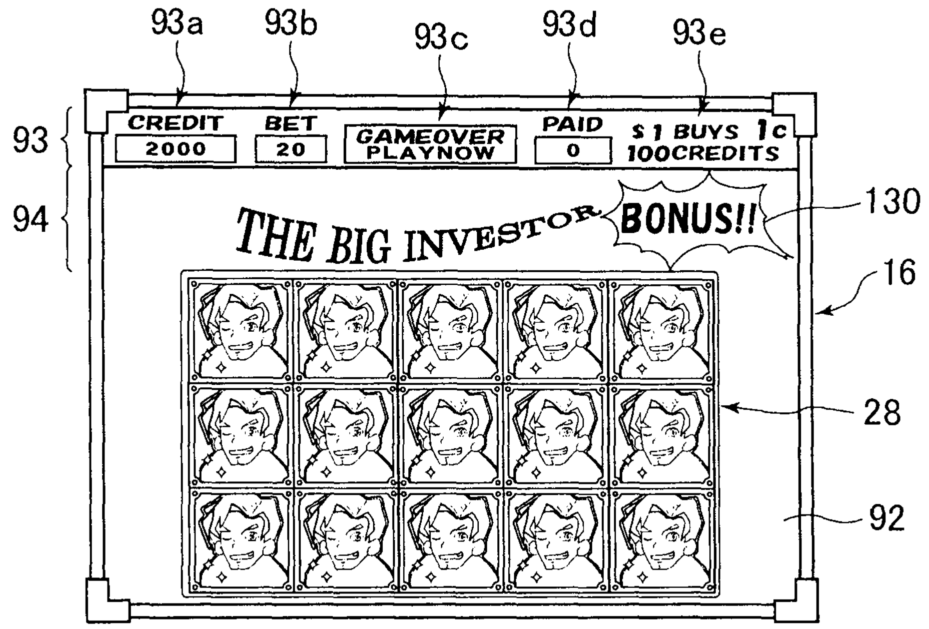
FIG. 22A is a view showing an exemplary symbol matrix displayed at the slot machine of FIG. 21.
Figure 22B:
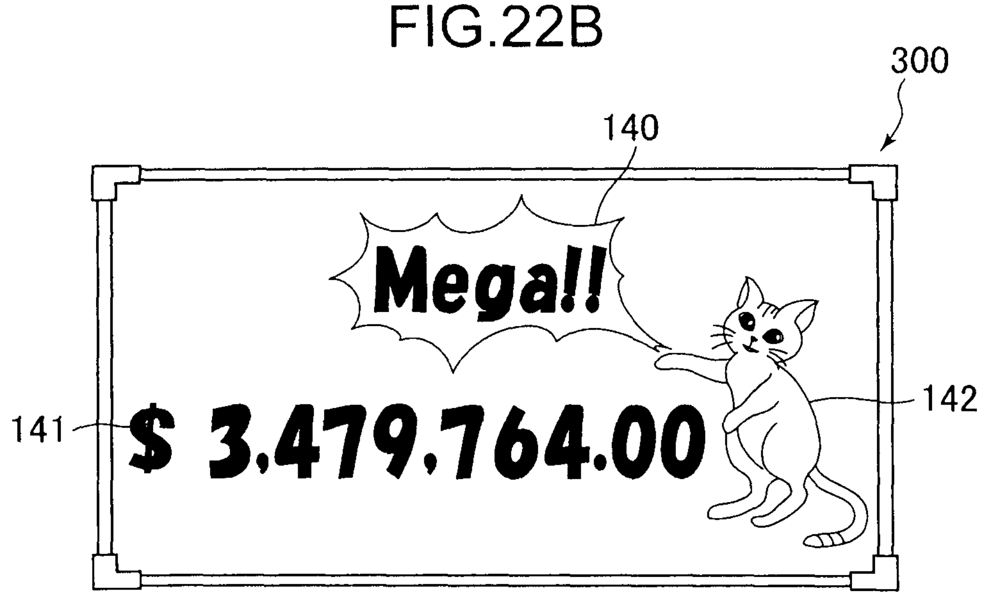
FIG. 22B is a view showing an exemplary image displayed at the time of establishment of a winning progressive link displayed at the slot machine of FIG. 21.

A configuration of the image that is displayed on the common display device 300 will be described, referring to FIGS. 22 and 23. FIG. 22A is a view showing an exemplary image displayed while in a game at the slot machine 10 shown in FIG. 20. FIG. 22B is a view showing an exemplary image displayed on the common display device 300. FIG. 22A is a view showing an exemplary image displayed at the slot machine 10 before the jackpots 151 of the progressive links 150 are merged with each other. FIG. 22B is a view showing an exemplary image displayed at the slot machine 10 after the jackpots 151 of the progressive links 150 are merged with each other.

As shown in FIG. 22A, the lower image display panel 16 is made up of display (area) sections such as a display area section 92, an information display section 93, and an effect image display section 94. A symbol matrix 28 is displayed in the display area section 92. Further, icons displaying the number of betted coins are disposed at both sides of the symbol matrix 28, and the icons corresponding to BET number are controlled to illuminate. The information display section 93 is arranged upwardly of the display region 92 and is made up of a credit amount display section 93*a*, a BET amount display section 93*b*, a character information display section 93*c*, a PAID amount display section 93*d*, and a charge display section 93*e*.

The credit amount display section 93*a* displays the number of coins currently credited, and the BET number display section 93*b* displays the number of coins betted in one standalone game. Further, the character information display section 93*c* displays character information which is indicative of the current state of a game, and displays characters "PLAY NOW" while in a game and characters "GAME OVER" if no game is played. Further, the PAID amount display section 93*d* displays the number of coins paid out in one standalone game, and displays a converted value of credit relative to the predetermined amount of money.

The effect image display section 94 displays effect images according to a type of the slot game. There are several types of slot games, for example, a standalone game and a link game. The effect image display section 94 displays a variety of effect images according to the standalone game and the link game, for example.

Any of symbols such as "main animation character", "sub animation character", "office building", "bullion", "car", "stock certificate", "jet", "cottage", and "CHANCE" symbols, is rearranged in the symbol matrix 28 that is displayed on the lower image display panel 16. A payout is determined depending upon the arrangement or number of these symbols displayed in the symbol matrix.

In this example, there is shown a case in which a jackpot 151 is acquired, and a combination of winning symbols, i.e., the "main animation character" symbols, is rearranged and displayed which is indicative of the fact that the jackpot 151 has been acquired in the symbol matrix 28 of the lower image display panel 16 after a winning jackpot signal to be described later has been received. Further, an image 130, which is indicative of the fact that a progressive bonus has been acquired (hereinafter, referred to as "BONUS"), is displayed. After that, the progressive value corresponding to the acquired jackpot 151 is displayed.

FIG. 22B shows an exemplary image displayed on the common display device 300. When the jackpots 151 of the progressive link 150 are acquired, the common display device 300 displays an image, which is indicative of the fact, at the center of the screen. In this example, "MEGA" 140 is acquired among the jackpots 151, that image 140 (hereinafter, referred to as "MEGA") is displayed, and an image 141 of the progressive value of the corresponding jackpot 151 is displayed at the center of the screen. Therefore, a player can visually recognize that the jackpot 151 has been obtained. Further, these images are displayed together with an animation character image 142 (herein, referred to as a cat) as well. Types of jackpots 151 acquired include "MEGA" "MAJOR", and "MINI", and a predetermined rate, i.e., a value obtained by multiplying 50% if "MEGA" is established or 30% if "MAJOR" is established, for example, is employed for the accumulated progressive value. If none of the jackpots 151 has been acquired, for example, the progressive value stored in the RAM 203 of the center controller 200 and the updated stored progressive value are displayed.

Figure 23A:
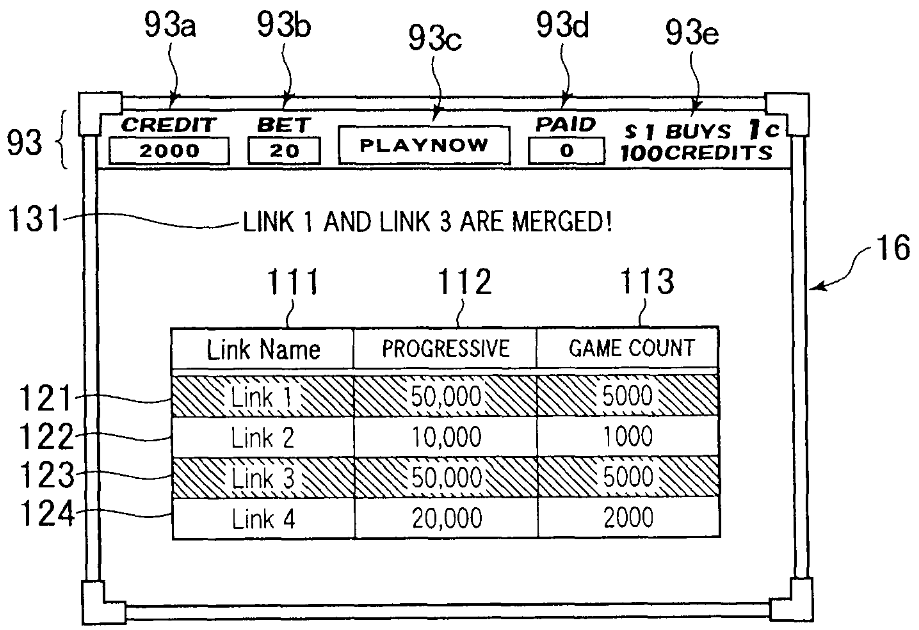
FIG. 23A is a view showing an exemplary image which is indicative of the fact that progressive links displayed immediately before merged are to be performed.

As shown in FIG. 23A, when the jackpots 151 of the progressive link 150 are merged with each other, an image is displayed which is indicative of a state in which these jackpots have been merged. In this example, the progressive link names, the corresponding progressive values, and the number of participants are displayed at the center of the screen in a tabulated manner, and a message "Link 1 and Link 3 are merged!" is displayed at the upper side thereof. The table on this image is provided with a link column 111, a progressive value column 112, and a game count column 113. This table is also provided with lines 121 to 124 for each of the progressive links 150. As illustrated, the links to be merged, i.e., Link 1 and Link 3, are established when both of the progressive values are 50,000, both of the link game counts are 5,000, and a predetermined condition is met. Meeting the predetermined condition merges these links with each other by means of processes to be described later. The predetermined condition is, for example, that both of the progressive values reach the predetermined value (50,000, for example) and a difference therebetween is within a predetermined range (±10%, for example). Another predetermined condition may be set without limitative thereto. The image shown in FIG. 23A is displayed, and is then changed to that shown in FIG. 23B. In the example shown in FIG. 23A, line 121 of Link 1 and line 123 of Link 3 are displayed in an expression (shaded) which is different from another one, and a message 131 "Link 1 and Link 3 are merged!" is displayed at the upper side of the screen, whereby a player, who has visually recognized this message display, contemplates that these two progressive links 150 are to be merged from now.

Figure 23B:
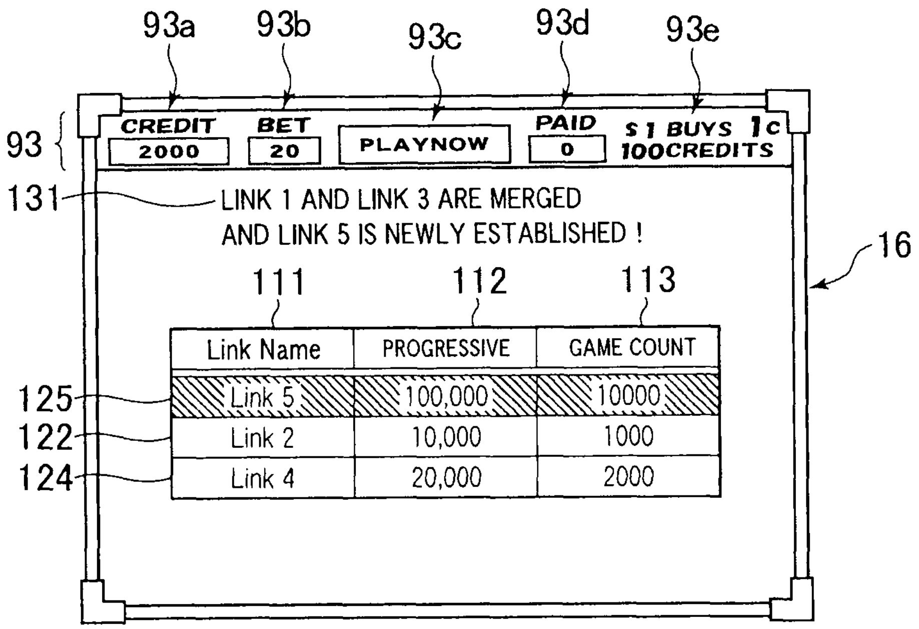
FIG. 23B is a view showing an exemplary image which is indicative of the fact that progressive links displayed immediately after merged are established, and a new progressive link is then created.

As shown in FIG. 23B, the latest information is displayed after the jackpots 151 of the progressive links have been merged after the display of FIG. 23A. In this example, the names of the progressive links, the corresponding progressive values, and the number of participants are displayed at the center of the screen in a tabulated manner; and a display 131, which is indicative of the fact that a message "Link 1 and Link 3 are merged, and Link 5 is newly established", appears at the upper side of the screen. Here, line 125 of Link 5 established when Link 1 and Link 3 shown in FIG. 23A have been merged is displayed in an expression (shaded) which is different from another one. Further, the progressive value and the link game count are indicated by numbers obtained after they are added up by means of merging. Here, each of the progressive values of Link 1 and Link 3 is established as 50,000. Thus, these values are added up, and the progressive value of Link 5 is established as 100,000. Further, each of the link game counts of Link 1 and Link 3 is 5,000. Thus, they are added up, and the link game count of Link 5 is established as 10,000. A message "Link 1 and Link 3 are merged, and Link 5 is newly established!" is displayed at the upper side of the screen, whereby a player, who has visually recognized this message display, is aware of the fact that two links are merged, a new link is then established, and the progressive value is substantially doubled in comparison with each of the links before merged. Therefore, the player raises further expectation in obtaining the progressive value increased by means of merging.

Next, processes executed at the slot machines 10 and the center controller 200, according to the embodiment of the present invention, will be described in detail, referring to the drawings. The main CPU 41 conducts a link game by reading and executing a game program from the RAM 43. The CPU 201 of the center controller 200 controls the entire game system 100 by reading and executing a predetermined program.

Figure 24:
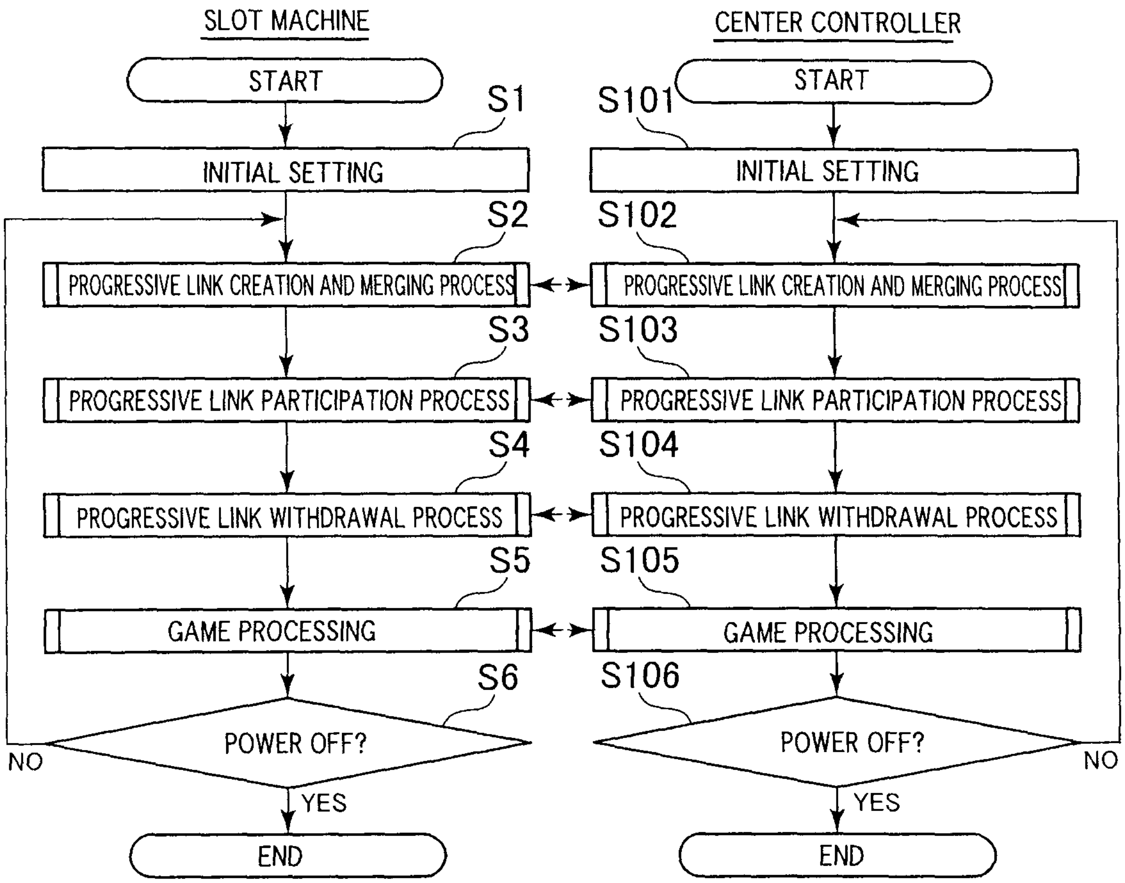
FIG. 24 is a flowchart showing a subroutine of a main process associated with the slot machine and the center controller.

FIG. 24 is a flowchart showing a subroutine of main processes of the slot machines 10 and the center controller 200. In the main process of the slot machines 10, first, when the power switch is turned ON (when power is supplied), the motherboard 40 and the gaming board 50 are started up, respectively, and the CPU 51 executes an initial setting process (step S1). In this initial setting process, the main CPU 41 executes the BIOS stored in the ROM 42, decompresses, in the RAM 43, compressed data included in the BIOS, executes the BIOS decompressed in the RAM 43, and performs diagnosis and initialization of each of the peripheral devices. The main CPU 41 writes game programs or the like from memory card 53 into the RAM 43, and retrieves data for setting a payout ratio and country-identification information. The main CPU 41 also performs an authentication process for each program during execution of the initial setting process.

Figure 25:
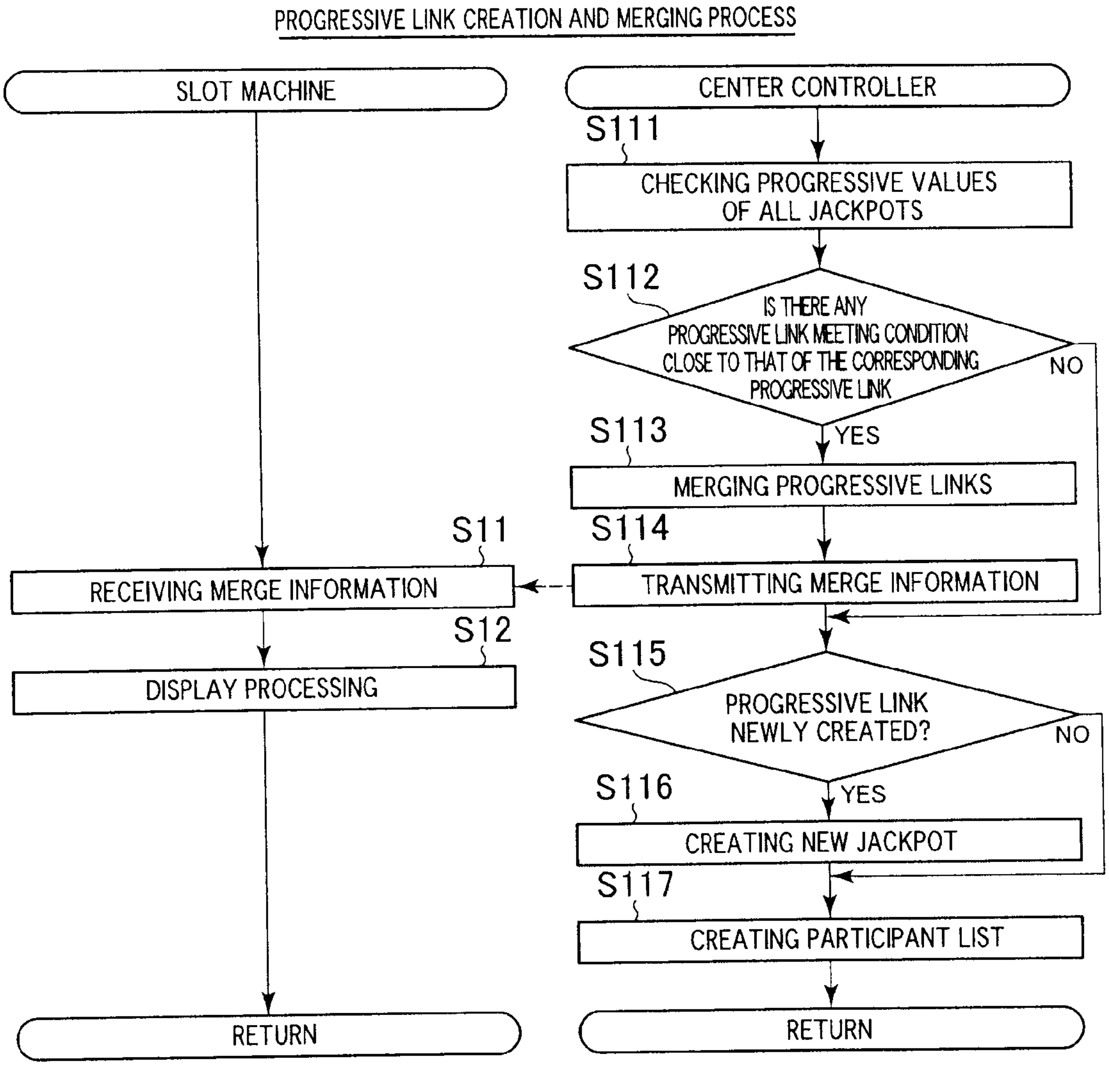
FIG. 25 is a flowchart showing a subroutine of a process of creating and merging progressive links associated with the slot machine and the center controller.

Next, the main CPU 41 performs a process of creating and merging progressive links to be described later referring to FIG. 25 (step S2). In this process of creating and merging progressive links, the main CPU 41 of the slot machine 10 performs processing which is based upon progressive link merge information provided from the center controller 200. The progressive merging process described here is performed under cooperative operation between the main CPU 41 of the slot machine 10 and the CPU 201 of the center controller 200.

Figure 26:
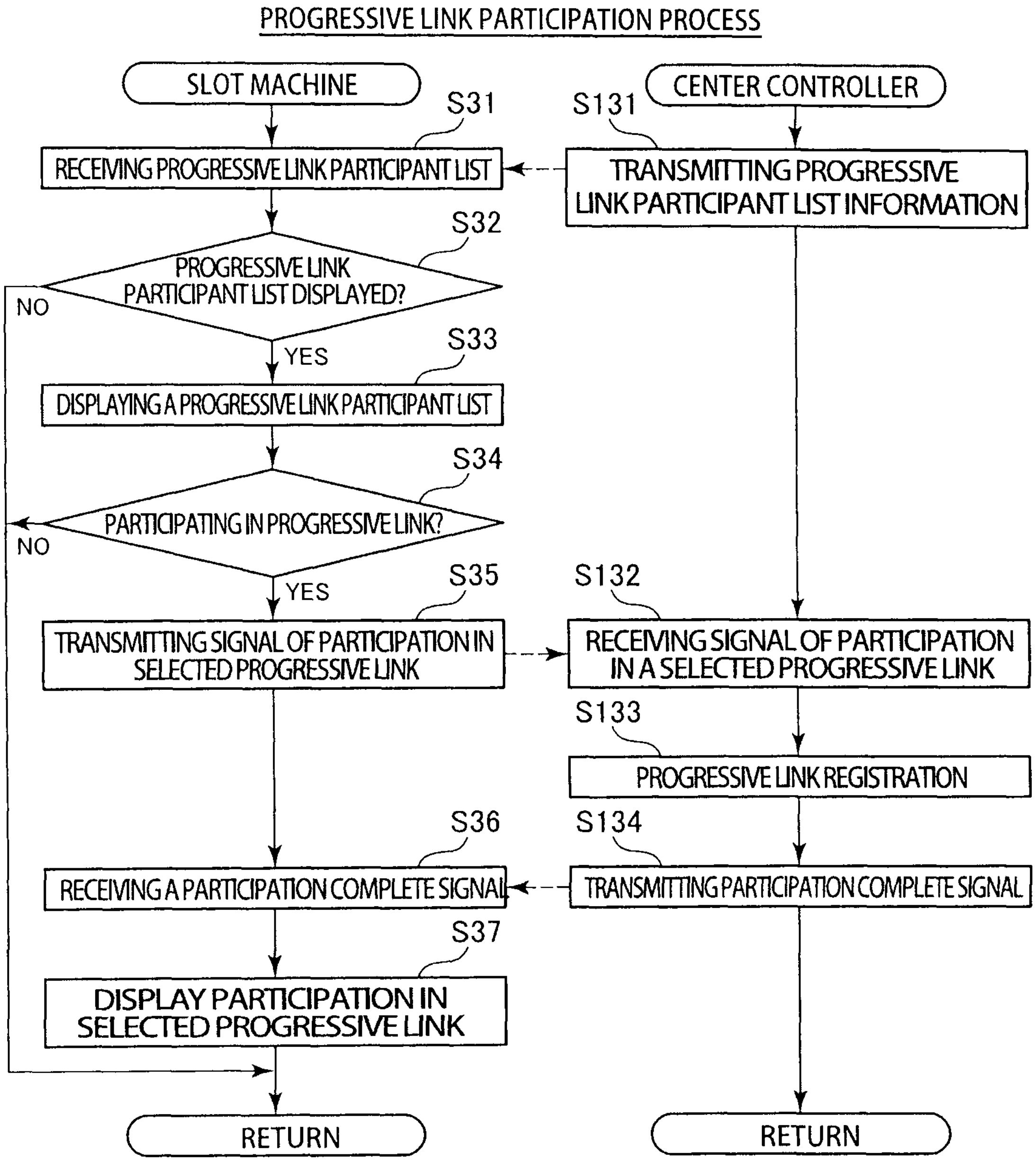
FIG. 26 is a flowchart showing a subroutine of a process of participating in progressive links associated with the slot machine and the center controller.

Next, the main CPU 41 performs a progressive link participation process to be described later referring to FIG. 26 (step S3). In this progressive link participation process, the main CPU 41 of the slot machine 10 performs a process of participation in a progressive link provided from the center controller 200. The progressive link participation process described hereinafter is performed under cooperative operation between the main CPU 41 of the slot machine 10 and the CPU 201 of the center controller 200.

Figure 27:
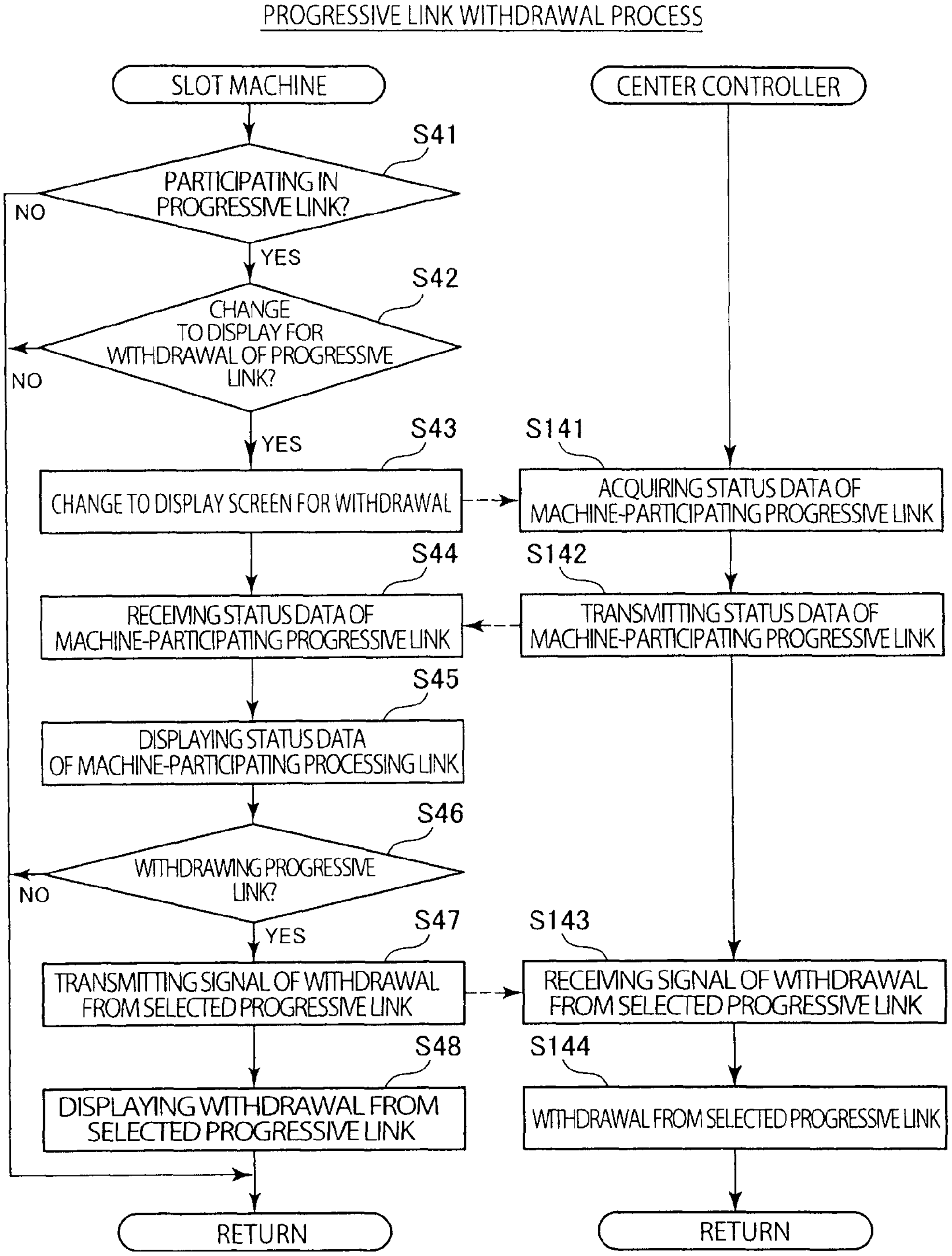
FIG. 27 is a flowchart showing a subroutine of a process of withdrawal from progressive link associated with the slot machine and the center controller.

Next, the main CPU 41 performs a progressive link withdrawal process to be described later referring to FIG. 27 (step S4). In this progressive link withdrawal process, the main CPU 41 of the slot machine 10 performs a process of withdrawal from machine-participating progressive links. The progressive link withdrawal process described hereinafter is performed under cooperative operation between the main CPU 41 of the slot machine 10 and the CPU 201 of the center controller 200.

Figure 28:
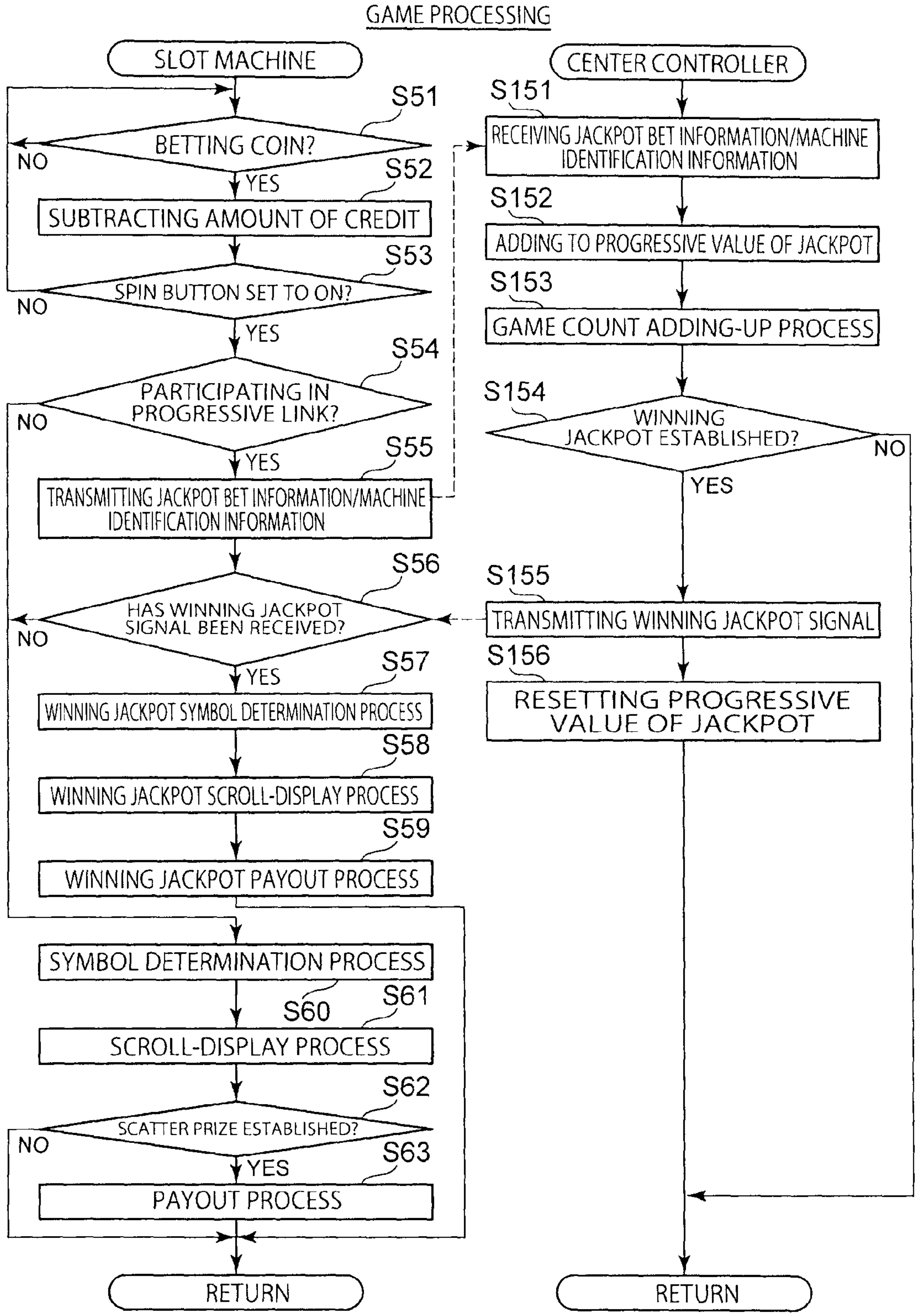
FIG. 28 is a flowchart showing a subroutine of game processing associated with the slot machine and the center controller.

Next, the main CPU 41 performs game processing to be described later referring to FIG. 28 (step S5). In this game processing, the main CPU 41 sequentially reads and executes programs such as a game program from the RAM 43, and performs a game execution process. The game processing described hereinafter is performed under cooperative operation between the main CPU 41 of the slot machine 10 and the CPU 201 of the center controller 200. After game processing has terminated, while power is supplied to the slot machine 10, the routine is reverted to the progressive link participation process (step S6).

On the other hand, in the main process of the center controller 200, first, when the power switch is turned ON (when power is supplied), the CPU 201 of the center controller 200 executes an initial setting process (step S101). In this initial setting process, the CPU 201 of the center controller 200 executes the BIOS stored in the ROM 202; decompresses to the RAM 203 the compressive data incorporated in the BIOS; executes the BIOS decompressed to the RAM 203; and diagnoses and initializes peripherals. Further, the CPU 201 of the center controller 200 acquires identification information pertinent to the plurality of slot machines 10 connected to a communication line via the communication interface 204.

Next, the CPU 201 of the center controller 200 performs a process of creating and merging progressive links to be described later referring to FIG. 25. In this progressive link merging process, when the progressive links in which the slot machines participate meet a predetermined condition, the CPU 201 of the center controller 200 performs a process of merging the progressive links with each other, and responds to the slot machines 10. As set forth previously, the progressive link merging process is performed under cooperative operation between the main CPU 41 of the slot machine 10 and the CPU 201 of the center controller 200.

Next, the main CPU 201 performs a progressive link participation process to be described later referring to FIG. 26 (step S103). In this progressive link participation process, the CPU 201 affirmatively responds to whether or not to perform a process of participation in a progressive link at the slot machine 10. As set forth previously, the progressive link participation process is performed under cooperative operation between the main CPU 41 of the slot machine 10 and the CPU 201 of the center controller 200.

Next, the main CPU 201 performs a progressive link withdrawal process to be described later referring to FIG. 27 (step S104). In this progressive link withdrawal process, the CPU 201 affirmatively responds to whether or not to perform a process of withdrawal from a progressive link in which the slot machine 10 participates, the process being performed by the slot machine 10. As set forth previously, the progressive link participation process is performed under cooperative operation between the main CPU 41 of the slot machine 10 and the CPU 201 of the center controller 200.

Next, the CPU 201 of the center controller 200 performs game processing to be described later referring to FIG. 28 (step S105). In this game processing, the CPU 201 of the center controller 200 affirmatively responds to whether or not to perform a game execution process which the slot machine 10 performs. As set forth previously, the game execution process is performed under cooperative operation between the main CPU 41 of the slot machine 10 and the CPU 201 of the center controller 200. After game processing has terminated, while power is supplied to the slot machine 10, the routine is reverted to the progressive link creation process (step S106).

Next, a process of creating and merging progressive links will be described. FIG. 25 is a flowchart showing the process of creating and merging progressive links. FIG. 25 is a flowchart showing a subroutine of the process of creating and merging progressive links that is invoked and executed at step S3 of the subroutine in the slot machine 10 shown in FIG. 24 or at step S103 of the subroutine in the center controller 200. The game process described hereinafter is performed under cooperative operation between the main CPU 41 of the slot machine 10 and the CPU 201 of the center controller 200.

The main CPU 41 receives merge information from the center controller to be described later (step S11). The main CPU 41 receives merge information from the CPU 201 of the center controller, the information being transmitted via the communication interface 204 and stored in the RAM 203 (see step S114 to be described later). The main CPU 41 causes the RAM 43 to store the received information.

Next, the main CPU 41 performs a display process (step S12). The main CPU 41 reads the merge information stored in the RAM 43, and causes the lower image display panel 16 to display merge information via a graphic board 68, based upon the read information. The items of merge information include progressive link information or progressive values, etc.

Next, processes performed by the center controller 200 will be described. The CPU 201 of the center controller 200 performs a process of verifying the progressive values of the jackpots 151 (step S111). In this process, the CPU 201 of the center controller 200 reads the progressive values of all of the jackpots 151 in link games, the values being stored in the RAM 203.

Next, the CPU 201 of the center controller 200 judges whether or not there is a progressive link meeting a condition close to that of the corresponding progressive link (step S112). In this process, the CPU 201 of the center controller 200 judges whether or not each of the stored first and second progressive values meets the preset predetermined condition. The predetermined condition is that each of the first and second progressive values has reached a predetermined value or more (for example, 50,000) and that each of these progressive values is within the preset predetermined difference (for example, ±10%). Further, the CPU 201 of the center controller 200 further reads the link game count from the RAM 203, and judges whether or not each of the first and second link games meets the preset predetermined condition. The predetermined condition is that the CPU 201 of the center controller 200 references the RAM 203, whereby each of the link game counts executed in a plurality of link games reaches a predetermined value (for example, 5,000). Upon judging that the first and second progressive values and link game count that were read at step S111 meets the predetermined condition (step S112: YES), the CPU 201 of the center controller 200 proceeds to step S113. If the judgment result is negative (step S112: NO), the routine proceeds to step S115. While the target range was herein defined to be within ±10%, it may be broader or narrower.

Next, the CPU 201 of the center controller 200 merges progressive links (step S113). In this process, upon judging that the first and second progressive values meet a predetermined condition, the CPU 201 (center controller) of the center controller 200 merges in one link game the pluralities of link games corresponding to the first and second progressive values meeting the predetermined condition. Further, this CPU adds up the first and second progressive values meeting the predetermined condition. Namely, as the result of the judgment at step 112, the CPU 201 of the center controller 200 merges the first and second link games with each other to form one link game, and further, adds up the first and second progressive values so that the first and second progressive bonuses are integrated with each other. After that, the CPU 201 of the center controller 200 updates the progressive values stored in the RAM 203, based upon the added-up progressive value. Specifically, the CPU 201 of the center controller 200 generates a new unique progressive link number which is different from the currently assigned progressive numbers, and causes the RAM 203 to store the added progressive value, in association with the generated number. This item of information is defined as merge information. The items of merge information include the progressive values of machine-participating progressive links.

Namely, if the stored first and second progressive values meet the predetermined condition or if each of the link game counts stored in a count memory has reached the predetermined value, the first and second progressive values can be merged, thus making it possible to increase the scale of the progressive values. As a result, an opportunity of obtaining a greater progressive value is given a player, thus making it possible to enhance entertainability.

Next, the CPU 201 of the center controller 200 transmits merge information (step S114). The CPU 201 transmits merge information via the communication interface 204 to each of the slot machines 10 that participate in progressive links. The slot machines 10 receive this information, and thereafter, perform a display process.

At the same time, the CPU 201 of the center controller 200 communicates with the common display device 300, and the common display device 300 displays merge information. Specifically, the CPU 201 of the center controller 200 causes the common display device 300 to display the progressive value that is added up at step S113 and stored in the RAM 203.

Next, at step S115, the CPU 201 of the center controller 200 judges whether or not to newly create a progressive link. Specifically, the CPU 201 of the center controller 200 judges whether or not the number of progressive links raised in the created progressive link participant list is less than a predetermined number (for example, less than 3). Upon judging that a progressive link is newly created (step S115: YES), the CPU 201 of the center controller 200 proceeds to step S116. If not (step S115: NO), the routine proceeds to step S117.

Next, at step S116, the CPU 201 of the center controller 200 performs a process of creating new jackpots 151. Specifically, the CPU 201 of the center controller 200 creates jackpots 151 so that the number of progressive links raised in the progressive link participant list is a predetermined number (for example, 3) or more at step S115. The embodiment assumes that the CPU 201 of the center controller 200 randomly sets a payment condition for the jackpots 151 without being limitative thereto.

For example, it may be a routine to judge a pattern of the progressive links raised in the progressive link participant list, and thereafter, control creation of new jackpots 151 serving as progressive links 150 of the same pattern. Upon creating new jackpots 151, the CPU 201 of the center controller 200 sets the amount of prize money for each of the jackpots 151 (maximum value of payout amount); a minimum BET amount for each standalone game; and the number of slot machines, etc., that can participate, and stores them in the RAM 203.

Next, the CPU 201 of the center controller 200 performs a process of creating progressive link participant list information (step S117). In this process, the CPU 201 of the center controller 200 samples, from the RAM 203, the currently possessed information pertinent to the progressive links 150, and creates a progressive link participant list. The progressive link participant list is created for each of the progressive links 150 in which the slot machines 10 participate. Specifically, the CPU 201 of the center controller 200 reflects the contents varied by way of the merge process of the progressive links 150 and the process of newly creating jackpots 151 on the progressive link participant list information. The CPU 201 samples from the RAM 203 one or multiple items of information pertinent to progressive links 150 that the center controller 200 manages, and creates a progressive link participant list. Items of information pertinent to the progressive links 150 include: the amount of prize money for each of the jackpots 151 by progressive link 150 (maximum value of payout amount); a minimum BET amount for each standalone game; and the number of slot machines that currently participate, etc. The CPU 201 stores the created progressive link participant list in a predetermined area of the RAM 203. Subsequently, the CPU 201 of the center controller 200 updates progressive link participant list information. Specifically, the updated progressive link participant list information is stored in the predetermined area of the RAM 203. Further, it may be a routine to transmit the updated information to the slot machines 10 that participate in the progressive links 150 so that the slot machines 10 display the received information. Further, it may be a routine to transmit the updated information to the common display device 300 so that the common display device 300 displays the received information. After this process has terminated, the progressive merge process is terminated.

Next, a progressive link participation process will be described. FIG. 26 is a flowchart showing a subroutine of the progressive link participation process invoked and executed at step S3 of the subroutine in the slot machine 10 shown in FIG. 24 or at step S103 of the subroutine in the center controller 200. The game processing described hereinafter is performed under cooperative operation between the main CPU 41 of the slot machine 10 and the CPU 201 of the center controller 200.

Now, an operation of the slot machines 10 will be described. The main CPU 41 of the slot machine 10 performs the processes at steps S31 to S37 that follow. At step S31, the main CPU 41 of the slot machine 10 performs a process of receiving progressive link participant list information. In this process, the main CPU 41 receives the progressive link participant list information transmitted from the center controller 200, and stores the received information in the RAM 43.

At step S32, the main CPU 41 of the slot machine 10 judges whether or not to display progressive link participant list information. In this process, the main CPU 41 causes the lower image display panel 16 to display receipt of the progressive link participant list, and judges whether or not a player makes an operation to display the touch panel 69 or make entry therefrom. Upon judging that the progressive link participant list information is displayed (step S32: YES), the main CPU 41 proceeds to step S33. If not (step S32), the CPU terminates this subroutine.

At step S33, the main CPU 41 of the slot machine 10 causes the lower image display panel 16 to display the progressive link participant list information.

At step S34, the main CPU 41 of the slot machine 10 judges whether or not to participate in progressive link 150. In this process, the main CPU 41 judges whether or not a player makes an operation for participation entry from the touch panel 69. Upon judging that the slot machine participates in the progressive link 150 (step S34: YES), the main CPU 41 proceeds to step S35. If not (step S34: NO), this CPU terminates this subroutine.

At step S35, the main CPU 41 of the slot machine 10 performs a process of transmitting the progressive link participation signal selected at step S34. In this process, the main CPU 41 transmits to the center controller 200 the code and machine identification information pertinent to the selected progressive link 150.

At step S36, the main CPU 41 of the slot machine 10 receives a participation complete signal for the selected progressive link at step S34. In this process, the main CPU 41 stores in the predetermined area of the RAM 43 the progressive link participation information including a BET condition for the received progressive link 150 from the center controller 200.

At step S37, the main CPU 41 of the slot machine 10 performs a process of displaying on the lower image display panel 16 that the slot machine has participated in the selected progressive link 150 at step S34. After this process has terminated, this CPU terminates this subroutine.

Next, an operation of the center controller 200 will be described. The CPU 201 of the center controller 200 performs the processes at step S131 to S134 that follow. At step S131, the CPU 201 of the center controller 200 transmits progressive link participant list information to the slot machines 10. In this process, the CPU 201 transmits to the slot machines 10 the progressive link participant list information created during the aforementioned process of creating progressive links.

At step S132, the CPU 201 of the center controller 200 performs a process of receiving the progressive link participation signal transmitted from the slot machine at step S35. In this process, the CPU 201 receives the code and machine identification information pertinent to the selected progressive link 150 transmitted from the slot machines 10 at step S35.

At step S133, the CPU 201 of the center controller 200 performs a process of causing the corresponding slot machine 10 to participate in the selected progressive link 150. This process is based upon the progressive link participation signal received at step S132. In this process, the CPU 201 specifies a machine-participating progressive link from the code of the selected progressive link 150; specifies a participating slot machine 10 from the received machine identification information; and registers the specified machine in the specified progressive link 150. The CPU 201 creates an area for the slot machine 10 that newly participates, in an area of storing information pertinent to the progressive link 150 of the RAM 203. In that area, the BET information indicating that the slot machine 10 has placed a bet on the jackpot 151 or the link game count, etc., is stored.

At step S134, the CPU 201 of the center controller 200 performs a process of transmitting to the participating slot machine 10 the participation complete signal of the progressive link 150 having participated at step S133. In this process, the CPU 201 transmits participation information to the slot machine 10 having transmitted the participation signal, the items of the information including the BET condition for the machine-participating progressive link 150. After this process has terminated, the CPU terminates this subroutine.

Next, a progressive link withdrawal process will be described. FIG. 27 is a flowchart showing a subroutine of the progressive link withdrawal process invoked and executed at step S4 of the subroutine in the slot machine 10 shown in FIG. 24 and at step S104 of the subroutine in the center controller 200. The game processing described hereinafter is performed under cooperative operation between the main CPU 41 of the slot machine 10 and the CPU 201 of the center controller 200.

First, an operation of the slot machine 10 will be described. The main CPU 41 of the slot machine 10 performs the processes at steps S41 to S48 that follow. At the step S41, the main CPU 41 of the slot machine 10 judges whether or not a player participates in the progressive link 150. In this process, the main CPU judges whether or not there is any item of subscriber information including the BET condition for the progressive link 150 stored in the RAM 43. Upon judging that the player participates in the progressive link 150 (step S41: YES), the CPU 201 proceeds to step S42. If not (step S41: NO), this CPU terminates this subroutine.

At step S42, the main CPU 41 of the slot machine 10 judges whether or not to change a current display screen to a display screen for progressive link withdrawal. In this process, the main CPU 41 judges whether or not the player makes an operation to check the withdrawal display entry from the touch panel 69. Upon judging that the current display is changed to the display screen for progressive link withdrawal (step S42: YES), the CPU 201 proceeds to step S43. If not (step S42: NO), this CPU terminates this subroutine.

At step S43, the main CPU 41 of the slot machine 10 performs a process of change the current display to the display screen for progressive link withdrawal. The main CPU 41 receives status data of the machine-participating progressive link 150 transmitted from the center controller 200 (step S44), and displays the status data of the received machine-participating progressive link 150 at the lower display panel 16 (step S45).

At step S46, the main CPU 41 of the slot machine 10 judges whether or not to withdraw from the progressive link 150. In this process, the main CPU 41 judges whether or not the player makes an operation to check the withdrawal entry from the touch panel 69. Upon judging withdrawal from the progressive link 150 (step S46: YES), the CPU 201 proceeds to step S47. If not (step S46: NO), this CPU terminates this subroutine.

At step S47, the main CPU 41 of the slot machine 10 performs a process of transmitting a withdrawal signal from the progressive link 150 selected at step S46. In this process, the main CPU 41 transmits the code and machine identification information pertinent to the selected progressive link 150 to the center controller 200.

At step S48, the main CPU 41 of the slot machine 10 performs a process of displaying on the lower image display panel 16 the withdrawal from the progressive link 150 selected at step S46. After this process has terminated, this CPU terminates this subroutine.

Next, an operation of the center controller 200 will be described. The CPU 201 of the center controller 200 performs the processes at steps S141 to S144 that follow. At step S141, the CPU 201 of the center controller 200 transmits progressive link participant list information to the slot machines 10. In this process, the CPU 201 transmits to the slot machines 10 the progressive link participant list information created at the aforementioned progressive link creation process.

At step S141, the CPU 201 of the center controller 200 performs a process of receiving a request signal of withdrawal screen information transmitted from the slot machines 10 at step S43. In this process, the CPU 201 performs a process of sampling from the RAM 203 the information pertinent to the progressive link 150 in which the slot machines 10 having transmitted the request signal participate.

At step S142, the CPU 201 of the center controller 200 performs a process of transmitting to the slot machines 10 having transmitted the request signal the information pertinent to the progressive link 150 that is sampled at step S41.

At step S143, the CPU 201 of the center controller 200 performs a process of receiving a withdrawal signal of the progressive link 150, the signal having been transmitted from the slot machines 10 at the step S44. In this process, the CPU 201 receives the code and machine identification information pertinent to the selected progressive link 150, the information having been transmitted from the slot machines 10 at step S44.

At step S144, the CPU 201 of the center controller 200 performs a process of withdrawing the corresponding slot machine 10 from the selected progressive link 150 based upon the withdrawal signal of the progressive link 150 received at step S143. In this process, the CPU 201 performs a process of specifying the progressive link 150 to be withdrawn from the code of the selected progressive link 150, specifying the machine-participating slot machine 10 from the received machine identification information, and excluding the registered slot machine 10. Further, the CPU 201 deletes an area for the slot machine 10 to be withdrawn from an area storing the information pertinent to the progressive link 150 in the RAM 203. After this process has terminated, this CPU terminates this subroutine.

Next, game processing will be described. FIG. 28 is a flowchart showing a subroutine of the game processing invoked and executed at step S5 of the subroutine in the slot machine 10 shown in FIG. 24 or at step S105 of the subroutine in the center controller 200. The game processing described hereinafter is performed under cooperative operation between the main CPU 41 of the slot machine 10 and the CPU 201 of the center controller 200.

The main CPU 41 of the slot machine 10 performs the processes at steps S51 to S63 that follow. First, at step S51, the main CPU 41 judges whether or not coins have been betted. In this process, the main CPU 41 judges whether or not an input signal output from a 1-BET switch 26S when a 1-BET button 26 is operated or that output from a MAX-BET switch 27S when a MAX-BET button 27 is operated has been received. Upon judging that no coin has been betted (step S51: NO), the main CPU 41 reverts to step S51. Upon judging that coins have been betted (step S51: YES), the routine proceeds to step S52.

At step S52, when the judgment result is affirmative at step S51, the main CPU 41 of the slot machine 10 performs a process of subtracting the amount of credit stored in the RAM 43, in accordance with the number of betted coins. Further, the main CPU 41 stores in the RAM 43 the amount of credit after subtracted.

At step S53, the main CPU 41 of the slot machine 10 judges whether or not the spin button 23 has been set to ON. Specifically, the main CPU 41 judges whether or not the input signal outputted from the SPIN switch 23S has been received when the SPIN button 23 has been depressed. Upon judging that the spin button 23 has not been set to ON (step S53: NO), the main CPU 41 reverts to step S51. Upon judging that the button has been set to ON (step S53: YES), the routine proceeds to step S54. Upon judging that the SPIN button 23 has not been set to ON (for example, if an instruction for terminating a standalone game without setting the SPIN button 23 to ON has been entered), the main CPU 41 cancels the credit amount subtraction performed at step S52.

At step S54, the main CPU 41 of the slot machine 10 judges whether or not a player participates in the progressive link 150. Specifically, the main CPU 41 judges whether or not the received BET condition data for the participating progressive link 150 is present in a predetermined area of the RAM 43, in the progressive link participation process performed at FIG. 27 described previously. Upon judging that the player has participated in the progressive link 150 (step S54: YES), the main CPU 41 proceeds to step S55, or alternatively, if not (step S54: NO), the routine proceeds to step S60.

At step S55, the main CPU 41 of the slot machine 10 transmits to the center controller 200: the BET amount betted on the jackpot 151 among the number of coins betted at step S51; and identification information pertinent to the slot machine 10, the information having been stored in the ROM 42, altogether.

At step S56, the main CPU 41 of the slot machine 10 judges whether or not a winning jackpot signal has been received. The center controller 200 selects a slot machine winning the jackpot 151 from among those participating in the progressive link 150, and transmits the winning jackpot signal to only the selected slot machine 10. Namely, only the slot machine 10 that has won the jackpot 151 can receive the winning jackpot signal. Upon judging that the winning jackpot signal has been received (step S56: YES), the main CPU 41 proceeds to step S57. If not (step S56: NO), the routine proceeds to step S60.

At step S57, the main CPU 41 of the slot machine 10 performs a jackpot symbol determination process. Specifically, upon judging that the SPIN button 23 has been set to ON at step S63, the main CPU 41 executes the symbol determination program stored in the RAM 43. After that, while it is triggered that the winning jackpot signal has been received at step S56, this main CPU determines code No. indicating a winning jackpot established when scrolling of the symbols stops.

At step S58, the main CPU 41 of the slot machine 10 performs a scroll-display process. Specifically, the main CPU 41 perform display control so that scroll-display of plural types of symbols is started, and thereafter, concurrently with the stop of scroll-display after an elapse of a predetermined time, the symbols indicated by code No. representing the winning jackpot determined at step S56 are displayed in a stopped state in the symbol matrix 28.

At step S59, the main CPU 41 of the slot machine 10 performs a payout process of the winning jackpot 151. Specifically, the main CPU 41 pays out coins, based upon the amount of payout included in the winning jackpot signal received at step S56.

At step S60, the main CPU 41 of the slot machine 10 performs a symbol determination process. Specifically, upon judging that the SPIN button 23 has been turned ON at step S53, the main CPU 41 determines code No at the stoppage of symbols, by executing the symbol determination program stored in the RAM 43. The present embodiment describe a case of determining one or more prizes from among plural types of prizes, by determining symbols displayed in a stopped state. However, the present invention is not limitative thereto, and, for example, may be applicable to a case in which one or more prizes selected from among the plural types of prizes are determined, and the combinations of symbols displayed in a stopped state are then determined based upon the above-mentioned prizes.

At step S61, the main CPU 41 of the slot machine 10 performs a scroll-display process. Specifically, the main CPU 41 perform display-control so that scroll-display of plural types of symbols is started, and thereafter, concurrently with the stop of scroll-display after an elapse of a predetermined time, the symbols indicated by code No. representing the winning jackpot determined at step S70 are displayed in a stopped state in the symbol matrix 28.

At step S62, the main CPU 41 of the slot machine 10 judges whether or not a scatter prize is established. Specifically, the main CPU 41 judges whether or not three or more trigger symbols of the scatter prize are displayed in a stopped state in any elements of the symbol matrix 28, and the scatter prize is then established. Upon judging that the scatter prize is established (step S62: YES), the main CPU 41 proceeds to S73 at which a coin payout process is performed. If not (step S62: NO), this main CPU terminates this subroutine without performing coin payout.

If the main CPU 41 judges that no winning jackpot signal has been received (step S56: NO) and that no scatter prize is established (step S62: NO), it is determined to be a “loser”. The word “loser” used herein denotes a case in which no coin payout is performed.

Next, an operation of the center controller 200 will be described. The CPU 201 of the center controller 200 performs the processes at steps S151 to S157 that follow. At step S151, the CPU 201 of the center controller 200 receives jackpot BET information and machine identification information transmitted from the slot machine 10 at the abovementioned step S55. Namely, at step S151, the center controller receives BET information pertinent to the first or second link game from any of the first and second pluralities of gaming machines.

The CPU 201 of the center controller 200 stores the jackpot BET amount in the RAM 203, based upon the received jackpot BET information. Namely, the CPU 201 of the center controller 200 accumulatively updates the first or second progressive value stored in the RAM 203, based upon the BET information received at step S151. The RAM 203 stores the jackpot BET amount by slot machine 10, and the CPU 201 of the center controller 200 stores the jackpot BET amount in a memory space of the corresponding slot machine 10 of the RAM 203, based upon the machine identification information. Further, the CPU 201 of the center controller 200 receives the machine identification information transmitted from the slot machine 10 at the abovementioned step S55, and stores the received link game count in the predetermined area of the RAM 203.

At step S152, the CPU 201 of the center controller 200 performs a process of adding and updating the progressive value of the jackpot 151. Specifically, the CPU 201 adds up the respective ones of the jackpot BET amounts at the slot machines 10 stored in the RAM 203 at step S151 and adds the jackpot BET amounts at the slot machines 10 participating in the progressive links 150, thereby storing the added-up progressive value in the RAM 203. Namely, this CPU updates the progressive value. For example, assuming that two slot machines 10 participate in a progressive link 150, if these slot machines each have invested 500 and 300 jackpot BET numbers, the center controller 200 adds up these BET numbers (500+300), and stores the added-up progressive value, i.e., "800" in the RAM 203.

At step S153, the CPU 201 of the center controller 200 performs a process of adding up the link game count. Specifically, the CPU 201 of the center controller 200 counts and adds up the respective ones of the link game counts at the slot machines 10, which are stored in the RAM 203 at the abovementioned step S151. After that, this CPU stores the added-up counts in the RAM 203 that function as a count memory. The RAM 203 also stores the value of the added up total link game counts acquired at all of slot machines 10 participating in the progressive link 150. For example, if the link game counts of the two slot machines 10 are 10 and 25, respectively, the center controller 200 adds up these link game counts (10+25). After that, this controller adds the added up value, i.e., "35" as the link game count of the RAM 203.

At step S154, the CPU 201 of the center controller 200 judges whether or not a winning jackpot is established. The CPU 201 judges whether or not the sampled random numbers coincide with specific numbers. Upon judging that the winning jackpot is established (step S154: YES), the CPU 201 proceeds to step S155. If not (step S154: NO), this CPU terminates this subroutine.

At step S155, the CPU 201 of the center controller 200 transmits a winning jackpot signal. Specifically, if the random numbers sampled at step S154 coincide with specific numbers, the CPU 201 transmits a winning jackpot signal to slot machines 10 to which the specific numbers have been randomly assigned as a winning jackpot. Namely, the CPU 201 of the center controller 200 randomly determines whether or not to award a progressive bonus for a link game to any of the slot machines 10 participating in a merged link game. After that, this CPU awards a progressive bonus, which is responsive to the added up progressive value, to the slot machine determined as the result of the random determination.

If the jackpots 151 are merged in the progressive link creation and merging process, the CPU 201 awards to the slot machine 10 the progressive bonus that is responsive to the added-up progressive value, based upon the link game outcome of the gaming machine that participate in the merged-link game.

At step S156, the CPU 201 of the center controller 200 resets the progressive value of the jackpot 151. Specifically, the CPU 201 resets: the progressive value of the winning jackpot 151 stored in the RAM 203; the jackpot BET amount by slot machine 10; the total link game count; and the value of the link game count by slot machine 10. After this process has terminated, this CPU terminates this subroutine.

Other Embodiment

An alternate embodiment of the present invention will be described. While the above embodiments described a game system provided with the center controller 200, even if the center controller is absent, a main CPU 41' included in any one of the slot machines 10 serves as a host controller, namely, a parent machine, making it possible to control the center controller 200 of the above embodiment and perform the abovementioned standalone game. Hereinafter, the configuration of the game system will be described referring to FIGS. 29 and 30. In this case, the main CPU 41' of any one slot machine 10' serves as a host controller to perform control operation. Namely, the main CPU 41' of the slot machine 10', which serves as a host controller, performs control operation of the CPU 201 of the abovementioned center controller 200 that performs processing of the progressive link 150; and other slot machines perform a participation process of the progressive link 150 for the single slot machine 10'. In the following description, a ROM 42' of the slot machine 10' replaces the abovementioned ROM 202; a RAM 43' of the slot machine 10' replaces the abovementioned RAM 203; and a communication interface 44' of the slot machine 10' replaces the abovementioned communication interface 204. While control operation will be described hereinafter, it is substantially identical to that of the embodiments, and therefore, part of the description thereof is omitted here.

Figure 29:
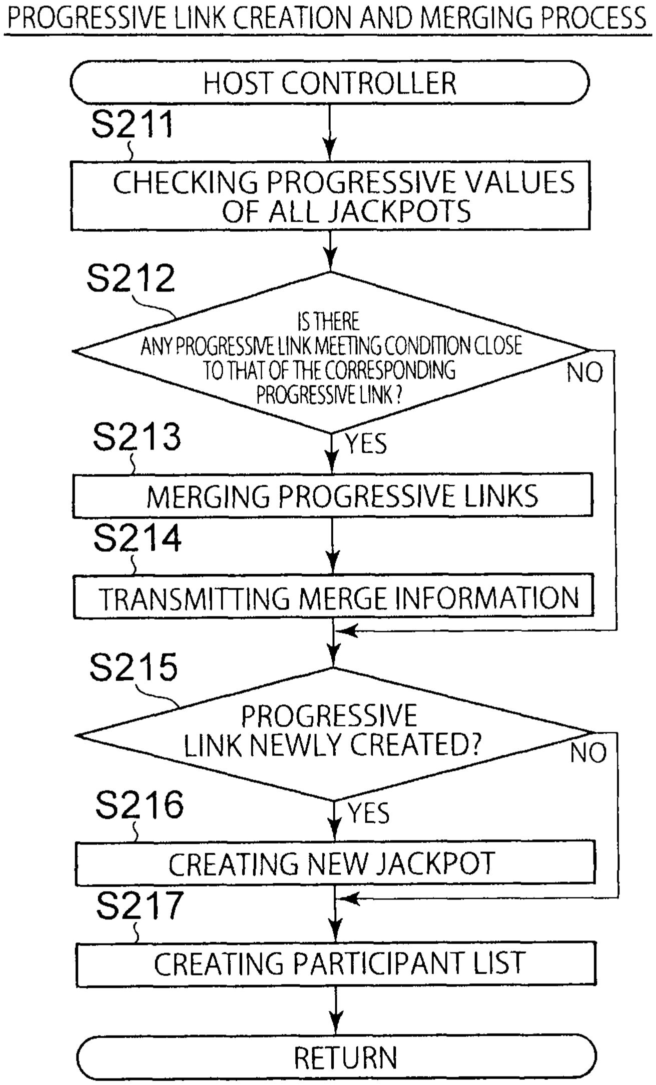
FIG. 29 is a flowchart showing a subroutine of a process of creating and merging progressive links associated with a host controller of the slot machine.

Next, the progressive link creation and merging process will be described. FIG. 29 is a flowchart showing the progressive link creation and merging process performed by a host controller. FIG. 27 is a flowchart showing a subroutine of the progressive link creation and merging process invoked and executed at step S3 of the subroutine in the slot machine 10' shown in FIG. 24 or at step S103 of the subroutine in the host controller.

A host controller operation will be described hereinafter. The main CPU 41' serving as a host controller performs a process of verifying the progressive value of each jackpot 151 (step S211). In this process, the main CPU 41' serving as a host controller reads the progressive values of all of the jackpots 151 in link games, the values being stored in the RAM 43'.

Next, the main CPU 41' serving as a host controller judges whether or not there exists a progressive link meeting a condition close to the corresponding progressive link 150 (step S212). In this process, the main CPU 41' serving as a host controller judges a predetermined condition in which each of the stored first and second progressive values and the link game count are preset. The predetermined condition is that each of the first and second progressive values has reached a predetermined value or more (for example, 50000) and that the respective progressive values are within the preset predetermined difference (for example, ±10%). The main CPU 41' serving as a host controller further reads the link game count from the RAM 43', and judges whether or not each of the first and second link games meets the preset predetermined condition. The predetermined condition is that, when the main CPU 41' serving as a host controller references the RAM 43', each of the link game counts executed in the first and second link games reaches the predetermined value (for example, 5,000). Upon judging that the first and second progressive values and link game count read at step S211 meet the predetermined condition (step S212: YES), the main CPU 41' serving as a host controller proceeds to step S213. If not (step S212: NO), the main CPU 41' proceeds to step S215. While the target range was defined to be within ±10%, it may be broader or narrower.

Next, the main CPU 41' serving as a host controller merges progressive links (step S213). Upon judging that the first and second progressive values meet the predetermined condition as the result of the judgment at step S213, the main CPU 41' merges a plurality of link games, which correspond to the first and second progressive values meeting the predetermined condition, to form one link game; and then, adds up these progressive values. Namely, the main CPU 41' serving as a host controller adds up the first progressive values so that the first and second link games are merged with each other to form one link game, as the result of the judgment at step S212, and the first and second progressive bonuses are integrated with each other. Subsequently, the main CPU 41' serving as a host controller updates the progressive values stored in the RAM 43', based upon the added-up progressive value. Specifically, the main CPU 41' serving as a host controller generates the number of a new progressive link 150 that is different from that of the currently established progressive link 150, and stores the added up progressive value in the RAM 43' of the host controller in association with the generated number. This item of information is defined as merge information. The items of the merge information include a progressive value of a machine-participating progressive link 150.

Namely, where the stored first and second progressive values meet the predetermined condition, they can be merged, thus making it possible to increase the scale of the progressive values. As a result, an opportunity of obtaining a greater progressive value is given a player, thus making it possible to enhance entertainability.

Next, the main CPU 41 serving as a host controller transmits merge information (step S214). The main CPU 41' serving as a host controller transmits merge information via a communication interface 44' to other slot machines, each of which participates in the progressive link 150. Other slot machines 10 each receive this information, and thereafter, perform a display process. Namely, other slot machines 10 each receive merge information from the host controller to be described later (step S214). The main CPU 41 of each of such other slot machines 10 receives, from the main CPU 41' serving as a host controller, the merge information stored in the RAM 43' and transmitted via the communication interface 44'.

At the same time, the main CPU 41' serving as a host controller communicates with a common display device 300, and the common display device 300 displays merge information. Specifically, the main CPU 41' serving as a host controller controls the common display device 300 to display the progressive value added up at step S213 and stored in the RAM 43'. Therefore, the updated progressive value is displayed so that information such as the current progressive value or a plurality of merged progressive values can be provided.

At step S215, the main CPU 41' serving as a host controller judges whether or not to create the progressive link 150. Specifically, the main CPU 41' serving as a host controller judges whether or not the number of progressive links raised in the created progressive link participant list is less than a predetermined number (for example, less than 3). Upon judging that the progressive link 150 is created (step S215: YES), the main CPU 41' serving as a host controller proceeds to step S216. If not (step S215: NO), the routine proceeds to step S217.

At step S216, the main CPU 41' serving as a host controller performs a process of creating a new jackpot 151. Specifically, the main CPU 41' serving as a host controller creates the jackpot 151, so that the number of progressive links raised in the progressive link participant list is a predetermined number or more (for example, 3 or more) at step S215. In the embodiment, the payment condition for the jackpot 151 is randomly set by means of the main CPU 41' serving as a host controller, without being limitative thereto. For example, it may be a routine to judge a pattern of the progressive links 150 included in the progressive link participant list so as to control creation of a new jackpot 151 serving as a progressive link 150 of the same pattern. Upon creating the new jackpot 151, the main CPU 41' serving as a host controller sets the amount of prize money for each jackpot 151 (maximum value of payout amount); a minimum BET amount in one standalone game; and the number of slot machines that can participate, and stores the settings in the RAM 43' of the host controller.

Next, the main CPU 41' serving as a host controller performs a process of creating progressive link participant list information (step S217). In this process, the main CPU 41' serving as a host controller samples current information pertinent to the progressive link 150 from the RAM 43' of the host controller, and creates the progressive link participant list. The main CPU 41' progressive link participant list is created by progressive links 150 in which slot machines 10 participate. Specifically, the main CPU 41' serving as a host controller incorporates, in the progressive link participant list information, the contents changed by the merging process of the progressive links 150 and the jackpot creation process. The main CPU 41' serving as a host controller samples, from the RAM 43 of the host controller, the information pertinent to one or more progressive links 150 managed by the host controller, and creates the progressive link participant list. The items of information pertinent to the progressive links 150 include: the amount of prize money for each progressive link 150 (maximum value of payout amount); a minimum BET amount in one standalone game; and the number of slot machines that currently participate. The main CPU 41' serving as a host controller stores the created progressive link participant list in the predetermined area of the RAM 43' of the host controller.

Next, the main CPU 41' serving as a host controller updates progressive link participant list information. Specifically, the updated progressive link participant list information is stored in the predetermined area of the RAM 43' of the host controller. Further, it may be a routine to transmit the update information to other slot machine 10 participating in the progressive link 150, so that such other slot machines 10 display the received information. Further, it may also be a routine to transmit the updated information to the common display device 300 so that the common display device displays the received information. After this process has terminated, this CPU terminates a progressive link merging process.

Figure 30:
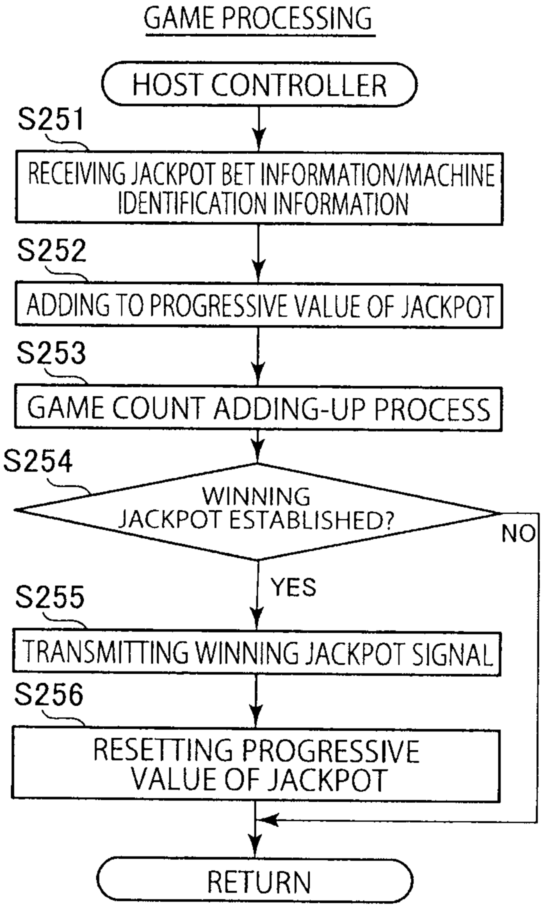
FIG. 30 is a flowchart showing a subroutine of game processing associated with the host controller of the slot machine.

Game processing of the host controller will be described, referring to FIG. 30. FIG. 30 is a flowchart showing the game processing of the host controller. In the game processing of this embodiment, the main CPU 41' of any one slot machine 10', serving as a host controller, performs control operation in place of the CPU 201 of the center controller 200. The processes of other slot machines 10 are not described here, since it is similar to those shown in FIG. 28. The main CPU 41' serving as a host controller performs the processes at steps S251 to S257 that follow. At step S251, the main CPU 41' serving as a host controller receives jackpot BET information and machine identification information having been transmitted from the slot machines 10. Namely, the main CPU 41' performs the processes of the center controller shown in FIG. 25, and other slot machines 10 perform the processes of the slot machine 10 shown in FIG. 25. Further, the main CPU 41' receives a participation signal, for example, BET information and machine identification information, from the gaming machines. The main CPU 41' serving as a host controller stores the jackpot BET amount in the RAM 43' of the host controller, based upon the received jackpot BET information. Namely, the main CPU 41' serving as a host controller accumulatively updates the first or second progressive value stored in the RAM 43', based upon the BET information received at step S251. The RAM 43' stores the jackpot BET amount by other slot machines 10, and the main CPU 41' serving as a host controller stores the jackpot BET amount in the area of the corresponding slot machine 10' of the RAM 43', based upon machine identification information. Further, the main CPU 41' serving as a host controller receives the machine identification information transmitted from the slot machines 10 at the abovementioned step S55, and stores the received link game count in the predetermined area of the RAM 43'.

At step S252, the main CPU 41' serving as a host controller performs a process of updating the progressive value of the jackpot 151. Specifically, the main CPU 41' serving as a host controller adds up the respective jackpot BET amounts of slot machines 10, the amounts having been stored in the RAM 43' of the host controller at step S251. Further, this main CPU adds up the jackpot BET amounts of all of the slot machines participating in the progressive links 150, and stores the added-up progressive value in the RAM 43' of the host controller. For example, assuming that two slot machines participate in a progressive link 150, if these slot machines 10 have invested 500 and 300 jackpot bets, the host controller adds up these BET numbers (500+300), and stores the added-up progressive value, i.e., "800", in the RAM 43 of the host controller.

At step S253, the main CPU 41' serving as a host controller performs a process of adding up the link game count. Specifically, the main CPU 41' serving as a host controller counts the number of the respective link games at the slot machines, the counts having been stored in the RAM 43' of the host controller at the abovementioned step S251, adds up the counted number, and then, stores it in the RAM 43'. The RAM 43' of the host controller stores the added-up value of the total link game count of all of the slot machines 10 participating in the progressive links 150. For example, the link game counts of two slot machines 10 are 10 times and 25 times, respectively, these link game counts are added up (10+25), and the added-up value, i.e., "35" is stored in the RAM 43' of the host controller.

At step S254, the main CPU 41' serving as a host controller judges whether or not a winning jackpot is established. The main CPU 41' serving as a host controller judges whether or not the sampled random numbers coincide with specific numbers. Upon judging that the winning jackpot is established (step S254: YES), the main CPU 41' serving as a host controller proceeds to step S255. If not (step S254: NO), this main CPU terminates this subroutine.

At step S255, the main CPU 41' serving as a host controller transmits a winning jackpot signal. Specifically, if the random numbers sampled at step S254 coincide with specific numbers, the main CPU 41' serving as a host controller transmits a winning jackpot signal to slot machines 10 to which the specific numbers have been randomly assigned as a winning jackpot. In other words, the main CPU 41' serving as a host controller randomly determines whether or not to award a progressive bonus in a link game to any of the slot machines 10 participating in a merged link game, and awards to the slot machine 10 determined as the result of random determination the progressive bonus that is responsive to the added-up progressive value.

At step S256, the main CPU 41' serving as a host controller resets the progressive value of the jackpot 151. Specifically, the main CPU 41' resets: the progressive value of the winning jackpot 151 stored in the RAM 43' of the host controller; the jackpot BET amount by slot machine 10; the total link game count; and the value of link game count by slot machine 10. After this process has terminated, this main CPU terminates this subroutine.

While the embodiment described a case in which the plurality of slot machine 10, the center controller 200, and the common display device 300 are connected via a wire, the present invention is not limitative thereto. Data may be transmitted or received wirelessly. In other words, the communication lines according to the present invention include wired and wireless transmission lines.

While the embodiment described a case in which the game system 100 is installed in one gaming facility, etc., the slot machines 10 may be installed separately in other gaming facilities in the present invention.

While the embodiment described a case in which slot machines are employed as gaming machines, card game machines may be employed in the present invention.

While the embodiment described a case in which the predetermined value is fixed to 50,000, the present invention is not limitative thereto. The predetermined value may be set to a value other than 50,000 or may vary depending upon the number of players participating in link games or the progressive values.

While the embodiment described that two link games are merged to award a progressive link bonus, three or more link games may be merged in the present invention.

While, in the embodiment, the predetermined conditions for adding up the progressive values was that: the progressive value must be a predetermined value or more (50,000 or more); the progressive value is within the predetermined range (within ±10%); and the link game count is equal to the predetermined value (5,000), the present invention is not limitative thereto. It is sufficient if at least one of the above conditions is met. Further, the above predetermined value, the predetermined range, and the predetermined value may be taken as other values, or alternatively, any other condition may be established for merging link games.

Sixth Embodiment

Figure 31:
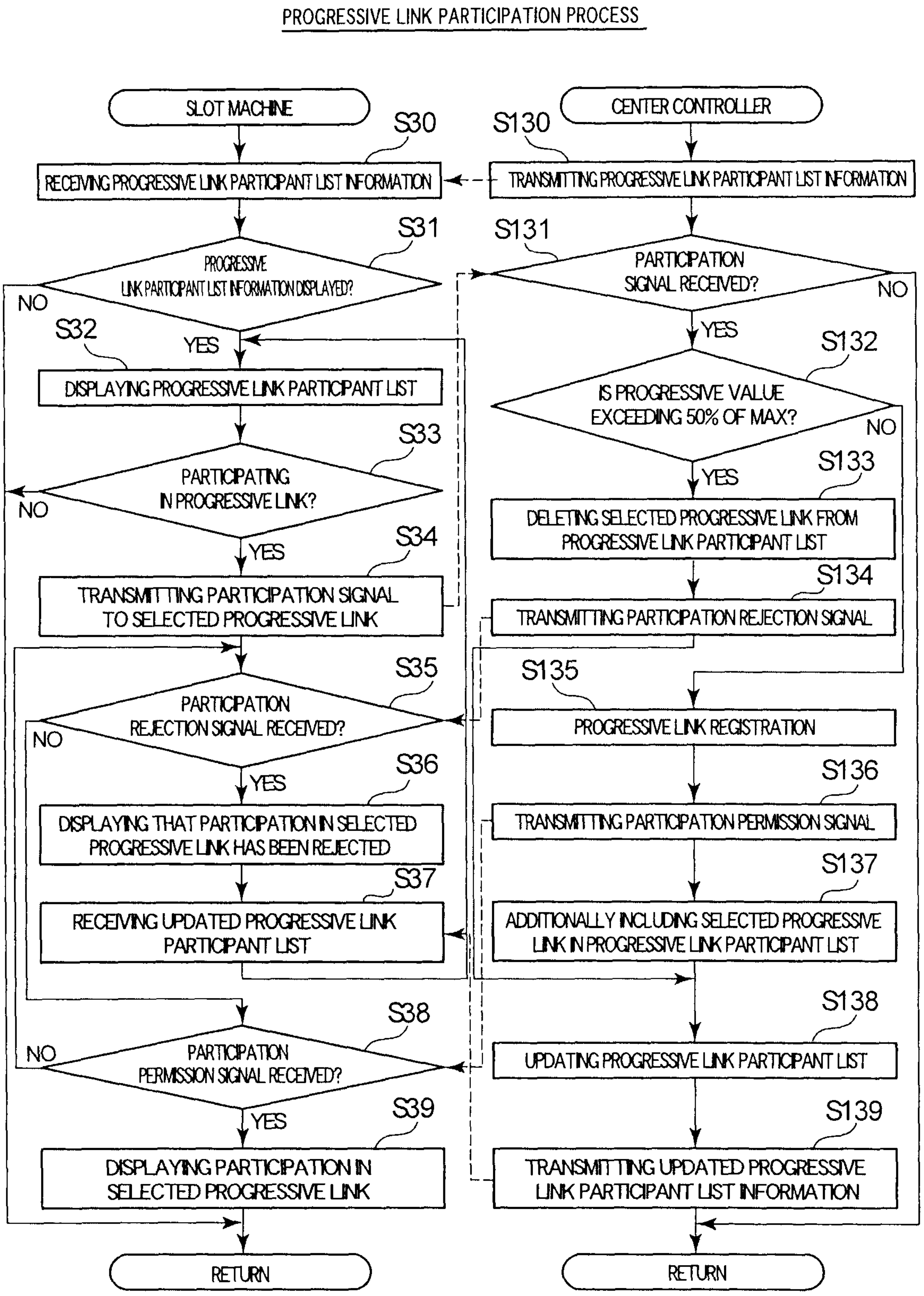
FIG. 31 is a flowchart showing a subroutine of a progressive link participation process according to a slot machine and a center controller.

A game system according to an embodiment of the present invention will be described in detail, referring to the drawings. FIG. 31 is an explanatory view of a progressive participation process.

First, an outline of games will be described. Slot machines 10 can perform a standalone game which a player at each of the slot machines 10 plays individually and a link game which is played by a plurality of players at other slot machines 10. The players at the slot machines 10 can arbitrarily play link games while playing standalone games.

A game system 100 according to the embodiment is made up of: a center controller 200 having a RAM 203 which stores a progressive value paid as a prize in a progressive bonus game serving as a link game; and a plurality of slot machines which can be connected to the center controller 200 via a communication line and can participate in a progressive bonus game in order to acquire a progressive value paid out as a prize. The progressive value stored in the RAM 203 of the center controller 200 is updated so as to increase BET information input from each of the slot machines 10.

At step S132, the center controller 200 monitors whether or not the progressive value updated based upon the BET information transmitted from each of the slot machines 10 has reached a predetermined value (for example, a value of 50%). If the progressive value has exceeded a predetermined value (for example, a value of 50%), the center controller 200 limits participation in a progressive bonus game relative to a slot machine which desires to do so from now. If not, the center controller allows such participation. In other words, the center controller 200 determines whether or not to participate in a progressive bonus game relative to a slot machine which desires to do so, in accordance with a state of the progressive value updated based upon the BET information. By limiting a period of time during which a player can participate in a progressive bonus game, it is possible to eliminate the player's feeling of unfairness in acquisition of the progressive value paid out as a prize common to a plurality of slot machines. The center controller 200 transmits, to a slot machine 10 which desires participation, information for determining whether or not the participation is permissible, based upon the contents of determination of participation in the progressive game determined according to the state of the progressive value (step S134, S136).

Figure 32:
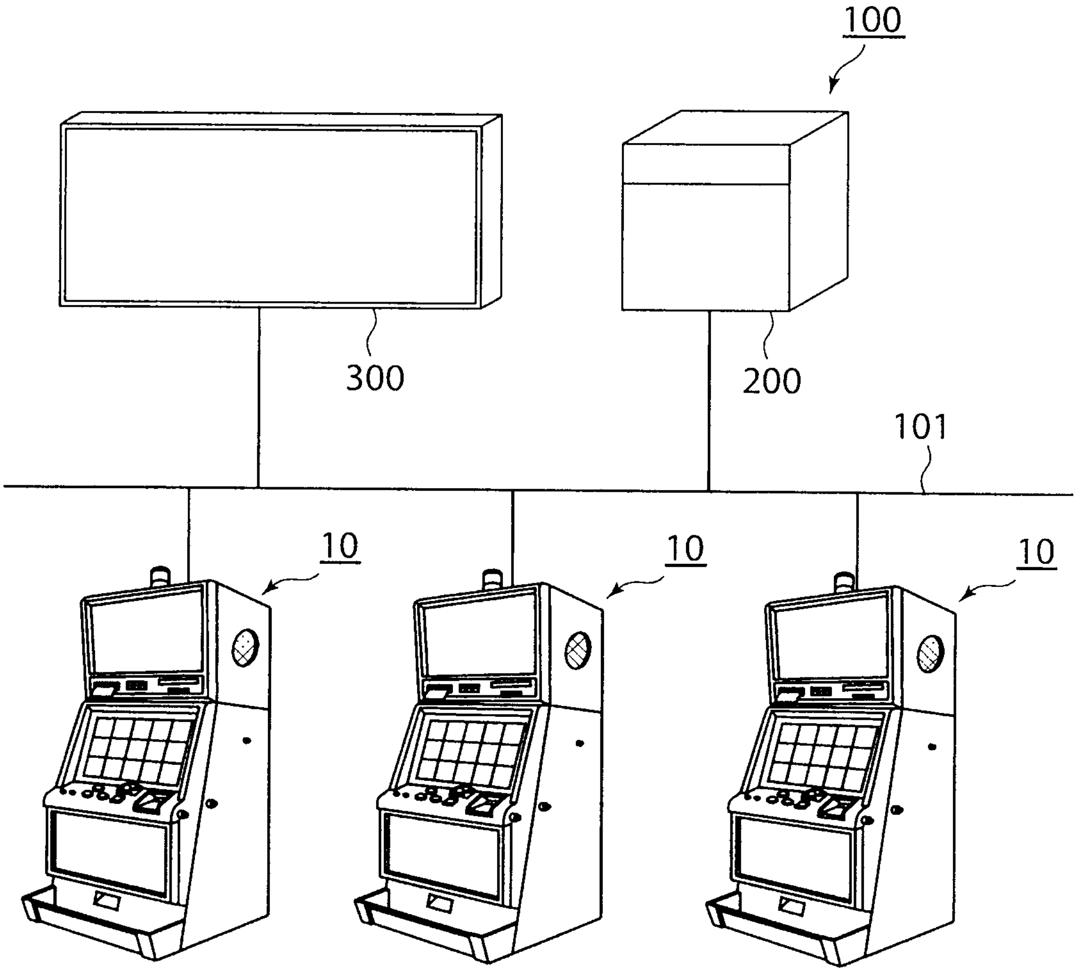
FIG. 32 is a schematic view showing an entire configuration of a game system.

Next, an entire configuration of the game system 100 in the embodiment will be described. FIG. 32 is a schematic view showing the entire configuration of the game system. This game system 100 is provided with the center controller 200 that is inter-communicable with each of the slot machines 10 serving as a plurality of gaming machines via a communication line 101 serving as a network. As shown in FIG. 32, the game system 100 is provided with a plurality of slot machines 10, a center controller 200, and a common display device 300.

To the center controller 200, a plurality of slot machines 10 and the common display device 300 are connected via the communication line 101. The center controller 200 is inter-communicable with the plurality of slot machines 10. Further, the common display device 300 can also transmit or receive data to or from the center controller 200 via the center controller 200. The plurality of slot machines 10 are interconnected to be communicable with each other via the communication line 101.

The common display device 300 is intended for displaying the amount of prize money in jackpots in the progressive links described later, and is installed at a position which is visually recognizable from the players at the plurality of slot machines 10.

Figure 33:
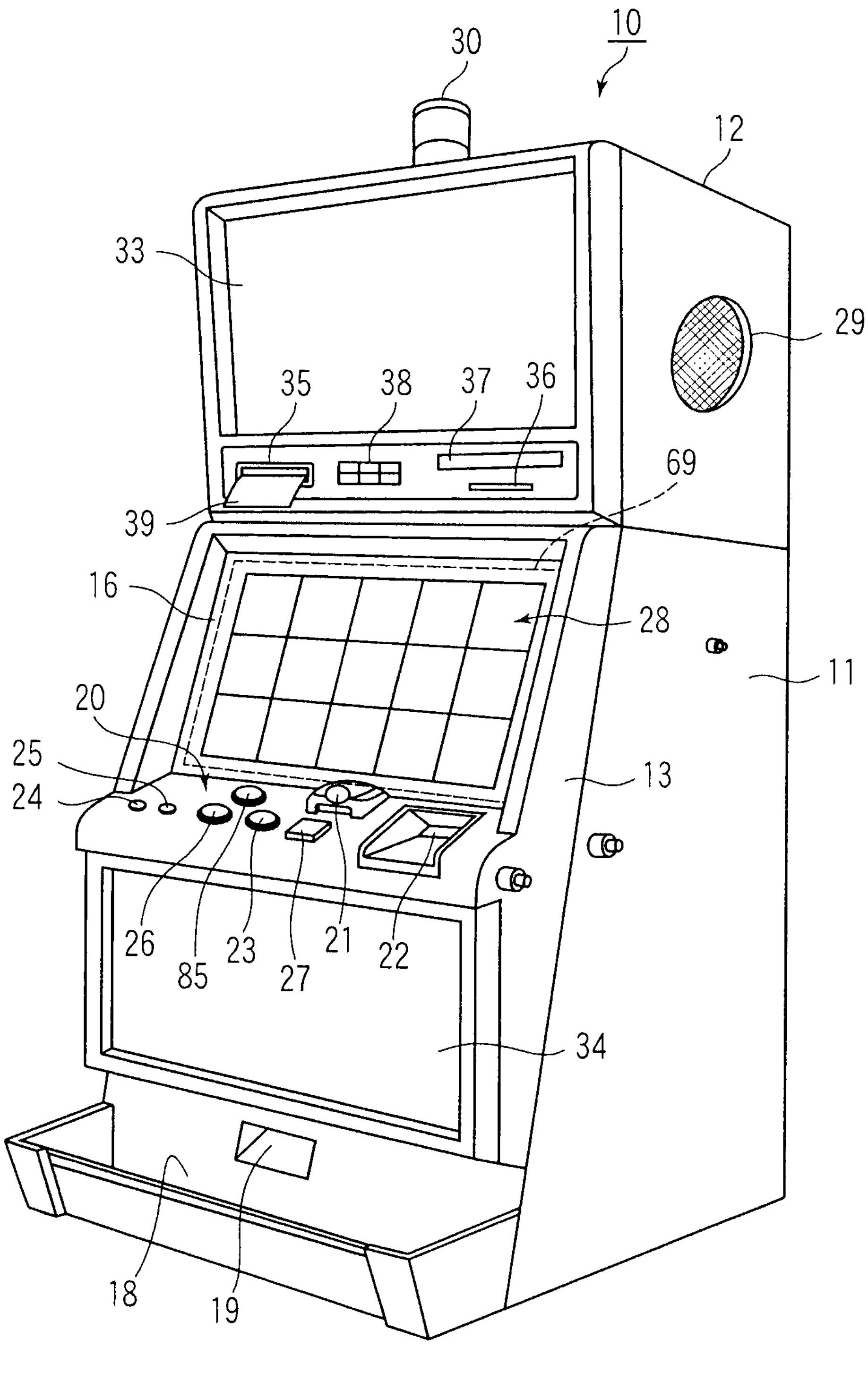
FIG. 33 is a perspective view schematically showing a slot machine.

FIG. 33 is a view schematically showing an appearance of the slot machine according to the embodiment of the present invention. The gaming media used in the slot machine 10 include coins, bills, or electronic value information equivalent thereto. In the present invention, however, medals, tokens, electronic money, or tickets, for example, may be employed as gaming mediums without being limitative thereto in particular. The above tickets are not limitative in particular, and can include barcode-attached tickets or the like, as described later, for example.

The slot machine 10 is provided with: a cabinet 11; a top box 12 installed at the upper side of the cabinet 11; and a main door 13 provided at the front face of the cabinet 11.

Each of the slot machines 10 has a display device, and a lower image display panel 16 serving as a display device is provided in front of a main door 13. The lower image display panel 16 is provided with a liquid crystal panel, which displays the symbol matrix 28 in three rows and five columns. One symbol is arranged in each of the cells of a symbol matrix 28, and a maximum of 15 symbols are displayed. A touch panel 69 is provided at the player's side of the lower image display panel 16. The lower image display panel 16 serves to display image such as icons. This display panel serves as touch panel buttons actuated by a player touching a partial area of the touch panel 69 on the image to enable judgment that the image has been selected by the player.

Downwardly of the lower image display panel 16 and at the center of a main door 13, a control panel 20 is provided in which: a plurality of buttons 23 to 27 and 85 are disposed for entering instructions associated with the progress of a game by a player; a coin receiving slot 21 are disposed for receiving coins in a cabinet 11; and a bill validator 22 are disposed.

On the control panel 20, a start button 23, a change button 24, a cashout button 25, a 1-BET button 26, a MAX-BET button 27, and a side-BET button 85 are provided. The start button 23 is intended for entering an instruction of starting a standalone game. The change button 24 is intended for use in asking an attendant of the gaming facility for change. The cashout button 25 is intended for entering an instruction of paying out the coins corresponding to the credits reserved by the players from a coin payout slot 19 to a coin tray 18.

The 1-BET button 26 is intended for entering a command for betting a credit corresponding to one coin. The MAX-BET button 27 is intended for entering a command for betting the maximum number (fifty in this embodiment) of coins that can be bet per game. A side-BET button 85 is used to place a bet in a side-game other than a game for rearranging symbols in the symbol matrix 28 among the standalone games. For example, in the embodiment, if a predetermined credit is betted by means of the side-BET button 85, it is possible to control the "CHANCE" symbols to be rearranged in the symbol matrix 28. Further, part of the credit betted by these input means is integrated and stored in a memory space set in a RAM 43, and is defined as a standard for determining the amount of payout in the case where jackpot acquisition takes place in a link game.

The bill validator 22 validates whether or not a bill is legitimate and accepts a legitimate bill into the cabinet 11. The bill validator 22 may be configured so that a barcode-attached ticket 39 described later is readable thereby. Provided on a lower front surface of the main door 13, that is, at a lower part of the control panel 20, is a berry glass 34 on which characters of the slot machine 10 and the like are depicted.

On the front face of the top box 12, an upper image display panel 33 is provided. The upper image display panel 33 has a liquid crystal panel displaying images for introducing the game contents or explaining game rules, for example.

Also, on the top box 12, a lamp 30 and a speaker 29 are provided. At the lower side of the upper image display panel 33, a ticket printer 35, a card reader 36, a data display 37, and a keypad 38 are provided. The ticket printer 35 prints, on tickets, bar codes containing coded data such as credit amount, date and time, or ID numbers of the slot machine 10, and the bar code-attached tickets 39 are output. A player causes another slot machine 10 to read bar code-attached tickets 39, thereby making it possible to perform games at the slot machines 10 and exchange the bar code-attached tickets 39 with cashes such as bills at a predetermined site of a game facility (for example, cashier in casino).

The card reader 36 reads data from and writes data into a smart card. The smart card is owned by a player, and stores data for identifying players or data pertinent to the history of games performed by the players. The smart card may store data equivalent to coins, bills, or credits. As an alternative of a smart card, a magnetic stripe card may be employed. The data display 37 is made up of a fluorescent display or the like, and displays data read by the card reader 36 or data input by the player via a keypad 38. The keypad 38 is intended for entering the instructions or data pertinent to the issuance of tickets.

Figure 34A:
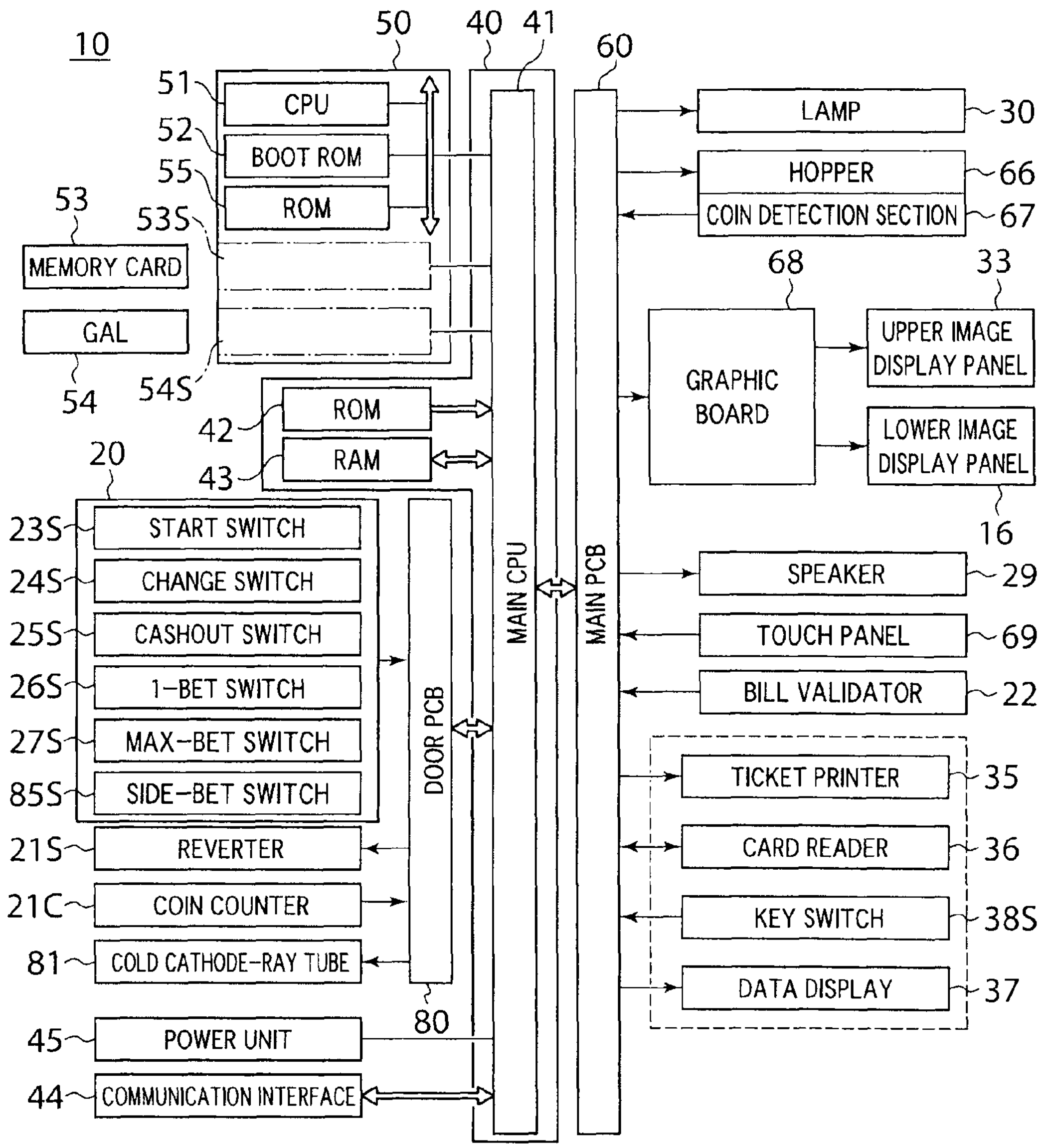
FIG. 34A is a view showing an internal configuration of the slot machine.

FIG. 34A is a block diagram depicting an internal configuration of the slot machine shown in FIG. 33. A gaming board 50 is provided with: a CPU (Central Processing Unit) 51, which is interconnected via an internal bus; a ROM (Read Only Memory) 55 and a boot ROM 52; a card slot 53S corresponding to a memory card 53; and an IC socket 54S corresponding to a GAL (Generic Array Logic) 54.

The memory card 53 is internally provided with a nonvolatile memory, and stores game programs. The game programs include a symbol selection program. The symbol selection program is intended for determining symbols rearranged in the symbol matrix 28. The symbol selection program includes symbol weighing data corresponding to each of plural types of payout ratios (for example, 80%, 84%, and 88%). The symbol weighting data is indicative of the correspondence relationship between the respective symbols and one or more random numeric values which come under a predetermined numerical range (0 to 255). A payout rate is determined based upon payout rate setting data output from the GAL 54, and the symbols rearranged in the symbol matrix 28 are determined based upon the symbol-weighted data corresponding to the payout rate. Further, the game programs include table data indicating the correspondence relationship between each of the symbols and a payout.

In addition, a card slot 53S is constituted to enable removable insertion of the memory card 53, and the card slot is connected to a motherboard 40 by means of an IDE bus. Therefore, the types or contents of games performed at the slot machines 10 can be varied by removing the memory card 53 from the card slot 53S; writing other game programs and game system programs in the memory card 53; and inserting the memory card 53 into the card slot 53S. The game programs include those which are relevant to the operating procedures for performing games. Furthermore, the game program includes image data or sound data to be output during the game. The image data includes image data of symbols to be arranged in the symbol matrix 28.

The GAL 54 is a kind of PLD having an OR-fixed arrayed structure. The GAL 54 is provided with pluralities of IN ports and OUT ports. If predetermined items of data are input to the IN port, the corresponding data is output from the OUT port. The data output from the OUT port is equivalent to the above-described payout rate setting data. Further, the IC socket 54S is constituted so as to removably mount the GAL 54, and is connected to the motherboard 40 via the PCI bus. Therefore, the payout setting data can also be varied by replacing the GAL with the replacement GAL 54.

The CPU 51, the ROM 55, and the boot ROM 52 interconnected via the internal bus are connected to the motherboard 40 via a PCI bus. The PCI bus not only performs signal transmission between the motherboard 40 and the gaming board 50, but also supplies power from the motherboard 40 to the gaming board 50.

The motherboard 40 is constructed using a general-purpose motherboard commercially available (a printed circuit board on which essential parts of a personal computer are mounted) and includes: a main CPU (Central Processing Unit) 41, a ROM (Read Only Memory) 42; a RAM (Random Access Memory) 43; and a communication interface 44.

The ROM 42 stores thereon a program such as BIOS (Basic Input/Output System) executed by the main CPU 41, and permanent data. Executing the BIOS by means of the main CPU 41 performs a process of initializing predetermined peripherals and starts an acquisition process via the gaming board 50 of the game programs and game system programs stored in the memory card 53. In the present invention, the contents of the ROM 42 may be rewritable or not.

The RAM 43 stores data and programs used when the main CPU 41 is activated. The RAM 43 can also store game programs. Further, the RAM 43 stores the data pertinent to credit amounts and coin insertion numbers or payout numbers in one game. In the embodiment of the present invention, the RAM 43 stores bonus points cumulatively.

Both a main body PCB (Printed Circuit Board) 60 and a door PCB 80 are connected to the motherboard 40 by USB. A power supply unit 45 is also connected to the motherboard 40.

Equipment and devices, which generate input signals to be input to the main CPU 41, and equipment and devices, operations of which are controlled by a control signal output from the main CPU 41, are connected to the body PCB 60 and the door PCB 80. The main CPU 41 executes the game programs stored in RAM 43, based upon an input signal that was input to the main CPU 41, thereby performing a predetermined computational process. Then, this CPU 41 stores results thereof into RAM 43; and transmits control signals to equipment and devices as a control process relative to the equipment and devices.

Connected to the main body PCB 60 are a lamp 30, a hopper 66, a coin detection section 67, a graphic board 68, a speaker 29, a touch panel 69, a bill validator 22, a ticket printer 35, a card reader 36, a key switch 38S, and a data display 37. The lamp 30 lights in a predetermined pattern, based upon a control signal output from the main CPU 41.

The hopper 66 is installed in a cabinet 11, and a predetermined number of coins are paid out from the coin payout opening 19 to the coin tray 18, based upon the control signal output from the main CPU 41. A coin detecting section 67 is provided inside of the coin payout opening 19, and outputs an input signal to the main CPU 41, if it is detected that a predetermined number of coins have been paid out from the coin payout opening 19.

A graphic board 68 controls the images to be displayed on the upper and lower image display panels 33 and 16, based upon the control signal output from the main CPU 41. The graphic board 68 is provided with: a VDP (Video Display Processor), which generates image data, based upon the control signal output from the main CPU 41; and a video RAM, etc., which temporarily stores image data generated by the VDP. The image data employed when the image data is generated by means of the VDP is read from the memory card 53, and thereafter, is included in the game programs stored in the RAM 43.

The bill validator 22 validates whether or not a bill is legitimate and accepts a legitimate bill into the cabinet 11.

Upon accepting a legitimate bill, the bill validator 22 outputs an input signal to the main CPU 41 based on the bill amount. The main CPU 41 stores in the RAM 43 the amount of credits responsive to that of bills transmitted by the input signal.

Based on a control signal output from the main CPU 41, the ticket printer 35 prints on a ticket a barcode having encoded thereon data such as the credit amount, data and time, and the identification number of the slot machine 10 stored in the RAM 43. Further, this printer outputs the printed ticket as a barcode-attached ticket 39. The card reader 36 reads data from a smart card, thereby transmitting the read data to the main CPU 41 or writing data into the smart card, based upon the control signal from the main CPU 41. The key switch 38S is provided on the key pad 38, and outputs a predetermined input signal to the main CPU 41 when a player operates the key pad 38. The data display 37 displays, based upon a control signal output from the main CPU 41, the data read by the card reader 36 and the data input by a player through the key pad 38.

To the door PCB 80, a control panel 20, a reverter 21S, a coin counter 21C, and a cold cathode-ray tube 81 are connected. On the control panel 20, there are provided: a start switch 23S corresponding to a start button 23; a change switch 24S corresponding to a change button 24; a cashout switch 25S corresponding to a cashout button 25; a 1-BET switch 26S corresponding to a 1-BET button 26; a MAX-BET switch 27 corresponding to a MAX-BET button 27; and a side-BET switch 85S corresponding to a side-BET button 85. When the player operates the buttons 23 to 27, and 90 the corresponding switches 23S to 27S and 85S output the input signals to the main CPU 41, respectively.

The coin counter 21C is provided inside the coin receiving slot 21, and validates whether or not a legitimate coin is inserted into the coin receiving slot 21. Those other than the legitimate coins are discharged from the coin payout exit 19. The coin counter 21C outputs an input signal to the main CPU 41 when a legitimate coin is detected.

The reverter 21S is operable based upon the control signal output from the main CPU 41. This reverter distributes the coins recognized to be legitimate by the coin counter 21C, into a cashbox (not shown) or a hopper 66 which was installed in the slot machine 10. In other words, if the hopper 66 is filled with coins, the legitimate coins are distributed to the cashbox by means of the reverter 21S. Otherwise, the legitimate coins are distributed to the hopper 66. The cold cathode-ray tube 81 functions as a backlight installed at the rear side of the lower and upper image display panels 16 and 33, and lights based upon the control signal that was output from the main CPU 41.

Figure 34B:
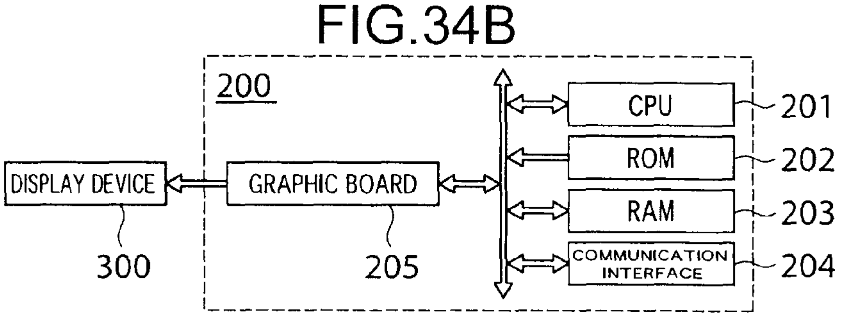
FIG. 34B is a view showing an internal configuration of the center controller.

FIG. 34B is a block diagram depicting an internal configuration of the center controller 200 shown in FIG. 31. The center controller 200 has: a CPU 201, which controls a plurality of slot machines 10; a ROM 202; and a RAM 203, which stores progressive values for the plurality of progressive bonuses, in this game system. This center controller 200 also has a RAM 203; a communication interface 205, which communicates with a main CPU 41; and a graphic board 205, which controls the common display device 300 to display an image.

The ROM 202 stores: programs such as a BIOS executed by the CPU 201; and permanent data. When the CPU 201 executes the BIOS, a process of initializing predetermined devices is performed, and the control programs and game system programs of the center controller 200 is read in the RAM 203. Further, the RAM 203 stores game data such as accumulative amounts of credits which the slot machines own or bonus points. The graphic board 205 controls the common display device 300 to display an image, based upon a control signal output from the main CPU 201.

Figure 35:
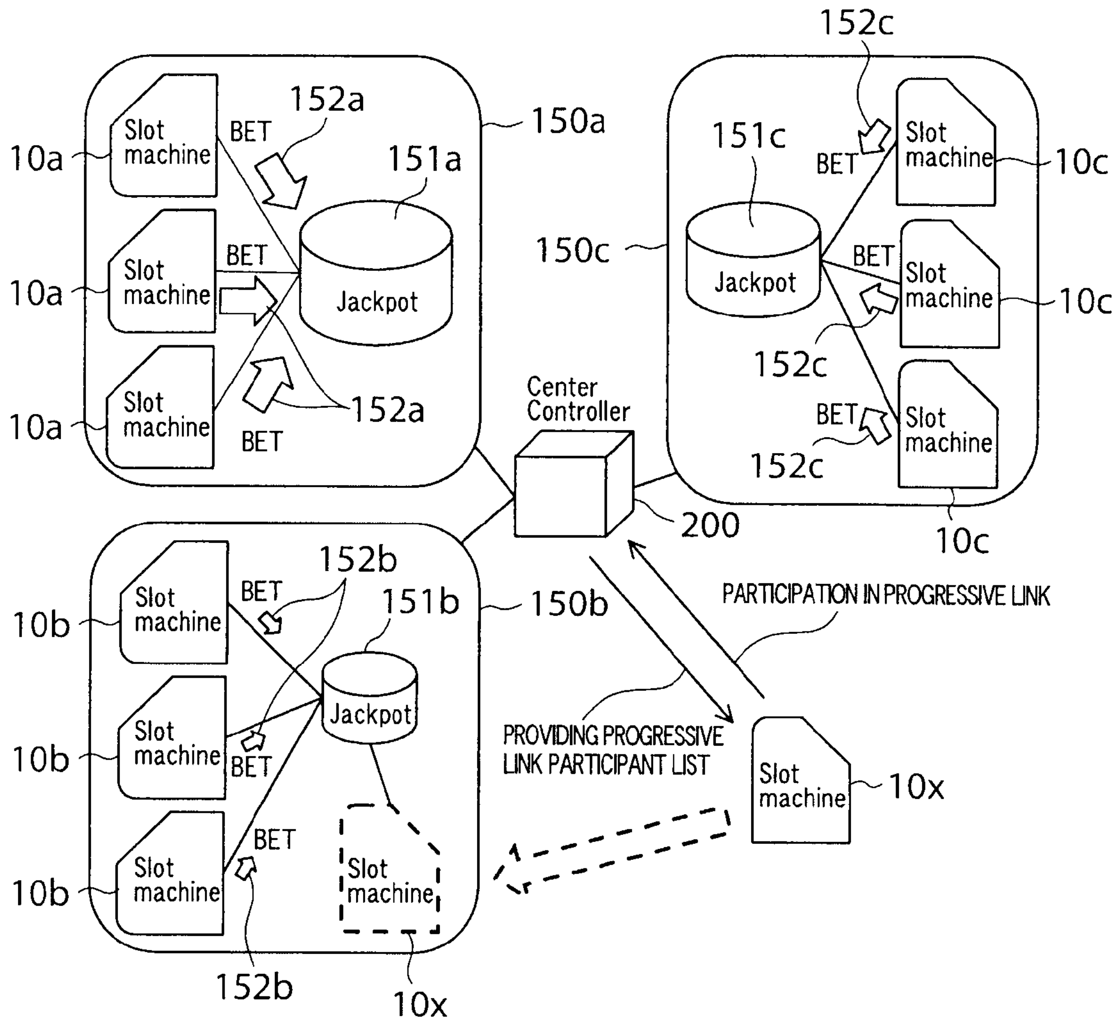
FIG. 35 is a schematic view showing a configuration of a progressive link which the a center controller controls.

Next, the configuration of a progressive link in the embodiment will be described. FIG. 35 is a schematic view showing the configuration of the progressive link that the center controller 200 controls. This game system is provided with a plurality of gaming machines (progressive link 150) which execute a plurality of jackpots for obtaining a progressive bonus and include the lower image display panel 16 for displaying a selection screen inquiring participation in the jackpots. As shown in FIG. 35, the center controller 200 provides a plurality of jackpots 151*a*, 151*b*, 151*c*, and a plurality of slot machines 10 participate in the jackpots 151*a*, 151*b*, 151*c*. Hereinafter, the plurality of slot machines 10 participating in one jackpot 151 are formed in one configuration, and are referred to as a progressive link 150.

The center controller 200 provides the RAM 203 that stores progressive link information such as: conditions for setting the jackpot 151 by progressive link 150; progressive values; game counts; identification information of the slot machines 10; and BET information of the slot machines 10. The center controller 200 samples the corresponding progressive information of the RAM 203 in response to a request from each of the slot machines 10, and responds to the requesting slot machine 10, thereby controlling the progressive link 150.

In one example shown in FIG. 35, the amounts of prize money (maximum amounts of payout) for three jackpots 151*a*, 151*b*, 151*c* provided from the center controller 200 are set differently from each other, the jackpot 151*a* is set at the highest, and the jackpot 151*c* is set at the lowest. Further, the lowest BET amount 152 per game, for placing a bet in a jackpot from a slot machine 10, is set in accordance with the amount of prize money for the jackpot, and the minimum BET amount 152*a* is set at the highest and that of the jackpot 151*c* is set at the lowest.

A player, who has not participated in a jackpot yet, can participate in a jackpot meeting the player's need while verifying the jackpot setting condition. The center controller 200 provides progressive link participant list information serving as list data of permissible progressive links to a player who has not participated therein yet. Having received the progressive link participant list information, a slot machine 10*x* causes a display device to display the corresponding progressive link participant list to prompt a player to participate therein, and transmits to the center controller 200 a signal indicative of participation in the progressive link 150*b* that the player has selected. The center controller 200 adds the slot machine 10*x* to the progressive link 150*b* from the progressive link participation signal, and causes the jackpot 151*b* to share the slot machine 10*x*. Further, the slot machine 10*x* can place a bet in the jackpot 151*b*.

While the embodiment describes a case in which the center controller 200 controls all of the progressive links 150, the present invention is not limitative thereto. By providing the center controller 200 for each of the progressive links 150, the game system 100 may be configured under cooperative control exerted by intercommunication between these center controllers. In other words, this game system may be provided with a plurality of game machines which execute a jackpot for obtaining one progressive bonus. Further, in place of providing the center controller 200, a slot machine first having participated in each of the progressive links 150 is defined as a host, and the host slot machine controls the progressive link, whereby the game system 100 may be configured under cooperative control exerted by intercommunication between the host slot machines. If this configuration is employed, when the host slot machine is withdrawn from a progressive link, a next slot machine is randomly determined. This configuration will be described referring to FIG. 45.

Figure 36A:
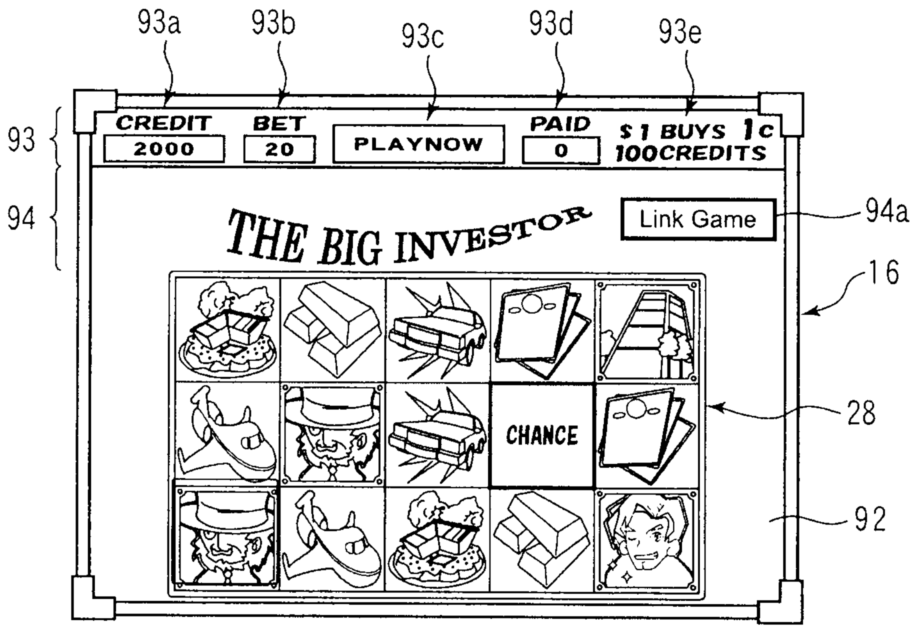
FIG. 36A is a view showing an exemplary image displayed at the slot machine while in a base game.

FIGS. 36A and 36B to FIG. 39 are views each showing an exemplary image displayed on the lower image display panel 16 of the slot machine 10 shown in FIG. 33. FIG. 36A is a view showing an exemplary image displayed at the slot machine 10 shown in FIG. 33 while in a standalone game.

As shown in FIG. 36A, the lower image display panel 16 is made up of display (area) sections such as a display area section 92, an information display section 93, and an effect image display section 94. A symbol matrix 28 is displayed at the display area section 92. Further, icons displaying the number of betted coins are disposed at both sides of the symbol matrix 28, and the icon corresponding to BET number is controlled to illuminate. The information display section 93 is arranged upwardly of the display region 92 and is made up of a credit amount display section 93*a*, a BET amount display section 93*b*, a character information display section 93*c*, a PAID amount display section 93*d*, and a charge display section 93*e*.

The number of coins presently credited is displayed at the credit amount display section 93*a* while the number of coins bet in one game is displayed at the BET amount display section 93*b*. The character information indicative of a current status of the game is displayed at the character information display section 93*c*. The characters of "PLAY NOW" are displayed during the play of the game, whereas the characters of "GAME OVER" are displayed during the intervals between the plays of the game. The number of coins that have been paid out in one game is displayed at the PAID amount display section 93*d*, whereas a conversion value of the credit amount based on a predetermined amount of money is displayed at the charge display section 93*e*.

Any of symbols such as "main animation character", "sub animation character", "office building", "bullion", "car", "stock certificate", "jet", "cottage", and "CHANCE" symbols, are rearranged in the symbol matrix 28 that is displayed on the lower image display panel 16. A payout is determined depending upon the arrangement or number of these symbols displayed in the symbol matrix 28.

The effect image display section 94 displays effect images which are responsive to the settings of standalone games and progressive bonus games (hereinafter, referred to as jackpots). On the upper right of the effect image display section 94, a participant list display icon 94*a* is displayed which is indicative of the fact that progressive link participant list information has been received from the center controller 200.

Figure 36B:
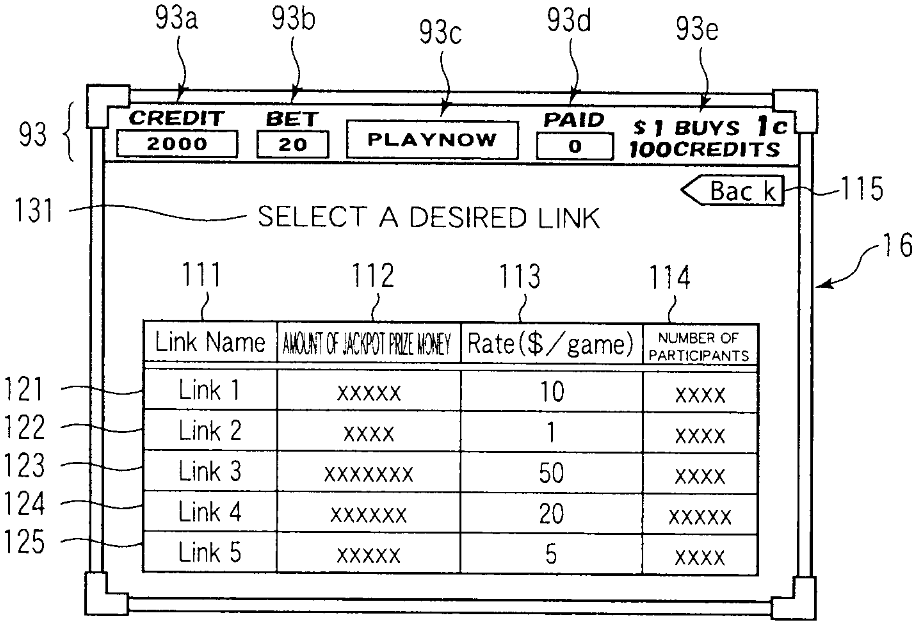
FIG. 36B is an exemplary image when a progressive link participant list is displayed at the slot machine.

FIG. 36B is a view showing an exemplary image displayed by a player touching an area which is indicative of the participant list display icon 94*a* on the touch panel 69 in FIG. 36A. At the substantial center of the lower image display panel 16, a progressive link participant list is displayed from the center controller 200. A guide display 131 for guiding a player's operation is displayed at the upper center of the lower image display panel 16, and a BACK icon 115 for reverting to the previous screen is displayed at the right thereof.

The progressive link participant list displays, by progressive link, a link name 111 of a currently-participable progressive link; a jackpot prize money amount 112 indicating the maximum payout amount of a jackpot; a minimum BET amount 113 minimally required for jackpot betting for one standalone game; and the number 114 of slot machines that currently participate in progressive links. As shown in FIG. 36B, players can participate in five progressive links, Link 1 to Link 5. On the touch panel 69, each of the players can select a desired progressive link by touching any one of link participation icons 121 to 125 on each line in a progressive link participant list.

Figure 37A:
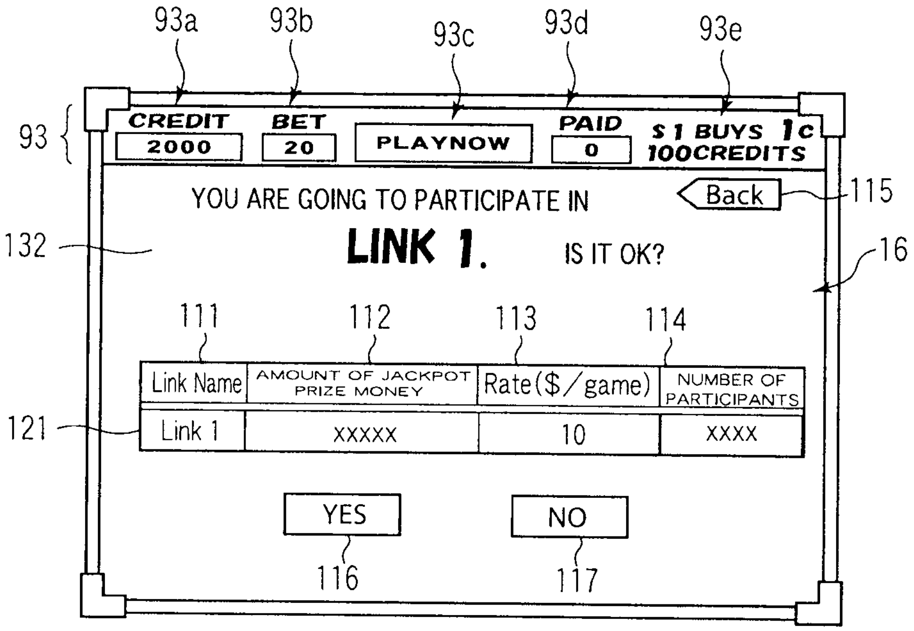
FIG. 37A is a view showing an exemplary image when a progressive link participant list is displayed at the slot machine.

FIG. 37A is a view showing an exemplary image displayed on the lower image display panel 16 when the player has touched (selected) an area corresponding to the participation icon 121 of Link 1, which is a first line of the progressive link participant list, on the touch panel 69 in FIG. 36B. The screen shown in FIG. 37A is intended for the player to verify whether or not to participate in a selected progressive link. In the figure, only a list of Link 1 serving as the progressive link depressed in FIG. 36B is displayed at the substantial center of the lower image display panel 16. The guide display 132 for guiding the player's operation is displayed at the upper center of the lower image display panel 16, and the BACK icon 115 for reverting to the previous screen is displayed at the right thereof.

The guide display 132 appears that is pertinent to check of participation in the progressive link depressed in FIG. 36B, and a YES icon indicating participation in the progressive link and a NO icon 117 indicating no participation are displayed at the lower side of the lower image display panel 16. The player can select the YES icon 116 or the NO icon 117 from the touch panel 69. If the player selects neither of them, the routine reverts to the screen indicating that a standalone game is in progress, one minute later.

Figure 37B:
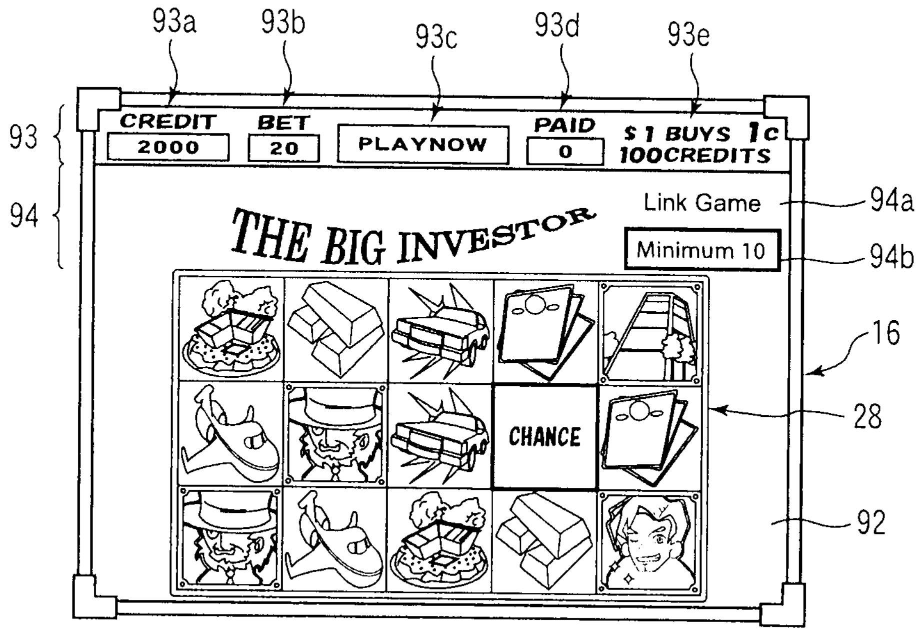
FIG. 37B is a view showing an exemplary image displayed at the slot machine while in a base game.

FIG. 37B is a view showing an exemplary image displayed on the lower image display panel 16 when the player has selected the YES icon 116 indicating that the player participates in the progressive link, from the touch panel 69 in FIG. 37A. The image indicating that the standalone game is in progress, shown in FIG. 36A, is displayed on the lower image display panel 16. A "participating" icon 94*b* indicating that a player participates in a progressive link is displayed at the upper right of the lower image display panel 16. The "participating" icon 94*b* displays information on the lowest BET amount per one standalone game in Link 1 serving as the progressive link selected in FIG. 36B. Selecting the "participating" icon 94*b* from the touch panel 69 displays information pertinent to Link 1 serving as a machine-participating progressive link.

In the embodiment, a player can participate in a plurality of progressive links simultaneously. For example, in a case where a player participates in two progressive links, i.e., Link 1 and Link 3, the "participating" icon 94*b* displays information pertinent to the minimum BET amount for one standalone game for betting in two jackpots. In the above case, "Minimum 10" is displayed.

Figure 38A:
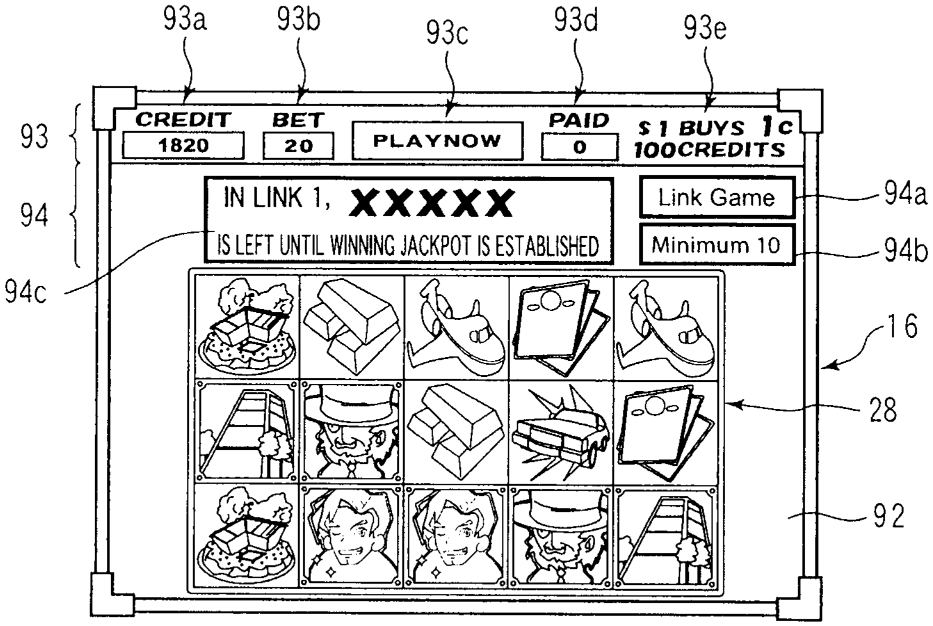
FIG. 38A is a view showing an exemplary image displayed at the slot machine while in a base game.

FIG. 38A is a view showing an exemplary image displayed on the lower image display panel 16 when a player participates in progressive link, Link 1. If the progressive value of the jackpot in a progressive link or a total number of standalone games, which is stored in the RAM 203, has reached a predetermined value, the center controller 200 transmits the corresponding information to a slot machine participating in the corresponding progressive link. The slot machine 10 displays the information such as the progressive value of the jackpot in the progressive link or total number of standalone games, which has been transmitted from the center controller 200, on a progressive link information area 94*c* of the lower image display panel 16. In other words, the progressive link information area 94*c* displays the information such as a progressive value or a total amount of standalone games required until a winning jackpot is established, and prompts a player for jackpot betting or continued participation in a progressive link.

Figure 38B:
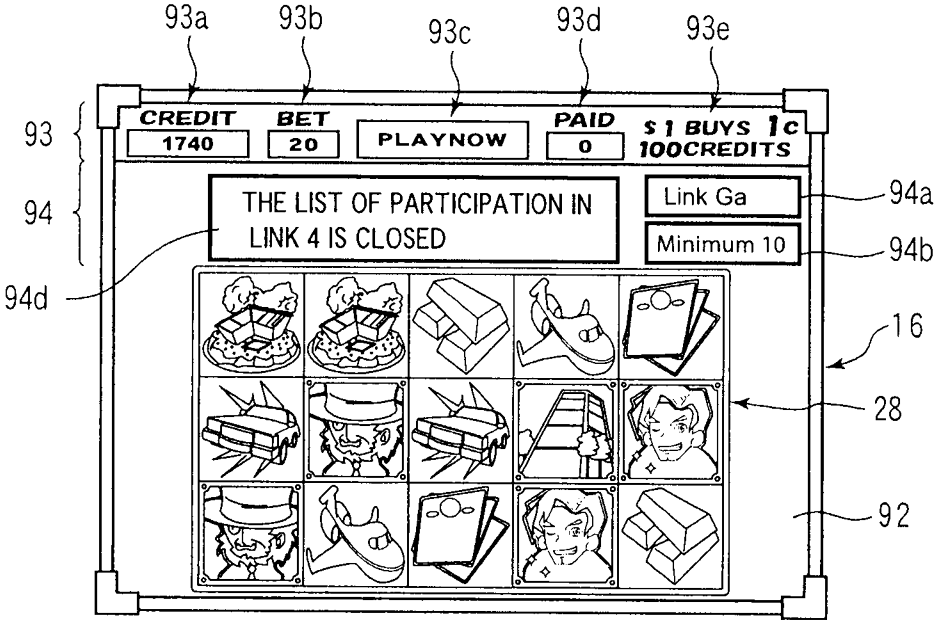
FIG. 38B is a view showing an exemplary image displayed at the slot machine while in a base game.

FIG. 38B is a view showing an exemplary image displayed on the lower image display panel 16 when a player participates in progressive link, Link 1. If there is a progressive link in which the progressive value of the jackpot in a progressive link, the value being stored in the RAM 203, has reached 50% of the maximum payout amount (amount of prize money) of the jackpot, the center controller 200 transmits to a slot machine 10 the fact that participation in the progressive link is closed. The slot machine 10 displays the corresponding information, which is indicative of the above fact transmitted from the center controller 200, in the progressive link information area 94*d* of the lower image display panel 16. In other words, the progressive link information area 94*d* displays a message indicating that the list of participation in Link 4 is closed.

Figure 39:
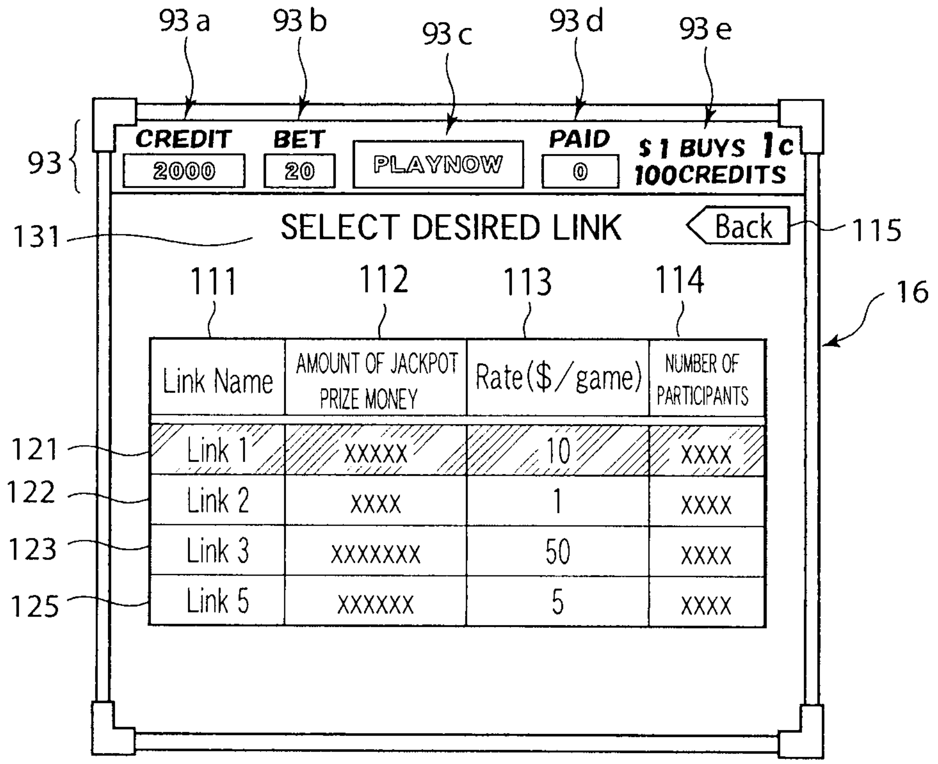
FIG. 39 is a view showing an exemplary image when a progressive link participant list is displayed at the slot machine.

FIG. 39 is a view showing an exemplary image displayed after a player has selected an area which is indicative of the participant list display icon 94*a*, from the touch panel 69 in FIG. 38B. As shown in FIG. 36B, the progressive participant list is displayed at the center of the lower image display panel 16. In the figure, a participation icon 121 of Link 1 that is a currently participating progressive link is active, which indicating that a player participates therein. Further, Link 4 is not displayed which is a progressive link having reached 50% of the maximum payout amount (amount of prize money) of the jackpot. Namely, this means that no more players can participate in Link 4. By displaying such screen and limiting a period of time during which a player can participate in a jackpot, it is possible to eliminate the player's feeling of unfairness in acquisition of a jackpot common to a plurality of slot machines.

While the present embodiment describes a process of disabling the showing of a progressive link having reached 50% of the maximum payout amount (amount of prize money) of the jackpot from the progressive link participant list, the present invention is not limitative thereto. For example, a process may be performed so that, in the progressive link participant list, the showing of the progressive link having reached 50% of the maximum payout amount (amount of prize money) of the jackpot is enabled, whereas the showing of a participation icon of the progressive link is disabled, or alternatively, the participation icon is not enabled even if it is depressed on the touch panel.

Next, the processes executed in the slot machine 10 and the center controller 200, according to the embodiment of the present invention, will be described in detail, referring to the drawings. The main CPU 41 controls a game progress by reading and executing the game program from the RAM 43. The CPU 201 of the center controller 200 controls the entire game system 100 by reading and executing a predetermined program.

Figure 40:
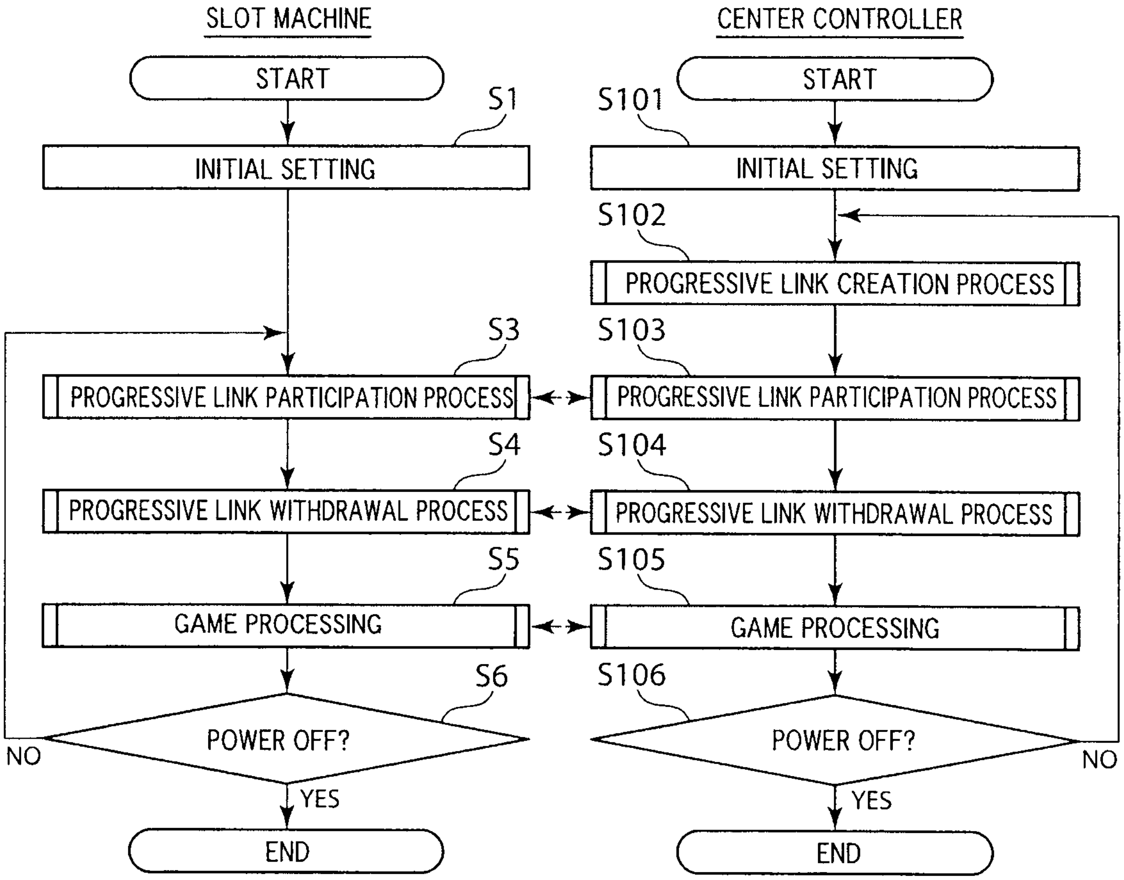
FIG. 40 is a flowchart showing a subroutine of main processing according to the slot machine and the center controller.

FIG. 40 is a flowchart showing a subroutine of main processing of the slot machine 10 and the center controller 200. In the main processing of the slot machine 10, first, when a power switch is turned ON (when power is supplied) at step S1, a motherboard 40 and a gaming board 50 are started up, respectively, and the CPU 51 executes an initial setting process. In this initial setting process, the main CPU 41 executes the BIOS stored in the ROM 42, decompresses, in the RAM 43, compressed data included in the BIOS, executes the BIOS decompressed in the RAM 43, and performs diagnosis and initialization of each of the peripheral devices. The main CPU 41 writes game programs or the like from memory card 53 into the RAM 43, and retrieves data for setting a payout ratio and country-identification information. The main CPU 41 also performs an authentication process for each program during execution of the initial setting process.

Figure 42:
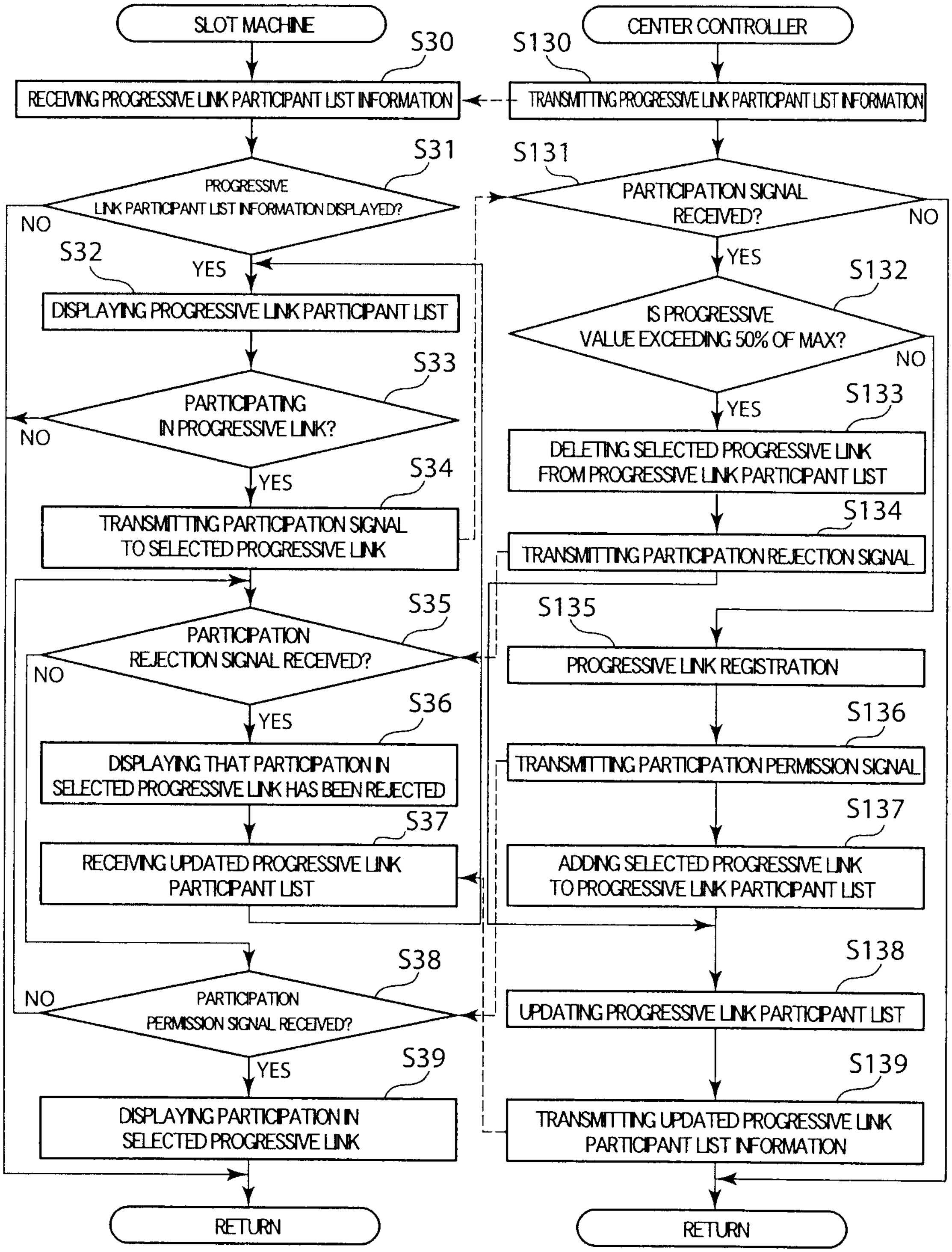
FIG. 42 is a flowchart showing a subroutine of the progressive link participation process according to the slot machine and the center controller.

At step S3, the main CPU 41 performs a progressive link participation process to be described later referring to FIG. 42. In this progressive link process, the main CPU 41 of the slot machine 10 performs a process of participation in a progressive link provided from the center controller 200. The progressive link participation process described herein is performed under cooperative operation between the main CPU 41 of the slot machine 10 and the CPU 201 of the center controller 200.

Figure 43:
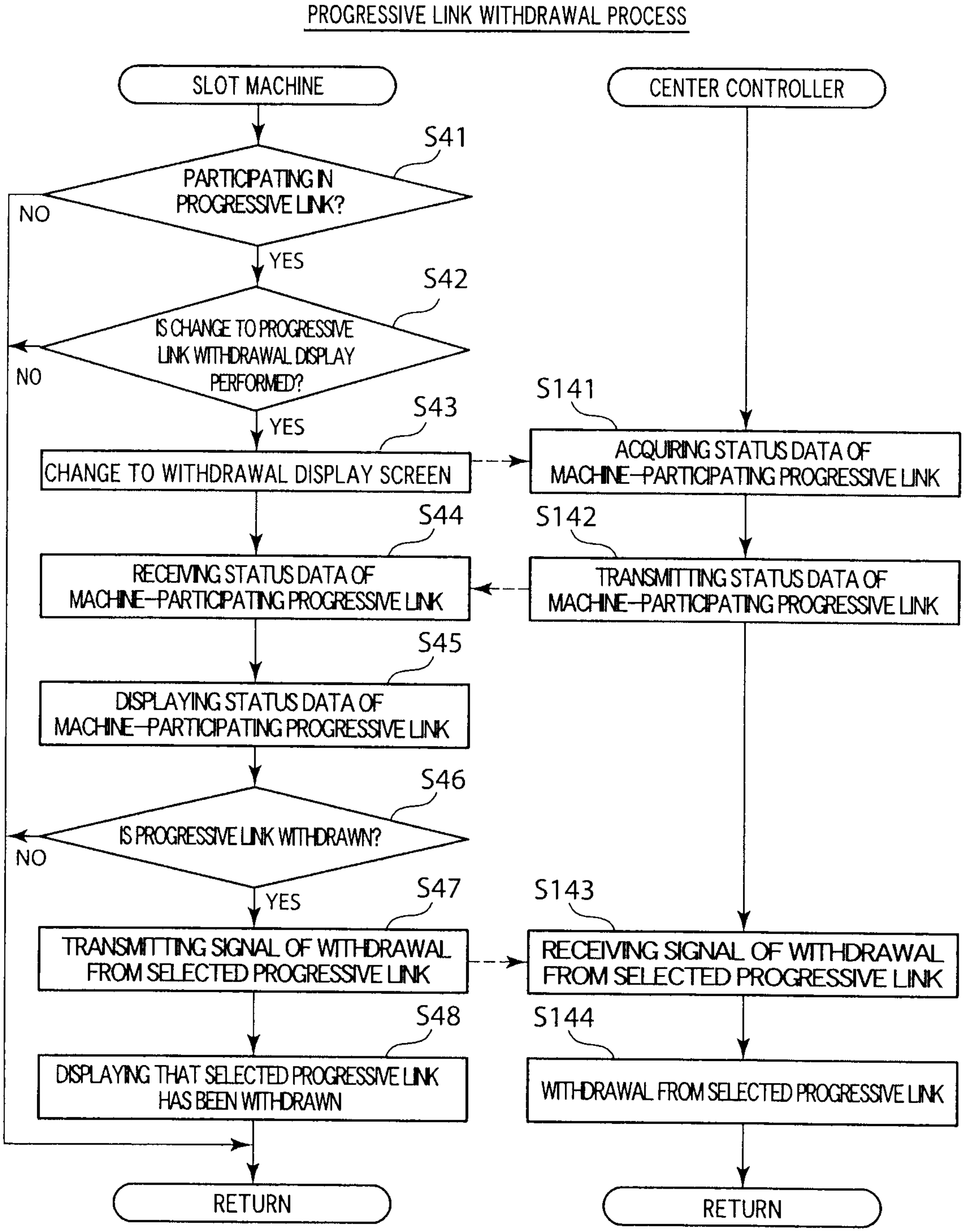
FIG. 43 is a flowchart showing a subroutine of a progressive link withdrawal process according to the slot machine and the center controller.

At step S4, the main CPU 41 performs a progressive link withdrawal process to be described later referring to FIG. 43. In this progressive link withdrawal process, the main CPU 41 performs a process of withdrawal from a machine-participating progressive link. The progressive link withdrawal process described herein is performed under cooperative operation between the main CPU 41 of the slot machine 10 and the CPU 201 of the center controller 200.

Figure 44:
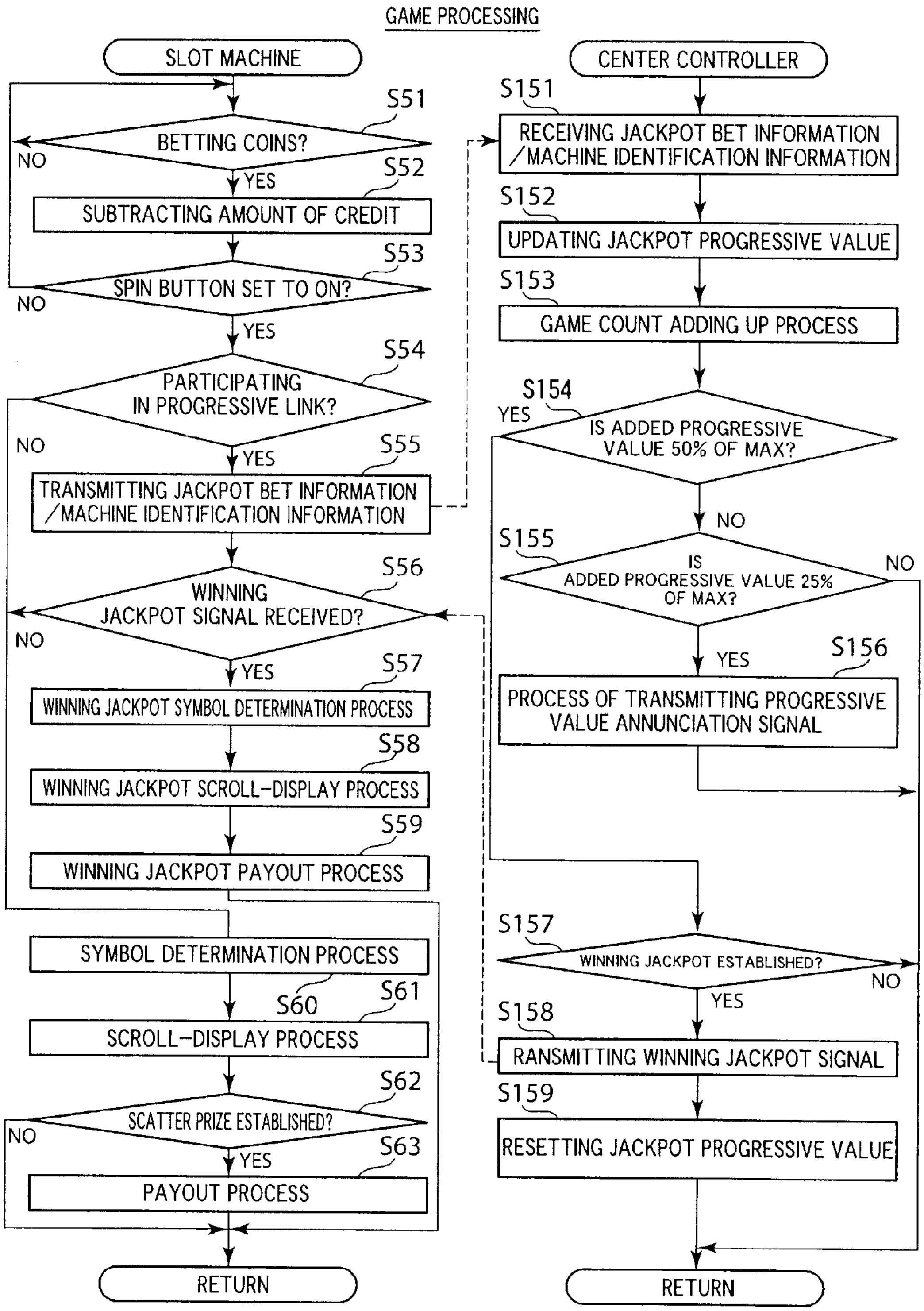
FIG. 44 is a flowchart showing a subroutine of game processing according to the slot machine and the center controller.

At step S5, the main CPU 41 performs game processing to be described later referring to FIG. 44. In this game processing, the main CPU 41 performs a process of sequentially reading and executing programs such as game programs from the RAM 43, executing a standalone game, and executing a progressive bonus game. The game processing described herein is performed under cooperative operation between the main CPU 41 of the slot machine 10 and the CPU 201 of the center controller 200. After the game processing has terminated, while power is supplied to the slot machine 10, the routine is reverted to the progressive link participation process (step S6).

On the other hand, in the main processing of the center controller 200, when the power switch is turned ON (when power is supplied) at step S101, first, the CPU 201 executes an initial setting process. In this initial setting process, the CPU 201 executes a BIOS stored in the ROM 202; decompresses to the RAM 203 the compressive data incorporated in the BIOS; executes the BIOS decompressed to the RAM 203; and diagnoses and initializes peripherals. Further, the CPU 201 acquires identification information of a plurality of slot machines interconnected by a communication line via the communication interface 204.

At step S102, the main CPU 201 performs a progressive link creation process to be described later referring to FIG. 41. In this progressive link creation process, the main CPU 201 performs a process of creating a progressive link to be provided to the slot machine 10 and constructing list data of the created progressive link.

At step S103, the main CPU 201 performs a progressive link participation process to be described later referring to FIG. 42. In this progressive link participation process, the CPU 201 affirmatively responds to whether or not to perform a process of participation in a progressive link in which the slot machine 10 participates. As described previously, the progressive participation process is performed under cooperative operation between the main CPU 41 of the slot machine 10 and the CPU 201 of the center controller 200.

At step S104, the main CPU 201 performs a progressive link withdrawal process to be described later referring to FIG. 43. In this progressive link withdrawal process, the CPU 201 affirmatively responds to whether or not to perform a process of withdrawal from a machine-participating progressive link in which the slot machine 10 participates. As described previously, the progressive link withdrawal process is performed under cooperative operation between the main CPU 41 of the slot machine 10 and the CPU 201 of the center controller 200.

At step S105, the main CPU 201 performs game processing to be described later referring to FIG. 44. In this game processing, the CPU 201 affirmatively responds to whether or to perform a game execution process that the slot machine 10 performs, i.e., performs a process of executing a progressive bonus game. As described previously, the game execution process is performed under cooperative operation between the main CPU 41 of the slot machine 10 and the CPU 201 of the center controller 200. After the game processing has terminated, while power is supplied to the slot machine 10, the routine is reverted to the progressive link creation process (step S106).

Figure 41:
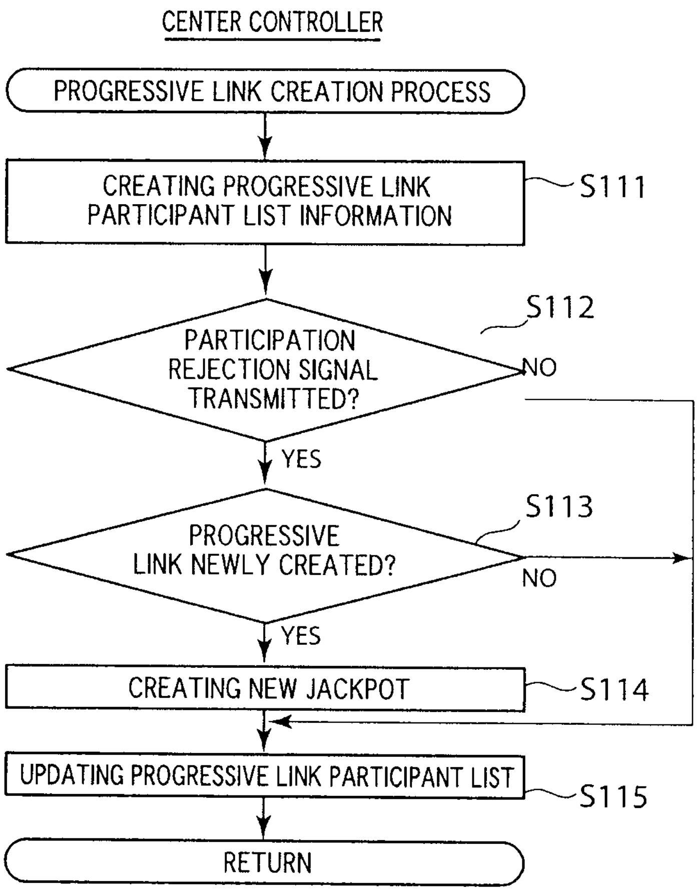
FIG. 41 is a flowchart showing a subroutine of a progressive link creation process according to the center controller.

FIG. 41 is a flowchart showing a subroutine of the progressive link creation process invoked and executed at step S102 of the subroutine in the center controller 200 shown in FIG. 40. At step S111, the CPU 201 of the center controller 200 creates progressive link participant list information. Specifically, the CPU 201 samples from the RAM 203, the information pertinent to one or a plurality of progressive links managed by the center controller 200, and creates progressive participant list information. The items of progressive link information include information such as: the amount of money prize for each progressive link (maximum value of payout amount); a minimum BET amount in one standalone game; and the number of slot machines that currently participate therein. The CPU 201 stores the created progressive link participant list information in the predetermined memory space of the RAM 203.

At step S112, the CPU 201 of the center controller 200 judges whether or not an participation rejection signal has been transmitted. Specifically, the CPU 201 judges whether or not the center controller 200 has transmitted a participation rejection signal at step S134 of FIG. 42. When the CPU 201 judges that the participation rejection signal (step S112: YES) has been transmitted, the routine proceeds to step S113 or if not (step S112: NO), the routine proceeds to step S115.

At step S113, the CPU 201 of the center controller 200 judges whether or not to newly create a progressive link. The CPU 201 creates a predetermined number of jackpots when the number of progressive links, i.e., the number of jackpots is small, referring to the progressive link participant list information stored in the RAM 203. When the CPU 201 judges that a progressive link is newly created (step S113: YES), the routine proceeds to step S114 or if not (step S113: NO), the routine proceeds to step S115.

At step S114, the CPU 201 of the center controller 200 creates a new jackpot. Specifically, the CPU 201 creates a jackpot so that the number of valid jackpots becomes a predetermined number.

At step S115, the CPU 201 of the center controller 200 updates progressive link participant list information. Here, the CPU 201 updates information such as the amount of prize money of a jackpot for each progressive link (maximum value of the amount of payout); a maximum BET amount in one standalone game; and the number of slot machines that currently participate therein. After this process has terminated, the CPU terminates this subroutine.

Next, a progressive link participation process will be described. Like FIG. 31, FIG. 42 is a flowchart showing a subroutine of the progressive link participation process invoked and executed at step S3 of the subroutine in the slot machine 10 shown in FIG. 40 or at step S103 of the subroutine in the center controller 200. The progressive link participation described here is performed under cooperative operation between the main CPU 41 of the slot machine 10 and the CPU 201 of the center controller 200.

An operation of the slot machine 10 will be described hereinafter. The main CPU 41 of the slot machine 10 performs the processes at step S30 to S39 that follow. At step S30, the main CPU 41 of the slot machine 10 performs a process of receiving progressive link participant list information. In this process, the main CPU 41 receives the progressive link participant list information transmitted from the center controller 200, and stores the received information in the RAM 43.

At step S31, the main CPU 41 of the slot machine 10 judges whether or not to display the progressive link participant list information. In this process, the main CPU 41 causes the lower image display panel 16 to display the fact that the progressive link participant list information has been received (see FIG. 36A), and judges whether or not a player has made an operation of display entry from a touch panel 69. Upon judging that the progressive link participant list information is displayed (step S31: YES), the main CPU 41 proceeds to step S32, or if not (step S31: NO), the CPU terminates this subroutine.

At step S32, the main CPU 41 of the slot machine 10 causes the lower image display panel 16 to display the progressive link participant list in accordance with the corresponding list information (see FIG. 36B).

At step S33, the main CPU 41 of the slot machine 10 judges whether or not to participate in a progressive link. In this process, the main CPU 41 judges whether or not a player has made an operation of participation entry from the touch panel 69. Upon judgment that the player participates in the progressive link (step S33: YES), the main CPU 41 proceeds to step S34 or if not (step S33: NO), the CPU terminates this subroutine.

At step S34, the main CPU 41 of the slot machine 10 performs a process of transmitting a signal indicative of participation in the selected progressive link. In this process, the main CPU 41 transmits to the center controller 200 the participation signal indicative of a code of the selected progressive link and machine identification information or the like.

At step S35, the main CPU 41 of the slot machine 10 judges whether or not a participation rejection signal has been received. Specifically, at step S134 to be described later, this CPU judges whether or not the participation rejection signal transmitted from the center controller 200 has been received. When the judgment result is affirmative (step S35: YES), the main CPU 41 proceeds to step S36, or if not (step S35: NO), this CPU proceeds to step S38.

At step S36, the main CPU 41 of the slot machine 10 performs a process of displaying that participation in the selected progressive link has been rejected. In this process, the main CPU 41 display-controls a display device, based upon the participation rejection signal received from the center controller 200 at step S35. In other words, the main CPU 41 causes the lower image display panel 16 to display the fact that participation in the selected progressive link has been rejected, based upon the received participation rejection signal.

At step S37, the main CPU 41 of the slot machine 10 receives the updated progressive link participant list. At step S138 to be described later, this CPU receives the updated progressive link participant list transmitted from the center controller 200, and stores it in the RAM 43. After this process has terminated, the routine is reverted to step S32.

At step S38, the main CPU 41 of the slot machine 10 judges whether or not a participation permission signal has been received. Specifically, the main CPU 41 judges whether or not the participation permission signal transmitted from the center controller 200 has been received at step S136 to be described later. When the judgment result is affirmative (step S38: YES), the main CPU 41 proceeds to step S39, or if not (step S38: NO), the routine is reverted to step S35.

At step S39, the main CPU 41 of the slot machine 10 displays participation in the selected progressive link. Specifically, the main CPU 41 causes the lower image display panel 16 to display participation in the progressive link selected at step S35, based upon the participation permission signal received at step S38. After this process has terminated, the CPU terminates this subroutine.

Next, an operation of the center controller 200 will be described. The CPU 201 of the center controller 200 performs the processes at steps S130 to S139 that follow. First, at step S130, the CPU 201 of the center controller 200 transmits progressive link participant list information to the slot machine 10. In this process, the CPU 201 transmits a participant list pertinent to a plurality of jackpots, which is displayed on a selection screen of the lower image display panel 16 and in which a player can currently participate, to each of the gaming machines in a plurality of progressive links.

At step S131, the CPU 201 of the center controller 200 judges whether or not the progressive link participation signal transmitted from the slot machine has been received at step S34. In this process, the CPU 201 of the center controller 200 judges whether or not a participation signal has been received from the gaming machine 10, the signal requesting midcourse participation in a progressive bonus game (jackpot) executed in a progressive link. This CPU judges whether or not participation information has received including codes of the progressive links transmitted from the slot machine 10 to the center controller 200 and machine identification information or the like. When the judgment result is affirmative (step S131: YES), the CPU 201 proceeds to step S132, or when the judgment result is negative (step S131: NO), the CPU terminates this subroutine.

At step S132, the CPU 201 of the center controller 200 judges whether or not the progressive value exceeds 50% of Max. In this process, if the judgment result is affirmative at step S131 (step S131: YES), the CPU 201 of the center controller 200 judges whether or not the progressive value corresponding to the participation signal has reached a preset rate as a predetermined value (50% of Max). For example, when the maximum value of the set jackpot payout is $1,000,000, the CPU 201 judges whether or not the progressive value stored in the RAM 203 is $500,000 or more. Upon judging that the progressive value exceeds 50% of Max (step S132: YES), the CPU 201 proceeds to step S133.

At step S133, the CPU 201 of the center controller 200 performs a process of deleting the selected progressive link from the progressive link participant list. In this process, if it is judged that the progressive value has reached a predetermined value (50% of Max), as a result of the judgment at step S132, (step S132: YES), the CPU 201 updates a participant list so as to exclude a progressive link of the progressive value having reached the predetermined value.

At step S134, the CPU 201 of the center controller 200 performs a process of transmitting the participation rejection signal to the corresponding slot machine, based upon the participation signal received at step S131. If it is judged that the progressive value has reached 50% of Max, as a result of the judgment at step S132, the center controller 200 executes a process of rejecting participation in the progressive link of the slot machine having received the participation signal. In other words, as a process of rejecting participation in a progressive link, the CPU 201 of the center controller 200 transmits the participation rejection signal serving as a predetermined annunciation signal to a slot machine whose participation in the progressive link has been rejected. After this process has terminated, this CPU proceeds to step S138.

Upon judging that the progressive value has not exceeded 50% of Max (step S132: NO), the CPU 201 of the center controller 200 proceeds to step S135, and performs a process of registering the corresponding slot machine to a progressive link, based upon the participation signal received at step S131. Specifically, the CPU 201 registers machine identification information of the slot machine as to the progressive links included in the progressive link participant list information stored in the RAM 203.

At step S136, the CPU 201 of the center controller 200 performs a process of transmitting the participation permission signal to the corresponding slot machine, based upon the participation signal received at step S131. If it is judged that the progressive value has not reached 50% of Max, as a result of the judgment at step S1132, the CPU 201 of the center controller 200 executes a process of allowing participation in the progressive link of the slot machine having received the participation signal.

At step S137, the CPU 201 of the center controller 200 performs a process of adding a progressive link selected from the progressive link participant list. Specifically, the main CPU 201 adds information about the progressive link as a currently participable progressive link to the progressive link participant list information stored in the RAM 203. If it is judged that the progressive value has not reached a predetermined value (step S132: NO), as a result of the judgment at step S132, the CPU 201 updates a progressive link participant list so as to herein include the progressive link of the progressive value having reached the predetermined value.

At step S138, the CPU 201 of the center controller 200 updates the progressive link participant list. The CPU 201 updates the number of slot machines participating in the progressive link included in the corresponding list information.

At step S139, the CPU 201 of the center controller 200 transmits the updated progressive link participant list information to the slot machine 10. In this process, the CPU 201 transmits the updated progressive link participation information received at step S37. The CPU 201 transmits the updated progressive link participant list to the slot machine 10 having transmitted the progressive link participation signal requesting the midcourse participation in the progressive link, so that the updated participant list is displayed on the lower image display panel 16 of the slot machine 10. Further, the progressive link participant list information that the slot machine 10 receives at step S30 after one standalone game has terminated is included in the updated progressive link participant list. Therefore, the center controller 200 can execute a jackpot for obtaining a progressive bonus game other than that for obtaining a participation-rejected progressive bonus, in response to a request from a slot machine whose participation in a progressive link has been rejected. In this manner, the center controller 200 executes the processes at steps S102 to S105 in the jackpot for obtaining another progressive bonus game that has been executed. After this process has terminated, the center controller terminates this subroutine.

Next, a progressive link withdrawal process will be described. FIG. 43 is a flowchart showing a subroutine of the progressive link withdrawal process invoked and executed at step S4 of the subroutine in the slot machine 10 shown in FIG. 40 or at step S104 of the subroutine in the center controller 200. The progressive link withdrawal process described here is performed under cooperative operation between the main CPU 41 of the slot machine 10 and the CPU 201 of the center controller 200.

An operation of the slot machine 10 will be described. The main CPU 41 of the slot machine 10 performs the processes at steps S41 to S48 that follow. At step S41, the main CPU 41 of the slot machine 10 judges whether or not to participate in a progressive link. In this process, the main CPU 41 judges whether or not there exists participation information including a BET condition for a progressive link stored in the RAM 43. Upon judging participation in a progressive link, the CPU 41 proceeds to step S42 (step S41: YES), or if not (step S41: NO), the CPU terminates this subroutine.

At step S42, the main CPU 41 of the slot machine 10 judges whether or not to change to the display screen for progressive link withdrawal. In this process, the main CPU 41 judges whether or not a player has made an operation for display entry of withdrawal from the touch panel 69. If it is judged that a current screen is changed to the display screen for progressive link withdrawal (step S42: YES), the main CPU 41 proceeds to step S43, or if not (step S42: NO), the main CPU terminates this subroutine.

At step S43, the main CPU 41 of the slot machine 10 performs a process of change to the display screen for progressive link withdrawal. The main CPU 41 receives status data of the machine-participating progressive link transmitted from the center controller 200 (step S44), and causes the lower image display panel 16 to display the state data of the received machine-participating progressive link (step S45).

At step S46, the main CPU 41 of the slot machine 10 judges whether or not to withdraw from a progressive link. In this process, the main CPU 41 judges whether or not a player has made an operation for withdrawal entry from the touch panel 69. If the judgment result is affirmative (step S46: YES), the CPU 41 proceeds to step S47, or if not (step S46: NO), the CPU terminates this subroutine.

At step S47, the main CPU 41 of the slot machine 10 performs a process of transmitting the signal indicative of withdrawal from the progressive link selected at step S46. In this process, the main CPU 41 transmits to the center controller 200 the code of the selected progressive link and machine identification information.

At step S48, the main CPU 41 of the slot machine 10 performs a process of causing the lower image display panel 16 to display withdrawal from the progressive link selected at step S46. After this process has terminated, the main CPU terminates this subroutine.

Next, an operation of the center controller 200 will be described. The CPU 201 of the center controller 200 performs the processes at steps S141 to S144 that follow. At step S141, the CPU 201 of the center controller 200 performs a process of receiving a request signal indicative of information for withdrawal screen transmitted from the slot machine at step S43. In this process, the CPU 201 performs a process of sampling from the RAM 203 the information on a progressive link in which the slot machine having transmitted the request signal participates.

At step S142, the CPU 201 of the center controller 200 performs a process of transmitting the information on the progressive link sampled at step S41 to the slot machine having transmitted the request signal.

At step S143, the CPU 201 of the center controller 200 performs a process of receiving the progressive link withdrawal signal transmitted from the slot machine at step S47. In this process, the CPU 201 receives the code of the selected progressive link and machine identification information transmitted from the slot machine 10 at step S44.

At step S144, the CPU 201 of the center controller 200 performs a process of releasing the corresponding slot machine from the selected progressive link, based upon the progressive link withdrawal signal received at step S143. In this process, the CPU 201 performs a process of specifying a progressive link withdrawn from the code of the selected progressive link; specifying a participating slot machine 10 from the received machine identification information; and excluding the registered slot machine 10. Further, the CPU 201 deletes an area for the slot machine 10 withdrawn from an area of storing the progressive link information of the RAM 203. After this process has terminated, the CPU terminates this subroutine.

Next, game processing will be described. FIG. 44 is a flowchart showing a subroutine of the game processing invoked and executed at step S5 of the subroutine in the slot machine 10 shown in FIG. 40 or at step S105 of the subroutine in the center controller 200. The game processing described hereinafter is performed under cooperative operation between the main CPU 41 of the slot machine 10 and the CPU 201 of the center controller 200.

The main CPU 41 of the slot machine 10 performs the processes at steps S51 to S63 that follow. First, at step S51, the main CPU 41 judges whether or not coins have been betted. In this process, the main CPU 41 judges whether or not there has been received an input signal output from a 1-BET switch 26S when a 1-BET button 26 is operated or that output from a MAX-BET switch 27S when a MAX-BET button 27 is operated. Upon judging that no coins have been betted (step S51: NO), the main CPU 41 reverts to step S51, or when it does (step S51: YES), the CPU proceeds to step S52.

At step S52, upon judging that the coins have been betted at step S51, the main CPU 41 of the slot machine 10 performs a process of subtracting the amount of credit stored in the RAM 43, in response to the number of betted coins. Further, the main CPU 41 stores in the RAM 43 the amount of credit after subtracted.

At step S53, the main CPU 41 of the slot machine 10 judges whether or not the SPIN button 23 has been set to ON. Specifically, the main CPU 41 judges whether or not the input signal outputted from the SPIN switch 23S has been received when the SPIN button 23 has been depressed. Upon judging that the SPIN button 23 has not been set to ON (step S53: NO), the main CPU 41 reverts to step S51, or if not (step S53: YES), the CPU proceeds to step S54. If it is judged that the SPIN button 23 has been set to ON (if an instruction has been entered to an extent such that a game is terminated without setting the SPIN button 23 to ON, for example), the main CPU 41 cancels subtraction of the amount of credit at step S52.

At step S54, the main CPU 41 of the slot machine 10 judges whether or not to participate in a progressive link. Specifically, the main CPU 41 judges whether or not the received machine-participating BET condition data of a progressive link is present in the progressive link participation process performed in FIG. 42 described previously. Upon judging participation in the progressive link (step S54: YES), the main CPU 41 proceeds to step S55, or if not (step S54: NO), the CPU proceeds to step S60.

At step S55, the main CPU 41 of the slot machine 10 transmits to the center controller 200: the BET amount betted on a jackpot among the number of coins betted at step S51; identification information of the slot machine 10 stored in the ROM 42; and standalone game counts altogether.

At step S56, the main CPU 41 of the slot machine 10 judges whether or not a winning jackpot signal has been received. The center controller 200 selects a slot machine acquiring a jackpot from a plurality of slot machines participating in a progressive link, and transmits a winning jackpot signal to only the selected slot machine. Namely, only the slot machine having acquired a jackpot can receive the winning jackpot signal. Upon judging that the winning jackpot signal has been received (step S56: YES), the main CPU 41 proceeds to step S57, or if not (step S56: NO), this CPU proceeds to step S60.

At step S57, the main CPU 41 of the slot machine 10 performs a jackpot symbol determination process. Specifically, upon judging that the SPIN button 23 is set to ON at step S53, the main CPU 41 executes a symbol determination program stored in the RAM 43, and further, in a state in which it is triggered that the winning jackpot signal has been received at step S56, this CPU determines code No. indicating a winning jackpot when symbols have been stopped.

At step S58, the main CPU 41 of the slot machine 10 performs a scroll-display process. Specifically, after an elapse of a predetermined time after starting scroll-display of plural types of symbols, the main CPU 41 display-controls the symbols represented by code Nos. indicative of the winning jackpot determined at step S57 to be displayed in a stopped state in the symbol matrix 28 concurrently with stoppage of the scroll-display.

At step S59, the main CPU 41 of the slot machine 10 performs a winning jackpot payout process. Specifically, the main CPU 41 pays out coins, based upon the payout amount included in the winning jackpot signal received at step S56.

At step S60, the main CPU 41 of the slot machine 10 performs a symbol determination process. Specifically, upon judging that the SPIN button 23 has been set to ON at step S53, the main CPU 41 determines code Nos. at the time of stopping symbols by executing the symbol determination program stored in the RAM 43. The embodiment described a case of determining one or more prizes from among plural kinds of prizes by determining symbols displayed in a stopped state. However, the present invention is not limitative thereto, and, for example, may be applicable to a case in which one or more prizes selected from among the plural types of prizes are determined, and then, the combinations of symbols displayed in a stopped state are determined based upon the above-mentioned prizes.

At step S61, the main CPU 41 of the slot machine 10 performs a scroll-display process. Specifically, after an elapse of a predetermined time after starting scroll-display of plural types of symbols, the main CPU 41 display-controls the symbols represented by code Nos. indicative of the winning jackpot determined at step S60 to be displayed in a stopped state in the symbol matrix 28 concurrently with stoppage of the scroll-display.

At step S62, the main CPU 41 of the slot machine 10 judges whether or not a scatter prize is established. Specifically, the main CPU 41 judges whether or not the scatter prize is established by judging whether not three or more trigger symbols for the scatter prize are displayed in a stopped state in any elements of the symbol matrix 28. Upon judging that the scatter prize is established (step S62: YES), the main CPU 41 proceeds to step S63 to perform a coin payout process, or if not (step S62: NO), the CPU terminates this subroutine without paying out coins.

If the main CPU 41 judges that no winning jackpot signal has been received (step S56: NO) and judges that no scatter prize has been established (step S62: NO), it is determined to be a "loser". The word "loser" used herein denotes a case in which no coin payout is performed.

Next, an operation of the center controller 200 will be described. The CPU 201 of the center controller 200 performs the processes at steps S151 to S159 that follow. At step S151, the CPU 201 receives the jackpot BET information and machine identification information transmitted from the slot machines 10 at the aforementioned step S55. The CPU 201 of the center controller 200 receives the BET information transmitted from the slot machine 10 allowed for participation in a progressive link. After that, the CPU 201 causes the RAM 203 to store the jackpot BET amount, based upon the received jackpot BET information. The RAM 203 stores the jackpot BET amounts by slot machines 10, and the CPU 201 stores the jackpot BET amount in a memory space of the corresponding slot machine 10 of the RAM 203. After that, the CPU 201 receives the machine identification information transmitted from the slot machine 10 at the aforementioned step S55, and stores the received standalone game count in the predetermined memory space of the RAM 203. The RAM 203 stores the standalone game counts by slot machines 10, and the CPU 201 stores the standalone game count in the memory space of the corresponding slot machine 10 of the RAM 203, based upon machine identification information.

At step S152, the CPU 201 of the center controller 200 performs a process of updating a progressive value of a jackpot. The CPU 201 of the center controller 200 updates the progressive value corresponding to the participation signal stored in the RAM 203. Specifically, the CPU 201 adds up the respective ones of the jackpot BET amounts of the slot machines 10, which are stored in the RAM 203 at step S151, and adds up the jackpot BET amounts of all of the slot machines participating in progressive links, and then, stores the added-up progressive value in the RAM 203. For example, assuming that two slot machines have participated in a progressive link and have invested 500 and 300 jackpot BETS, the center controller 200 adds up these BET numbers (500+300), and causes the RAM 203 to store the added-up progressive value of "800".

At step S153, the CPU 201 of the center controller 200 performs a game count adding-up process. Specifically, the CPU 201 adds up the respective ones of the standalone game counts of the slot machines, which are stored in the RAM 203 at the aforementioned step S151, and causes the RAM 203 to store a value of the added-up total number of times when the standalone games are executed at all of the slot machines participating in a progressive link. For example, if the standalone game counts of two standalone games 10 are 10 times and 25 times, respectively, the center controller 200 adds up these standalone game counts (10+25), and causes the RAM 203 to store the added value of "35".

At step S154, the CPU 201 of the center controller 200 judges whether or not the progressive value added at step S152 reaches 50% of the maximum value of jackpot payout set at the progressive link creation process mentioned above. For example, assuming that that the set maximum value of jackpot payout is $1,000,000, the CPU 201 judges whether or not the progressive value stored in the RAM 203 is $500,000 or more. Upon judging that the progressive value reaches 50% of the maximum value of jackpot payout (step S154: YES), the CPU 201 proceeds to step S157, or if not (step S154: NO), this CPU proceeds to step S155.

At step S155, the CPU 201 of the center controller 200 judges whether or not the progressive value added at step S152 reaches 25% of the maximum value of jackpot payout set at the progressive link creation process mentioned above. In other words, upon judging that the progressive value corresponding to a participation signal fails to reach a predetermined value (50% of Max) as the result of the judgment at step S154, the center controller 200 judges whether or not the progressive value corresponding to the participation signal, stored in the RAM 203, reaches a preset rate as a predetermined value (25% of Max). For example, assuming that the set maximum value of jackpot payout is $1,000,000, the CPU 201 judges whether or not the progressive value stored in the RAM 203 is $250,000 or more. Upon judging that the progressive value reaches 25% of the maximum value of jackpot payout (step S155: YES), the CPU 201 proceeds to step S156, or if not (step S155: NO), the CPU terminates this subroutine.

At step S156, the CPU 201 of the center controller 200 performs a process of transmitting a progressive value annunciation signal. In other words, based upon the result of the judgment at step S155, the center controller 200 transmits to a plurality of slot machines participating in the jackpot a predetermined annunciation signal pertinent to a preset rate as a predetermined value (50% of Max) (see FIG. 38A). After this process has terminated, the center controller terminates this subroutine.

At step S157, the CPU 201 of the center controller 200 judges whether or not a winning jackpot is established. To any of the plurality of slot machines participating in a jackpot, the CPU 201 of the center controller 200 randomly determines whether or not to award a progressive bonus to the jackpot. Specifically, the CPU 201 assigns a specific number to a slot machine having transmitted jackpot information and machine identification information at step S55, and samples random numbers from the predetermined numeric range including the specific number. After that, the CPU 201 judges whether or not each of the sampled random numbers coincides with the specific number. Upon judging that a winning jackpot is established (step S157: YES), the CPU 201 proceeds to step S158, or if not (step S157: NO), the CPU terminates this subroutine.

At step S158, the CPU 201 of the center controller 200 transmits a winning jackpot signal. Specifically, if each of the random numbers sampled at step S157 coincides with the specific number, the CPU 201 transmits a winning jackpot signal, as a winning jackpot, to a slot machine to which the specific number has been assigned. In other words, the CPU 201 of the center controller 200 awards to the determined slot machine a progressive bonus which is responsive to the progressive value updated at step S152.

At step S159, the CPU 201 of the center controller 200 resets a progressive value of a jackpot. Upon judging that the progressive bonus has been awarded at step S157, the CPU 201 of the center controller 200 resets the progressive value corresponding to the participation signal stored in the RAM 203. Specifically, the CPU 201 resets: the progressive values of the winning jackpots stored in the RAM 203; the jackpot BET amounts by slot machines 10; a total game count; and the values of standalone game counts by slot machines 10. After this process has terminated, the CPU terminates this subroutine.

According to the embodiment of the present invention, a game system can be provided which eliminates the player's feeling of unfairness in acquisition of a jackpot common to a plurality of slot machines by limiting a period of time during which they can participate in the jackpot.

Other Embodiment

Figure 45:
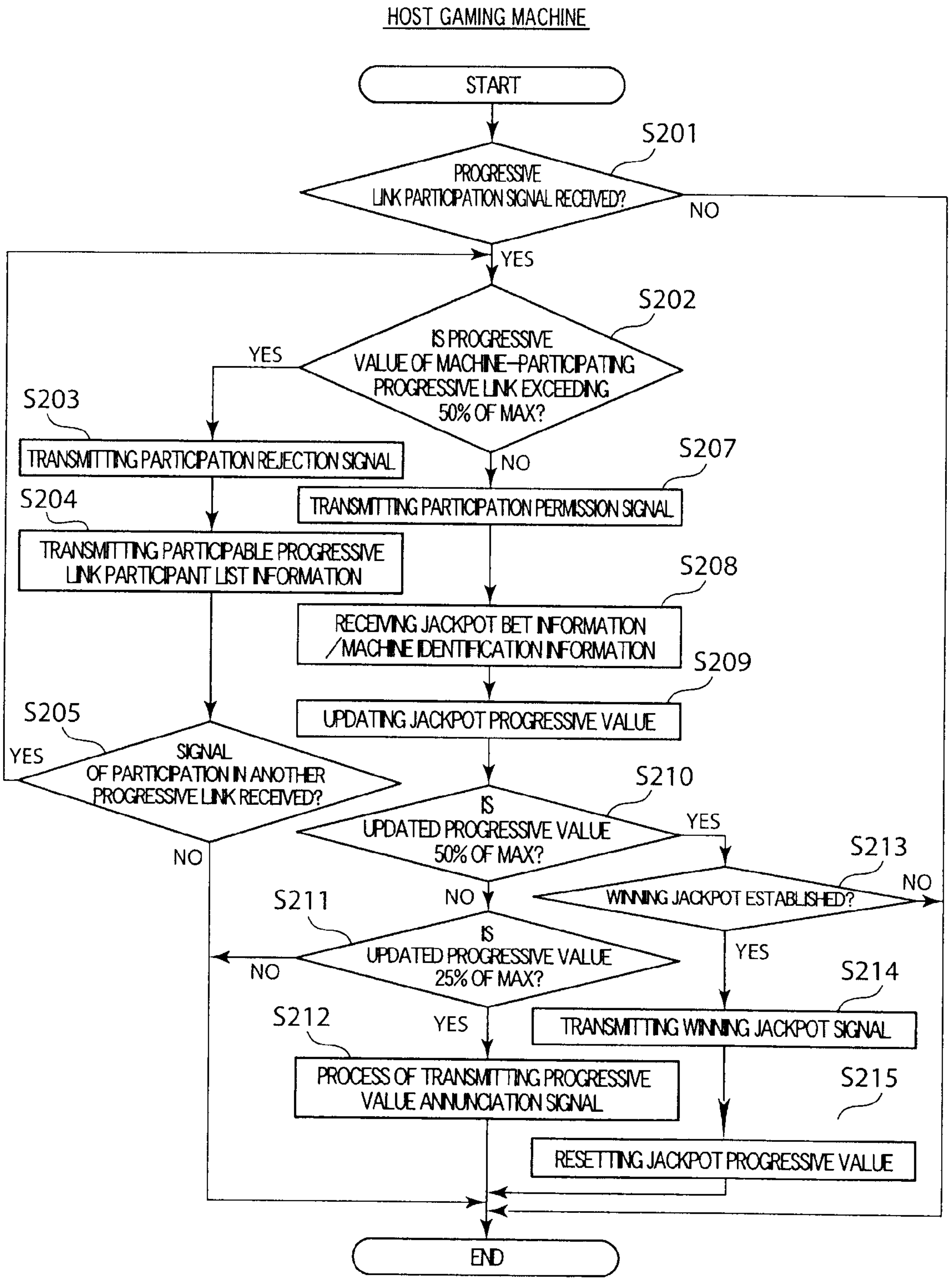
FIG. 45 is a flowchart explaining a process performed in a case of limiting participation in games by only gaming machines, without a center controller according to an alternate embodiment.

Next, a configuration of a progressive link in an alternate embodiment of the present invention will be described. FIG. 45 is an explanatory flowchart of the processes performed at a host slot machine in the case of limiting participation in jackpots by only the gaming machines. In the embodiment, a plurality of gaming machines are connected to communicate with each other via a network and each of the slot machines 10 is provided with a communication interface 44 which communicates with another gaming machine via a communication line 201. Further, at least one of the plurality of slot machines 10 provides a jackpot 151, and the provided slot machine serves as a slot machine 10' to control other slot machines 10 participating in the jackpot 151. Namely, the host slot machine 10' controls a progressive link 150.

The slot machine 10' is provided with a main CPU 41' which executes a jackpot for obtaining the progressive bonus. The host slot machine 10' is provided with a RAM 43' which stores a progressive value for the progressive bonus. Further, the host slot machine 10' causes the RAM 43' to store progressive link information such as: conditions for setting the jackpot 151 of the progressive link 150; progressive values; standalone game counts; identification information of participating slot machines 10: and BET information transmitted from each of the slot machines 10. Furthermore, the host slot machine 10' samples the corresponding progressive link information from the RAM 43' in response to a request from the slot machine 10 participating in the progressive link 150, and controls the progressive link 150 by responding to the requesting slot machine 10.

First, the main CPU 41' of the host slot machine 10' judges whether or not a progressive link participation signal has been received at step S201. The main CPU 41' judges whether or not a participation signal requesting midcourse participation in a progressive link has been received from another slot machine. Further, the main CPU 41' receives the code of the selected progressive link and machine identification information, which are transmitted from the participating slot machine 10. Upon judging that the progressive link participation signal has been received (step S201: YES), the main CPU 41' proceeds to step S202. If not (step S201: NO), the main CPU 41' terminates this subroutine.

At step S202, the main CPU 41' of the host slot machine 10' judges whether or not the progressive value of the machine-participating progressive link exceeds 50% of Max. In this process, upon judging that the participation signal has been received, the main CPU 41 judges whether or not the progressive value of the RAM 43' of the slot machine 10' reaches a preset rate as a predetermined value (50%). In the embodiment, the main CPU 41' of the slot machine 10' judges whether or not a current progressive value reaches 50% of the maximum value of jackpot payout. For example, assuming that the set maximum value of jackpot payout is $1,000,000, the main CPU 41' judges whether or not the progressive value stored in the RAM 43' is $500,000 or more. Upon judging that the progressive value exceeds 50% of Max (step S202: YES), the main CPU 41' proceeds to step S203. If not (step S202: NO), the main CPU 41' proceeds to step S207.

At step S203, the main CPU 41' of the host slot machine 10' performs a process of transmitting a participation rejection signal to the corresponding slot machine, based upon the progressive link participation signal received at step S201. Upon judging that the progressive value reaches 50% of Max as the result of the judgment at step S202, the main CPU 41' executes a process of rejecting participation in a progressive link by a slot machine having received the participation signal. After that, as a process of rejecting participation in a progressive link, the main CPU 41' display-controls the lower image display panel 16 so as to notify the fact to a slot machine whose participation in the progressive link has been rejected.

At step S204, the main CPU 41' of the host slot machine 10' performs a process of transmitting list information of participable progressive links. In this process, the main CPU 41' of the host slot machine 10' updates information so as to exclude information on a progressive link in which machine-participation has been rejected, and transmits the updated progressive link participant list information to the slot machine 10 having transmitted the participation reject signal at step S203. After that, the player at the slot machine 10 having received the participation rejection signal selects a desired one from the progressive links included in the updated progressive link participant list information. If there is no progressive link in which the player wants to participate, the corresponding information is transmitted to the host slot machine 10'.

At step S205, the main CPU 41' of the host slot machine 10' judges whether or not a signal indicative of participation in another progressive link has been received. The main CPU 41' judges whether or not there has been received a participation signal which is indicative of participation in the progressive links included in the progressive link participant list information transmitted at step S204. When the judgment result is affirmative (step S205: YES), the main CPU 41' reverts to step S202. In this manner, in response to a request from a slot machine whose participation in a progressive link has been rejected, the main CPU 41' can execute a jackpot for obtaining a jackpot other than that for obtaining a progressive bonus of the progressive link. If not (step S205: NO), the main CPU 41 terminates this subroutine.

Upon judging that the progressive value fails to exceed 50% of Max, the main CPU 41' of the host slot machine 10' performs a process of transmitting a participation permission signal at step S207. In other words, if it is judged that the progressive value fails to reach the predetermined value, as the result of the judgment at step S202, the main CPU 41' executes a process of allowing participation in a progressive link, of a slot machine having received the participation signal.

At step S208, the main CPU 41' of the host slot machine 10' receives jackpot BET information/machine identification information. The main CPU 41' receives the BET information transmitted from the slot machine allowed for participation in the progressive link. Specifically, this CPU receives BET information and machine identification information obtained at the same time as when information is obtained which is indicative of the fact that it is detected that the START button 23 of the participating slot machine 10 has been depressed. Further, the main CPU 41' causes the RAM 43' to store the jackpot BET amount, based upon the received jackpot BET information. The RAM 43' stores the jackpot BET amounts by slot machines 10, and the main CPU 41' stores the jackpot BET amount in a memory space of the corresponding slot machine 10 of the RAM 43', based upon machine identification information. Further, the main CPU 41' receives the machine identification information transmitted from the slot machine 10, and stores the received standalone game count in the predetermined memory space of the RAM 43'. The RAM 43' stores the standalone game counts by slot machines 10, and the main CPU 41' stores the standalone game count in the memory space of the corresponding slot machine 10 of the RAM 43', based upon machine identification information.

At step S209, the main CPU 41' of the host slot machine 10' updates the progressive value of the jackpot. The main CPU 41' updates the progressive value stored in the RAM 43', based upon the BET information received at step S208. Specifically, the main CPU 41' adds up the respective ones of the jackpot BET amounts of the slot machines 10, which are stored in the RAM 43' at step S208, and adds up the jackpot BET amounts of all of the slot machines participating in progressive links, and then, stores the added-up progressive value in the RAM 43'.

At step S210, the main CPU 41' of the host slot machine 10' judges whether or not the progressive value updated at step S209 is 50% of Max. When the judgment result is negative (step S210: NO), the main CPU 41' proceeds to step S211. When the judgment result is affirmative (step S210: YES), the main CPU 41' proceeds to step S213.

At step S211, the main CPU 41' of the host slot machine 10' judges whether or not the updated progressive value is 25% of Max. If it is judged that the progressive value fails to the predetermined value (50% of Max) as the result of the judgment at step S210, it is judged that the progressive value stored in the RAM 43' reaches a preset rate as a predetermined value (50%). Upon judging that the updated progressive value is not 25% of Max, the main CPU 41' terminates this subroutine. When the judgment result is affirmative, the main CPU 41' proceeds to step S212.

At step S212, the main CPU 41' of the host slot machine 10' performs a process of transmitting a progressive value annunciation signal. Based upon the result of the judgment, the main CPU 41' transmits a predetermined annunciation signal pertinent to a preset rate (50%) as a predetermined value (when the progressive value is 50% of Max), to a plurality of gaming machines participating in the progressive bonus game. After this process has terminated, the main CPU terminates this subroutine.

Upon judging that the updated progressive value is 50% of Max at step S210 (step S210: YES), the main CPU 41' of the host slot machine 10' judges whether or not a winning jackpot is established at step S213. In other words, the main CPU 41' randomly determines whether or not to award a jackpot progressive bonus to any of a plurality of slot machines participating in a progressive link. Specifically, the main CPU 41' assigns a specific number to a slot machine having transmitted jackpot BET information and machine identification information, and samples random numbers from a predetermined numeric range including the specific number. After that, the main CPU 41' judges whether or not each of the sampled random numbers coincides with the specific number. When the judgment result is negative (step S213: NO), the main CPU 41' terminates this subroutine.

When the judgment result is affirmative (step S213: YES), the main CPU 41' proceeds to step S214. At step S214, the main CPU 41' of the host slot machine 10' transmits a winning jackpot signal. In other words, the main CPU 41' awards to the determined slot machine 10 a progressive bonus responsive to the progressive value updated at step S209. Specifically, if each of the random numbers sampled at step S213 coincides with a specific number, the main CPU 41' transmits a winning jackpot signal, as a winning jackpot, to a slot machine to which the specific number has been assigned.

At step S215, the main CPU 41' of the host slot machine 10' resets the progressive value of the jackpot. In other words, upon judging that the progressive bonus has been awarded at step S213, the main CPU 41' resets the progressive value stored in the RAM 43'. Specifically, the main CPU 41' resets the progressive values of the winning jackpots stored in the RAM 43'; the jackpot BET amounts by slot machines 10; a total number of standalone games; and the values of the numbers of standalone games by slot machines 10. After this process has terminated, the main CPU terminates this subroutine. The main CPU 41' repeatedly executes the progressive bonus acquisition processes (the abovementioned processes at steps S208 to S215) in order to repeatedly perform a progressive bonus game (jackpot) for obtaining a progressive bonus.

In the embodiment, even though the center controller is employed, the slot machine 10 controls progressive links to enable a process of disabling a slot machine 10 to newly participate in a progressive link in which a progressive value is 50% or more of the jackpot prize money. In this manner, a game system can be provided which eliminates the player's feeling of unfairness in acquisition of a jackpot common to a plurality of slot machines by limiting a period of time during which they can participate in the jackpot.

While the embodiment described a case in which the plurality of slot machines 10, the center controller 200, and the common display device 300 are connected via a wire, the present invention is not limitative thereto. Data may be transmitted or received wirelessly. In other words, the communication lines according to the present invention include wired or wireless transmission lines.

While the embodiment described a case in which the game system 100 is installed in one gaming facility, the slot machines 10 may be installed in other gaming facilities in the present invention.

While the embodiment described a case in which slot machines are employed as gaming machines, card game machines may be employed in the present invention.

While the embodiment described a case in which the predetermined progressive value is fixed to 50%, the predetermined progressive value, of the present invention, may be set at any other value, or alternatively, may vary depending upon the number of players participating in link games or progressive values.

Seventh Embodiment

Figure 46:
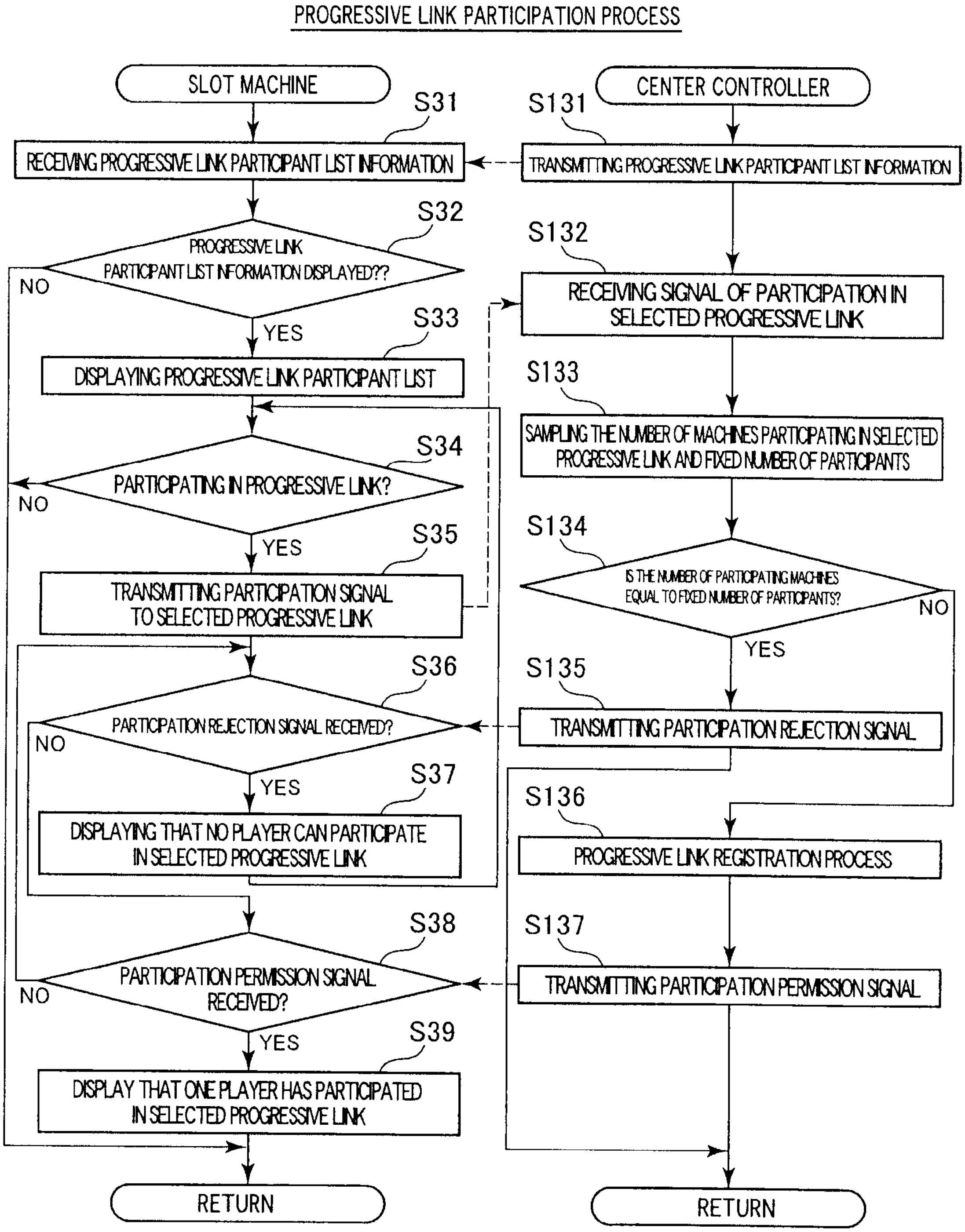
FIG. 46 is a flowchart showing a subroutine of a progressive link participation process according to a center controller.

A game system according to the present invention will be described in detail with reference to the drawings. FIG. 46 is a flowchart showing a subroutine of a progressive link participation process in a slot machine 10 and a center controller 200.

First, an outline of games will be described. The slot machine 10 can perform: a standalone game individually performed by the player at each of the slot machines 10; and a link game performed by a plurality of players at other slot machines 10 simultaneously. Further, the players enjoying games at the slot machines 10 can arbitrarily perform the link games while playing the standalone games.

A game system 100 according to the embodiment is made up of: a center controller 200 having a RAM 203 which stores a progressive value paid out as a prize in a progressive bonus game serving as a link game; and a plurality of slot machines 10 which is connected to the center controller 200 via a communication line and which can participate in the progressive bonus game in order to acquire the progressive value paid out as the prize. The progressive value stored in the RAM 203 of the center controller 200 is updated so as to increase based upon BET information input from each of the slot machines 10.

At step S134, the center controller 200 monitors whether the number of slot machines has reached a fixed number of participants, the slot machines participating in a progressive link updated based upon a participation signal transmitted from each of the slot machines 10. The fixed number of participants used herein is randomly predetermined for each of the progressive links. If the number of slot machines participating in the progressive link exceeds the fixed number of participants, the center controller 200 limits participation in a progressive bonus game, of a slot machine desiring to do so from now. If not, the center controller permits participation in the progressive bonus game, of such slot machine. In other words, the center controller 200 determines whether or not to enable participation in the progressive bonus game, of the slot machine desiring to do so. This determination is made in response to a state of participation in the progressive bonus game updated based upon the participation signal transmitted from the slot machine. By limiting a period of time during which a player can participate in a progressive bonus game, it is possible to eliminate the player's feeling of unfairness in acquisition of the progressive value paid as a prize common to a plurality of slot machines. The center controller 200 transmits determination information as to whether or not to enable participation of the slot machine 10 desiring to do so. This transmission is based upon the contents of determining whether or not to enable participation in the progressive bonus game determined depending upon the state of participation in the progressive bonus game (step S135, S137).

Figure 47:
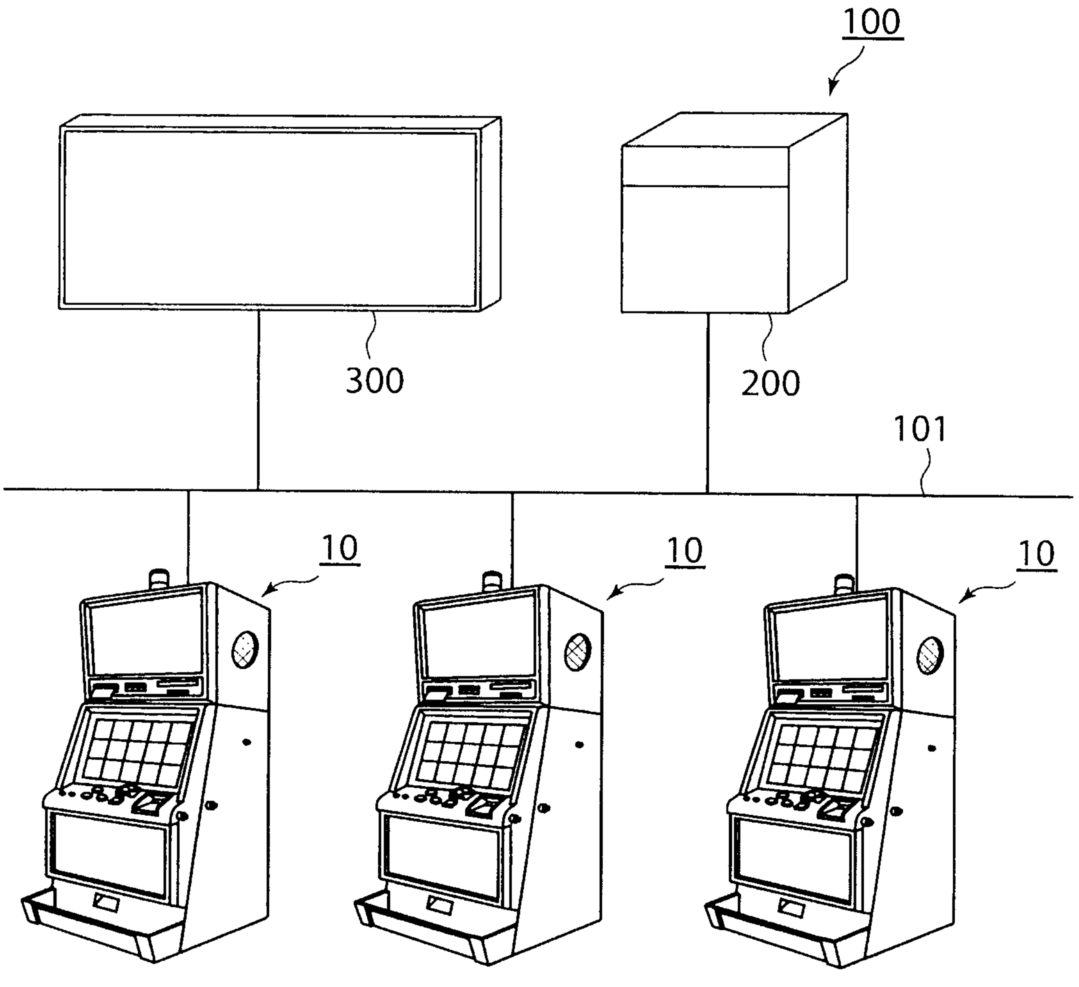
FIG. 47 is a schematic view showing an entire configuration of a game system.

Next, an entire configuration of the game system 100 in the embodiment will be described. FIG. 47 is a schematic view showing the entire configuration of the game system. As shown in FIG. 47, the game system 100 is provided with a plurality of slot machines, a center controller, and a common display device 300. The common display device is equivalent to the center controller according to the present invention.

To the center controller 200, the plurality of slot machines 10 and the display device 300 are connected via a communication line 101. The plurality of slot machine 10 and the display device 300 can transmit/receive data to/from the center controller 200 via the communication line 101. Further, the plurality of slot machines 10 are interconnected to be able to communicate with each other via the communication line 101.

The display device 300 is intended for displaying the amount of prize money for a jackpot in a progressive link to be described later.

While the embodiment describes a case in which the plurality of slot machine 10, the center controller 200, and the display device 300 are connected via a wire, the present invention is not limitative thereto. Data may be transmitted or received wirelessly. In other words, the communication lines according to the present invention include wired and wireless transmission lines. Further, while the embodiment describes a case in which the game system 100 is installed in one gaming facility, the slot machines 10 may be installed separately in other gaming facilities in the present invention.

Figure 48:
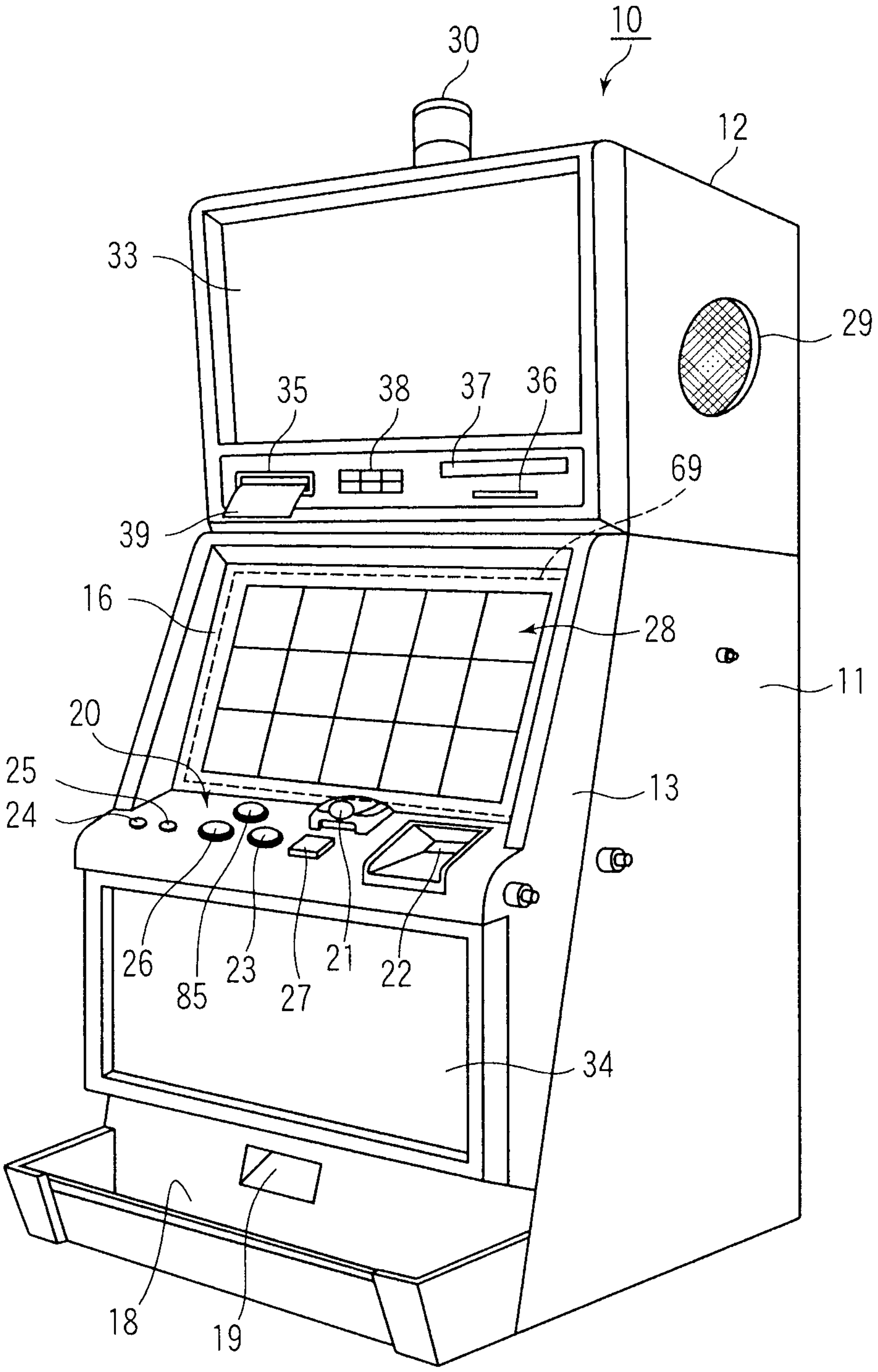
FIG. 48 is a perspective view schematically showing a slot machine.

FIG. 48 is a view schematically showing an appearance of the slot machine according to an embodiment of the present invention. The gaming media used in the slot machine 10 include coins, bills, or electronic value information equivalent thereto. In the present invention, however, medals, tokens, electronic money, or tickets, for example, may be employed as gaming media without being limitative thereto in particular. The above tickets are not limitative in particular, and can include barcode-attached tickets or the like, as described later, for example.

The slot machine 10 is provided with a cabinet 11, a top box 12 installed on an upper side of the cabinet 11, and a main door 13 provided on a front surface of the cabinet 11.

The lower image display panel 16 serving as a display device is provided in front of the main door 13. The lower image display panel 16 is provided with a liquid crystal panel, which displays the symbol matrix 28 in three rows and five columns. One symbol is arranged in each of the cells of the symbol matrix 28, and a maximum of 15 symbols are displayed in all.

A credit amount display section 31 of the lower image display panel 16 displays, by way of an image, a credit corresponding to the number of inserted coins. A payout amount display unit 32 displays by way of an image, a combination of rearranged symbols or the number of coins to be paid if the predetermined number of symbols are rearranged.

Provided on the lower side of the lower image display panel 16 at a center of the main door 13 is a control panel 20 on which a plurality of buttons 23 to 27 and 85 through which command regarding the process of the game is entered, a coin receiving slot 21 for receiving coins into the cabinet 11, and bill validator 22 are disposed.

On the control panel 20, a start button 23, a change button 24, a cashout button 25, a 1-BET button 26, a MAX-BET button 27, and a side-BET button 85 are provided. The start button 23 is intended for entering an instruction for starting a standalone game. The change button 24 is intended for use in asking an attendant of the gaming facility for change. The cashout button 25 is intended for entering a command for paying out the credited coins to a coin tray 18 through a coin payout exit 19.

The 1-BET button 26 is intended for entering a command for betting a credit corresponding to one coin. The MAX-BET button 27 is intended for entering a command for betting the maximum number (fifty in this embodiment) of coins that can be bet per game. The side-BET button 85 is used to place a BET in the symbol matrix 28 in a standalone game, i.e., a secondary game other than a game in which symbols are rearranged. For example, in the embodiment, when a predetermined credit is betted by the side-BET button 85, it is possible to control the "CHANCE" symbol(s) to be rearranged in the symbol matrix 28. Further, part of the credit betted by these input means is integrated and stored in a memory space set in a RAM 43, and is defined as a standard for determining the amount of payout in the case where the jackpot 151 is acquired in a link game.

The bill validator 22 validates whether a bill is legitimate and accepts a legitimate bill into the cabinet 11. The bill validator 22 may be configured so that a barcode-attached ticket 39 described later is readable thereby. Provided on a lower front surface of the main door 13, that is, at a lower part of the control panel 20, is a berry glass 34 on which characters of the slot machine 10 and the like are depicted.

An upper image display panel 33 is provided on the front face of the top box 12. The upper image display panel 33 has a liquid crystal panel displaying images for introducing the game contents or explaining game rules, for example.

Also, a lamp 30 and a speaker 29 are provided on the top box 12. A ticket printer 35, a card reader 36, a data display 37, and a keypad 38 are provided at the lower side of the upper image display panel 33. The ticket printer 35 prints, on tickets, barcodes containing coded data such as credit amount, date and time, or ID numbers of the slot machine 10, and the bar code-attached tickets 39 are output. A player causes another slot machine to read the bar-code-attached tickets 39, allowing the slot machine to perform games, or alternatively, allowing the exchange of bar-code-attached tickets 39 with bills or the like at a predetermined site of a game facility (for example, at the cashier in a casino).

The card reader 36 reads data from and writes data into a smart card. The smart card is to be owned by the player, which stores data for identifying the player or data regarding the log of games executed by the player, for example. The smart card may store data equivalent to coins, bills, or credits. As an alternative of a smart card, a magnetic stripe card may be employed. The data display 37 is made up of a fluorescent display or the like, and stores data read by the card reader 36 or data input by a player via the keypad 38, for example. The keypad 38 is intended for entering the instructions or data pertinent to the issuance of tickets.

Figure 49A:
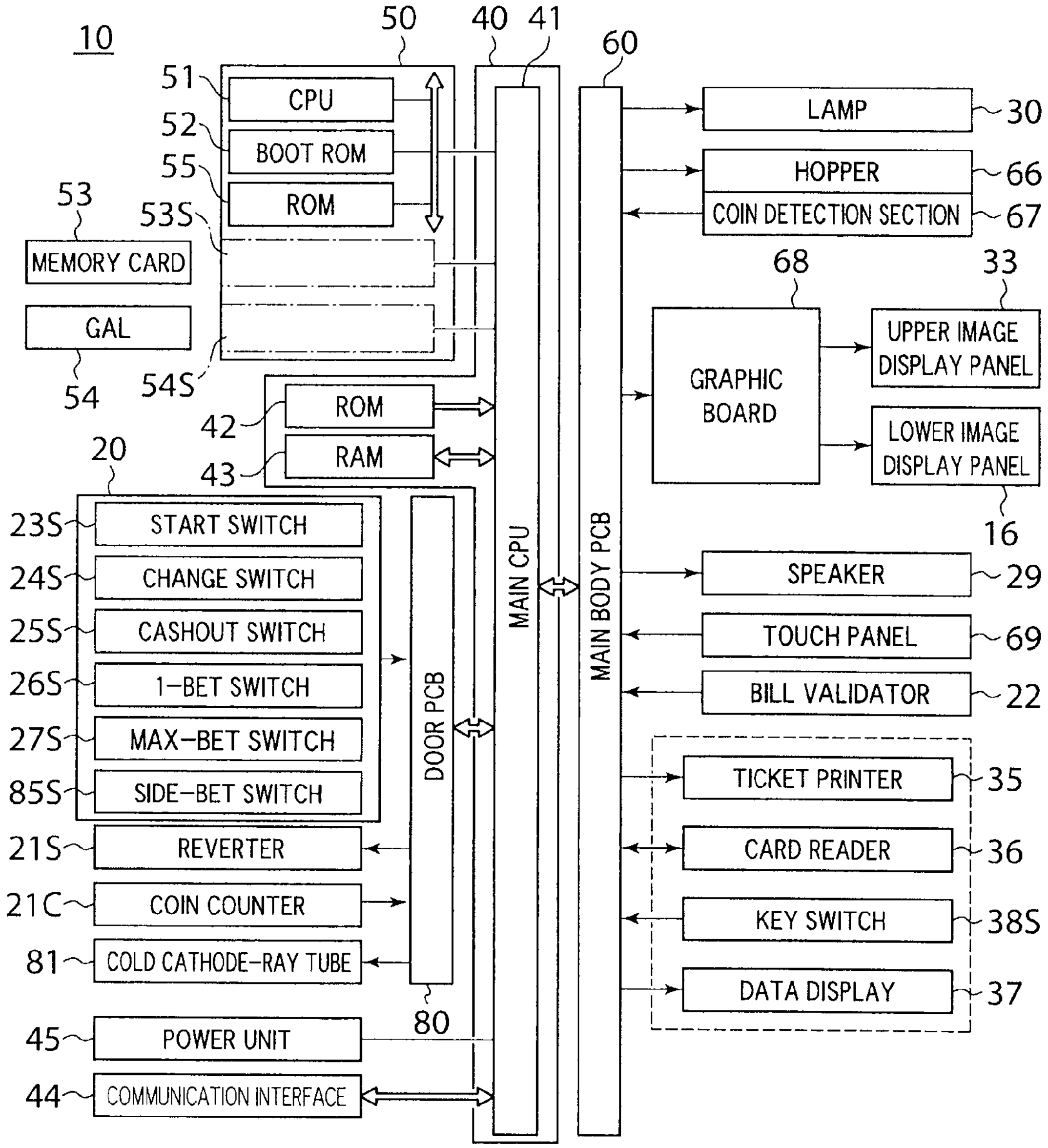
FIG. 49A is a view showing an internal configuration of the slot machine.

FIG. 49A is a block diagram depicting an internal configuration of the slot machine shown in FIG. 48. The gaming board 50 is provided with: a CPU (Central Processing Unit) 51 interconnected by means of an internal path; a ROM (Read Only Memory) 55 and a boot ROM 52; a card slot 53S corresponding to a memory card 53; and an IC socket 54S corresponding to a GAL (Generic Array Logic) 54.

The memory card 53 is internally provided with a nonvolatile memory, and stores a game program. The game programs include a symbol selection program. The abovementioned symbol selection program is intended for determining symbols rearranged in the symbol matrix 28. The symbol selection program includes symbol weighing data corresponding to each of plural types of payout ratios (for example, 80%, 84%, and 88%). The symbol weighting data is indicative of the correspondence relationship between the respective symbols and one or more random numeric values which come under a predetermined numerical range (0 to 255). The payout rate is determined based upon payout rate setting data output from the GAL 54, and the symbols rearranged in the symbol matrix 28 are determined based upon the symbol-weighted data corresponding to the payout rate. Further, the game programs include table data indicating the correspondence relationship between each of the symbols and a payout.

The card slot 53S is constituted so as to removably insert the memory card 53, and is connected to the motherboard 40 by means of an IDE path. Therefore, the memory card 53 is removed from the card slot 53S, other game programs and game system programs are written in the memory card 53, and the memory card 53 is then inserted into the card slot 53S, thereby making it possible to vary the types or contents of the games performed at the slot machine 10. The game programs include those which are relevant to the operating procedures for performing games. Furthermore, the game program includes image data or sound data to be output during the game. The image data includes image data of symbols to be arranged in the symbol matrix 28.

The GAL 54 is a kind of PLD having an OR-fixed arrayed structure. The GAL 54 is provided with a plurality of IN ports and OUT ports. If predetermined items of data are input to the IN port, the corresponding data is output from the OUT port. The data output from the OUT port is equivalent to the above-described payout rate setting data. In addition, the IC socket 54S is constituted to enable removable insertion of the GAL 54, and is connected to a motherboard 40 by means of a PCI bus. Therefore, it is possible to vary the payout rate setting data by replacing the GAL with the replacement GAL 54.

The CPU 51, the ROM 55, and the boot ROM 52 interconnected by the internal bus are connected to the motherboard 40 by the PCI bus. The PCI bus not only performs signal transmission between the motherboard 40 and the gaming board 50, but also supplies power from the motherboard 40 to the gaming board 50.

The motherboard 40 is constructed using a general-purpose motherboard commercially available (a printed circuit board on which essential parts of a personal computer are mounted) and includes: a main CPU 41; a ROM (Read Only Memory) 42; a RAM (Random Access Memory) 43; and a communication interface 44.

The ROM 42 stores therein a program such as BIOS (Basic Input/Output System) executed by the main CPU 41, and permanent data. When the BIOS is executed by the main CPU 41, a process of initializing predetermined peripheral devices is carried out and a process of capturing game programs and game system programs stored in the memory card 53 through the gaming board 50 is started. In the embodiment of the present invention, the contents of the ROM 42 may be rewritable or not.

The RAM 43 stores data and programs used when the main CPU 41 is activated. The RAM 43 can also store game programs. Further the RAM 43 stores data pertinent to the credit amount and the number of inserted coins or the number of paid-out coins in one game. In embodiments of the present invention, the RAM 43 stores bonus points cumulatively.

Both a main body PCB (Printed Circuit Board) 60 and a door PCB 80 are connected to the motherboard 40 by USB. A power supply unit 45 is also connected to the motherboard 40.

Equipment and devices which generate input signals to be input to the main CPU 41, and equipment and devices, operations of which are controlled by a control signal output from the main CPU 41, are connected to the body PCB 60 and the door PCB 80. The main CPU 41 executes the game programs stored in RAM 43, based upon an input signal that was input to the main CPU 41, thereby performing a predetermined computational process. Then, this CPU 41 stores results thereof into RAM 43; and transmits control signals to equipment and devices as a control process relative to the equipment and devices.

Connected to the main body PCB 60 are a lamp 30, a hopper 66, a coin detection section 67, a graphic board 68, a speaker 29, a touch panel 69, a bill validator 22, a ticket printer 35, a card reader 36, a key switch 38S, and a data display 37. The lamp 30 lights in a predetermined pattern, based upon a control signal output from the main CPU 41.

The hopper 66 is installed in a cabinet 11, and the predetermined amount of coins are paid out from the coin payout opening 19 to the coin tray 18, based upon the control signal output from the main CPU 41. A coin detection section 67 is provided inside of the coin payout opening 19, and outputs an input signal to the main CPU 41, if it is detected that the predetermined amount of coins have been paid out from the coin payout opening 19.

A graphic board 68 controls the images to be displayed on the upper and lower image display panels 33 and 16, based upon the control signal output from the main CPU 41. The credit amount display section 31 (see FIG. 47) on the lower image display panel 16 displays the number of credits stored in the RAM 43. Further, the payout amount display section 31 (see FIG. 47) on the lower image display panel 16 displays the number of coins to be paid out. The graphic board 68 is provided with: a VDP (Video Display Processor), which generates image data, based upon the control signal output from the main CPU 41; and a video RAM, etc., which temporarily stores image data generated by the VDP. The image data used when the image data is generated by the VDP is read out of the memory card 53, and thereafter, is included in the game programs stored in the RAM 43.

The bill validator 22 validates whether a bill is legitimate and accepts a legitimate bill into the cabinet 11. The bill validator 22, upon accepting a legitimate bill, outputs an input signal to the main CPU 41 based upon the bill amount. The main CPU 41 stores in the RAM 43 the amount of credits responsive to the amount of bills transmitted by the input signal.

Based upon a control signal output from the main CPU 41, the ticket printer 35 prints on a ticket a barcode having encoded thereon data such as the credit amount, data and time, and the identification number of the slot machine 10 stored in the RAM 43. Further, this printer outputs the printed ticket as a barcode-attached ticket 39. The card reader 36 reads data from a smart card, thereby transmitting the read data to the main CPU 41 or writing data into the smart card, based upon the control signal from the main CPU 41. The key switch 38S is provided on the key pad 38, and outputs a predetermined input signal to the main CPU 41 when a player operates the key pad 38. The data display 37 displays, based upon a control signal output from the main CPU 41, the data read by the card reader 36 and the data input by a player through the key pad 38.

To the door PCB 80, a control panel 20, a reverter 21S, a coin counter 21C, and a cold cathode-ray tube 81 are connected. On the control panel 20, there are provided: a start switch 23S corresponding to the start button 23; a change switch 24S corresponding to the change button 24; a cashout switch 25S corresponding to the cashout button 25; a 1-BET switch 26S corresponding to the 1-BET button 26; a MAX-BET switch 27S corresponding to the MAX-BET button 27; and a side-BET switch 85S corresponding to the side-BET button 85. When the player operates the buttons 23 to 27, and 85, the corresponding switches 23S to 27S and 85S output the input signals to the main CPU 41, respectively.

The coin counter 21C is provided inside the coin receiving slot 21, and validates whether a legitimate coin is inserted into the coin receiving slot 21. Those other than the legitimate coins are discharged from the coin payout exit 19. The coin counter 21C outputs an input signal to the main CPU 41 when a legitimate coin is detected. Those other than the valid coins are discharged from the coin payout exit 19. The coin counter 21C also outputs an input signal to the main CPU 41 if a valid coin is detected.

The reverter 21S is operable based upon the control signal output from the main CPU 41. This reverter distributes the coins recognized to be legitimate by the coin counter 21C, into a cashbox (not shown) or a hopper 66 which was installed in the slot machine 10. In other words, if the hopper 66 is filled with coins, the legitimate coins are distributed to the cashbox by means of the reverter 21S. In other words, if the hopper 66 is filled with coins, the legitimate coins are distributed to the cashbox by means of the reverter 21S. Otherwise, the legitimate coins are distributed to the hopper 66. The cold cathode-ray tube 81 functions as a backlight installed at the rear side of the lower and upper image display panels 16 and 33, and lights based upon the control signal that was output from the main CPU 41.

Figure 49B:
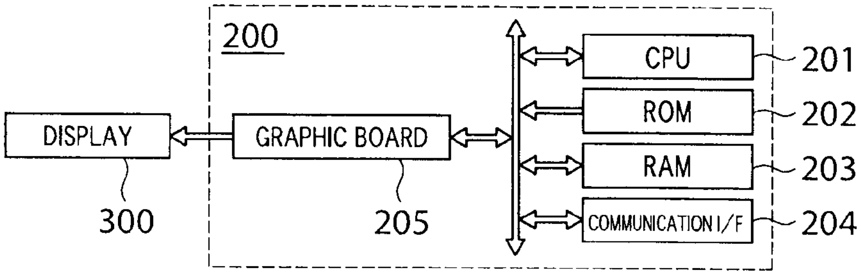
FIG. 49B is a view showing an internal configuration of the center controller.

FIG. 49B is a block diagram depicting an internal configuration of the center controller 200 shown in FIG. 47. The center controller 200 has: a CPU 201 which functions as a controller for controlling a plurality of slot machines 10; a ROM 202; a RAM 203; a communication interface 204 which communicates with a main CPU 41 of the plurality of slot machines 10; and a graphic board 205 which controls a display device 300 to display an image.

The ROM 202 stores therein a program such as BIOS (Basic Input/Output System) executed by the CPU 201, and permanent data. When the CPU 201 executes the BIOS, a process of initializing predetermined devices is performed and the control program and game system program of the center controller 200 are read in the RAM 203. The RAM 203 stores data related to a game, such as a cumulative value of credit possessed by each of the slot machines or bonus points. The graphic board 205 controls the display device 300 to display an image, based upon a control signal output from the main CPU 201.

Figure 50:
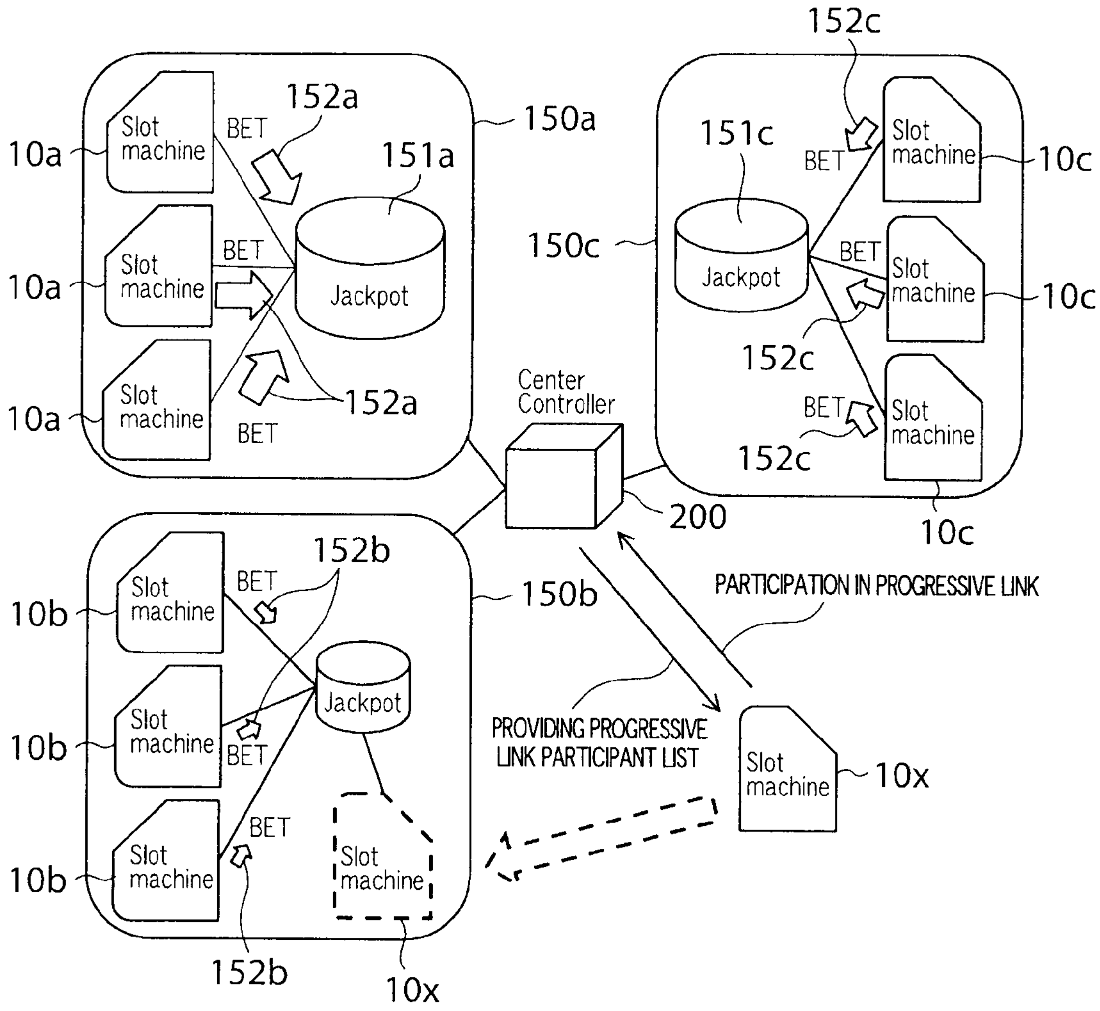
FIG. 50 is a schematic view showing a configuration of progressive links which the center controller controls.

Next, a configuration of progressive links in the embodiment will be described. FIG. 50 is a schematic view showing the configuration of the progressive links that the center controller 200 control. As shown in FIG. 50, the center controller 200 provides a plurality of jackpots 151*a*, 151*b*, 151*c*, and a plurality of slot machines 10 participate in these jackpots 151*a*, 151*b*, 151*c*. Hereinafter, the plurality of slot machines 10 participating in one jackpot 151 form one configuration, and are referred to as a progressive link 150.

The center controller 200 provides the RAM 203 that stores items of progressive link information such as: setting conditions of jackpots 151 by progressive links 150; progressive values; game counts; identification information of the participating slot machines 10; and BET information transmitted from each of the slot machines 10. The center controller 200 controls progressive links 150 by sampling the corresponding progressive link information stored in the RAM 203 in response to a request from each the slot machines 10, and thereafter, responding to each of the requesting slot machines 10.

In one example shown in FIG. 50, the amounts of prize money (maximum amounts of payout) for three jackpots 151*a*, 151*b*, 151*c* provided from the center controller 200 are set differently from each other, the jackpot 151*a* is set at the highest, and the jackpot 151*c* is set at the lowest. Further, the lowest BET amount 152 in one standalone game, for placing a bet in a jackpot from a slot machine 10, is set in accordance with the amount of prize money for the jackpot, and the minimum BET amount 152 is set at the highest and that of the jackpot 151*c* is set at the lowest.

A player, who has not participated in a jackpot yet, can participate in a jackpot meeting the player's need while verifying the jackpot setting condition. The center controller 200 provides progressive link participant list information serving as list data of permissible progressive links to a player who has not participated therein yet. Having received the progressive link participant list information, a slot machine 10*x* causes a display device to display the corresponding progressive link participant list to prompt a player to participate therein, and transmits to the center controller 200 a signal indicative of participation in the progressive link 150*b* that the player has selected. The center controller 200 adds the slot machine 10*x* to the progressive link 150*b* from the progressive link participation signal, and causes the jackpot 151*b* to share the slot machine 10*x*. Further, the slot machine 10*x* can place a bet in the jackpot 151*b*.

While the embodiment describes a case in which the center controller 200 controls all of the progressive links 150, the present invention is not limitative thereto. By providing the center controller 200 for each of the progressive links 150, the game system 100 may be configured under cooperative control exerted by intercommunication between these center controllers. This configuration will be described referring to FIG. 60 by way of alternate embodiment.

Figure 51A:
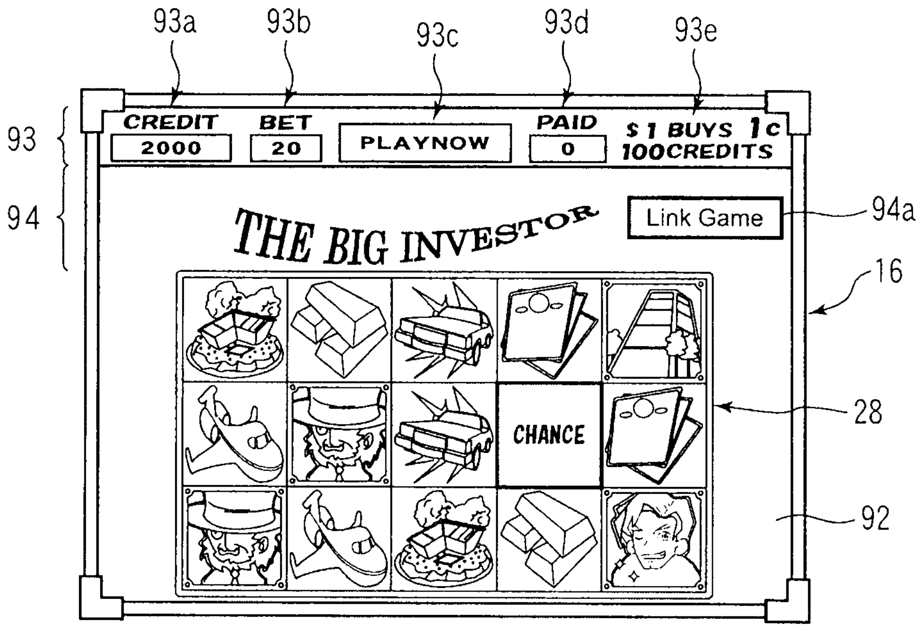
FIG. 51A is a view showing an exemplary image displayed at a slot machine while in a standalone game.

FIG. 51A to FIG. 53B are views, each of which shows an exemplary image displayed on the display sections of the lower image display panel 16 of the slot machine 10 shown in FIG. 48. FIG. 51A is a view showing an exemplary image displayed at the slot machine shown in FIG. 48 while in a standalone game.

As shown in FIG. 51A, the lower image display panel 16 is made up of display (area) sections such as a display area section 92, an information display section 93, and an effect image display section 94. The symbol matrix 28 is displayed in the display area section 92. Further, icons for displaying the number of betted coins are disposed at both sides of the symbol matrix 28, and the icons corresponding to the number of betted coins are controlled to illuminate. The information display section 93 is arranged upwardly of the display region 92 and is made up of a credit amount display section 93*a*, a BET amount display section 93*b*, a character information display section 93*c*, a PAID amount display section 93*d*, and a charge display section 93*e*.

The credit amount display section 93*a* displays the number of currently credited coins, and the BET amount display section 93*b* displays the number of coins betted in one standalone game. The character information indicative of a current status of the game is displayed at the character information display section 93*c*. The characters of "PLAY NOW" are displayed during the play of the game, whereas the characters of "GAME OVER" are displayed during the intervals between the plays of the game. The number of coins that have been paid out in one game is displayed at the PAID amount display section 93*d*, whereas a conversion value of the credit amount based upon a predetermined amount of money is displayed at the charge display section 93*e*.

Any of symbols such as "main animation character", "sub animation character", "office building", "bullion", "car", "stock certificate", "jet", "cottage", and "CHANCE" are rearranged in the symbol matrix 28 that is displayed on the lower image display panel 16. A payout is determined depending upon the arrangement or number of these symbols displayed in the symbol matrix 28.

An effect image according to the settings of a slot game is displayed at the effect image display section 94. On the upper right of the effect image display section 94, a participant list display icon 94*a* is displayed which is indicative of the fact the progressive link participant list information has been received from the center controller 200.

Figure 51B:
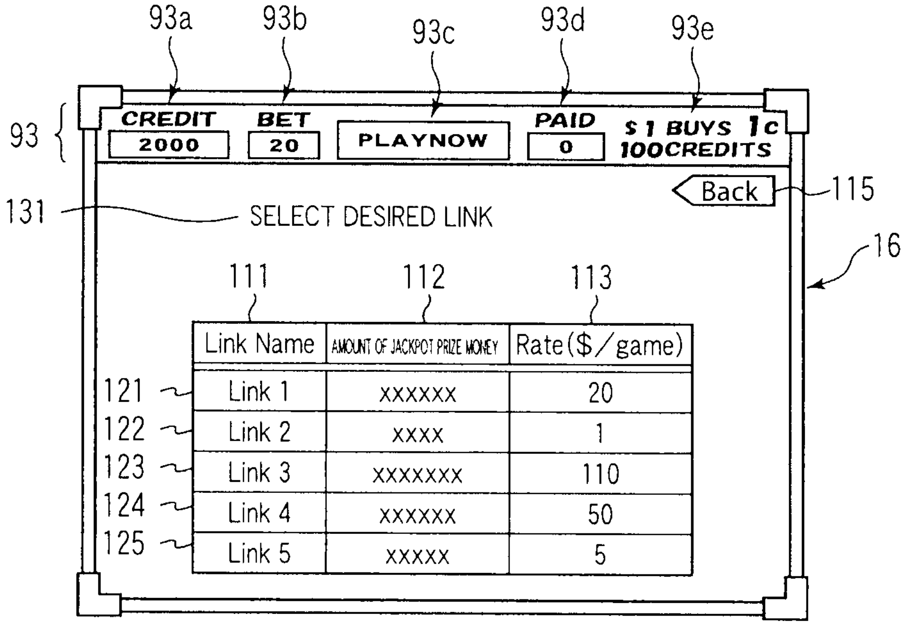
FIG. 51B is a view showing an exemplary image displaying a progressive link participant list at the slot machine.

FIG. 51B is a view showing an exemplary image displayed after a player has depressed an area which is indicative of the participant list display icon 94*a* on the touch panel 69 in FIG. 51A. At the substantial center of the lower image display panel 16, a progressive link participant list is displayed from the center controller 200. A guide display 131 for guiding a player's operation is displayed at the upper center of the lower image display panel 16, and a BACK icon 115 for reverting to the previous screen is displayed at the right thereof.

The progressive link participant list displays, by progressive link, a link name 111 of a currently-participable progressive link; a jackpot prize money amount 112 indicating the maximum payout amount of a jackpot; and a minimum BET amount 113 minimally required for jackpot betting for one standalone game. As shown in FIG. 51B, players can participate in five progressive links, Link 1 to Link 5. On the touch panel 69, each of the players can depress any one of link participation icons 121 to 125 on each line in a progressive link participant list.

Figure 52A:
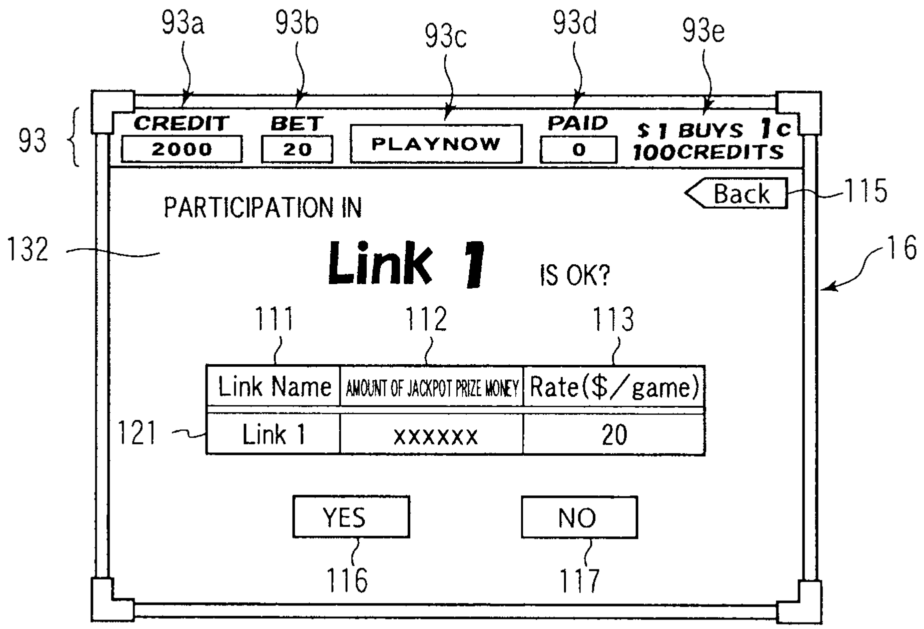
FIG. 52A is a view showing an exemplary image displaying a progressive link participant list at the slot machine.

FIG. 52A is a view showing an exemplary image displayed on the lower image display panel 16 when the player has depressed the participation icon 121 of Link 1, which is a first line of the progressive link participant list, on the touch panel 69, in FIG. 51B. The screen shown in FIG. 52A is intended for the player to verify whether or not to participate in a selected progressive link. In the figure, only a list of Link 1 serving as the progressive link depressed in FIG. 51B is displayed at the substantial center of the lower image display panel 16. The guide display 132 for guiding the player's operation is displayed at the upper center of the lower image display panel 16, and the BACK icon 115 for reverting to the previous screen is displayed at the right thereof.

The guide display 132 appears that is pertinent to check of participation in the progressive link depressed in FIG. 51B, and an YES icon indicating participation in the progressive link and a NO icon 117 indicating no participation are displayed at the lower side of the lower image display panel 16. The player can select the YES icon 116 or the NO icon 117 from the touch panel 69. If the player selects neither of them, the routine reverts to the screen indicating that a standalone game is in progress, one minute later.

Figure 52B:
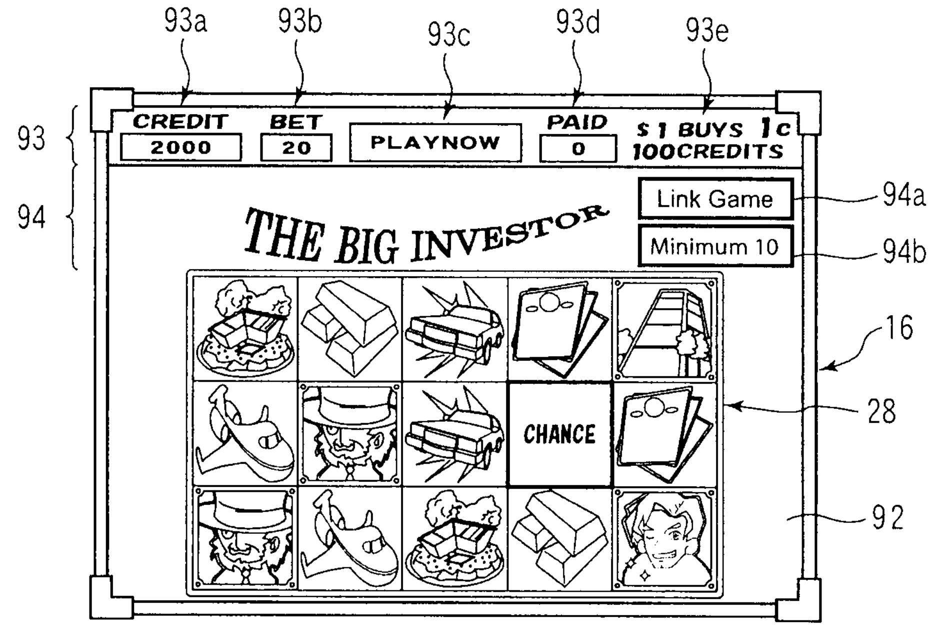
FIG. 52B is a view showing an exemplary image displayed at the slot machine while in a standalone game.

FIG. 52B is a view showing an exemplary image displayed on the lower image display panel 16 when the player has depressed the YES icon 116 indicating that the player participates in the progressive link, from the touch panel 69 in FIG. 52A. The image indicating that the standalone game is in progress, shown in FIG. 51A, is displayed on the lower image display panel 16. A "participating" icon 94*b* indicating that a player participates in a progressive link is displayed at the upper right of the lower image display panel 16. The "participating" icon 94*b* displays information on the lowest BET amount in one standalone game of Link 1 serving as the progressive link selected in FIG. 51B. Selecting the "participating" icon 94*b* from the touch panel 69 displays information of Link 1 serving as a machine-participating progressive link.

In the embodiment, a player can participate in a plurality of progressive links simultaneously. For example, in a case where a player participates in two progressive links, i.e., Link 1 and Link 3, the "participating" icon 94*b* displays information of the minimum BET amount for one standalone game for betting in two jackpots. In the above case, "Minimum 10" is displayed.

Figure 53A:
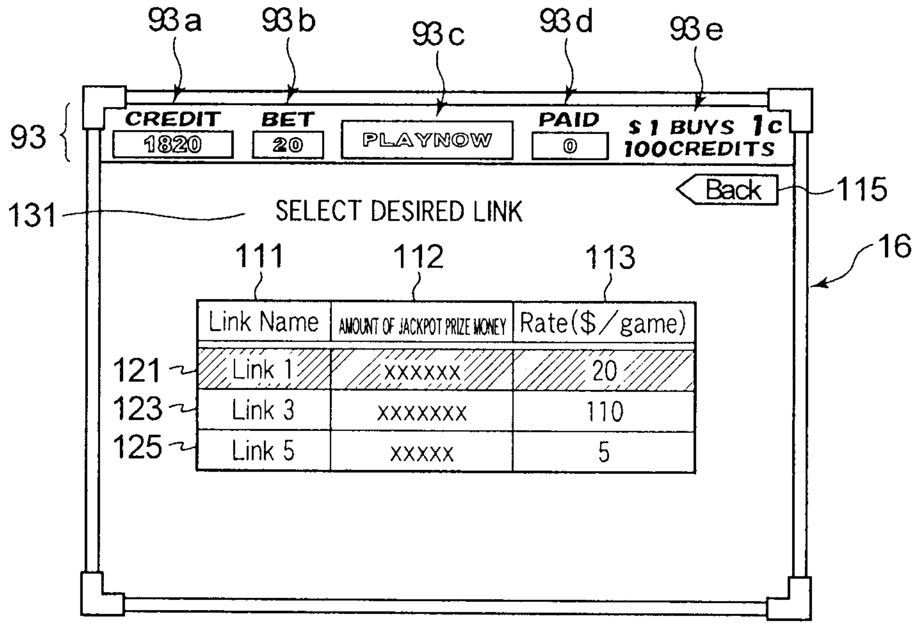
FIG. 53A is a view showing an exemplary image displaying a progressive link participant list at the slot machine.

FIG. 53A is a view showing an exemplary image displayed after the player has depressed an area, which is indicative of the participant list display icon 94*a* on the touch panel 69, after executing the standalone game in FIG. 52B. As shown in FIG. 51B, a progressive link participant list is displayed at the center of the lower image display panel 16. Here, the participation icon 121 of Link 1, which is a currently machine-participating progressive link, is displayed indicating that a slot machine participates in the link. Further, progressive links, Link 2 and Link 4, in which the number of participating slot machines has reached a predetermined value or more, are not displayed. Namely, this means that no more players can participate in Link 2 and Link 4. By displaying such screen and limiting a period of time during which a player can participate in a jackpot, it is possible to eliminate the player's feeling of unfairness in acquisition of a jackpot common to a plurality of slot machines.

Figure 53B:
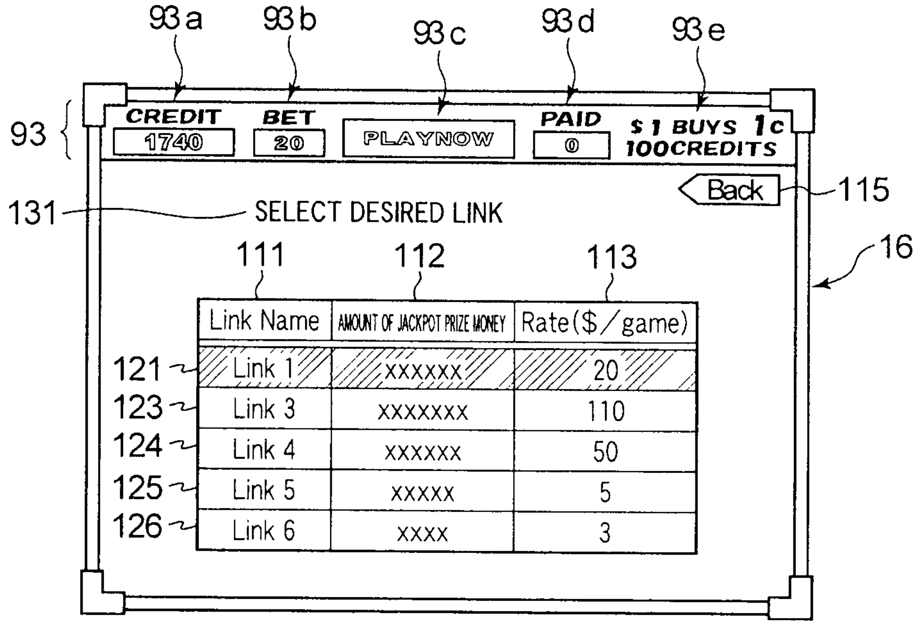
FIG. 53B is a view showing an exemplary image displaying a progressive link participant list at the slot machine.

FIG. 53B is a view showing an exemplary image displayed after the player has depressed an area, which is indicative of the participant list display icon 94*a* on the touch panel 69, after executing the standalone game in FIG. 52B. As shown in FIG. 53A, the progressive link participant list is displayed at the center of the lower image display panel 16. Here, the participation icon 121 of Link 1, which is a currently machine-participating progressive link, is displayed indicating that a slot machine participates in the link. In FIG. 53A, Link 4 which has been inactive is reactivated. This is because the number of slot machines participating in the progressive link has become less than the predetermined value. Link 2 remains inactive because the number of slot machines participating in the progressive link is the predetermined value or more.

In FIG. 53B, Link 6 is newly displayed in the progressive link participant list. Here, a new progressive link is created when the number of progressive links displayed in the progressive link participant list is smaller than the predetermined value (smaller than 3, for example). A jackpot meeting a setting condition close to that of inactive Link 2 is provided in the created progressive link, Link 6.

While, in the embodiment, a process is performed of inactivating, from the progressive link participant list, the progressive link in which the number of slot machines participating has become the predetermined value or more, the present invention is not limitative thereto in particular. For example, processing may be performed so that a progressive link, in which the number of slot machines participating has become the predetermined value or more, is displayed in the progressive link, whereas the participating icon of the progressive link is not displayed or is not activated even if the icon is depressed on the touch panel.

Next, processes executed in the slot machine 10 and the center controller 200, according to the embodiment of the present invention, will be described in detail, referring to the drawings. The main CPU 41 controls a game progress by reading and executing the game program from the RAM 43. The CPU 201 of the center controller 200 controls the entire game system by reading and executing predetermined programs.

Figure 54:
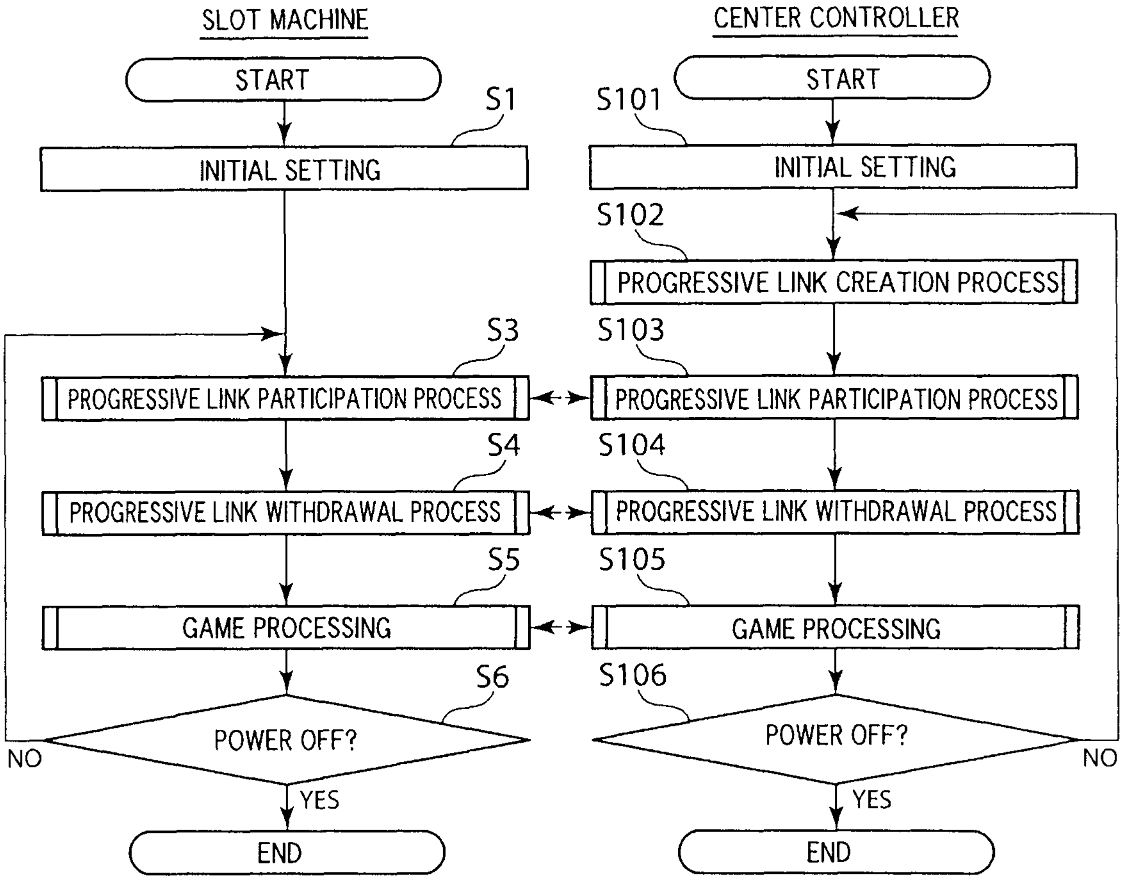
FIG. 54 is a flowchart showing a routine of main processing according to the slot machine and the center controller.

FIG. 54 is a flowchart showing a subroutine of the main processing at the slot machine 10 and the center controller 200. In the main process at the slot machine 10, first, when the power switch is turned ON (when power is supplied), the motherboard 40 and the gaming board 50 are started up, respectively, and the CPU 51 executes an initial setting process (step S1). In this initial setting process, the main CPU 41 executes the BIOS stored in the ROM 42, decompresses, in the RAM 43, the compressed data included in the BIOS; executes the BIOS decompressed in the RAM 43; and performs diagnosis and initialization of each of the peripheral devices. The main CPU 41 writes game programs or the like from memory card 53 into the RAM 43, and retrieves data for setting a payout ratio and country-identification information. The main CPU 41 also performs an authentication process for each program during execution of the initial setting process.

Figure 57:
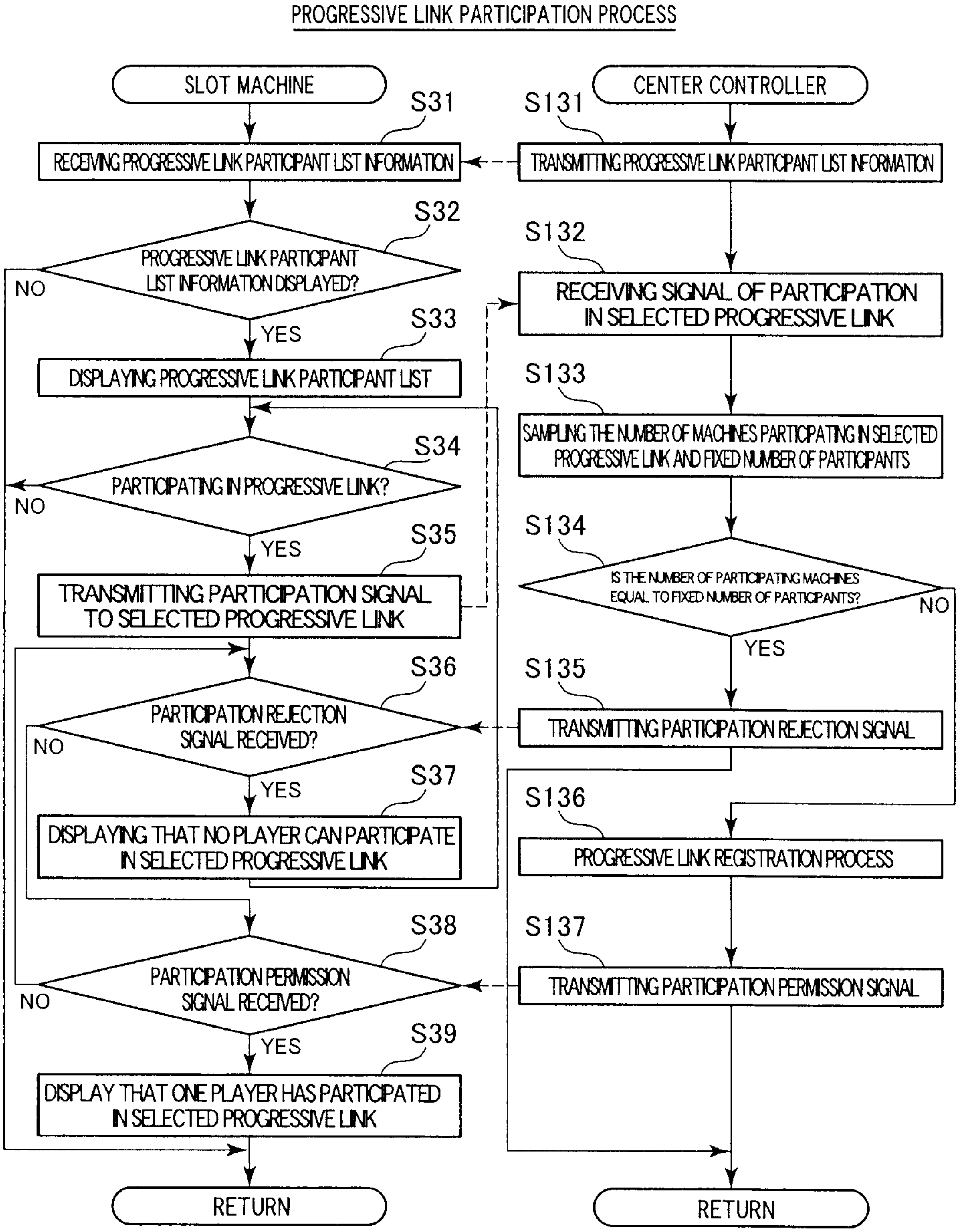
FIG. 57 is a flowchart showing a subroutine of a progressive link participation process according to the slot machine and a center controller.

The main CPU 41 performs a progressive link participation process to be described later referring to FIG. 57 (step S3). In this process, the main CPU 41 of the slot machine 10 performs a process of participating in a progressive link provided from the center controller 200. The progressive link participation process described herein is performed under cooperative operation between the main CPU 41 of the slot machine 10 and the CPU 201 of the center controller 200.

Figure 58:
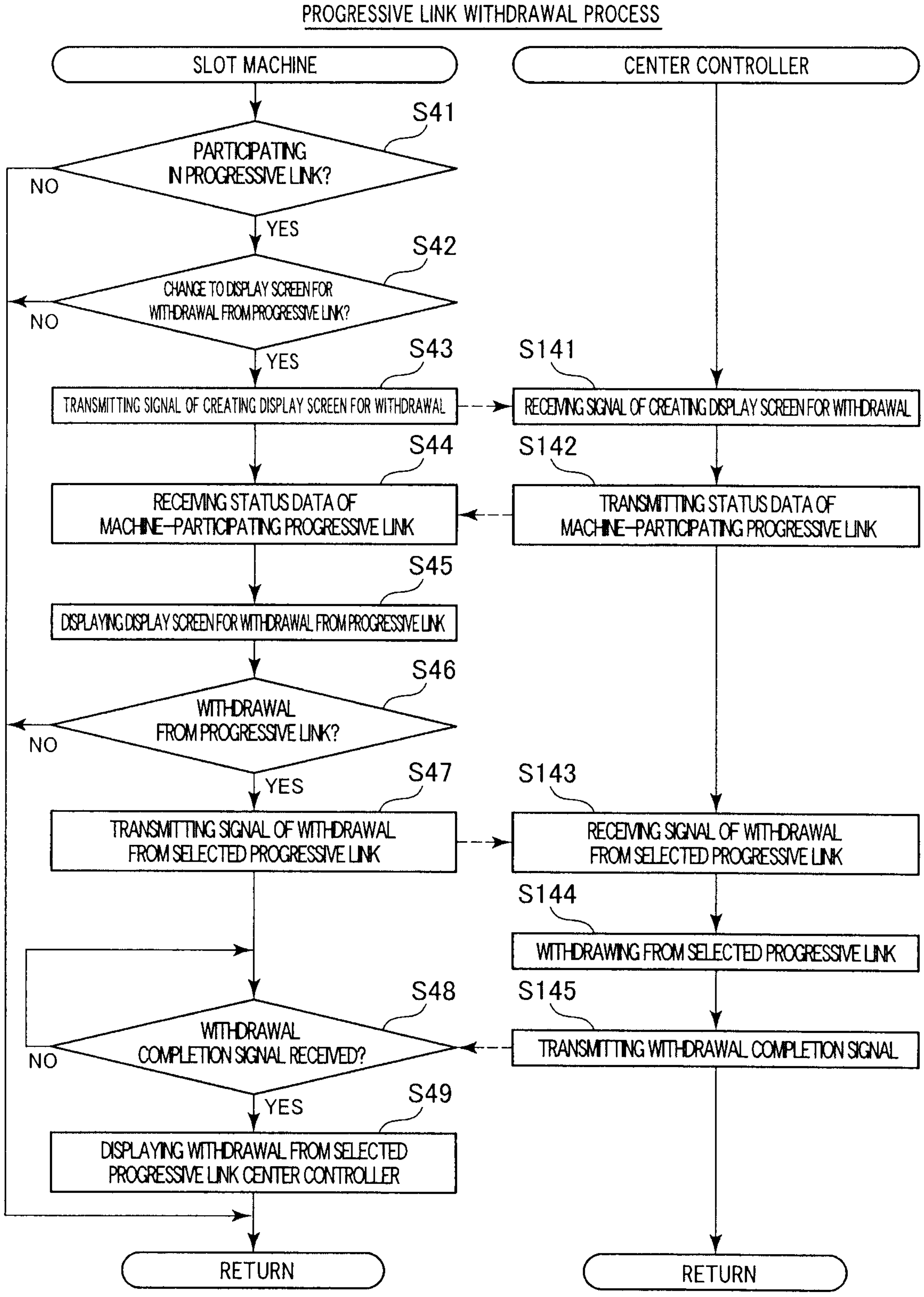
FIG. 58 is a flowchart showing a subroutine of a progressive link withdrawal process according to the slot machine and the center controller.

The main CPU 41 performs a progressive link withdrawal process to be described later referring to FIG. 58 (step S4). In this process, the main CPU 41 of the slot machine 10 performs a process of withdrawal from a machine-participating progressive link. The progressive link withdrawal process described herein is performed under cooperative operation between the main CPU 41 of the slot machine 10 and the CPU 201 of the center controller 200.

Figure 59:
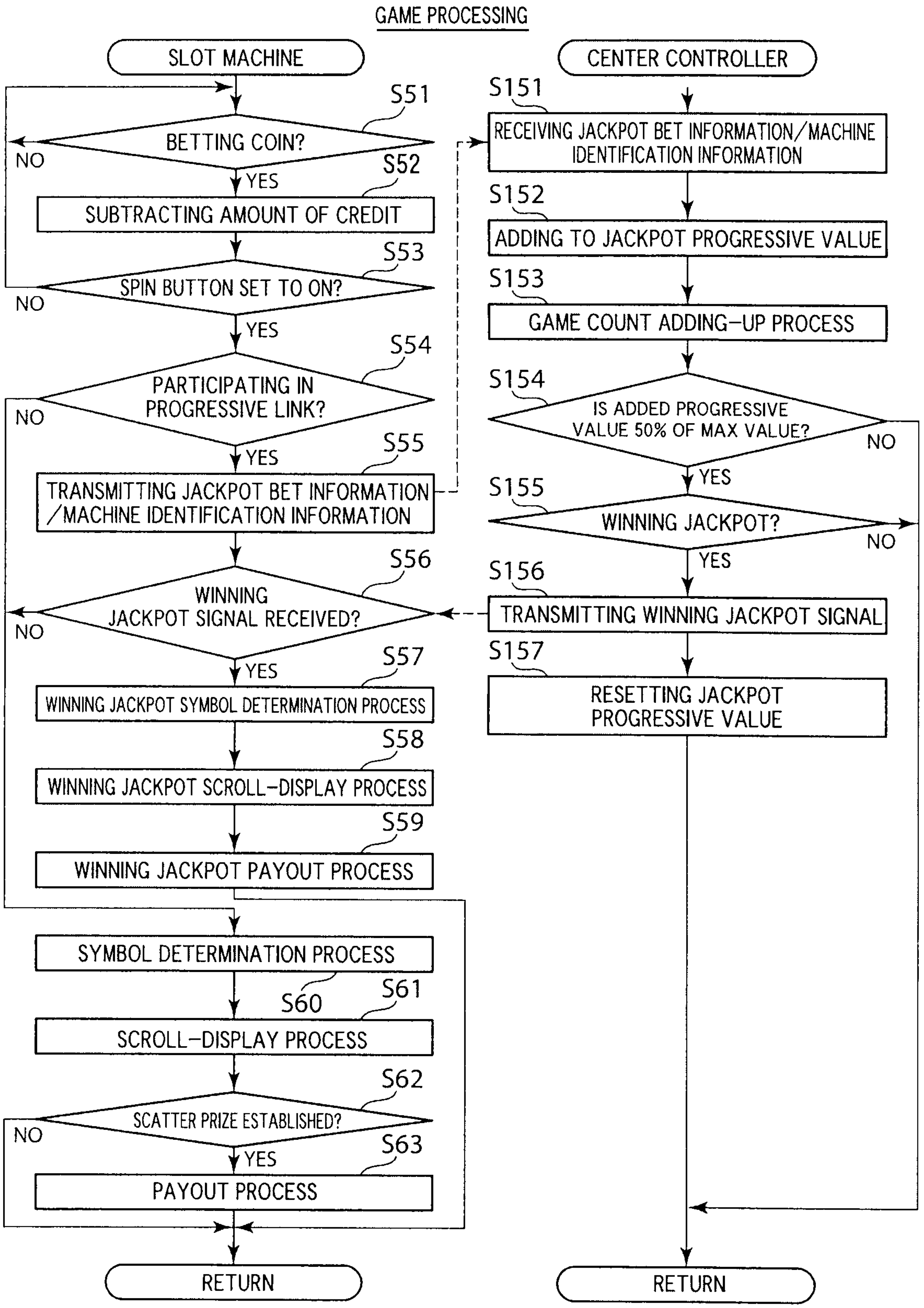
FIG. 59 is a flowchart showing a subroutine of game processing according to the slot machine and the center controller.

The main CPU 41 performs game processing to be described later referring to FIG. 59 (step S5). In the game processing, the main CPU 41 performs a process of sequentially reading and executing programs such as game programs from the RAM 43, executing a standalone game, and executing a progressive bonus game. The game processing described herein is performed under cooperative operation between the main CPU 41 of the slot machine 10 and the CPU 201 of the center controller 200. After the game processing has terminated, while power is supplied to the slot machine 10, the routine is reverted to the progressive link participation process (step S6).

In the main processing at the center controller 200, first, when the power switch is turned ON (when power is supplied), the CPU 201 executes an initial setting process (step S101). In this initial setting process, the CPU 201 executes the BIOS stored in the ROM 202; decompresses to the RAM 203 the compressed data incorporated in the BIOS; executes the BIOS decompressed to the RAM 203; and diagnoses and initializes peripherals. Further, the CPU 201 acquires identification information of a plurality of slot machines connected to the communication line, via the communication interface 204.

The main CPU 201 performs a progressive link creation process to be described later referring to FIG. 55 (step S102). In this process, the main CPU 201 performs a process of creating a progressive link provided to a slot machine 10 and constructing list data of the created progressive link.

The main CPU 201 performs a progressive link participation process to be described later referring to FIG. 57 (step S103). In this progressive link participation process, the CPU 201 affirmatively responds to whether or not to perform a process of participation in a progressive link in which the slot machine 10 participates. As described previously, the progressive participation process is performed under cooperative operation between the main CPU 41 of the slot machine 10 and the CPU 201 of the center controller 200.

The main CPU 201 performs a progressive link withdrawal process to be described later referring to FIG. 58 (step S104). In this progressive link withdrawal process, the CPU 201 affirmatively responds to whether or not to perform a process of withdrawal from a machine-participating progressive link in which the slot machine 10 participates. As described previously, the progressive link withdrawal process is performed under cooperative operation between the main CPU 41 of the slot machine 10 and the CPU 201 of the center controller 200.

The main CPU 201 performs game processing to be described later referring to FIG. 59 (step S105). In this game processing, the CPU 201 affirmatively responds to whether or to perform a game execution process that the slot machine 10 performs. As described previously, the game execution process is performed under cooperative operation between the main CPU 41 of the slot machine 10 and the CPU 201 of the center controller 200. After the game processing has terminated, while power is supplied to the slot machine 10, the routine is reverted to the progressive link creation process (step S106).

Figure 55:
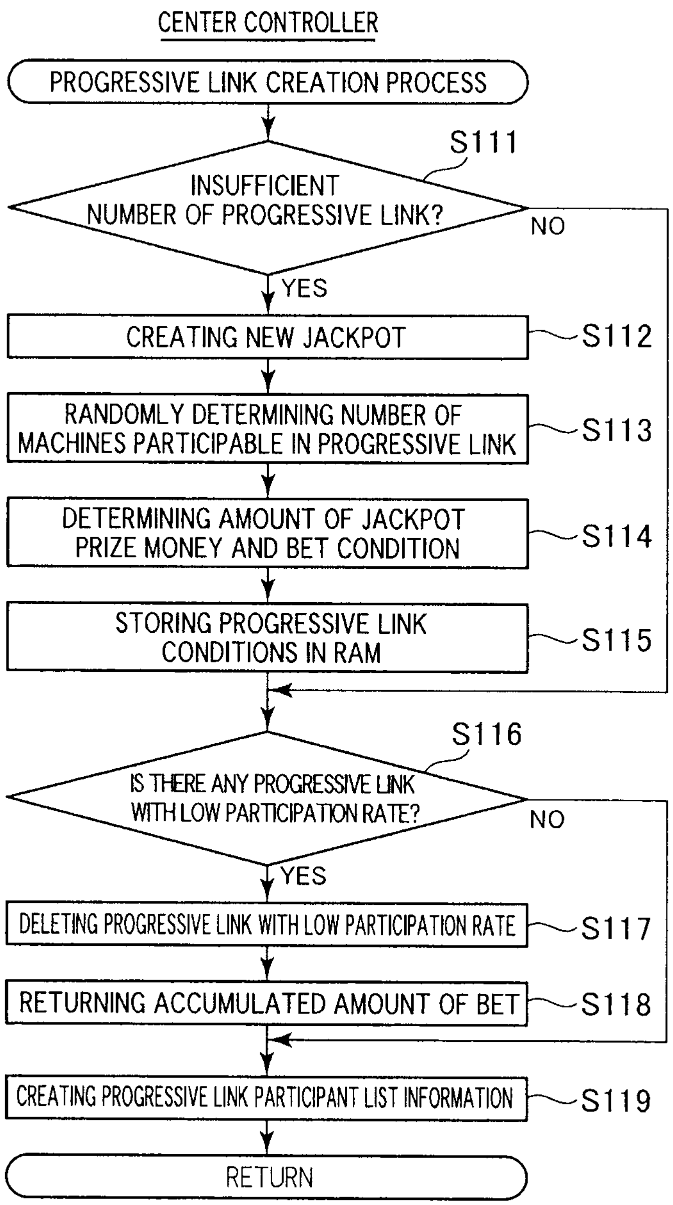
FIG. 55 is a flowchart showing a subroutine of a progressive link creation process according to the center controller.

FIG. 55 is a flowchart showing a subroutine of the progressive link creation process invoked and executed at step S102 of the subroutine in the center controller 200 shown in FIG. 54. First, at step S111, the CPU 201 of the center controller 200 judges whether the number of progressive links is insufficient. Specifically, the CPU 201 judges whether the number of progressive links is smaller than the predetermined number (smaller than 3, for example). The predetermined number is stored in the ROM 202. If the judgment result is affirmative (S111: YES), the CPU 201 proceeds to step S112, or if not (S111: NO), this CPU proceeds to step S113.

At step S112, the CPU 201 of the center controller 200 performs a process of creating a new jackpot. Specifically, the CPU 201 newly creates a jackpot so that the number of progressive links becomes a predetermined number or more (3 or more, for example) at step S111.

At step S113, the CPU 201 of the center controller 200 performs a process of randomly determining the number of machines that can participate in progressive links made up of the jackpots created at step S112.

At step S114, the CPU 201 of the center controller 200 performs a process of determining the amounts of prize money and BET conditions for the jackpots created at step S112. In this process, the CPU 201 randomly determines settings of the amounts of prize money and BET conditions for the jackpots. The jackpot condition settings in creating new jackpots at steps S113 and S114 will be described referring to FIG. 56.

At step S115, the CPU 201 of the center controller 200 stores, in the predetermined storage area of the RAM 203, the progressive link conditions determined at steps S113 and S114. In this process, first, the CPU 201 creates the storage area for the progressive link newly created in the RAM 203. Next, this CPU stores the number of machines that can participate in the progressive links determined at step S113, in an area of storing a fixed number of participants, which is provided in a storage area for the progressive links of the RAM 203. Further, this CPU stores the amounts of prize money and BET conditions for the jackpots in the progressive links determined at step S114, in a predetermined area provided in a storage area for the progressive links of the RAM 203.

At step S116, the CPU 201 of the center controller 200 judges whether there is a progressive link with a low participation rate. Specifically, the CPU 201 samples, by progressive links, the number of participable machines stored in the area of storing the fixed number of participants, of the RAM 203; and the number of currently participating machines stored in the area of storing the number of participants, of the RAM 203; computes a participation rate; and judges whether the computed participation rate is the predetermined value or less. At this time, a progressive link whose elapse of time after created is less than the predetermined time (for example, less than one hour), is not deleted. Upon judging that the participation rate is the predetermined value or less (step S117: YES), the CPU 201 proceeds to step S114, or if not (S117: NO), this CPU proceeds to step S116.

At step S117, the CPU 201 of the center controller 200 performs a process of deleting a progressive link with a low participation rate computed at step S116.

At step S118, the CPU 201 of the center controller 200 performs a process of returning to the BET-accumulated slot machine the progressive value of the jackpot in the progressive link deleted at step S117. Specifically, the CPU 201 performs a process of transmitting a signal of returning the BET-accumulated amount betted from each of the slot machines, to such each slot machine, based upon information of the RAM-stored progressive links to be deleted. The signal of returning the BET-accumulated amount is not transmitted to a slot machine which has already been withdrawn from the deleted progressive link. To the slot machine having received the signal of returning the BET-accumulated amount, the BET amount is returned in response to the information included in the signal, and the fact is displayed on the lower image display panel 16. The CPU 201 of the center controller 200 deletes the storage area for the progressive link of the RAM 203.

At step S119, the CPU 201 of the center controller 200 creates progressive link participant list information. Specifically, the CPU 201 creates the progressive link participant list information varied by means of the new jackpot creation process at step S112 and the progressive link deletion process at step S117. Specifically, the CPU 201 generates data including a list of items of progressive link information: the amount of prize money for jackpot (maximum value of the amount of payout); the minimum BET amount in one standalone game; a current progressive value; and the number of slot machines that currently participate therein, from the predetermined area in which jackpots have been stored for each of the progressive links, of the RAM 203. The updated progressive link participant list information is stored in the predetermined area of the RAM 203. After this process has terminated, the CPU terminates this subroutine.

Next, a jackpot condition setting table in creating new jackpots at steps S113 and S114, shown in FIG. 56, will be described. FIG. 56 shows the jackpot condition setting table in creating new jackpots, which is stored in the ROM 203. The progressive links are roughly divided into three patterns (A, B, C). Further, the number of progressive links belonging to these three patterns is preset, and the number of settings shown in the jackpot condition setting table is obtained as the preset value. In the embodiment, it is shown that one progressive link is set in pattern A; two in pattern B; and two in pattern C, i.e., that a total of five progressive links are provided to a slot machine 10.

At step S112, a progressive link is newly created in a pattern in which the number of the current progressive links is insufficient. For example, a description will be given by example of the progressive link participant list shown in FIG.

53A. First, the CPU 201 performs pattern classification of the current progressive links. Link 1 corresponds to pattern B; Link 2 corresponds to pattern A; and Link 3 corresponds to pattern C. Next, the number of progressive links by classified pattern is counted. Here, the number of progressive links in each pattern is counted to be one. Next, an insufficient number of progressive links is created referring to the settings of the jackpot condition setting table in FIG. 56. Here, one progressive link is assumed to be created in each of patterns B and C.

Next, a process of jackpot condition setting in each pattern will be described. In the progressive link of pattern A, the fixed number of participants (the number of participable slot machines) ranges from 101 to 500, and a large number of slot machines can participate. The CPU 201 first provides a plurality of settings ranging from 101 to 500; assigns specific numbers to the settings; and selects one or more from the settings that are the specific numbers identical to the random number values obtained after sampling and generating random numbers. In this manner, the fixed number of participants is randomly determined in the range of 101 to 500. Similarly, the CPU 201 determines the amount of prize money for a jackpot and the minimum BET amount in one standalone game.

In the progressive links of pattern A, the amount of prize money (scale) of a jackpot is set to be as high as $1,000,001 to $10,000,000. Upon determining the amount of prize money for a jackpot, the CPU 201 predetermines a plurality of settings ranging from $1,000,001 to $10,000,000; assigns specific numbers to the settings; and selects one or more the settings that are the specific numbers identical to the random number values obtained after generating and sampling random numbers. The minimum BET amount required to place a BET in a jackpot in one standalone game is set to be as high as S101 to S500. The CPU selects the minimum BET amount from the plurality of settings ranging from S101 to S500, like the amount of prize money for a jackpot. In this manner, the progressive link of pattern A is created.

The progressive link of pattern B allows the fixed number of participants (the number of participable slot machines) to be set in the range of 51 to 100, and is formed as a middle-scale progressive link. The CPU 201 first provides a plurality of settings ranging from 51 to 100; assigns specific numbers to the settings; and selects one or more from the settings that are the specific numbers identical to the random number values obtained after generating and sampling random numbers. In this manner, the fixed number of participants is randomly determined in the range of 51 to 100. Similarly, the CPU 201 determines the amount of prize money for a jackpot and minimum BET amount in one standalone game.

The progressive link of pattern B allows the amount of money prize (scale) of a jackpot to be set in the range of $100,001 to $1,000,000. Upon determining the amount of prize money for a jackpot, the CPU 201 provides a plurality of settings ranging from $100,001 to $1,000,000; assigns specific numbers to the settings; and selects one or more from the settings that are the specific numbers identical to the random number values obtained after generating and sampling the random numbers. The minimum BET amount required to place a BET in a jackpot in one standalone game ranges from $11 to $100. The CPU 201 selects the minimum BET amount from the plurality of settings ranging from $11 to $100 in the same manner as that for the amount of prize money for a jackpot. In this manner, the progressive link of pattern B is created.

The progressive link of pattern B allows the fixed number of participants (the number of participable slot machines) to be set in the range of 51 to 100, and is formed as a middle-scale progressive link. The CPU 201 first provides a plurality of settings ranging from 51 to 100; assigns specific numbers to the settings; and selects the settings that are the specific numbers identical to the random number values obtained after generating and sampling the random numbers. In this manner, the fixed number of participants is randomly determined in the range of 51 to 100. Similarly, the CPU 201 determines the amount of prize money for a jackpot and minimum BET amount in one standalone game.

In the progressive link of pattern C, the amount of prize money (scale) for a jackpot is set to be as low as $10,000 to $100,000. Upon determining the amount of prize money for a jackpot, the CPU 201 provides a plurality of settings ranging from $10,001 to $1,00,000; assigns specific numbers to the settings; and selects one or more from the settings that are the specific numbers identical to the random number values obtained after generating and sampling the random numbers. The minimum BET amount required to place a BET in a jackpot in one standalone game is as low as $1 to $10. The CPU 201 selects the minimum BET amount from a plurality of settings ranging from $1 to $10 in the same manner as that for the amount of prize money for a jackpot. Further, 101 or more gaming machines can participate in a progressive link. In this manner, the progressive link of pattern C is created.

As shown in this new jackpot creation table, the fixed number of participants is preset so that a large number of gaming machines can participate in a progressive link in accordance with the scale of the progressive value for a jackpot to be provided. Further, a plurality of jackpots are provided to the slot machines 10 so that there exists a plurality of progressive links in which large and small numbers of gaming machines can participate. Namely, by setting a small amount of slot machines which can participate in a progressive link in which the jackpot progressive value is small, it is possible to provide to the slot machines a progressive link in which only a small amount of jackpot prize money can be acquired, whereas the winning probability is high. Further, by setting a large number of slot machines which can participate in a progressive link in which the jackpot progressive value is large, a progressive link in which the winning probability is lowered can be provided to the slot machines, whereas a large amount of jackpot prize money can be acquired. In this manner, a plurality of various progressive links can be provided, making it possible to cope with the players' various needs.

Next, a progressive link participation process will be described. FIG. 57 is a flowchart showing a subroutine of the progressive link participation process invoked and executed at step S3 of the subroutine in the slot machine 10 shown in FIG. 54 or at step S103 of the subroutine in the center controller 200. The progressive link participation process described here is performed under cooperative operation between the main CPU 41 of the slot machine 10 and the CPU 201 of the center controller 200.

First, an operation of the slot machine 10 will be described. The main CPU 41 of the slot machine 10 performs the processes at steps S31 to S39 that follow. First, at step S31, the main CPU 41 of the slot machine 10 performs a process of receiving progressive link participant list information. In this process, the main CPU 41 receives the progressive link participant list information transmitted from the center controller 200, and stores the received information in the RAM 43.

At step S32, the main CPU 41 of the slot machine 10 judges whether or not to display the progressive link participant list information. In this process, the main CPU 41 causes the lower image display panel 16 to display that the progressive link participant list information has been received, and judges whether the player makes an operation, thereby performing display entry from the touch panel 69. Upon judging that the progressive link participant list information has been displayed (S32: YES), the main CPU 41 proceeds to step S33, or if not (S32: NO), the CPU terminates this subroutine.

At step S33, the main CPU 41 of the slot machine 10 causes the lower image display panel 16 to display the progressive link participant list information received at step S31.

At step S34, the main CPU 41 of the slot machine 10 judges whether or not to participate in a progressive link. In this process, the main CPU 41 judges whether the player makes an operation, thereby performing participation entry from the touch panel 69. When the judgment result is affirmative (step S34: YES), the main CPU 41 proceeds to step S35, or if not, the main CPU terminates this subroutine.

At step S35, the main CPU 41 of the slot machine 10 performs a process of transmitting a participation signal to the progressive link selected at step S34. In this process, the main CPU 41 transmits the code and machine identification information of the selected progressive link to the center controller 200.

At step S36, the main CPU 41 of the slot machine 10 judges whether a participation rejection signal has been received from the center controller 200. In this process, the main CPU 41 judges whether the participation rejection signal has been received in response to the progressive link participation signal transmitted to the center controller 200 at step S35. In a case where the participation rejection signal has been received (step S36: YES), the main CPU 41 proceeds to step S37, or if not (S36: NO), the main CPU proceeds to step S38.

At step S37, the main CPU 41 of the slot machine 10 performs a process of causing the lower image display panel 16 to display that no one could participate in the progressive link selected at step S35. After this process has terminated, the main CPU proceeds to step S33.

At step S38, the main CPU 41 of the slot machine 10 judges whether a participation permission signal has been received from the center controller 200. In this process, the main CPU 41 judges whether the participation permission signal has been received in response to the progressive link participation signal transmitted to the center controller 200 at step S35. Upon receipt of the participation rejection signal (S38: YES), the main CPU 41 proceeds to step S37, or if not (S38: NO), the main CPU proceeds to step S36.

At step S39, the main CPU 41 of the slot machine 10 performs a process of causing the lower image display panel 16 to display participation in the progressive link selected at step S35. After this process has terminated, the main CPU terminates this subroutine.

Next, an operation of the center controller 200 will be described. The CPU 201 of the center controller 200 performs the processes at steps S131 to S137 that follow. At step S131, the CPU 201 of the center controller 200 transmits the progressive link participant list information to the slot machine. In this process, the CPU 201 transmits to each of the slot machines 10 the progressive link participant list information created in the progressive link creation process mentioned previously.

At step S132, the CPU 201 of the center controller 200 performs a process of receiving the progressive link participation signal transmitted from the slot machine at step S35. In this process, the CPU 201 receives the code and machine identification information of the selected progressive link, which have been transmitted from the slot machine 10 at step S35.

At step S133, the CPU 201 of the center controller 200 performs a process of sampling from the RAM 203 the number of slot machines participating in the selected progressive link and the fixed number of participants. In this process, referring to the code of the progressive link received at step S132, the CPU 201 samples the number of currently participating slot machines from an area of storing the number of participants in the progressive link indicated by the code stored in the RAM 203 and the fixed number of participants from an area of storing the fixed number of participants.

At step S134, the CPU 201 of the center controller 200 judges whether the number of currently participating slot machines sampled at step S133 has reached the sampled fixed number of participants. When the judgment result is affirmative (S134: YES), the CPU 201 proceeds to step S135, or if not (S134: NO), the CPU proceeds to step S136.

At step S135, the CPU 201 of the center controller 200 transmits a participation rejection signal to the slot machine having transmitted the participation signal. This participation rejection signal includes data indicating that no one could participate in the progressive link selected at step S34.

At step S136, the CPU 201 of the center controller 200 performs a process of registering the slot machine having transmitted the participation signal in the progressive link selected at step S34. In this process, the CPU 201 specifies a participating progressive link from the code of the progressive link received at step S132 or specifies the participating slot machine 10 from the machine identification information received at step S132 and registers the specified slot machine in the specified progressive link. The CPU 201 creates a storage area for a newly participating slot machine 10 in an area of storing information of the progressive link of the RAM 203. The above storage area stores BET information indicative of the fact the slot machine 10 has placed a BET in a jackpot or the game count of the standalone game in which a payment has been made for a progressive bonus game.

At step S137, the CPU 201 of the center controller 200 transmits a participation permission signal to a slot machine having transmitted a participation signal. This participation permission signal includes data indicative of participation in the progressive link selected at step S34 and data indicative of a BET condition for the progressive link. After this process has terminated, the CPU terminates this subroutine.

Next, a progressive link withdrawal process will be described. FIG. 58 is a flowchart showing a subroutine of the progressive link withdrawal process invoked and executed at step S4 of the subroutine in the slot machine 10 shown in FIG. 54 or at step S104 in the center controller 200. The progressive link withdrawal process described here is performed under cooperative operation between the main CPU 41 of the slot machine 10 and the CPU 201 of the center controller 200.

First, an operation of the slot machine 10 will be described. The main CPU 41 of the slot machine 10 performs the processes at steps S41 to S49 that follow. At step S41, the main CPU 41 of the slot machine 10 judges whether or not to participate in a progressive link. In this process, the main CPU 41 judges whether there is subscriber information which is inclusive of the BET condition for the progressive link stored in the RAM 43. When the judgment result is affirmative (S41: YES), the CPU 41 proceeds to step S42, or if not (S41: NO), the CPU terminates this subroutine.

At step S42, the main CPU 41 of the slot machine 10 judges whether or not to change to the display screen for progressive link withdrawal. In this process, the main CPU 41 judges whether the player makes an operation, thereby performing withdrawal display entry from the touch panel 69. When the judgment result is affirmative (S42: YES), the CPU 41 proceeds to step S43, or if not (S42: NO), the CPU terminates this subroutine.

At step S43, the main CPU 41 of the slot machine 10 performs a process of transmitting to the center controller 200 a display screen creation signal for progressive link withdrawal.

At step S44, the main CPU 41 of the slot machine 10 receives from the center controller 200 status data of a progressive link in which a slot machine 19 participates. The items of the status data of this progressive link includes: an accumulative BET amount which the slot machine 10 has betted in a jackpot so far; the game count of the standalone game in which a payment has been made for a progressive link game (hereinafter, referred to as "game count"); and the current progressive value of a jackpot.

At step S45, the main CPU 41 of the slot machine 10 performs a process of causing the lower image display panel 16 to display the status data, which was received at step S44, of a progressive link in which the slot machine 10 participates.

At step S46, the main CPU 41 of the slot machine 10 judges whether or not to withdraw from a progressive link. In this process, the main CPU 41 judges whether the player makes an operation, thereby performing withdrawal entry from the touch panel 69. When the judgment result is affirmative (S46: YES), the CPU 41 proceeds to step S47, or if not (S46: NO), the CPU terminates this subroutine.

At step S47, the main CPU 41 of the slot machine 10 performs a process of transmitting a withdrawal signal of the progressive link selected at step S46. In this process, the main CPU 41 transmits to the center controller 200 the code and machine identification information of the selected progressive link.

At step S48, the main CPU 41 of the slot machine 10 judges whether a withdrawal completion signal transmitted from the center controller 200 has been received. When the judgment result is affirmative (S48: YES), the CPU 41 proceeds to step S49, or if not (S48: NO), the CPU reverts to step S48 at which a standby state is established until it is judged that the withdrawal completion signal has been received. If a standby state is established for a predetermined time, a withdrawal signal of the selected progressive link is canceled, and the display screen for progressive link withdrawal is redisplayed on the lower image display panel 16.

At step S49, the main CPU 41 of the slot machine 10 performs a process of causing the lower image display panel 16 to display withdrawal from the progressive link selected at step S46. After this process has terminated, the main CPU terminates this subroutine.

Next, an operation of the center controller 200 will be described. The CPU 201 of the center controller 200 performs processes at step S141 to S145 that follow. First, at step S141, the CPU 201 of the center controller 200 performs a process of receiving a withdrawal display screen creation signal transmitted from the slot machine at step S43. This withdrawal display screen creation signal includes the code of specifying a progressive link in which the transmitting slot machine participates and machine identification information.

At step S142, the CPU 201 of the center controller 200 performs a process of sampling information of a progressive link in which the transmitting slot machine 10 participates from the withdrawal display screen creation signal received at step S41 and transmitting the sampled information as status data to the slot machine 10. In this process, the CPU 201 samples the information of the progressive link in which the slot machine 10 participates, the information being stored in the RAM 203, from the code of specifying the progressive link and machine identification information, which were received at step S41. The items of the progressive link information to be sampled include current data of progressive links: an accumulative BET amount which the slot machine 10 has betted in a jackpot so far; a game count; and the current progressive value of the jackpot.

At step S143, the CPU 201 of the center controller 200 performs a process of receiving a progressive link withdrawal signal transmitted from the slot machine at step S47. In this process, the CPU 201 receives the code and machine identification information of the selected progressive link, transmitted from the slot machine 10 at step S44.

At step S144, the CPU 201 of the center controller 200 performs a process of withdrawing the corresponding slot machine from the selected progressive link, based upon the progressive link withdrawal signal received at step S143. In this process, the CPU 201 performs a process of specifying a progressive link to be withdrawn from the code of the selected progressive link, specifying a participating slot machine 10 from the received machine identification information, and withdrawing the registered slot machine 10. Further, the CPU 201 deletes a storage area for the slot machine 10 to be withdrawn, included in an area of storing information of the progressive link of the RAM 203.

At step S145, the CPU 201 of the center controller 20 performs a process of transmitting to a slot machine 10 having transmitted a withdrawal signal, a withdrawal completion signal which is indicative of termination of a process of withdrawal from the progressive link processed at step S144. After this process has terminated, the CPU terminates this subroutine.

Next, game processing will be described. FIG. 59 is a flowchart showing a subroutine of the game processing invoked and executed at step S5 of the subroutine in the slot machine 10 shown in FIG. 54 or at step S105 of the subroutine in the center controller 200. The game processing described here is performed under cooperative operation between the main CPU 41 of the slot machine 10 and the CPU 201 of the center controller 200.

The main CPU 41 of the slot machine 10 performs processes at step S51 to S63 that follow. At step S51, the main CPU 41 judges whether coins have been betted. In this process, the main CPU 41 judges whether an input signal output from a 1-BET switch 26S when a 1-BET button 26 is operated or that output from a MAX-BET switch 27S when a MAX-BET button 27 is operated has been received. If it is judged that no coin has been betted, the main CPU 41 reverts to step S51, or when it is (S51: YES), the main CPU proceeds to step S52.

Upon judging that coins have been betted at step S51, the main CPU 41 of the slot machine 10 performs a process of subtracting the amount of credit stored in the RAM 43 in response to the number of betted coins at step S52. Further, the main CPU 41 stores in the RAM 43 the amount of credit after subtracted.

At step S53, the main CPU 41 of the slot machine 10 judges whether the SPIN button 23 has been set to ON. Specifically, the main CPU 41 judges whether the input signal outputted from the SPIN switch 23S has been received when the SPIN button 23 has been depressed. Upon judging that the SPIN button 23 has not been set to ON (S53: NO), the main CPU 41 reverts to step S51, or upon judging that the SPIN button 23 has been set to ON (S53: YES), the main CPU proceeds to step S54. Upon judging that the SPIN button 23 has not been set to ON (for example, if an instruction for terminating a game has been entered without the SPIN button 23 being set to ON), the main CPU 41 cancels subtraction of the amount of credit at step S52.

At step S54, the main CPU 41 of the slot machine 10 judges whether any slot machine participates in a progressive link. Specifically, the main CPU 41 judges whether BET condition data for the received machine-participating progressive link is present in a predetermined area of the RAM 43 in the progressive link participation process performed in FIG. 57 described previously. When the judgment result is affirmative (S54: YES), the main CPU 41 proceeds to step S55, or if not (S54: NO), the main CPU proceeds to step S60.

At step S55, the main CPU 41 of the slot machine 10 transmits to the center controller 200: the BET amount to be betted in a jackpot among the number of coins betted at step S51; and identification information of the slot machines 10 stored in the ROM 42.

At step S56, the main CPU 41 of the slot machine 10 judges whether the winning jackpot signal has been received. The center controller 200 selects a slot machine which acquires a jackpot from among a plurality of slot machines participating in a progressive link, and transmits a winning jackpot signal to only the selected slot machine. Namely, only a slot machine which has acquired a jackpot can receive a winning jackpot signal. Upon judging that the winning jackpot signal has been received (S56: YES), the main CPU 41 proceeds to step S57, or if not (S56: NO), the main CPU proceeds to step S60.

At step S57, the main CPU 41 of the slot machine 10 performs a jackpot symbol determination process. Specifically, upon judging that the SPIN button 23 has been set to ON at step S53, the main CPU 41 executes the symbol determination program stored in the RAM 43, or when it is triggered that the winning jackpot signal has been received at step S56, the main CPU determines code No. which is indicative of a winning jackpot established when symbols are in a stopped state.

At step S58, the main CPU 41 of the slot machine 10 performs a scroll-display process. Specifically, the main CPU 41 controls a display so that scroll-display of plural types of symbols is started, and symbols indicated by code Nos. indicative of the winning jackpot determined at step S57 are displayed in a stopped state in the symbol matrix 28 concurrently with stoppage of scroll-display after an elapse of a predetermined time.

At step S59, the main CPU 41 of the slot machine 10 performs a winning jackpot payout process. Specifically, the main CPU 41 pays out coins based upon the payout amount included in the winning jackpot signal received at step S56.

At step S60, the main CPU 41 of the slot machine 10 performs a symbol determination process. Specifically, upon judging that the SPIN button 23 has been set to ON at step S53, the main CPU 41 executes the symbol determination program stored in the RAM 43, thereby determining code No. when symbols are in a stopped state. The present embodiment describes a case of determining symbols to be displayed in a stopped state, thereby determining one or more prizes from among plural types of prizes. However, the present invention is not limitative thereto, and, for example, may be applicable to a case in which one or more prizes selected from among the plural types of prizes are determined, and thereafter, the combinations of symbols displayed in a stopped state are determined based upon the above-mentioned prizes.

At step S61, the main CPU 41 of the slot machine 10 performs a scroll-display process. Specifically, the main CPU 41 controls a display so that scroll-display of plural types of symbols is started, and symbols indicated by code Nos. determined at step S60 are displayed in a stopped state in the symbol matrix 28 concurrently with stoppage of scroll-display after an elapse of a predetermined time.

At step S62, the main CPU 41 of the slot machine 10 judges whether a scatter prize is established. Specifically, the main CPU 41 judges whether three or more trigger symbols for a scatter prize are displayed in a stopped state in any of the symbol matrix 28 and the scatter prize is established. Upon judging that the scatter prize is established (S62: NO), the main CPU 41 proceeds to step S63 at which a coin payout process is to be performed, or if not (S62: NO), the main CPU terminates this subroutine without performing coin payout.

If the main CPU 41 judges that no winning jackpot signal has been received (S56: NO) and that no scatter prize is established (S62: NO), it is determined to be a “loser”. The word “loser” used herein denotes a case in which no coin payout is performed.

Next, an operation of the center controller 200 will be described. The CPU 201 of the center controller 200 performs processes at step S151 to S157 that follow. At step S151, the CPU 201 receives the jackpot BET information and machine identification information, transmitted from the slot machine 10 at step S55 mentioned above. After that, the CPU 201 stores the jackpot BET amount to the RAM 203, based upon the received jackpot BET information. The RAM 203 stores the jackpot BET amount by slot machine 10, and the CPU 201 stores the jackpot BET amount in a storage area of the corresponding slot machine 10 of the RAM 203, based upon machine identification information. Further, the CPU 201 receives the machine identification information transmitted from the slot machine 10 at step S55 mentioned above, and stores the received game count in a predetermined storage area of the RAM 203. The RAM 203 stores the game count by slot machine 10, and the CPU 201 stores the game count in a storage area of the corresponding slot machine 10 of the RAM 203, based upon the machine identification information.

At step S152, the CPU 201 of the center controller 200 performs a process of adding to a jackpot progressive value. Specifically, the CPU 201 performs a process of adding up respective one of the jackpot BET amounts of slot machines 10, stored in the RAM 203, and adds up the jackpot BET amounts of all of the slot machines participating in progressive links, and stores the added up progressive value in the RAM 203. For example, assuming that two slot machines 10 participate in a progressive link, if the jackpot BET numbers invested by the two slot machines 10 are 500 and 300, respectively, the center controller 200 adds up these BET numbers (500+300), and stores the added-up progressive value of “800” in the RAM 203.

At step S153, the CPU 201 of the center controller 200 performs a game count adding up process. Specifically, the CPU 201 performs a process of adding up respective ones of the game counts of slot machines, stored in the RAM 203 at step S151 mentioned above, and stores, in the RAM 203, an added-up value of the total games of all of the slot machines participating in progressive links. For example, if the game counts of two slot machines 10 are 10 and 25, respectively, the center controller 200 adds up these game counts (10+25), and stores the added up value of “35” in the RAM 203.

At step S154, the CPU 201 of the center controller 200 judges whether the progressive value added at step S152 reaches 50% of the maximum value of jackpot payout set at the progressive link creation process mentioned above. For example, when the maximum value of jackpot payout is set at $1,000,000, the CPU 201 judges whether the progressive value stored in the RAM 203 is $500,000 or more. Upon judging that the progressive value reaches 50% of the maximum value of jackpot payout (S154: YES), the CPU 201 proceeds to step S155, or if not (S154: NO), the CPU terminates this subroutine.

At step S155, the CPU 201 of the center controller 200 judges whether a winning jackpot is established. Specifically, the CPU 201 assigns a specific number to a slot machine having transmitted jackpot BET information and machine identification information at step S55, and samples random numbers from predetermined numeric range including the specific number. After that, the CPU 201 judges whether one of the sampled random numbers coincides with the specific number. Upon judging that the winning jackpot is established (S155: YES), the CPU 201 proceeds to step S156, or if not (S155: NO), the CPU terminates this subroutine.

At step S156, the CPU 201 of the center controller 200 transmits a winning jackpot signal. Specifically, when one of the random numbers sampled at step S155 coincides with the specific number, the CPU 201 transmits the winning jackpot signal as the winning jackpot to the slot machine to which the specific number has been assigned.

At step S157, the CPU 201 of the center controller 200 resets the jackpot progressive value. Specifically, the CPU 201 resets: the progressive value of a winning jackpot, stored in the RAM 203; the jackpot BET amount by slot machine 10; total game count; and the value of game count by slot machine 10. After this process has terminated, the CPU terminates this subroutine.

According to the embodiment of the present invention, a game system and gaming machine can be provided which eliminates the feeling of unfairness in acquisition of jackpot progressive bonuses accumulated by BET operation of a plurality of slot machines, by limiting the number of machines participable in a jackpot.

Other Embodiment

Figure 60:
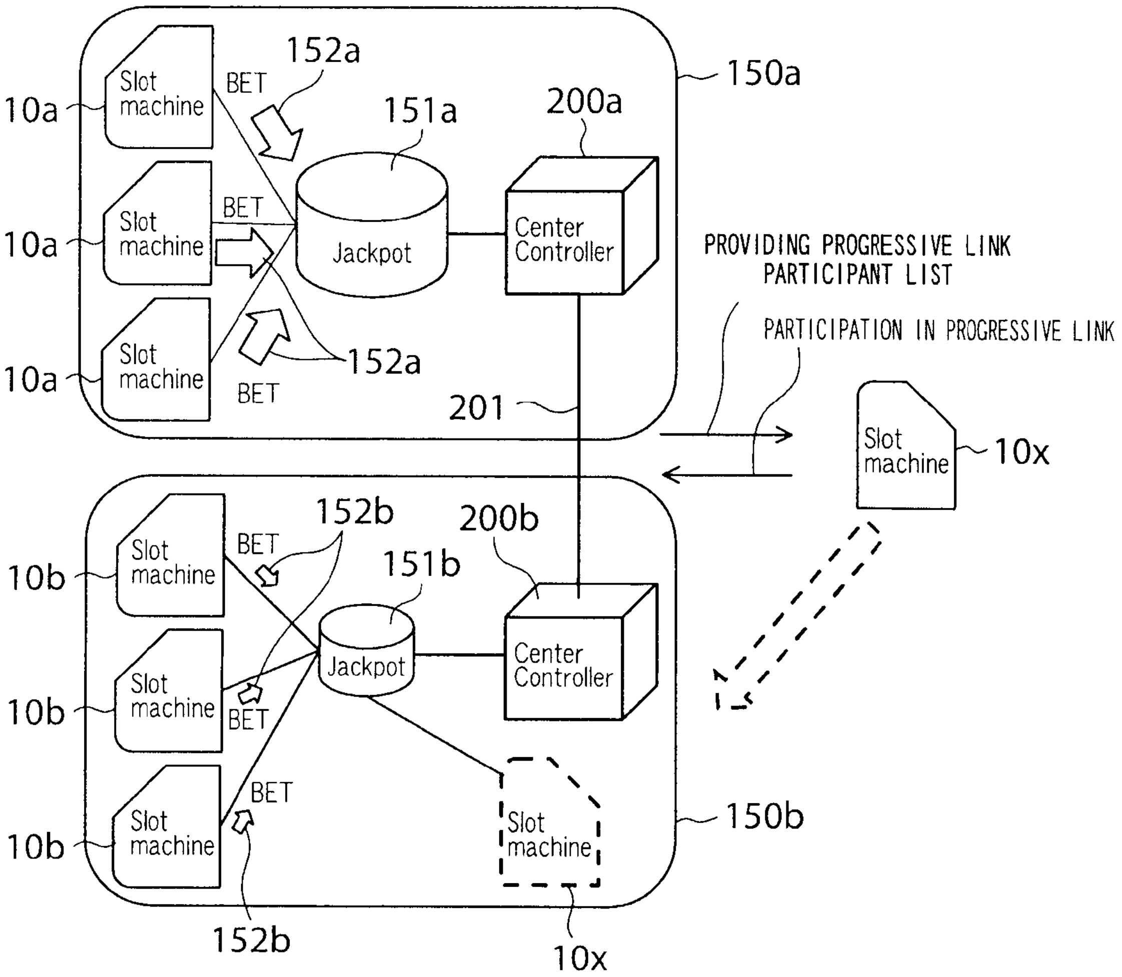
FIG. 60 is a schematic view showing a configuration of progressive links controlled by a plurality of center controllers according to an alternate embodiment.

Next, a configuration of progressive links in an alternate embodiment of the present invention will be described. FIG. 60 is a schematic view showing the configuration of the progressive links controlled by a plurality of center controllers 200. A center controller 200*a* provides a jackpot 151*a*, and controls a slot machine 10*a* participating in the jackpot 151*a*. Further, another center controller 200*b* provides a jackpot 151*b*, and controls a slot machine 10*b* participating in the jackpot 151*b*. The center controllers 200*a* and 200*b* exchange information by means of a communication line, and shares information of the entire game system 100.

Hereinafter, a description will be given by way of example in which one of the plurality of center controllers 200, i.e., the center controller 200*a* controls the entire game system 100.

The center controller 200*a* stores information in the storage area for each of the center controllers provided in a RAM 203*a*, the information including setting conditions for jackpots 151 provided from the plurality of center controller 200 or the number of slot machines currently participating in the progressive links 150. The center controller 200*a* grasps the number of progressive links exiting in the game system 100. If it is smaller than a predetermined number, this center controller newly creates a jackpot, and performs control to maintain the number at the predetermined number or more. At this time, the above center controller transmits a signal of causing a center controller, which does not create a progressive link, to newly create a jackpot. The table described in FIG. 56 may be employed as to jackpot condition setting at the time of newly creating a jackpot.

The center controller 200*a* makes a search for a progressive link 150 with a low participation rate from the progressive links existing in the game system 100. If the participation rate is a predetermined value or less, this center controller transmits a signal of deleting the progressive link 150 to a center controller 200 which controls the progressive link 150. The center controller 200*a* creates a participant list of progressive links, which serves as a list of existing progressive links, the list including the newly created and deleted progressive links 150. The center controller provides the participant list of the created progressive links to each of the slot machines 100 via a network.

Players participating in progressive links can participate in jackpots meeting their needs while verifying the progressive link participant list displayed at the slot machine 10. Hereinafter, a description will be given by way of example in which a slot machine 10*x* failing to participate in any of the progressive links, participate in the progressive link 150*b*. The center controller 200*a* receives a progressive link participation signal transmitted from the slot machine 10*x*, and verifies the code of a participating progressive link, included in the signal. The center controller 200*a* transfers the progressive link participation signal transmitted from the slot machine 10*x*, to the center controller 200*b* that controls the progressive link 150*b* corresponding to the verified code.

The center controller 200*b* receives the progressive link participation signal from the slot machine 10*x*, the signal having been transmitted from the center controller 200*a*. This center controller samples the number of slot machines (fixed number of participants) that are participable in the progressive link 150*b* and stored in an area of storing the fixed number of participants in the RAM 203. Further, the above center controller judges whether the number of slot machines currently participating in the progressive link 150*b* reaches the fixed number of participants. If the number of slot machines currently participating in the progressive link 150*b* reaches the fixed number of participants, the center controller 200*b* transmits a participation rejection signal to the slot machine 10*x*. If not, this center controller registers the slot machine 10*x* in the progressive link 150*b*, and transmits a participation permission signal to the slot machine 10*x*. Therefore, a slot machine 10 cannot newly participate in the progressive link 150*b* in which the number of currently participating slot machines reaches the fixed number of participants.

If a slot machine 10*c* participating in a progressive link 150*c* attempts to participate in the progressive link 150*b*, the center controller 200*c* receives the progressive link participation signal transmitted from the slot machine 10*c*, and verifies the code of the participating progressive link, included in the signal. The center controller 200*c* transfers the progressive link participation signal transmitted from the slot machine 10*x*, to the center controller 200*b* that controls the progressive link 150*b* corresponding to the verified code.

Each of the center controllers 200 controls participation in, and withdrawal from, each of the progressive links 150, and further, controls a progressive bonus game process executed in each of the progressive links 150. Namely, each of the center controllers 200 individually executes a process requiring control of the entire game system 100.

According to the alternate embodiment described in FIG. 60, it is possible to perform a process of controlling progressive links by center controllers with the use of a plurality of center controllers, and disabling a slot machine 10 to newly participating in a progressive link in which the number of currently participating slot machines reaches the fixed number of participants. Therefore, a game system and gaming machine can be provided which eliminates the feeling of unfairness in acquisition of jackpot progressive bonuses accumulated by BET operation of a plurality of slot machines, by limiting the number of machines participable in a jackpot. Further, a smoothly playable game system can be provided which allows distributed processing for a simultaneous request from a number of gaming machines and avoids congestion associated with a communication line.

While the embodiment described a case in which the plurality of slot machines 10, the center controller 200, and the common display device 300 are connected via a wire, the present invention is not limitative thereto. Data may be transmitted or received wirelessly. In other words, the communication lines according to the present invention include wired and wireless transmission channels.

While the embodiment described a case in which the game system 100 is installed in one gaming facility, the slot machines 10 may be installed separately in other gaming facilities in the present invention.

While the embodiment described a case in which slot machines are employed as gaming machines, card game machines may be employed in the present invention.

Eighth Embodiment

Figure 61A:
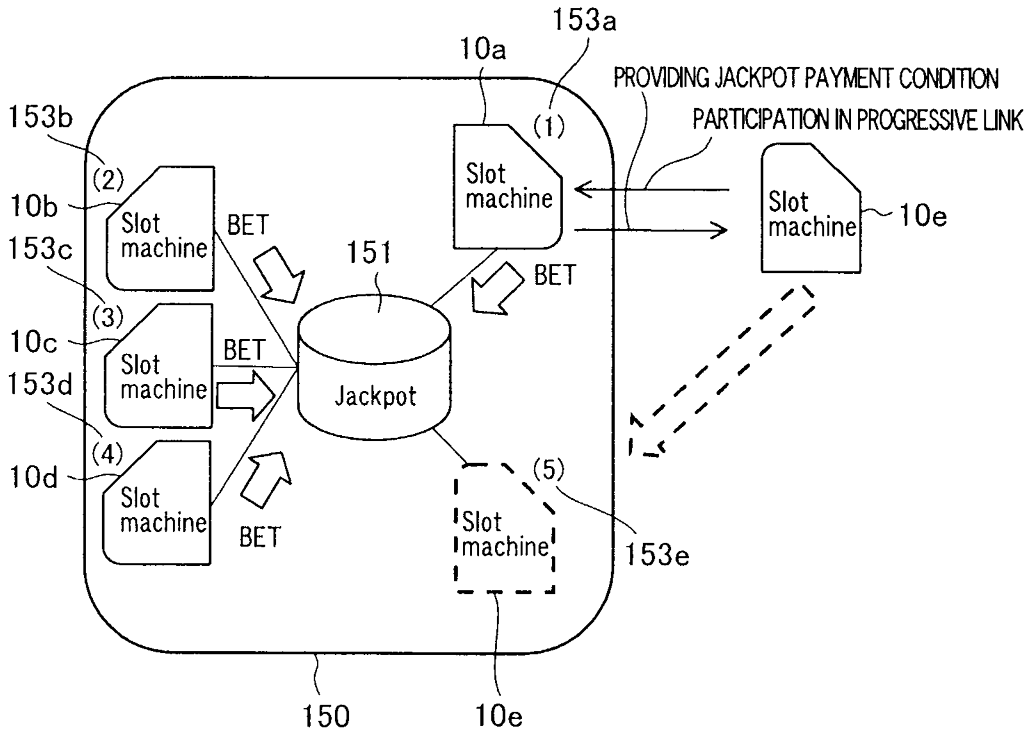
FIG. 61A is an explanatory view schematically showing an interrelationship between a plurality of slot machines sharing a jackpot.

A link system of the present invention will be described in detail, referring to the drawings. As shown in FIG. 61A, a plurality of slot machines 10*a*, 10*b*, 10*c*, 10*d* share a jackpot 151, and form a progressive link 150. The progressive link 150 sharing the jackpot is controlled by means of one host slot machine (hereinafter, referred to as the slot machine 10*a*) selected from among the slot machines belonging to the progressive link 150.

Figure 61B:
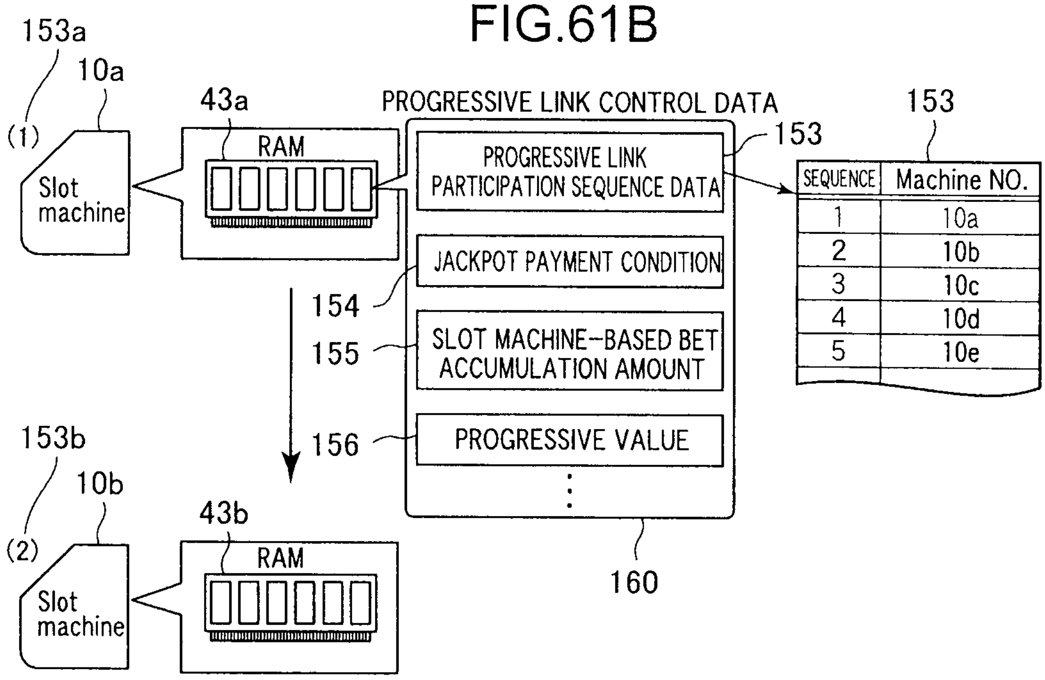
FIG. 61B is an explanatory view schematically showing the contents of a process of transmitting progressive link control data to a slot machine as a next host slot machine, the process being performed when a slot machine as a current host slot machine withdraws from a progressive link.

When the host slot machine 10*a* withdraws from the progressive link 150, a main CPU 41 of the slot machine 10*a* judges whether or not there exists a slot machine having participated in the progressive link that follows the slot machine 10*a*, referring to progressive link participation sequence data stored in a RAM 43. When the judgment result is affirmative, that slot machine is determined as a next host slot machine. As shown in FIG. 61B, progressive link control data 160 is transmitted to a slot machine 10*b* determined as the next host slot machine. Having thus received the progressive link control data 160, the next host slot machine 10*b* stores the progressive link control data in the RAM 43*b*. Further, the host slot machine starts control of another slot machine participating in the progressive link 150.

The stored progressive link control data 160 includes data such as: progressive link participation sequence data 153 which is participation sequence data; a jackpot payment condition 154; a slot machine-based BET accumulation amount 155; and a progressive value 156 of the jackpot 151 which is game history data. The progressive link participation sequence data 153 is stored in association with identification information of slot machines 10 in sequence of participation in the progressive link 150. Here, data is stored which is indicative of the slot machine 10*a* in response to sequence 1 indicating that a first slot machine has participated in the progressive link 150, and similarly, data is stored which is indicative of the slot machine 10*b* in response to sequence 2.

Figure 62:
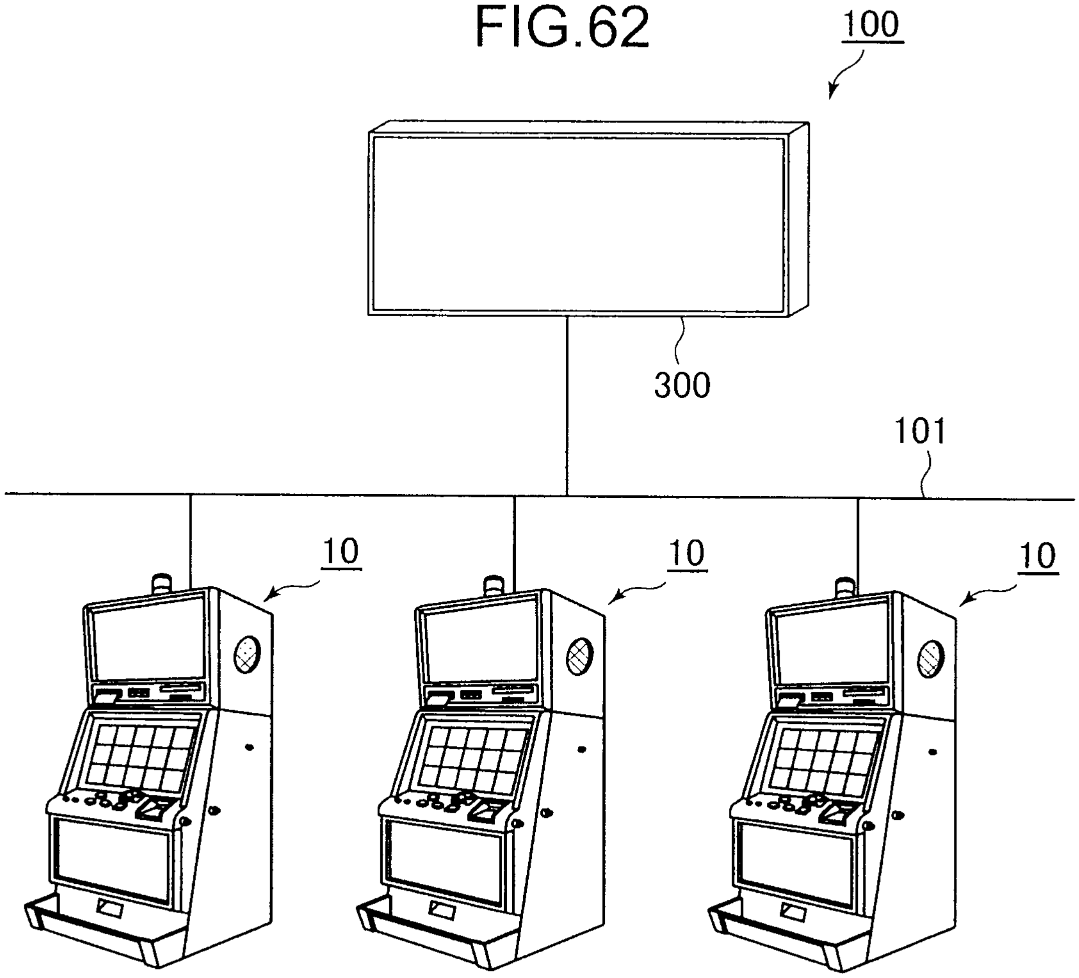
FIG. 62 is a schematic view showing an entire configuration of a game system.

Next, an entire configuration of a link system 100 in the embodiment will be described. FIG. 62 is a schematic view showing the entire configuration of the link system. As shown in FIG. 62, the link system 100 is provided with a plurality of slot machines 10 and a common display device 300.

The plurality of slot machines 10 and the common display device 300 are connected via a communication line 101. The plurality of slot machines 10 and the common display device 300 can receive/transmit data from/to each other via the communication line 101. The plurality of slot machines 10 are connected communicable with each other via the communication line 101.

The common display device 300 is intended for displaying the amount of prize money for a progressive link jackpot to be described later, and is installed at a position visible from the players at the plurality of slot machines 10.

Figure 63:
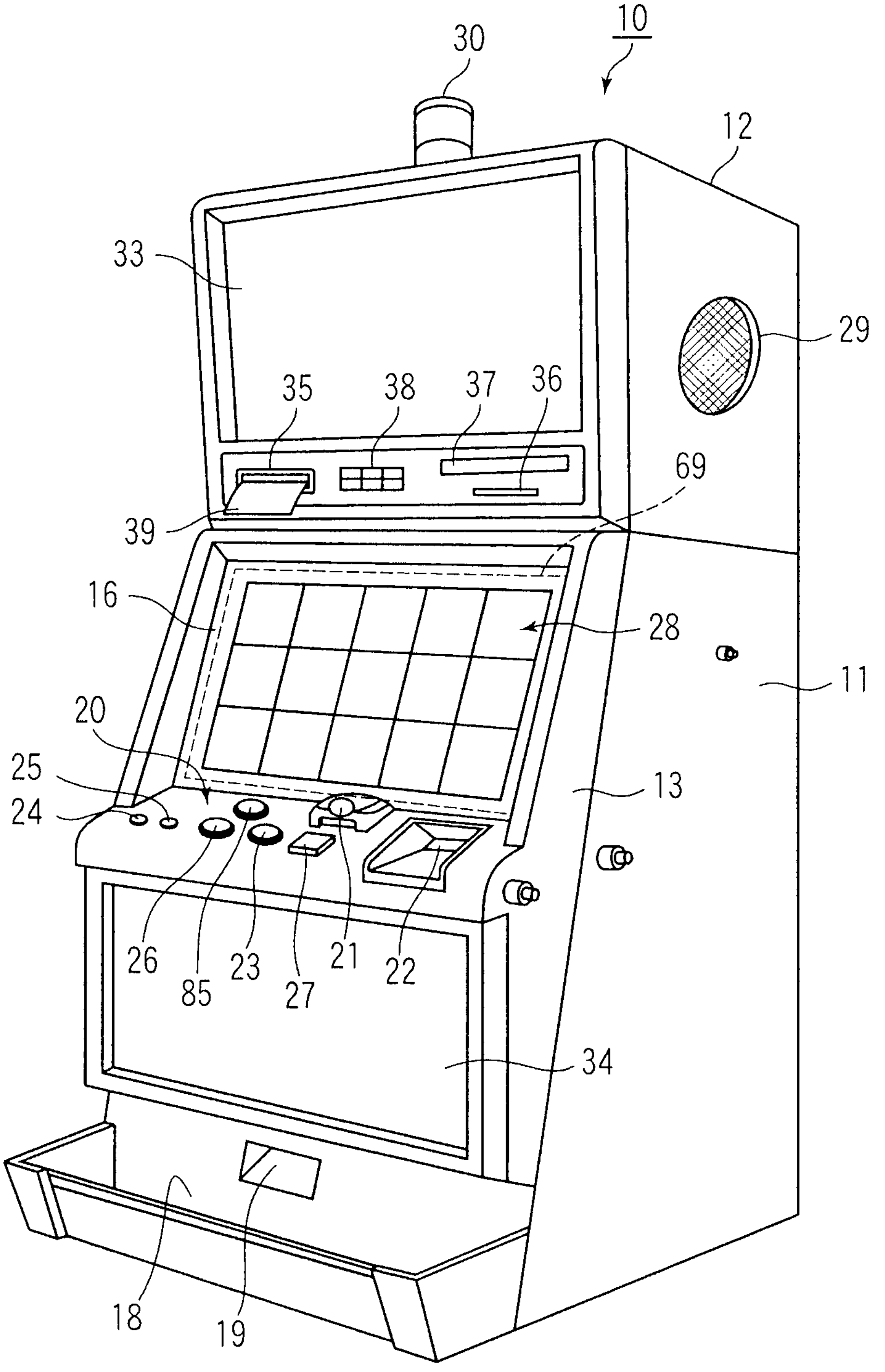
FIG. 63 is a perspective view schematically showing a slot machine.

FIG. 63 is a view schematically showing an appearance of a slot machine according to one embodiment of the present invention. The gaming media used in the slot machine 10 include coins, bills, or electronic value information equivalent thereto. In the present invention, however, medals, tokens, electronic money, or tickets, for example, may be employed as gaming media without being limitative thereto in particular. The above tickets are not limitative in particular, and can include barcode-attached tickets or the like, as described later, for example.

The slot machine 10 is provided with a cabinet 11, a top box 12 which is installed on an upper side of the cabinet 11, and a main door 13 which is provided on a front surface of the cabinet 11.

The lower image display panel 16 serving as a display device is provided in front of the main door 13. The lower image display panel 16 is provided with a liquid crystal panel, which displays the symbol matrix 28 in three rows and five columns. One symbol is arranged in a respective one of the cells of a symbol matrix 28, and a maximum of 15 symbols are displayed. A touch panel 16 is provided at the player's side of a lower image display panel 16. An image such as an icon is displayed on the lower image display panel 16, and a player touches part of a touch panel 69 on the image, whereby it is judged that the image has been selected by the player. In this manner, this icon acts as a touch panel button.

Downwardly of the lower image display panel 16 and at the center of a main door 13, there are provided a control panel 20 on which: a plurality of buttons 23 to 27 and 85 for a player to enter instructions pertinent to the progress of a game; a coin receiving slot 85 for receiving coins in a cabinet 11; and a bill validator 22 are disposed.

On the control panel 20, a start button 23, a change button 24, a cashout button 25, a 1-BET button 26, a MAX-BET button 27, and a side-BET button 85 are provided. The start button 23 is intended for entering an instruction for starting a standalone game individually played by a respective one of the players at the slot machines 10. The change button 24 is intended for use in asking an attendant of the gaming facility for change. The cashout button 25 is intended for entering an instruction for paying out coins corresponding to the player-reserved credits from a coin payout slot 19 to a coin tray 18, and is a liquidation input device for inputting withdrawal from a progressive link.

The 1-BET button 26 is intended for entering a command for betting a credit corresponding to one coin. The MAX-BET button 27 is intended for entering a command for betting the maximum number (fifty in this embodiment) of coins that can be bet per game. The side-BET button 85 is used to place a BET in a standalone game or in a subsidiary game other than a game in which symbols are rearranged in the symbol matrix 28. For example, in the embodiment, if a predetermined credit is betted by a side-BET button 85, it is possible to control a "CHANCE" symbol to be rearranged in the symbol matrix 28. Part of the credit betted by these input means is integrated and stored in a memory space set in the RAM 43, and is defined as a standard for determining the amount of payout in a case where a jackpot is acquired in a progressive bonus game which is a link game played by a plurality of players at other slot machines 10.

The bill validator 22 validates whether or not a bill is legitimate and accepts a legitimate bill into the cabinet 11. The bill validator 22 may be configured so that a barcode-attached ticket 39 described later is thereby readable. Provided on a lower front surface of the main door 13, that is, at a lower part of the control panel 20, is a berry glass 34 on which characters of the slot machine 10 and the like are depicted.

On the front face of the top box 12, an upper image display panel 33 is provided. The upper image display panel 33 has a liquid crystal panel displaying images for introducing the contents of games or explaining the rules of games, for example.

Also, on the top box 12, a lamp 30 and a speaker 29 are provided. At the lower side of the upper image display panel 33, a ticket printer 35, a card reader 36, a data display 37, and a keypad 38 are provided. The ticket printer 35 prints, on tickets, bar codes containing coded data such as credit amount, date and time, or ID numbers of the slot machine 10, and the bar code-attached tickets 39 are output. The player causes another slot machine to read a barcode-attached ticket 39, thereby making it possible to play a game or exchange the barcode-attached ticket 39 with bills at a predetermined site in a gaming facility (for example, cashier in casino).

The card reader 36 reads or writes data from or into a smart card. This card reader is an input device which removably inserts an ID card for entering withdrawal from a progressive link. A smart card is a player-owned card, and stores data for identifying players or data concerning the history of games played by the player. Therefore, the insertion or removal of the smart card enables the slot machine to easily judge the change of players. The smart card may store data equivalent to coins, bills, or credits. As an alternative of a smart card, a magnetic stripe card may be employed. The data display 37 is made of a fluorescent display or the like, and is intended for displaying data read by the card reader 36 or data input by the player via a keypad 38, for example. The keypad 38 is intended for entering the instructions or data pertinent to the issuance of tickets.

Figure 64:
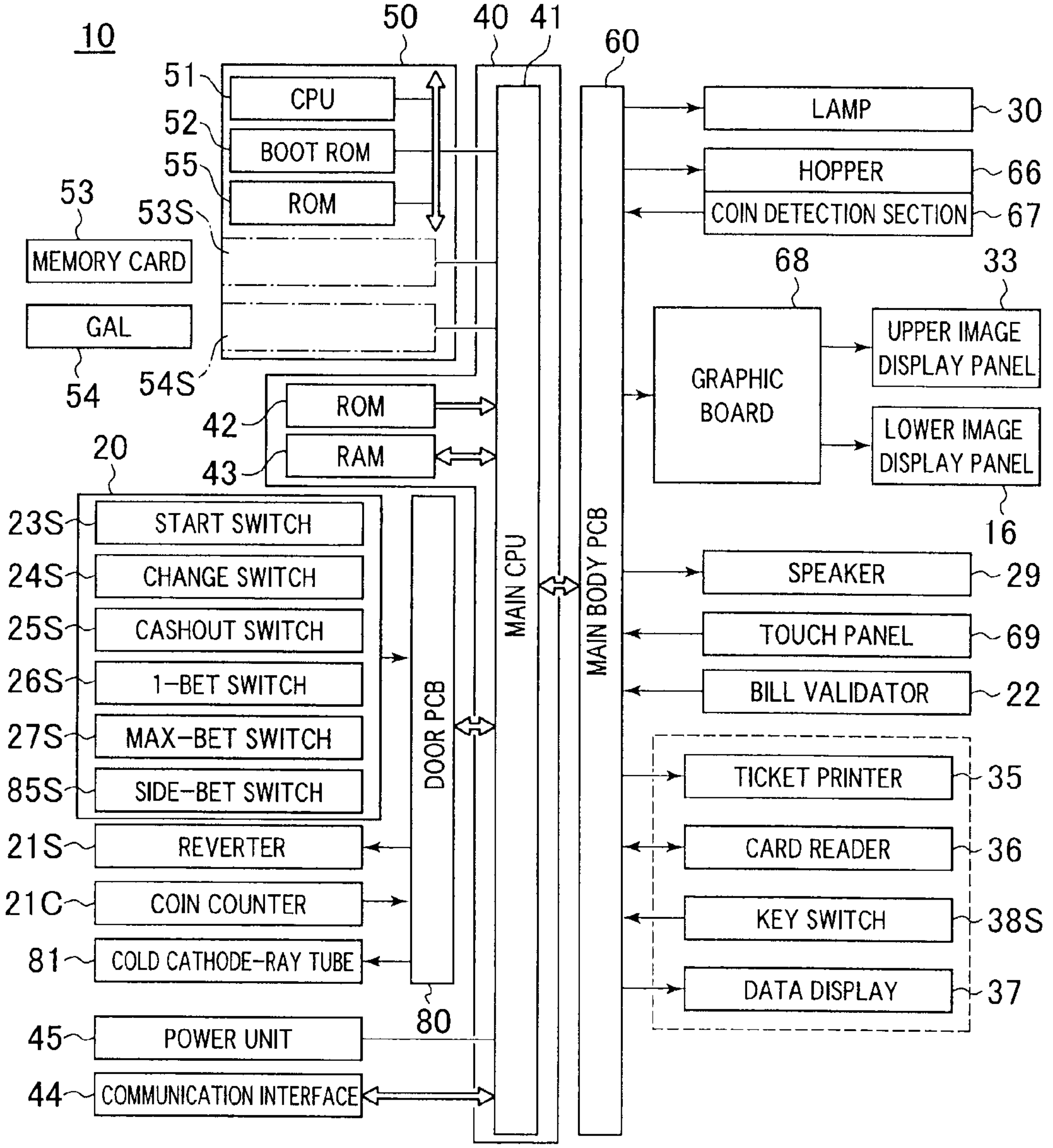
FIG. 64 is a view depicting an internal configuration of the slot machine.

FIG. 64 is a block diagram depicting an internal configuration of the slot machine shown in FIG. 63. A gaming board 50 is provided with: a CPU (Central Processing Unit) 51, a ROM (Read Only Memory) 55, and a boot ROM 52, which are interconnected by means of an internal bus; and an IC socket 54S corresponding to a GAL (Generic Array Logic) 54.

A memory card 53 is internally provided with a nonvolatile memory, and stores game programs. The game programs include a symbol selection program. The symbol selection program is intended for determining symbols rearranged in the symbol matrix 28. The symbol selection program includes symbol weighing data corresponding to each of plural types of payout rates (for example, 80%, 84%, and 88%). The symbol weighting data is indicative of the correspondence relationship between the respective symbols and one or more random numeric values which come under a predetermined numerical range (0 to 255). A payout rate is determined based upon payout rate setting data output from the GAL 54, and the symbols rearranged in the symbol matrix 28 are determined based upon symbol-weighted data corresponding to the payout rate. Further, the game programs include table data indicating the correspondence relationship between each of the symbols and a payout.

In addition, a card slot 53S is constituted so that the memory card 53 can be removably inserted thereinto. This card slot is connected to a motherboard 40 by means of an IDE bus. Therefore, the memory card 53 is removed from the card slot 53S, other game programs and game system programs are written into the memory card 53, and the memory card 53 is then inserted into the card slot 53S, thereby making it possible to change the types or contents of games played at the slot machines 10. The game programs include those which are relevant to the operating procedures for performing games. Furthermore, the game program includes video data or audio data to be output during the game. The video data includes video data of symbols to be arranged in the symbol matrix 28.

The GAL 54 is a kind of PLD having an OR-fixed arrayed structure. The GAL 54 is provided with a plurality of IN ports and OUT ports. If predetermined items of data are input to the IN port, the corresponding data is output from the OUT port. The data output from the OUT port is equivalent to the above-described payout rate setting data. In addition, the IC socket 54S is constituted so that the GAL 54 can be removably inserted thereinto. This IC socket is connected to a motherboard 40 by means of a PCI bus. Therefore, the payout rate setting data can be changed by replacing the GAL with another GAL 54.

The CPU 51, the ROM 55, and the boot ROM 52 interconnected via the internal bus are connected to the motherboard 40 via a PCI bus. The PCI bus not only performs signal transmission between the motherboard 40 and the gaming board 50, but also supplies power from the motherboard 40 to the gaming board 50.

The motherboard 40 is constituted using a commercially available motherboard (printed wiring board having mounted thereon basic parts of a personal computer, and the slot machine 10 is provided with a main CPU (Central Processing Unit) 41 which executes programs stored in the RAM 43 to be described later. Further, this motherboard is provided with: a ROM (Read Only Memory) 42; a RAM (Random Access Memory) 43; and a communication interface 44 for interconnecting a plurality of slot machines so that the slot machines can be communicated with each other.

The ROM 42 stores therein a program such as BIOS (Basic Input/Output System) executed by the main CPU 41, and permanent data. When the BIOS is executed by the main CPU 41, a process of initializing predetermined peripheral devices is carried out and a process of capturing game programs and game system programs stored in the memory card 53 through the gaming board 50 is started. In the embodiment of the present invention, the contents of the ROM 42 may be rewritable or not.

The RAM 43 stores progressive link control data 160 including items of data such as: a program for exercising centralized control of progressive bonus games (hereinafter, referred to as jackpots) executed in the plurality of game machine groups (hereinafter, referred to as progressive links); progressive link participation data 153 for storing sequences of participation in progressive bonus games executed in the plurality of gaming machine groups in association with slot machine-based identification information; a jackpot payment condition 154; a slot machine-based BET accumulation amount 155; and a progressive value 156 of a jackpot 151, which is game history data. Further, the RAM 43 can store data or programs employed when a main CPU 41 is activated; and game programs. Further, the RAM 43 stores data pertinent to the amount of credit and the number of inserted coins or the number of paid-out coins in one game. Programs subjected to centralized control are stored in advance in the ROM 42, and are loaded in a work area of the RAM 43 as required.

Both a main body PCB (Printed Circuit Board) 60 and a door PCB 80 are connected to the motherboard 40 by USB. A power supply unit 45 is also connected to the motherboard 40.

Equipment and devices, which generate input signals to be input to the main CPU 41, and equipment and devices, operations of which are controlled by a control signal output from the main CPU 41, are connected to the body PCB 60 and the door PCB 80. The main CPU 41 executes the game programs stored in RAM 43, based upon an input signal that was input to the main CPU 41, thereby performing a predetermined computational process. Then, this CPU 41 stores results thereof into RAM 43; and transmits control signals to equipment and devices as a control process relative to the equipment and devices.

Connected to the main body PCB 60 are a lamp 30, a hopper 66, a coin detection section 67, a graphic board 68, a speaker 29, a touch panel 69, a bill validator 22, a ticket printer 35, a card reader 36, a key switch 38S, and a data display 37. The lamp 30 lights in a predetermined pattern, based upon a control signal output from the main CPU 41.

The hopper 66 is installed in a cabinet 11, and the predetermined amount of coins are paid out from the coin payout opening 19 to the coin tray 18, based upon the control signal output from the main CPU 41. A coin detection section 67 is provided inside of the coin payout opening 19, and outputs an input signal to the main CPU 41, if it is detected that the predetermined amount of coins have been paid out from the coin payout opening 19.

A graphic board 68 controls the images to be displayed on the upper and lower image display panels 33 and 16, based upon the control signal output from the main CPU 41. The graphic board 68 is provided with: a VDP (Video Display Processor), which generates video data, based upon the control signal output from the main CPU 41; and a video RAM, etc., which temporarily stores video data generated by the VDP. The video data used when the video data is generated by the VDP is read out of the memory card 53, and thereafter, is included in the game programs stored in the RAM 43.

The bill validator 22 validates whether or not a bill is legitimate and accepts a legitimate bill into the cabinet 11. The bill validator 22, upon accepting a legitimate bill, outputs an input signal to the main CPU 41 based on the bill amount. The main CPU 41 stores in the RAM 43 the amount of credits responsive to the amount of bills transmitted by the input signal.

Based upon a control signal output from the main CPU 41, the ticket printer 35 prints on a ticket a barcode having encoded thereon data such as the credit amount, data and time, and the identification number of the slot machine 10 stored in the RAM 43. Further, this printer outputs the printed ticket as a barcode-attached ticket 39. The card reader 36 reads data from a smart card, thereby transmitting the read data to the main CPU 41 or writing data into the smart card, based upon the control signal from the main CPU 41. The key switch 38S is provided on the key pad 38, and outputs a predetermined input signal to the main CPU 41 when a player operates the key pad 38. The data display 37 displays, based upon a control signal output from the main CPU 41, the data read by the card reader 36 and the data input by a player through the key pad 38.

To the door PCB 80, a control panel 20, a reverter 21S, a coin counter 21C, and a cold cathode-ray tube 81 are connected. On the control panel 20, there are provided: a start switch 23S corresponding to a start button 23; a change switch 24S corresponding to a change button 24; a cashout switch 25S corresponding to a cashout button 25; a 1-BET switch 26S corresponding to a 1-BET button 26; a MAX-BET switch 27S corresponding to a MAX-BET button 27; and a side-BET switch 85S corresponding to a side-BET button 85. When the player operates the buttons 23 to 27, and 85S the corresponding switches 23S to 27S and 85 output the input signals to the main CPU 41, respectively.

The coin counter 21C is provided inside the coin receiving slot 21, and validates whether or not a legitimate coin is inserted into the coin receiving slot 21. Those other than the legitimate coins are discharged from the coin payout exit 19. The coin counter 21C outputs an input signal to the main CPU 41 when a legitimate coin is detected.

The reverter 21S is operable based upon the control signal output from the main CPU 41. This reverter distributes the coins recognized to be legitimate by the coin counter 21C, into a cashbox (not shown) or a hopper 66 which was installed in the slot machine 10. In other words, if the hopper 66 is filled with coins, the legitimate coins are distributed to the cashbox by means of the reverter 21S. Otherwise, the legitimate coins are distributed to the hopper 66. The cold cathode-ray tube 81 functions as a backlight installed at the rear side of the lower and upper image display panels 16 and 33, and lights based upon the control signal that was output from the main CPU 41.

Figure 65A:
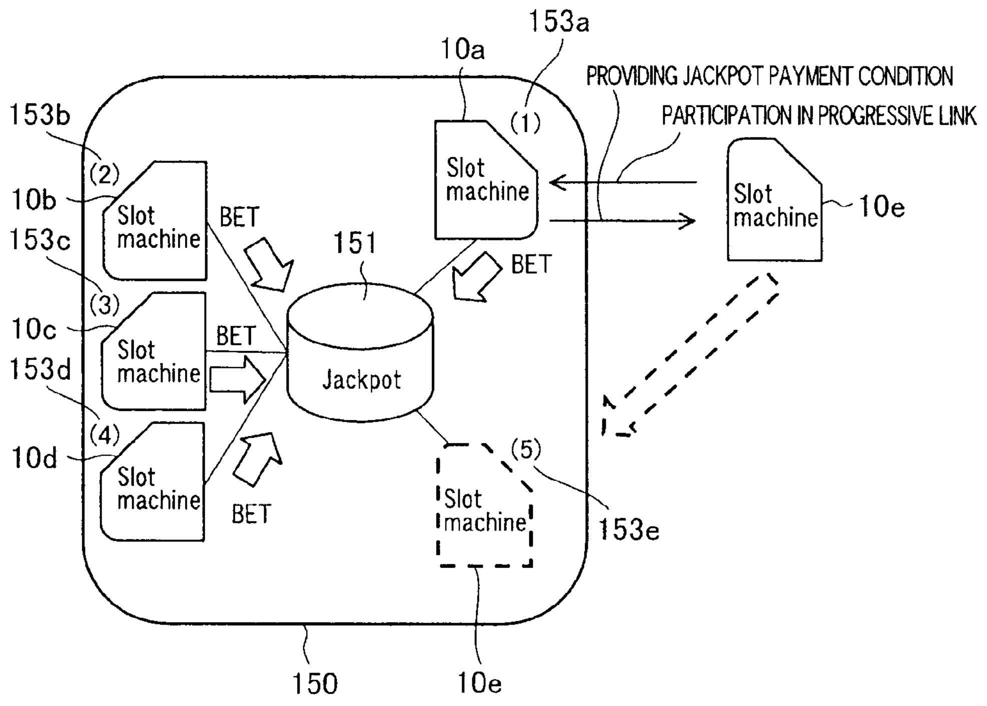
FIG. 65A is an explanatory view schematically showing an interrelationship between a plurality of slot machines sharing a jackpot.
Figure 65B:
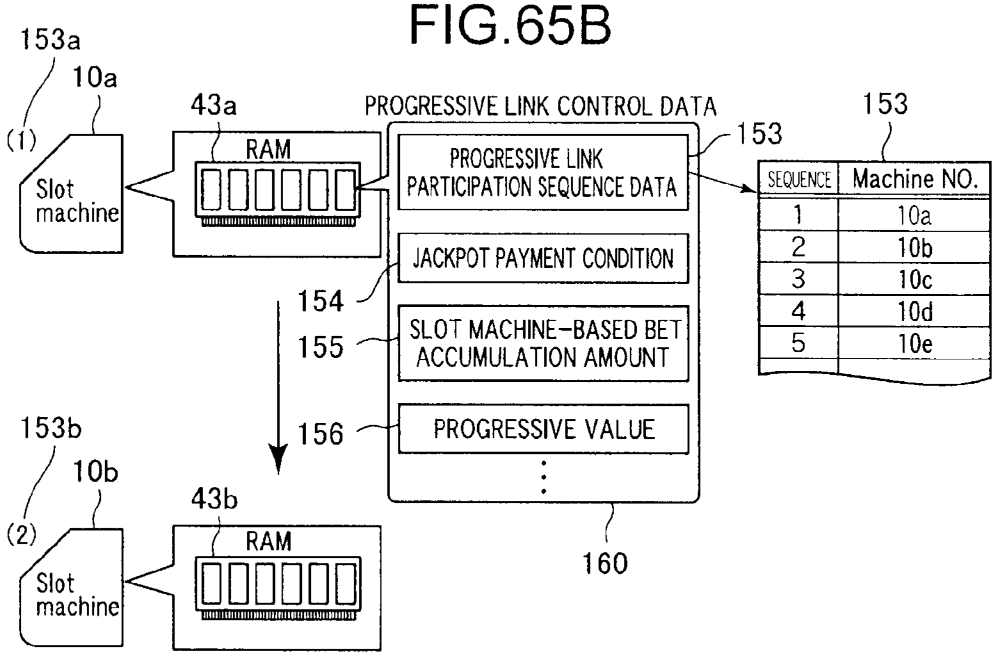
FIG. 65B is an explanatory view schematically showing the contents of a process of transmitting progressive link control data to a slot machine as a next host slot machine, the process being performed when a slot machine as a current host slot machine withdraws from a progressive link.

FIG. 65A is an explanatory view schematically showing an interrelationship between a plurality of slot machines sharing a jackpot. FIGS. 65A and 65B are identical to FIGS. 61A and 61B. A plurality of slot machines 10*a*, 10*b*, 10*c*, 10*d* share a jackpot 151, and forms a progressive link 150. Further, the progressive link 150 sharing the jackpot is controlled by means of one host slot machine (hereinafter, referred to as the slot machine 10*a*) selected from among the slot machines belonging to the progressive link 150.

Let us assume that a slot machine 10*e* newly participates in the progressive link 150 in order for slot machines 10*a*, 10*b*, 10*c*, 10*d* to share a jackpot 51. At this time, the slot machine 10*e* receives presentation of a jackpot payment condition or the like from a host slot machine 10*a* through a communication line. The slot machine 10*e* notifies a jackpot payment condition to a player; and causes the player to determine whether or not the slot machine 10*e* participates in the progressive link 150. When the determination result is affirmative, a signal of participation in the progressive link 150 is transmitted to the slot machine 10*a*.

FIG. 65B is an explanatory view schematically showing the contents of a process of transmitting progressive link control data to a slot machine (hereinafter, referred to as the slot machine 10*b*) as a next host slot machine, the process being performed when the slot machine 10*a* as a current host slot machine withdraws from the progressive link 150. A RAM 43*a* of the slot machine 10*a* as the current host slot machine stores progressive link control data 160 such as: progressive link sequence data 153, which is participation sequence data; a jackpot payment condition 154; a slot machine-based BET accumulation amount 155; and a progressive value 156 of a jackpot 151 which is game history data. The progressive link participation sequence data 153 is stored in association with identification information of the slot machines 10 in order of participation in a progressive link. Here, data is stored which is indicative of the slot machine 10*a* in response to sequence 1 indicating the first participation in a progressive link; and similarly, data is stored which is indicative of the slot machine 10*b* in response to sequence 2. When a slot machine 10*e* participates in the progressive link 150, data indicative of the fact that a fifth slot machine has participated in the progressive link 150 is added to the progressive link participation sequence data 153.

If the slot machine 10*a* withdraws from the progressive link 150, the main CPU 41 of the slot machine 10*a* judges whether or not there exists a slot machine having participated in the progressive link 150, immediately following the slot machine 10*a*. When the determination result is affirmative, that slot machine is determined as a next host slot machine.

Specifically, the main CPU 41 of the slot machine 10*a* verifies whether or not there exists a slot machine stored in response to sequence 2 of the participation sequence data 153. Data indicative of the slot machine 10*b* exists. The main CPU 41 of the slot machine 10*a* as the current host slot machine determines the slot machine 10*b* as the next host slot machine, and transmits progressive link control data to the slot machine 10*b*. Having thus received the progressive link control data 160, the next host slot machine 10*b* stores the progressive link control data in a RAM 43*b*, and starts control of another slot machine participating in the progressive link 150 as the host slot machine.

Figure 66A:
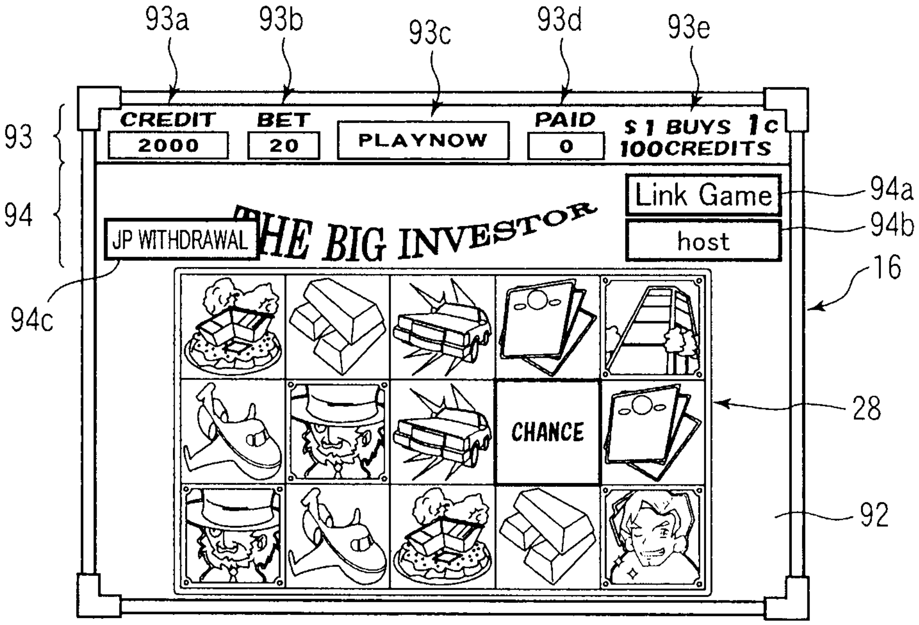
FIG. 66A is a view showing an exemplary image displayed at the slot machine shown in FIG. 63 in a standalone game.

FIGS. 66A and 66B to FIG. 69 are views, each of which shows an exemplary image displayed on the lower image display panel 16 of the slot machine 10 shown in FIG. 63. FIG. 66A is a view showing an exemplary image displayed at the slot machine 10 as a host slot machine in a standalone game shown in FIG. 63.

As shown in FIG. 66A, the lower image display panel 16 is made up of: display (area) sections such as a display area section 92; an information display section 93; and an effect image display section 94. A symbol matrix 28 is displayed in the display area section 92. Further, icons displaying the number of betted coins are disposed at both sides of the symbol matrix 28, and the icons corresponding to the number of BETS are controlled to illuminate. The information display section 93 is arranged upwardly of the display region 92 and is made up of a credit amount display section 93*a*, a BET amount display section 93*b*, a character information display section 93*c*, a PAID amount display section 93*d*, and a charge display section 93*e*.

The credit amount display section 93*a* displays the number of currently credited coins, and the BET amount display section 93*b* displays the number of coins betted in one standalone game. Further, the character information display section 93*c* displays character information indicating a current state of a standalone game and a progressive bonus game. During the play of a game, "PLAY NOW" characters are displayed, and during the play of a game, "GAME OVER" characters are displayed. A PAID number display section 93*d* displays the number of coins having paid out in one standalone game, and a charge display section 93*e* displays a conversion value of a credit relative to a determined amount.

The effect image display section 94 displays an effect image which is responsive to the settings of a slot game. Therefore, the effect image display section 94 displays a progressive link participation icon 94*a*, which is indicative of the fact that a plurality of gaming machines share a jackpot, i.e., that the plurality of gaming machines participate in a progressive link. Further, the first slot machine 10 having participated in a progressive link displays a host icon 94*b* which is indicative of a host icon for controlling a plurality of other gaming machines participating in the same progressive link. A jackpot withdrawal icon 94*c* is displayed, the icon being employed when it is withdrawn from a progressive link in which a player participates. Specifically, the main CPU 41 performs a progressive link withdrawal process of a host slot machine to be described later, by the player touching a touch panel 69 on the jackpot withdrawal icon 94*c* (see FIG. 74). Further, in the client's gaming machine as well, the client progressive link withdrawing process to be described later is performed (see FIG. 73).

Any of symbols "main animation character", "sub animation character", "office building", "bullion", "car", "stock certificate", "jet", "cottage", and "CHANCE" are rearranged in the symbol matrix 28 displayed on the lower image display panel 16, and a payout is determined depending upon the number of these symbols displayed in the symbol matrix.

FIG. 66A shows one example in which any of the symbols "main animation character", "sub animation character", "office building", "bullion", "car", "stock certificate", "jet", "cottage", and "CHANCE" have been rearranged in the symbol matrix 28 in a standalone game. Whether or not a free game or the like is started is determined depending upon the display number of "CHANCE" symbols.

Figure 66B:
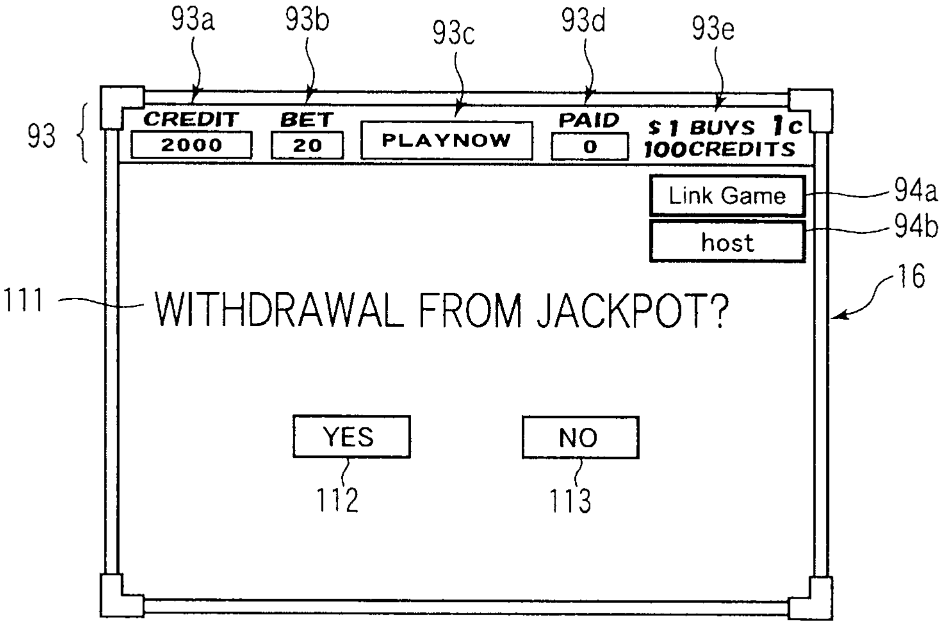
FIG. 66B is a view showing an exemplary image displayed at the slot machine after a player has selected a jackpot withdrawal icon of FIG. 66A.

FIG. 66B is a view showing an exemplary image displayed after touching the touch panel 69 on the jackpot withdrawal icon 94*c* of FIG. 66A. As shown in FIG. 66B, the lower image display panel 16 displays a progressive link participation icon 94*a* and a host icon 94*b*, so that a player can recognize that a host slot machine participates in a progressive link participation icon 94*a*. In the figure, the player has touched the touch panel 69 on the jackpot withdrawal icon 94*c* (see FIG. 66A), thus displaying a jackpot withdrawal verification display 111 for verifying whether or not to withdraw from a progressive link. Downwardly of the jackpot withdrawal verification display 111, there are displayed: a YES icon 112 to be selected during withdrawal from a progressive link; and a NO icon 113 to be selected if no withdrawal from the progressive link occurs. Like selection of the jackpot withdrawal icon 94*c*, the YES icon 112 or the NO icon 113 is selected by the player touching the touch panel 69 on each icon.

Figure 67A:
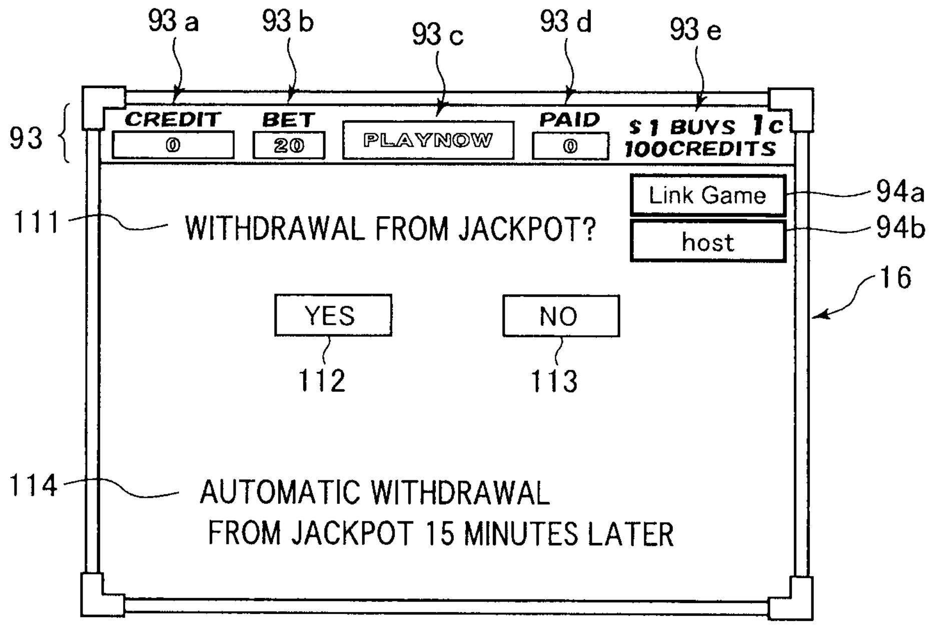
FIG. 67A is a view showing an exemplary image displayed at the slot machine when no credit is stored in a RAM.

FIG. 67A is a view showing an exemplary image displayed on the lower image display panel 16 when no credit is stored in the RAM 43. In the figure, a progressive link participation icon 94*a* and a host icon 94*b* are displayed so that the player can recognize that a host slot machine has participated in a progressive link. The jackpot withdrawal verification display 111 is displayed when the number of credits has become 0 if there is a possibility that a player stops the play of a game. Downwardly of the jackpot withdrawal verification display 111, there are displayed a YES icon 112 to be selected during withdrawal from a progressive link and a NO icon 113 to be selected if no withdrawal from a progressive link occurs. If the player fails to select either of the YES and NO icons 112 and 113, a jackpot withdrawal time display 114 appears which is indicative of the fact that a slot machine will automatically withdraw from a progressive link 15 minutes later.

Figure 67B:
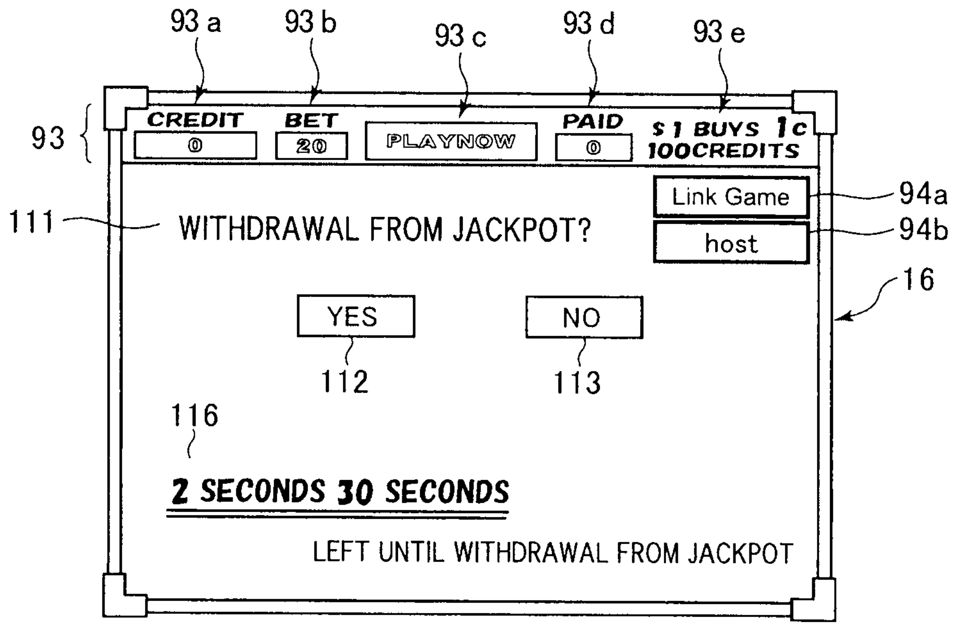
FIG. 67B is a view showing an exemplary image displayed at the slot machine after an elapse of a specified time while a player fails to select neither of YES and NO icons after the display of FIG. 67A has appeared.

FIG. 67B is a view showing an exemplary image displayed on the lower image display panel 16 after en elapse of a specified time (12 minutes 30 seconds) in a state in which the player fails to select either of the YES and NO icons 112 and 113. If no indication of intention is made as to player withdrawal from a progressive link, a withdrawal countdown display 116 is displayed which is indicative of a time spent until a slot machine has automatically withdrawn from the progressive link. This allows the player to be easily aware of a time spent until a slot machine has automatically withdrawn from a progressive link, and can prevent withdrawal from the progressive link while the player is not aware thereof.

Figure 68A:
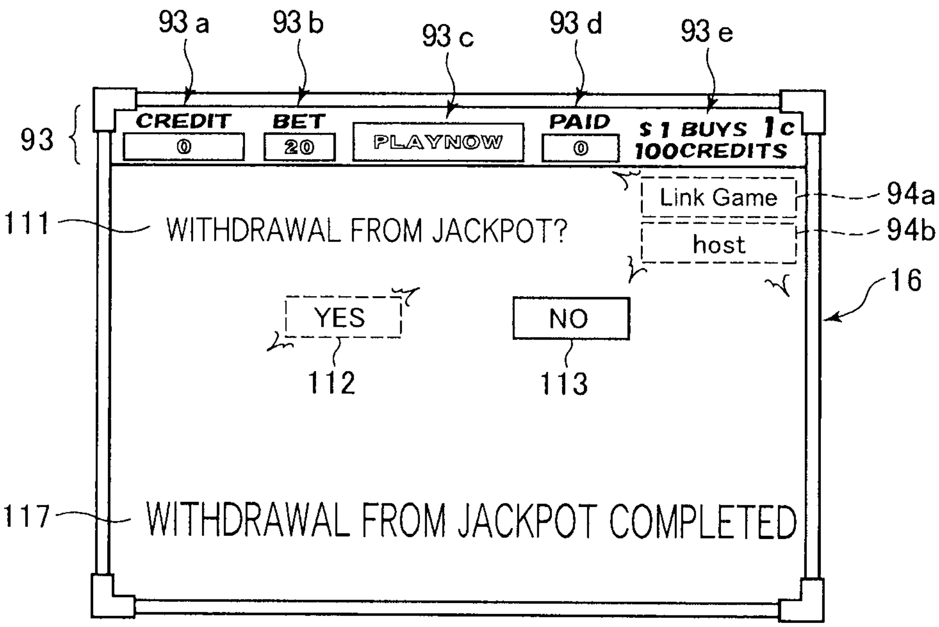
FIG. 68A is a view showing an exemplary image displayed at the slot machine when a player has selected the YES icon in FIG. 66B.

FIG. 68A is a view showing an exemplary image displayed on the lower image display panel 16 when the player has selected the YES icon 112 in FIG. 66B. The YES icon 112 selected by the player is displayed in a blinking state, and indicates that the icon has been selected by the player. A jackpot withdrawal display 117 is displayed which notifies to the player withdrawal from a progressive link. At this time, the progressive link participation icon 94*a* and the host icon 94*b* are displayed in a blinking state, and thereafter, go out, thereby notifying to the player that no slot machine has participated in a progressive link and that no host slot machine exists in the progressive link. When the player has selected the YES icon 112 in FIGS. 67A and 67B, a similar image is displayed. Slot machines 10 are provided with a plurality of input devices for inputting withdrawal from a progressive link of a jackpot executed in a plurality of gaming machine groups. While the input device was provided as touch panel buttons on the display screen displayed when a credit becomes zero (see FIG. 74A: steps S47 and S50), it may be a cashout button 25 for liquidating a credit (see FIG. 74A: step S52) or a card reader 36 for inserting and removing an ID card for identifying players (see FIG. 74A: step S44).

Figure 68B:
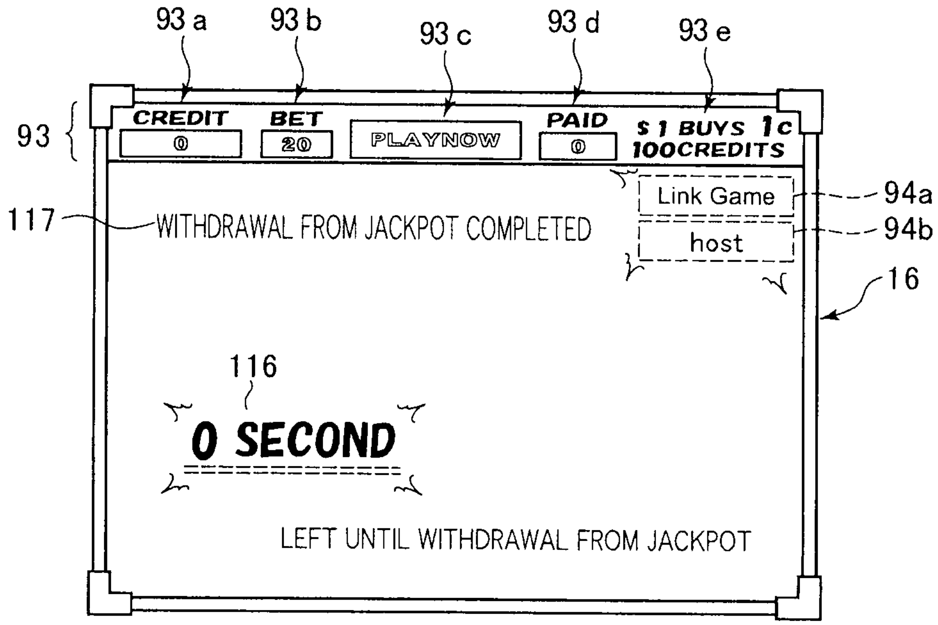
FIG. 68B is a view showing an exemplary image displayed at the slot machine when withdrawal countdown display becomes 0 seconds in FIG. 67B.

FIG. 68B is a view showing an exemplary image displayed on the lower image display panel 16 when a withdrawal countdown display 116 becomes 0 seconds in FIG. 67B. In FIG. 67B, in a state in which a player fails to select either of the YES and NO icons 112 and 113, when the countdown becomes 0 seconds after an elapse of a specified time, an area in which the withdrawal countdown display 116 displays 0 seconds is highlighted in a blinking state. After that, a jackpot withdrawal display 117 is displayed which notifies to a player withdrawal from a progressive link. At this time, the progressive link participation icon 94*a* and the host icon 94*b* are displayed in a blinking state, and thereafter, go out, thereby notifying to the player that no slot machine has participated in a progressive link and that no host slot machine exists in the progressive link.

Figure 69:
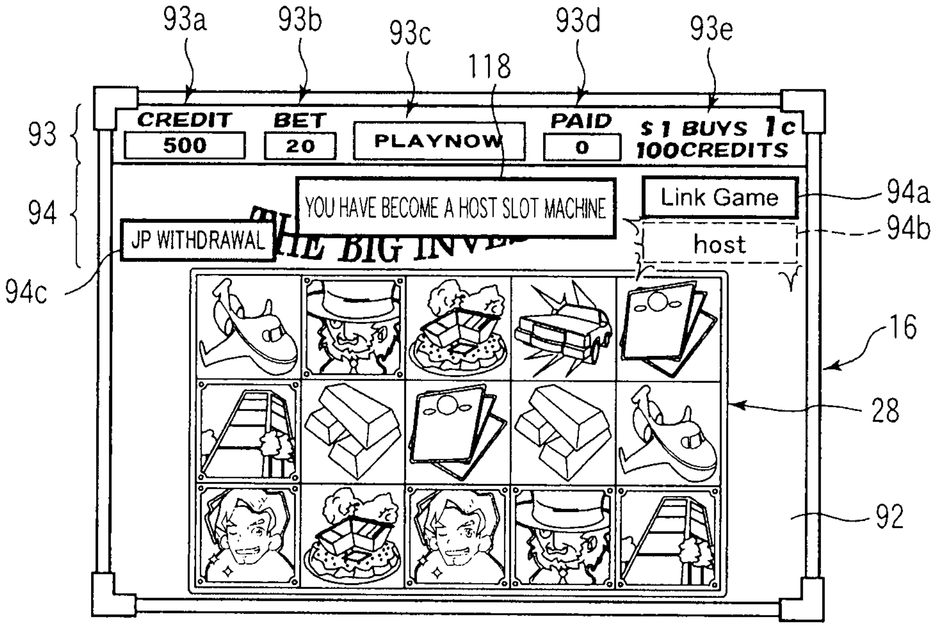
FIG. 69 is a view showing an exemplary image displayed at a slot machine as a new host slot machine if a host change occurs.

FIG. 69 is a view showing an exemplary image displayed on the lower image display panel 16 of the slot machine 10 serving as a new host slot machine if a current host machine is changed. Here, the slot machine 10 serving as a new host slot machine is the one having participated in a progressive link that follows a preceding host. The lower image display panel 16 of a new host slot machine 10 displays a progressive link participation icon 94*a* and a jackpot withdrawal icon 94*c*. Further, a guide-display area 118 displays that the slot machine 10 has been newly designated as a host slot machine. Concurrently, a host icon 94*b*, which has not been displayed so far, is displayed in a blinking state, and thereafter, the host icon 94*b* is normally displayed.

Next, a process executed in the slot machine 10 according to the embodiment of the present invention, will be described in detail with reference to the drawings.

Now, an outline of games will be described. Slot machines 10 can perform standalone games which are individually played by players at the slot machines 10 and link games (hereinafter, referred to as progressive bonus games) which are played by a plurality of players at other slot machines 10. Further, the players at the slot machines 10 can arbitrarily play link games while playing standalone games.

The main CPU 41 controls a game progress by reading and executing the game program from the RAM 43. Further, the main CPU 41 of the host slot machine controls the entire game system 100 by reading a predetermined program from the RAM 43 and executing it. The main CPU of the slot machine 10*a* is designated by reference numeral 41*a* and the main CPU of the slot machine 10*b* is designated by reference numeral 41*b*.

Figure 70:
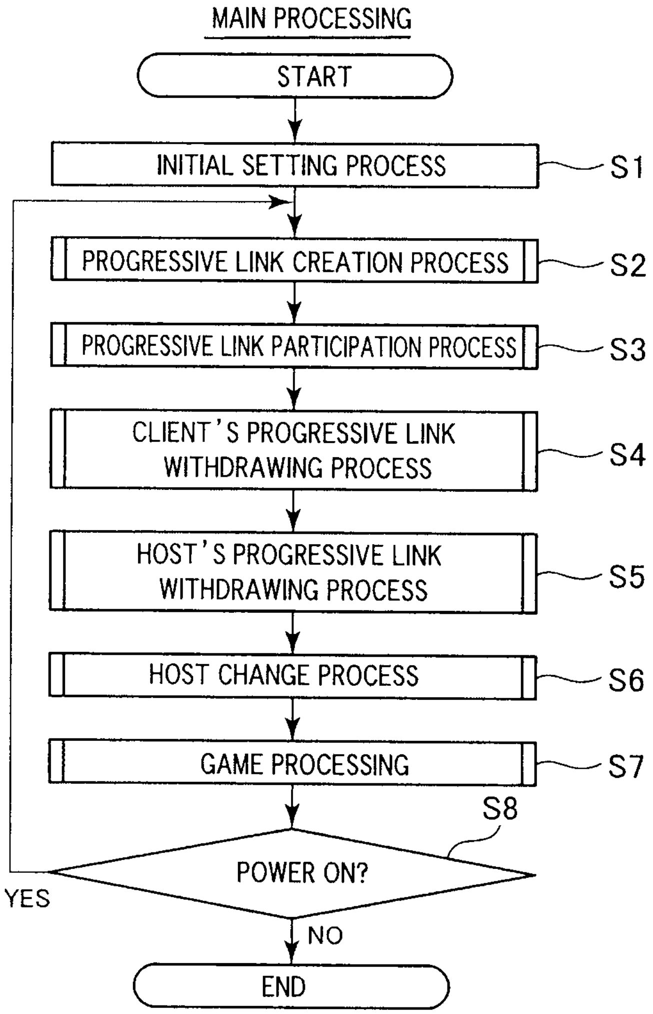
FIG. 70 is a flowchart showing a subroutine of main processing at the slot machine.

FIG. 70 is a flowchart showing a subroutine of main processing at the slot machine 10. In the main processing of the slot machine 10, first, when a power switch is turned ON (when power is supplied), the motherboard 40 and the gaming board 50 are activated, respectively, and the CPU 41 executes an initial setting process (step S1). Specifically, the main CPU 41 executes the BIOS stored in the ROM 42 and decompresses to the RAM 43 the compressed data incorporated in the BIOS. Further, this main CPU executes the BIOS decompressed to the RAM 43, and diagnoses and initializes peripherals. The main CPU 41 writes game programs or the like from memory card 53 into the RAM 43, and retrieves data for setting a payout rate and country-identification information. The main CPU 41 also performs an authentication process for each program during execution of the initial setting process. Further, the main CPU 41 sets, to OFF, a host flag which is indicative of a host slot machine stored in the main RAM 43 or a client flag which is indicative of a client slot machine participating in a progressive link.

Figure 71:
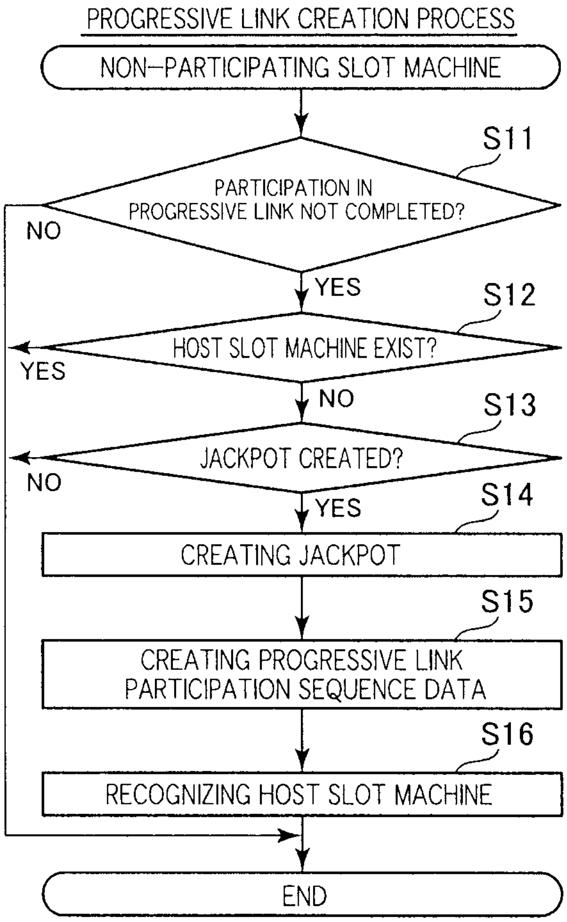
FIG. 71 is a flowchart showing a subroutine of a progressive link creation process at the slot machine.

Next, the main CPU 41 performs a progressive link creation process to be described later referring to FIG. 71 (step S2). In this progressive link creation process, if no progressive link exists, the main CPU 41 of the slot machine 10 newly creates a progressive link and determines whether or not a host slot machine is established.

Figure 72:
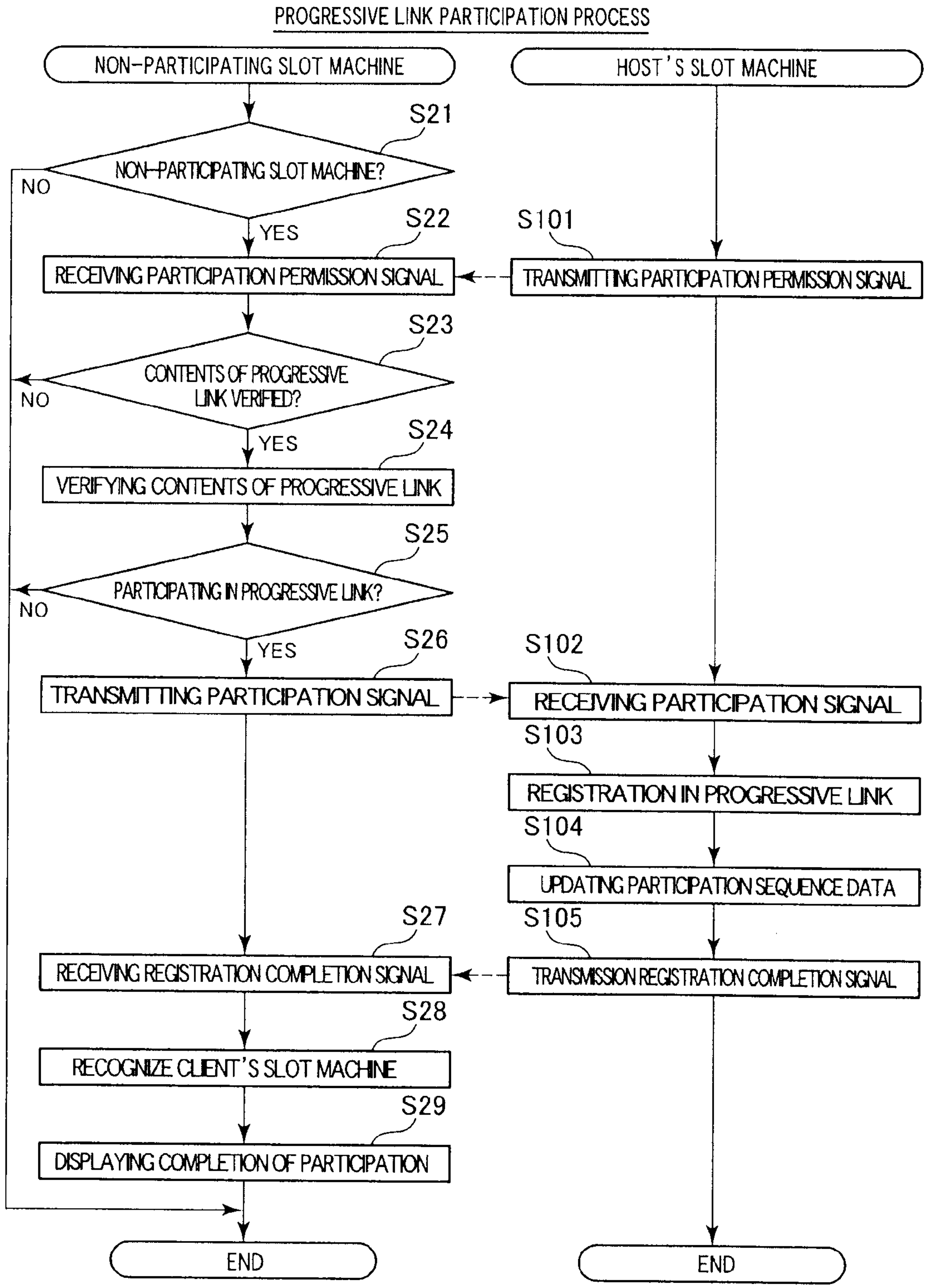
FIG. 72 is a flowchart showing a subroutine of a progressive link participation process at the slot machine.

Next, the main CPU 41 performs a progressive link participation process to be described later referring to FIG. 72 (step S3). In this progressive link participation process, the main CPU 41 of a slot machine 10 which does not participate in a progressive link performs a process of participating in a progressive link provided from a host slot machine.

Figure 73:
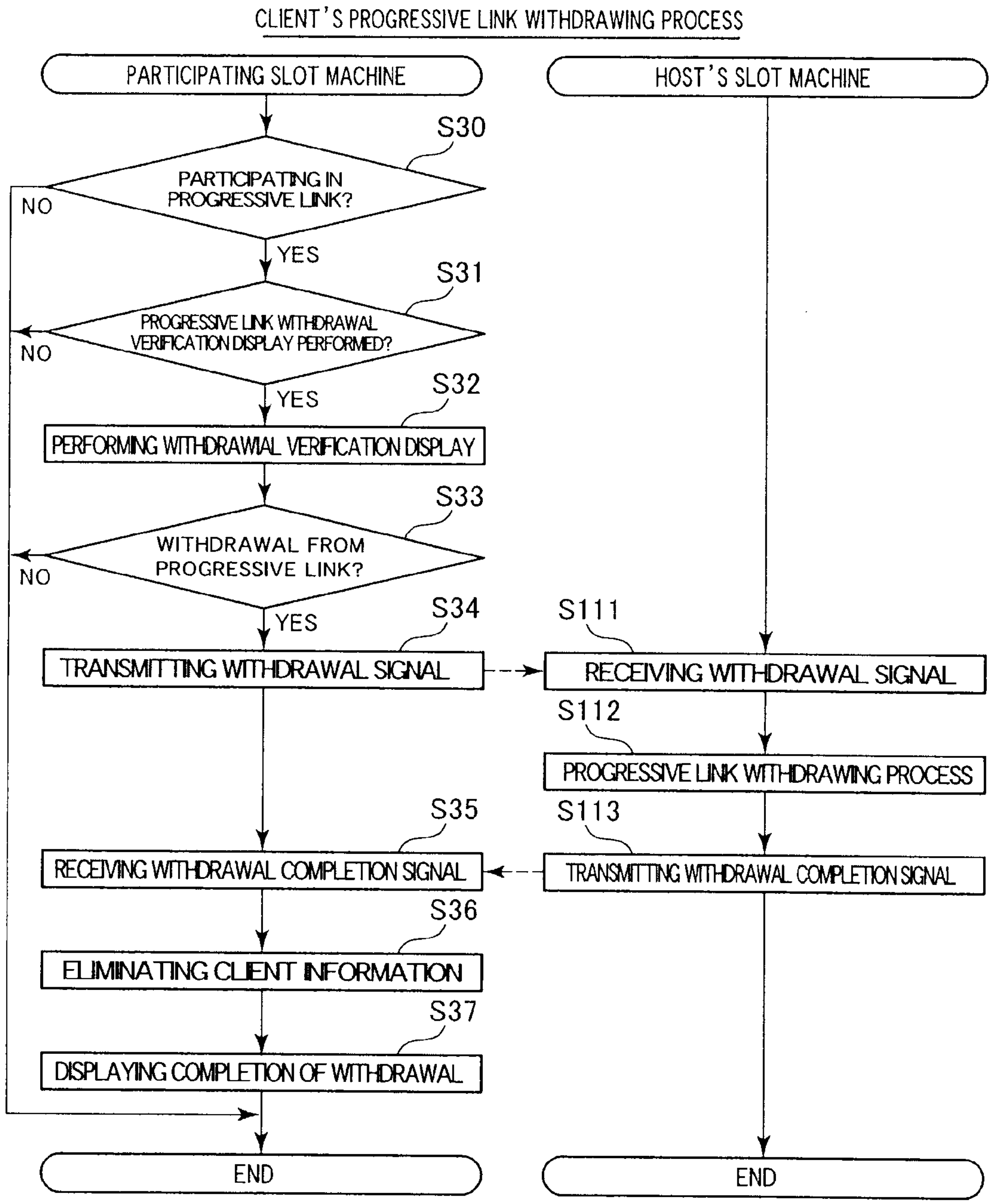
FIG. 73 is a flowchart showing a subroutine of a client progressive link withdrawing process at the slot machine.

The main CPU 41 performs a client progressive link withdrawing process to be described later referring to FIG. 73 (step S4). In this client progressive link withdrawing process, the main CPU 41 of the client slot machine 10 performs a process of withdrawing from a machine-participating progressive link.

Next, the main CPU 41 performs a process of withdrawing a host slot machine from a progressive link to be described later referring to FIG. 74 (step S5). In this process, the main CPU 41 of the host slot machine 10 performs a process of withdrawing the slot machine from a machine-participating progressive link.

Figure 75:
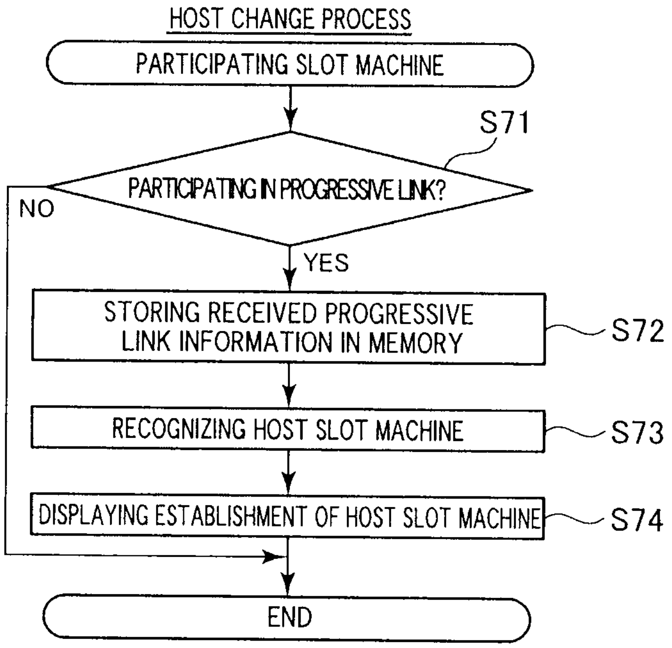
FIG. 75 is a flowchart showing a subroutine of a host change process at the slot machine.

Next, the main CPU 41 performs a process of changing a host slot machine to be described later referring to FIG. 75 (step S6). In this process, the main CPU 41 of a slot machine 10 as a next host slot machine receives progressive link control data from a slot machine 10 as a current host slot machine, and the next host slot machine performs a process of starting control of another slot machine.

Figure 76:
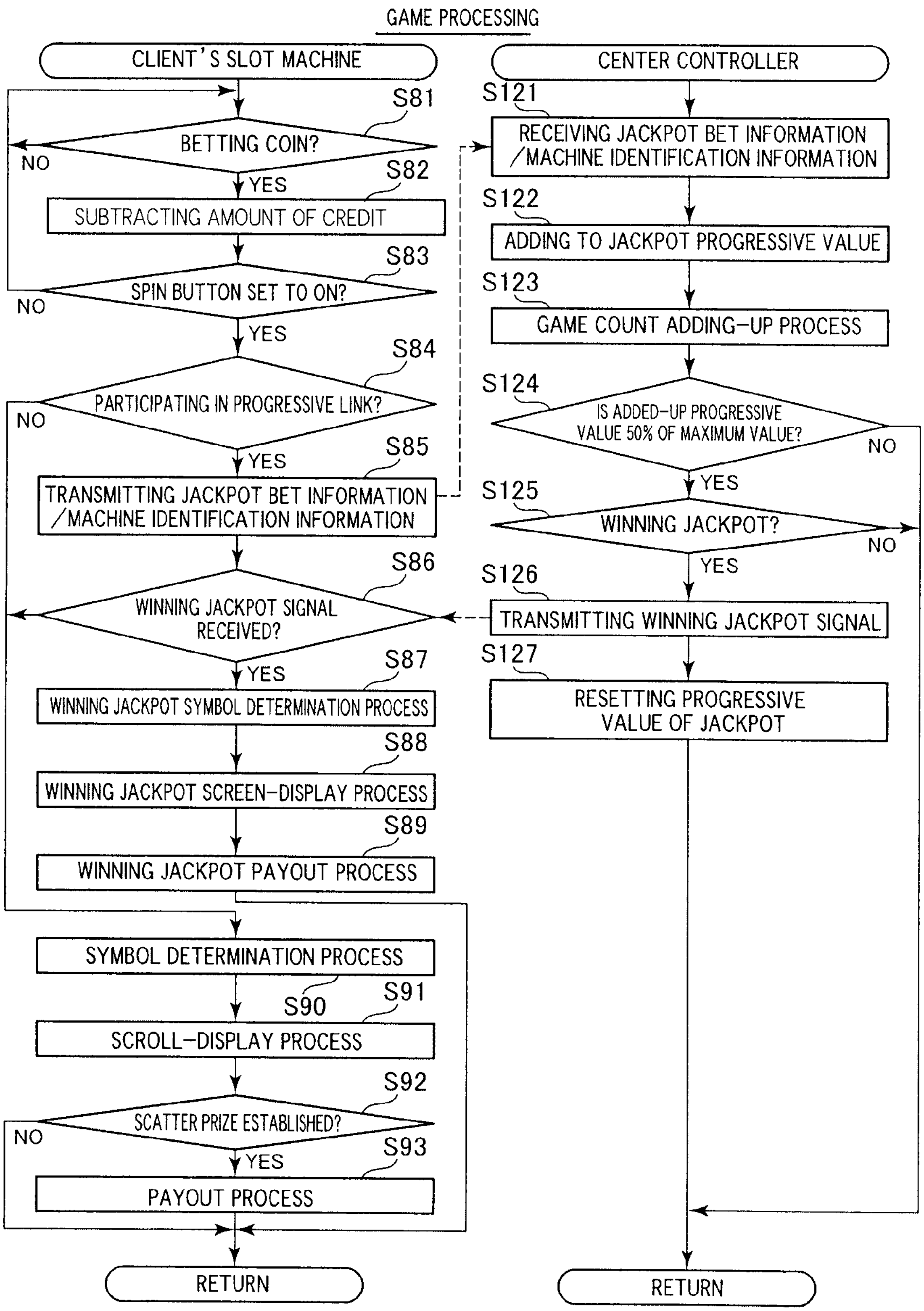
FIG. 76 is a flowchart showing a subroutine of game processing at the slot machine.

The main CPU 41 performs game processing to be described later referring to FIG. 76 (step S7). In this game processing, the main CPU 41 sequentially reads programs such as a game program from the RAM 43, and executes them. Further, this main CPU executes a standalone game and a progressive bonus game. After game processing has terminated, while power is supplied to the slot machine 10 (step S8: YES), the main CPU 41 reverts to the progressive link creation process (step S8). When no power is supplied to the slot machine 10 (step S8: NO), the main CPU 41 terminates main processing.

Next, a progressive link creation process will be described. FIG. 71 is a flowchart showing a subroutine of the progressive link creation process invoked and executed at step S2 in the main processing of the slot machine 10 shown in FIG. 70. First, the main CPU 41 judges whether or not any slot machine participates in a progressive link (step S11). Specifically, the main CPU 41 verifies a host flag which is indicative of a host slot machine stored in the RAM 43 or a client flag which is indicative of a client slot machine, and judges whether or not the host flag or the client flag is set to ON. Upon judging that a slot machine participates in a progressive link, i.e., upon judging that either of the host flag and the client flag is set to ON (step S11: NO), the main CPU 41 terminates a progressive link creation process.

Upon judging that no slot machine participates in a progressive link, i.e., upon judging that the host flag or the client flag is set to OFF (step S11: YES), the main CPU 41 judges whether or not a host slot machine exists (step S12). Specifically, the main CPU 41 judges whether or not a slot machine 10 of which the host flag stored in the RAM 43 is set to ON, exists among the slot machines interconnected via the communication line 101. Upon judging that the host slot machine exists (step S12: YES), the main CPU 41 terminates a progressive link creation process.

If not (step S12: NO), the main CPU 41 judges whether or not to create a jackpot (step S13). Specifically, the main CPU 41 judges whether or not a player has made indication of intention for newly setting a jackpot payment condition. If not (step S13: NO), the main CPU 41 terminates a progressive link creation process.

Upon judging that a jackpot is created (step S13: YES), the main CPU 41 creates the jackpot (step S14). Specifically, the main CPU 41 creates data pertinent to a jackpot, such as "jackpot payment condition 154", "slot machine-based BET accumulation amount 155", or "progressive value 156", and stores them in the RAM 43.

The main CPU 41 creates progressive link participation sequence data (step S15). Specifically, the main CPU 41 creates progressive link participation sequence data 153 indicative of participation sequences of slot machines participating in a progressive link (see FIG. 65B), and stores them in the RAM 43.

The main CPU 41 performs a process of recognizing a host slot machine (step S16). Specifically, the main CPU 41 sets to ON the host flag stored in the RAM 43. After executing the process of step S16, the main CPU 41 terminates a progressive link creation process.

Next, a progressive link participation process will be described. FIG. 72 is a flowchart showing a subroutine of the progressive link participation process invoked and executed at step S3 in the main processing of the slot machine 10 shown in FIG. 70. Hereinafter, the progressive link participation process will be described by way of example in which a slot machine 10*e* which does not participate in a progressive link participates in a progressive link 150. In this case, the progressive link participation process is performed under cooperative operation between a main CPU 41*e* of the slot machine 10*e* that does not participate in a progressive link and a main CPU 41*a* of a host slot machine 10*a*.

First, an operation of the slot machine 10*e* that does not participate in a progressive link will be described. The main CPU 41*e* of the slot machine 10*e* performs processes at steps S21 to S29 that follow. At step S21, the main CPU 41*e* of the slot machine 10*e* judges whether or not there exists a slot machine which does not participate in a progressive link (step S21). Specifically, the main CPU 41*e* judges whether or not a host flag which is indicative of a host slot machine stored in a main RAM 43*e* and a client flag which is indicative of a client slot machine are set to OFF. Upon judging that the slot machine is not the one which does not participate in a progressive link (step S21: NO), the main CPU 41*e* terminates a progressive link participation process.

Upon judging that the slot machine is the one that does not participate therein (step S21: YES), the main CPU 41*e* performs a process of receiving a participation permission signal (step S22). In this process, the main CPU 41*e* receives a participation permission signal transmitted from the host slot machine 10*a* at step S101 to be described later, and stores in the RAM 43*e* a jackpot payment condition 154 or the like included in the participation permission signal.

Next, the main CPU 41*e* judges whether or not an operation of verifying the contents of a progressive link has been made (step S23). Specifically, the main CPU 41*e* verifies whether or not a player has made an operation of verifying a jackpot payment condition 154 or the like stored in the RAM 43*e*. Upon judging that the above verification operation has not been made (step S23: NO), the main CPU 41*e* terminates a progressive link participation process.

Upon judging that the above operation has been made (step S23: YES), the main CPU 41*e* displays the contents of the progressive link (step S24). This main CPU displays the contents of the jackpot payment condition 154 or the like stored in the RAM 43*e* for the player.

Next, the main CPU 41*e* judges whether or not to participate in a progressive link (step S25). Specifically, the main CPU 41*e* judges whether or not the player has made participation entry by way of operation of the touch panel 69. Upon judging that no player participates in the progressive link (step S25: NO), the main CPU 41*e* terminates the progressive link participation process.

Upon judging that a player participates therein (step S25: YES), the main CPU 41*e* performs a process of transmitting a progressive link participation signal (step S26). In this process, the main CPU 41*e* transmits a participation signal including machine identification information or the like to the host slot machine 10*a*.

The main CPU 41*e* performs a process of receiving a progressive link registration completion signal (step S27), and thereafter, performs a client recognition process (step S28). Specifically, upon receipt of the registration completion signal from the host slot machine 10*a*, this main CPU sets to ON the client flag which is indicative of whether or not the client is stored in the RAM 43*e* of the slot machine 10*e*.

The main CPU 41*e* performs a process of displaying progressive link participation on a lower image display panel 16*e* (step S29). After this process has terminated, the main CPU terminates this subroutine.

Next, an operation of the host slot machine 10*a* will be described. The CPU 41*a* of the host slot machine 10*a* performs processes at steps S101 to S105 that follow. First, at step S101, the CPU 41*a* of the host slot machine 10*a* transmits a participation permission signal to the slot machine 10*e* that does not participate in a progressive link. In this process, the CPU 41*a* transmits a participation permission signal including the jackpot payment condition 154 or the like to the slot machine 10*e*.

The main CPU 41*a* performs a process of receiving progressive link participation information transmitted from the slot machine 10*e* at step S26 (step S102). Further, the main CPU 41*a* performs a progressive link registration process (step S103). Specifically, the main CPU 41*a* performs a process of providing a space or the like for storing data indicative of the BET accumulation amount of the slot machine 10*e* among the data of the slot machine-based BET accumulation amount 155 stored in the RAM 43*a*.

Next, the main CPU 41*a* updates participation sequence data (step S104). Specifically, the main CPU 41*a* adds data of the slot machine 10*e* to the progressive link control data stored in the RAM 43*a*. For example, the CPU 41*a* stores the data corresponding to the slot machine 10*e* at the end of the participation sequence of the progressive link participation sequence data 153 stored in the RAM 43*a*. In this case, the slot machine 10*e* has newly participated in the progressive link 150 when the link is formed at four slot machines 10*a*, 10*b*, 10*c*, 10*d*, and thus, the data of the slot machine 10*e* is stored in a memory space corresponding to a fifth place of the progressive link participation sequence data.

The main CPU 41*a* performs a process of transmitting a progressive link registration completion signal (step S105). This main CPU transmits to the slot machine 10*e* the progressive link registration completion signal received by the slot machine 10*e* at step S27. After this process has terminated, the main CPU terminates this subroutine.

Next, a client's progressive link withdrawing process will be described. FIG. 73 is a flowchart showing a subroutine of the client's progressive link withdrawing process invoked and executed at step S4 in the subroutine at the slot machine 10 shown in FIG. 70. The client's progressive link withdrawing process described hereinafter is performed under cooperative operation between the main CPU 41 of the client's slot machine 10 and the main CPU 41*a* of the host slot machine 10*a*. Hereinafter, the client's progressive link withdrawing process will be described by way of example of a process performed when the client's slot machine 10 withdraws from the progressive link 150.

First, an operation of a slot machine 10*c* will be described. The main CPU 41*c* of the slot machine 10*c* performs processes at steps S30 to S37 that follow. The main CPU 41*c* of the slot machine 10*c* judges whether or not any player participates in a progressive link (step S30). In this process, the main CPU 41*c* judges whether or not a client flag which is indicative of the client's slot machine stored in the RAM 43*c* has been set to ON. Upon judging that the client flag has been set to OFF (step S30: NO), the main CPU 41*c* terminates this subroutine.

Upon judging that the client flag has been set to ON (step S30: YES), the main CPU 41*c* judges whether or not to perform progressive link withdrawal verification display. Specifically, the main CPU 41*c* judges whether or not the player has made an operation of withdrawal display entry from the touch panel 69, i.e., whether or not the player has touched the touch panel 69 on a jackpot withdrawal icon 94*c*. Upon judging that no progressive link withdrawal verification display is performed (step S31: NO), the main CPU 41*c* terminates this subroutine.

Upon judging that progressive link withdrawal verification display is performed (step S31: YES), the main CPU 41*c* performs a process of performing the progressive link withdrawal verification display (step S32).

The main CPU 41*c* judges whether or not to withdraw from a progressive link (step S33). In this process, the main CPU 41*c* judges whether or not a player has made an operation of withdrawal entry from the touch panel 69. Upon judging that no withdrawal from the progressive link occurs (step S33: NO), the CPU 41*c* terminates this subroutine, or alternatively, upon judging that withdrawal from the progressive link occurs (step S33: YES), the CPU 41*c* proceeds to step S34.

The main CPU 41*c* of the slot machine 10*c* performs a process of transmitting a progressive link withdrawal signal (step S34). In this process, the main CPU 41 transmits a withdrawal signal including machine identification information to the host slot machine 10*a*.

The main CPU 41*c* performs a process of receiving a progressive link withdrawal completion signal (step S35), and thereafter, performs a process of eliminating client information (step S36). Specifically, upon receipt of the withdrawal completion signal from the host slot machine 10*a*, this main CPU sets to OFF the client flag which is indicative of whether or not the client is stored in the RAM 43*c* of the slot machine 10*c*.

The main CPU 41*c* of the slot machine 10*c* performs a process of displaying withdrawal from a progressive link on the lower image display panel 16*c* (step S37). After this process has terminated, the main CPU terminates this subroutine.

Next, an operation of the host slot machine 10*a* will be described. The main CPU 41*a* of the host slot machine 10*a* performs processes at steps S111 to S113 that follow. First, the main CPU 41*a* of the host slot machine 10*a* performs a process of receiving a progressive link withdrawal signal transmitted from the slot machine 10*c* at step S34 (step S111).

Next, the main CPU 41*a* performs a progressive link withdrawing process, based upon the received progressive link withdrawal signal (step S112). This main CPU eliminates data pertinent to the slot machine 10*c* from among the progressive link control data 160 stored in the RAM 43*a* of the host slot machine 10*a*.

The main CPU 41*a* performs a process of transmitting a progressive link withdrawal completion signal (step S113). This main CPU transmits to the slot machine 10*c* the progressive link withdrawal completion signal received by the slot machine 10*c* at step S35. After this process has terminated, the main CPU terminates this subroutine.

Figure 74A:
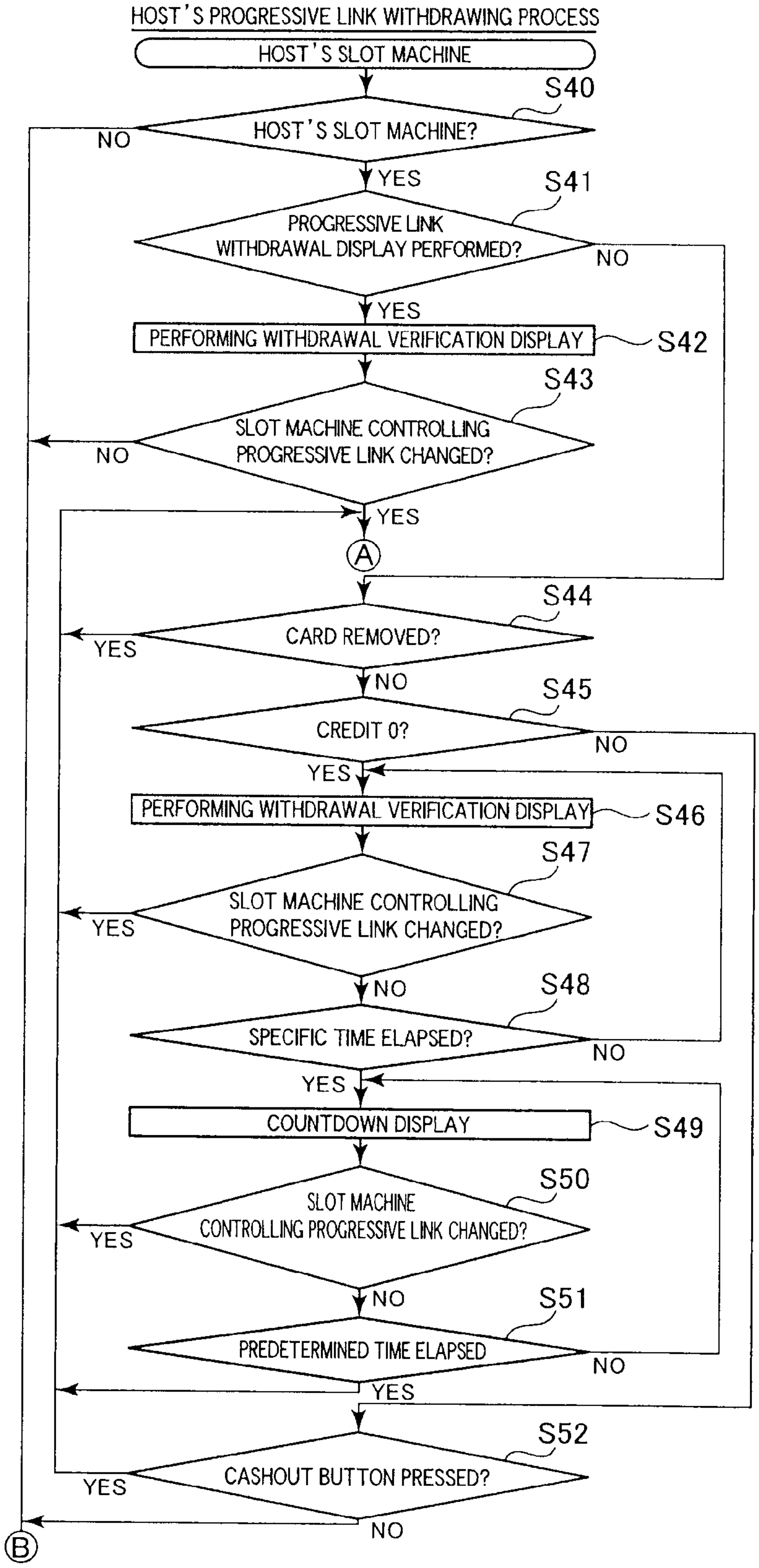
FIG. 74A is a flowchart showing a subroutine of a host progressive link withdrawing process at the slot machine.
Figure 74B:
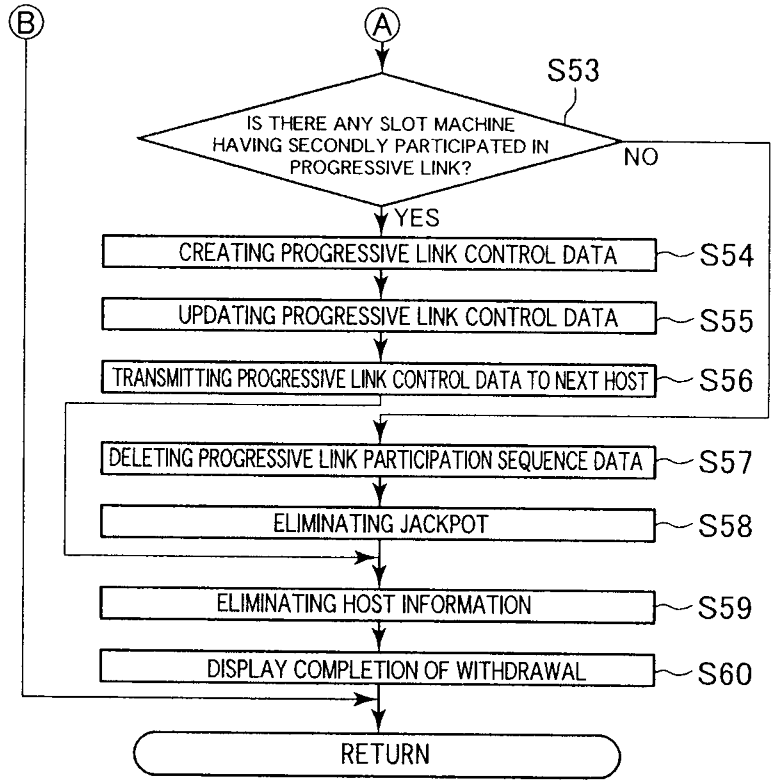
FIG. 74B is a flowchart showing a subroutine of a host progressive link withdrawing process at the slot machine.

Next, a host's progressive link withdrawing process will be described. FIGS. 74A and 74B are flowcharts, each of which shows a subroutine of the host's progressive link withdrawing process invoked and executed at step S5 in the subroutine at the slot machine 10 shown in FIG. 70. Hereinafter, the host's progressive link withdrawing process will be described by way of example of a process performed when the host slot machine 10*a* withdraws from the progressive link 150.

At step S40, the main CPU 41*a* of the slot machine 10*a* judges whether or not a host slot machine exists. In this process, the main CPU 41*a* judges whether or not a host flag which is indicative of the host slot machine stored in the RAM 43*a* has been set to ON. Upon judging that the host flag has been set to OFF (step S40: NO), the main CPU 41*a* terminates this subroutine.

Upon judging that the host slot machine exists, i.e., upon judging that the host flag has been set to ON (step S40: YES), the main CPU 41*a* judges whether or not to perform progressive link withdrawal verification display. Specifically, the main CPU 41*a* judges whether or not the player has made an operation of withdrawal display entry from the touch panel 69, i.e., whether or not the player has touched the touch panel 69 on the jackpot withdrawal icon 94*c* (see FIG. 66A). Upon judging that no progressive link withdrawal verification display is performed (step S41: NO), the main CPU 41*a* proceeds to step S44.

Upon judging that the progressive link withdrawal verification display is performed (step S41: YES), the main CPU 41*a* performs a process of performing the progressive link withdrawal verification display (step S42). Specifically, the main CPU 41*a* causes the lower image display panel 16 to display a message asking a player as to whether or not to withdraw from the jackpot shown in FIG. 66B.

Next, the main CPU 41*a* judges whether or not to change a slot machine controlling a progressive link (step S43). Specifically, the main CPU 41*a* judges whether or not the player has made entry indicative of withdrawal from a progressive link from the touch panel 69. Upon judging that no slot machine controlling a progressive link is changed (step S43: NO), the CPU 41*a* terminates this subroutine, or alternatively, upon judging that it is changed (step S43: YES), this CPU proceeds to step S53.

Upon judging that no progressive link withdrawal verification display is performed at step S41 (step S41: NO), the main CPU 41*a* judges whether or not an ID card has been removed (step S44). Specifically, the main CPU 41*a* judges whether or not an ID card (smart card) has been removed, the card storing data or the like for identifying players read by a card reader 36. Upon judging that the ID card has been removed (step S44: YES), the main CPU 41*a* proceeds to step S53.

Upon judging that no ID card has been removed (step S44: NO), the main CPU 41*a* judges whether or not the amount of credit is 0 (step S45). Specifically, the main CPU 41*a* reads the remaining amount of credit used in a game, the amount being stored in the main RAM 43*a*, and judges whether or not the remaining amount is 0.

Upon judging that the amount of credit is not 0 (step S45: NO), the main CPU 41*a* proceeds to step S52, and the main CPU 41*a* judges whether or not the cashout button has been pressed (step S52). Upon judging that the cashout button has been pressed and the credit has been liquidated (step S52: YES), the main CPU 41*a* proceeds to step S53. If not (step S52: NO), the main CPU 41*a* terminates this subroutine.

Upon judging that the amount of credit is 0 (step S45: YES), the main CPU 41*a* performs withdrawal verification display (step S46). The main CPU 41*a* causes the lower image display panel 16 to display a message asking a player as to whether or not to withdraw from a jackpot (see FIG. 67A).

Next, the main CPU 41*a* judges whether or not to change a slot machine controlling a progressive link (step S47). In this process, the main CPU 41*a* judges whether or not the player has performed an operation of making entry indicative of withdrawal from a progressive link, from the touch panel 69. Specifically, the main CPU judges whether or not the player has touched the touch panel 69 on the YES icon of FIG. 67A. Upon judging that the slot machine controlling a progressive link is changed, i.e., in a case where the player has touched the touch panel 69 on the YES icon 112 of FIG. 67A (step S47: YES), the CPU 41*a* proceeds to step S53.

Upon judging that no slot machine controlling a progressive link is changed, i.e., in a case where the player has touched the touch panel 69 on the NO icon 113 of FIG. 67A (step S47: NO), the main CPU 41*a* judges whether or not a specified time has elapsed after performing withdrawal verification display at step S46 (step S48). Upon judging that no specified time has elapsed after performing the withdrawal verification display (step S48: NO), the main CPU 41*a* reverts to step S46.

Upon judging that a specified time has elapsed after performing withdrawal verification display (step S48: YES), the main CPU 41*a* performs a countdown display (step S49). Specifically, the main CPU 41*a* causes the lower image display panel 16 to display a time spent until a slot machine controlling a progressive link has been changed, i.e., a time spent until withdrawal from a progressive link has completed (see FIG. 67B).

Next, the main CPU 41*a* judges whether or not to change a slot machine controlling a progressive link (step S50). In this process, the main CPU 41*a* judges whether or not the player has made entry indicative of withdrawal from a progressive link, from the touch panel 69, i.e., whether or not the player has touched the touch panel 69 on the YES icon 112 of FIG. 67B. Upon judging that a slot machine controlling a progressive link is changed (step S50: YES), the CPU 41*a* proceeds to step S53.

Upon judging that no slot machine controlling a progressive link is changed (step S50: NO), the main CPU 41*a* judges whether or not a specified time 15 minutes) has elapsed after performing withdrawal verification display at step S46 (step S51). Upon judging that the specified time has not elapsed after performing withdrawal verification display (step S51: NO), the main CPU 41*a* reverts to step S49. Upon judging that the specified time has elapsed after performing withdrawal verification display (step S51: YES), the main CPU 41*a* proceeds to step S53.

Upon judging that a slot machine controlling a progressive link is changed (step S43: YES, step S47: YES, step S50: YES); upon judging that an ID card has been removed (step S44: YES); upon judging that the specified time has elapsed after performing withdrawal verification display (step S51: YES); and when the cashout button has been pressed (step S53: YES), the main CPU 41*a* judges whether or not there exists a slot machine having secondly participated in a progressive link (step S53). The main CPU 41*a* performs a process of determining identification information of a slot machine whose participation sequence is a succession to a slot machine 10*a* exercising centralized control of jackpots, in response to the participation sequences stored in the RAM 43, upon the receipt of withdrawal entry from the cashout switch 24S, the card reader 36, or the touch panel 69. Specifically, the main CPU 41*a* judges whether or not there exists a slot machine 10 having participated in a progressive link, immediately following the slot machine 10*a*, referring to the participation sequence data stored in a main RAM 41*a*. Upon judging that there exists the slot machine having secondly participated in a progressive link (step S53: YES), the main CPU 41*a* performs a process of creating progressive link control data 160 (step S54). The items of progressive link control data 160 include: "progressive link participation sequence data 153"; a "jackpot payment condition 154"; a "slot machine-based BET accumulation amount 155"; and a "progressive value 156" or the like (see FIG. 65B).

Next, the main CPU 41*a* updates progressive link control data (step S55). In this process, the main CPU 41*a* eliminates information of the slot machine 10*a*, from the progressive link participation sequence data 153 and the slot machine-based BET accumulation amount 155, which are included in the progressive link control data.

Next, the main CPU 41*a* performs a process of transmitting the progressive link control data 160 to a next host slot machine (step S56). In order to store the determined identification information of the next host slot machine in the RAM 43 of the corresponding slot machine 10, the main CPU 41*a* executes a process of transferring to the slot machine, the progressive value and participation sequence stored in the RAM 43*a*, via a communication interface 44*a*. Specifically, the main CPU 41*a* transmits the progressive link control data 160 to a slot machine 10*b* stored as the one having participated in the progressive link, immediately following the host slot machine 10*a* determined at step S53 (see FIG. 65B).

Upon judging that there does not exist a slot machine having secondly participated in a progressive link (step S53: NO), the main CPU 41*a* deletes the progressive link participation sequence data created at step S15 and stored in the RAM 43*a* (step S57). Next, the main CPU 41*a* deletes a jackpot (step S58). Specifically, the main CPU 41*a* deletes data pertinent to jackpots, such as the "jackpot payment condition 154", the "slot machine-based BET accumulation amount 155", and the "progressive value 156", which were created at step S14 and stored in the RAM 43*a*.

The main CPU 41*a* eliminates host information after the process at step S56 or step S58 has terminated (step S59). Specifically, the main CPU 41*a* sets, to OFF, a host flag which is indicative of a host slot machine stored in the RAM 43*a*.

Next, the main CPU 41*a* displays withdrawal from a progressive link (step S60). Specifically, the main CPU causes the lower image display panel 16 to display a message notifying to a player, withdrawal from a jackpot (see FIGS. 68A and 68B). After this process has terminated, the main CPU terminates this subroutine.

A host change process will be described. FIG. 75 is a flowchart showing a subroutine of the host change process invoked and executed at step S6 in the subroutine at the slot machine 10 shown in FIG. 70. Hereinafter, a host change process will be described by way of example of a process performed in a case where the slot machine 10*b* becomes a next host slot machine.

A main CPU 41*b* of the slot machine 10*b* judges whether or not anyone participates in a progressive link (step S71). In this process, the main CPU 41*b* judges whether or not a client flag, which is indicative of a client slot machine stored in the RAM 43*b*, has been set to ON. Upon judging that the client flag has been set to OFF (step S71: NO), the main CPU 41*b* terminates this subroutine.

Upon judging that the client flag has been set to ON (step S71: YES), the main CPU 41*b* performs a process of storing received progressive link control data in a memory (step S72). Specifically, the RAM 43*b* stores the progressive link control data transmitted from the slot machine 10*a* as a previous host slot machine at step S56 of FIG. 74.

Next, the main CPU 41*b* performs a process of recognizing a host slot machine (step S73). Specifically, the main CPU 41*b* performs a process of setting to ON a host flag which is indicative of a host slot machine stored in the RAM 43*b*.

Next, the main CPU 41*b* performs a process of displaying a host slot machine (step S74). Specifically, the main CPU 41*b* causes the lower image display panel 16 of the slot machine 10*b* to display a host icon 94*b* and causes a guide display area 118 to display that the slot machine 10 newly becomes a host slot machine. Further, the main CPU notifies the fact to the player who is playing at the slot machine 10*b* (see FIG. 69). After this process has terminated, the main CPU terminates this subroutine.

The main CPU 41*b* of the slot machine 10*b* judges whether or not programs, game history data, and participation sequence data have been received. When the judgment result is affirmative, the main CPU causes the lower image display panel (display device) 16 to display a screen for setting a BET input amount of a progressive bonus. In addition, the main CPU 41*b* of the slot machine 10*b* may execute a process of changing the BET input amount of the progressive bonus game, in response to screen input information displayed on the lower image display panel 16. Further, the main CPU 41*b* of the slot machine 10*b* transmits the BET input amount after changed, to another slot machine 10 participating in the same progressive link.

Now, game processing will be described. FIG. 76 is a flowchart showing a subroutine of the game processing invoked and executed at step S7 in the subroutine at the slot machine 10 shown in FIG. 70. The game processing described hereinafter is performed under cooperative operation between a main CPU 41 of a client's slot machine 10 and a main CPU 41*a* of a host slot machine 10*a*. Hereinafter, the game processing will be described by way of example when a slot machine 10*c* is the client's slot machine.

The main CPU 41*c* of the slot machine 10*c* performs processes at steps S81 to S93 that follow. First, the main CPU 41*c* judges whether or not a coin has been betted (step S81). In this process, the main CPU 41*c* judges whether or not there has been received an input signal output from a 1-BET switch 26S when a 1-BET button 26 has been operated or an input signal output from a maximum BET switch 27S when a maximum BET button 27 has been operated. Upon judging that no coin has been betted (step S81: NO), the main CPU 41*c* reverts to step S81, or alternatively, upon judging that a coin has been betted (step S81: YES), the main CPU proceeds to step S82.

The main CPU 41*c* of the slot machine 10*c* performs a process of subtracting the amount of credit stored in the RAM 43*c* in response to the number of betted coins (step S82). Further, the main CPU 41*c* stores in the RAM 43*c* the amount of credit after subtracted.

Next, the main CPU 41*c* of the slot machine 10 judges whether or not a spin button 23 has been set to ON (step S83). Specifically, the main CPU 41*c* judges whether or not an input signal output from the spin switch 23S has been received upon pressing of the spin button 23. Upon judging that the spin button 23 has not been set to ON (step S83: NO), the main CPU 41*c* reverts to step S81, or alternatively, upon judging that the spin button 23 has been set to ON, (step S83: YES), the main CPU proceeds to step S84. Upon judging that the spin button 23 has not been set to ON (for example, when an instruction for terminating a game has been entered without setting the spin button 23 to ON), the main CPU 41*c* cancels subtraction of the amount of credit of step S82.

The main CPU 41*c* of the slot machine 10*c* judges whether or not anyone participates in a progressive link (step S84). Specifically, in the aforementioned progressive link participation process performed in FIG. 72, the main CPU 41*c* judges whether or not the client flag stored in the RAM 43*c* is set to ON. Upon judging that anyone participates in a progressive link (step S84: YES), the main CPU 41*c* proceeds to step S85, or alternatively, upon judging that no one participates in a progressive link (step S84: NO), the main CPU proceeds to step S90.

The main CPU 41*c* of the slot machine 10*c* transmits to the host slot machine 10*a*: the BET amount to be betted on a jackpot among the number of coins betted at step S81; and identification information of the slot machine 10*c* stored in the ROM 42*c* (step S85).

The main CPU 41*c* of the slot machine 10*c* judges whether or not a winning jackpot signal has been received (step S86). The main CPU 41*a* of the host slot machine 10*a* randomly selects a slot machine acquiring a jackpot from a plurality of slot machines participating in a progressive link, and transmits a winning jackpot signal to only the selected slot machine. Namely, only the slot machine having acquired a jackpot can receive a winning jackpot signal. Upon judging that the winning jackpot signal has been received (step S86: YES), the main CPU 41*c* proceeds to step S87, or alternatively, upon judging that no winning jackpot signal has been received (step S86: NO), the main CPU proceeds to step S90.

The main CPU 41*c* of the slot machine 10*c* performs a winning jackpot symbol determination process (step S87). Specifically, upon judging that the spin button 23 has been set to ON at step S83, the main CPU 41*c* executes the symbol determination program stored in the RAM 43*c*, and upon receipt of the winning jackpot signal at step S86, the main CPU determines code No. indicating a winning jackpot established when scrolling of symbols stops.

The main CPU 41*c* of the slot machine 10*c* performs a winning jackpot scroll-display process (step S88). Specifically, the main CPU 41*c* performs display-control so that, after an elapse of a specified time after starting scroll-display of plural types of symbols, the symbols designated by code Nos., which are indicative of a winning jackpot determined at step S87, are displayed in a stopped state in the symbol matrix 28, concurrently with stoppage of scroll-display.

The main CPU 41*c* of the slot machine 10*c* performs a winning jackpot payout process (step S89). Specifically, the main CPU 41*c* pays out coins, based upon the payout amount included in the winning jackpot signal received at step S86.

The main CPU 41*c* of the slot machine 10*c* performs a symbol determination process (step S90). Specifically, upon judging that the spin button 23 has been set to ON at step S83, the main CPU 41*c* determines code Nos. at the time of stoppage of symbols, by executing the symbol determination program stored in the RAM 43. The embodiment described a case of determining one or more prizes from among plural types of prizes, by determining symbols displayed in a stopped state. However, the present invention is not limitative thereto, and, for example, may be applicable to a case in which one or more prizes selected from among the plural types of prizes are determined, and thereafter, the combinations of symbols displayed in a stopped state are determined based upon the above-mentioned prizes.

The main CPU 41*c* of the slot machine 10 performs a scroll-display process (step S91). Specifically, the main CPU 41*c* performs display-control so that, after an elapse of a specified time after starting scroll-display of plural types of symbols, the symbols designated by code Nos. determined at step S90 are displayed in a stopped state in the symbol matrix 28, concurrently with stoppage of scroll-display.

Next, the main CPU 41*c* of the slot machine 10*c* determines whether or not a scatter prize is established (step S92). Specifically, the main CPU 41*c* judges whether or not a scatter prize is established such that three or more trigger symbols for the scatter prize are displayed in a stopped state in any of the symbol matrix 28. Upon judging that the scatter prize is established (step S92: YES), the main CPU 41*c* proceeds to step S93 at which a coin payout process is to be performed. Upon judging that no scatter prize is established (step S92: NO), the main CPU 41*c* terminates this subroutine without paying out a coin.

If the main CPU 41*c* judges that no winning jackpot signal has been received (step S86: NO) and that no scatter prize is established (step S92: NO), it is determined to be a "loser". The word "loser" used herein denotes that no coin is paid out.

Next, an operation of a host slot machine 10*a* will be described. A main CPU 41*a* of the host slot machine 10*a* performs processes at steps S121 to S127 that follow. The main CPU 41*a* receives jackpot BET information and machine identification information which were transmitted from the slot machine 10*c* at the abovementioned step S85 (step S121). The main CPU 41*a* stores the jackpot amount in the RAM 43*a*, based upon the received jackpot BET information. The RAM 43*a* stores the jackpot BET amount by slot machine 10, and the main CPU 41*a* stores the jackpot BET amount in the memory space of the corresponding slot machine 10 of the RAM 43*a*, based upon machine identification information. Further, the main CPU 41*a* receives the machine identification information transmitted from the slot machine 10 at the abovementioned step S85, and stores the received count in the predetermined memory space of the RAM 43*a*, as a standalone game count (hereinafter, referred to as a game count) paid for a progressive bonus game. The RAM 43*a* stores the count by slot machine 10, and the main CPU 41*a* stores the game count in the memory space of the corresponding slot machine 10 of the RAM 43*a*, based upon machine identification information.

Next, the main CPU 41*a* of the host slot machine 10*a* performs a process of adding a jackpot progressive value (step S122). Specifically, the main CPU 41*a* performs a process of accumulatively storing game history data (hereinafter, referred to as a progressive value) in the RAM 43*a*, the game history data including numeric data pertinent to a jackpot payment, the numeric data being received via a communication interface 44, in response to a unit game-based BET input executed at a plurality of slot machines 10. In other words, the main CPU 41*a* adds a respective one of the jackpot BET amounts of the slot machines 10 stored in the RAM 43*a* at step S121 and adds up the jackpot BET amounts of all of the slot machines participating in a progressive link. Further, the main CPU stores a progressive value in the RAM 43*a*. For example, after two slot machines have participated in the progressive link, if the jackpot BET numbers invested by the two slot machines 10 are 500 BETS and 300 BETS, respectively, the host slot machine 10*a* adds up these BET numbers (500+300). After that, the added up progressive value of "800" is stored in the RAM 43*a*.

Next, the main CPU 41*a* of the host slot machine 10*a* performs a process of adding up a game count (step S123). Specifically, the main CPU 41*a* adds up a respective one of the game counts of the slot machines stored in the RAM 43*a* at the abovementioned step S121 and stores, in the RAM 43*a*, values of the added-up total game counts at all of the slot machines participating in a progressive link. For example, if the game counts of the two slot machines 10 are 10 times and 25 times, respectively, the host slot machine 10*a* adds up these game counts (10+25), and stores the added-up value of "35" in the RAM 43*a*.

The main CPU 41*a* of the host slot machine 10*a* judges whether or not the progressive value added at step S122 reaches 50% of the maximum value of the jackpot payout set in the abovementioned progressive link creation process (step S124). For example, when the maximum value of the set jackpot payout is $1,000,000, the main CPU 41*a* judges whether or not the progressive value stored in the RAM 43*a* is $500,000 or more. Upon judging that the progressive value reaches 50% of the maximum value of jackpot payout (step S124: YES), the main CPU 41*a* proceeds to step S125, or alternatively, upon judging that the progressive value fails to reach 50% of the maximum value of jackpot payout (step S124: NO), the main CPU terminates this subroutine.

The main CPU 41*a* of the host slot machine 10*a* judges whether or not a winning jackpot prize is established (step S125). Specifically, the main CPU 41*a* assigns a specific number to a slot machine having transmitted jackpot BET information and machine identification information at step S85, and samples random numbers from the predetermined numeric range including the assigned specific number. After that, the main CPU 41*a* judges whether or not the sampled random number coincides with the specific number. Upon judging that a winning jackpot prize is established (step S125: NO), the main CPU 41*a* proceeds to step S126, or if not (step S125: NO), the main CPU terminates this subroutine.

The main CPU 41*a* of the host slot machine 10*a* transmits a winning jackpot signal (step S126). Specifically, in a case where the random number sampled at step S125 coincides with a specific number, the main CPU 41*a* transmits a winning jackpot signal as a winning jackpot to a slot machine to which the specific number has been assigned.

The main CPU 41*a* of the host slot machine 10*a* resets the progressive value of a jackpot (step S127). Specifically, the main CPU 41*a* resets: the progressive value of the winning jackpot stored in the RAM 43*a*; the jackpot BET amount by slot machine 10; a total game count; and a value of game count by slot machine 10. After this process has terminated, the main CPU terminates this subroutine.

According to the embodiment of the present invention, a game system can be provided which is capable of smoothly maintaining a jackpot even if the host gaming machine managing jackpots withdraws from the jackpot.

The embodiment described a case in which a host slot machine 10*a* withdraws from a progressive link and a slot machine 10*b* becomes a next host slot machine. However, in the present invention, even when the slot machine 10*b* as a new host slot machine withdraws from the progressive link, the host slot machine 10*b* can transfer its host function to another slot machine participating in the same progressive link, as in the abovementioned embodiment. In other words, an operation of specifying a new host slot machine when the current host slot machine withdraws is continuously repeated, and a jackpot is stably provided to a player.

While the embodiment described a case in which a plurality of slot machines 10 and a common display device 300 are connected via a wire, the present invention is not limitative thereto. Data may be received or transmitted wirelessly. In other words, the communication line according to the present invention includes a wired or wireless transmission line.

While the embodiment described a case in which the game system 100 is installed in one gaming facility or the like, the slot machines 10 may be installed separately in other gaming facilities, in the present invention.

While the embodiment described a case in which a slot machine is employed as a gaming machine, a card game machine may be employed in the present invention.

While the embodiment described a case in which one link game is executed, a plurality of link games may be executed in the present invention.

Ninth Embodiment

Figure 77A:
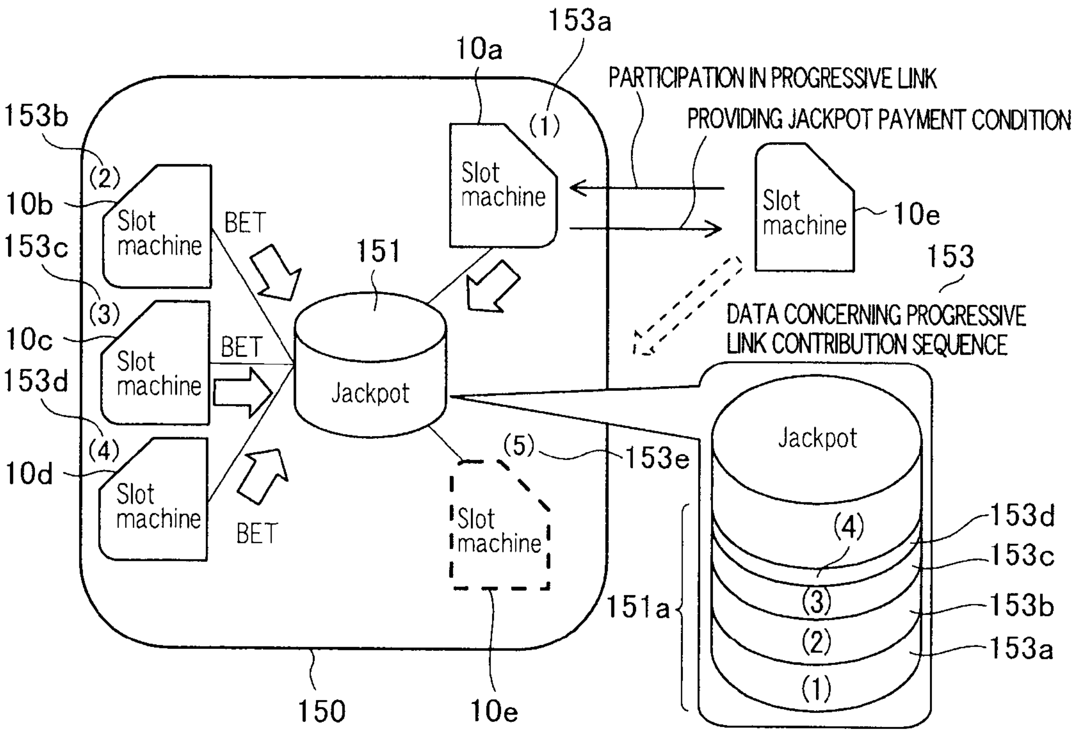
FIG. 77A is an illustrative view schematically showing an interrelationship between a plurality of slot machines sharing a jackpot.

A game system according to the present invention will be explained in details with reference to the drawings. As shown in FIG. 77A, a plurality of slot machines 10*a*, 10*b*, 10*c*, 10*d* share a jackpot 151 which is a progressive bonus game, and forms a progressive link 150. This progressive link is controlled by means of a host slot machine 10*a*. A RAM 43*a* (see FIG. 77B) of the host slot machine 10*a* stores progressive link contribution sequence data which is payment information indicative of sequences in which slot machines have contributed to a jackpot. The progressive link contribution sequence data 153 is stored in a state in which items of information pertinent to slot machines are associated with BET accumulation amounts in sequential order from the largest BET accumulation amount. This storing is performed based upon a slot machine-based BET accumulation amount 155 indicative of the BET accumulation amount of a respective one of the slot machines participating in a progressive link.

Figure 77B:
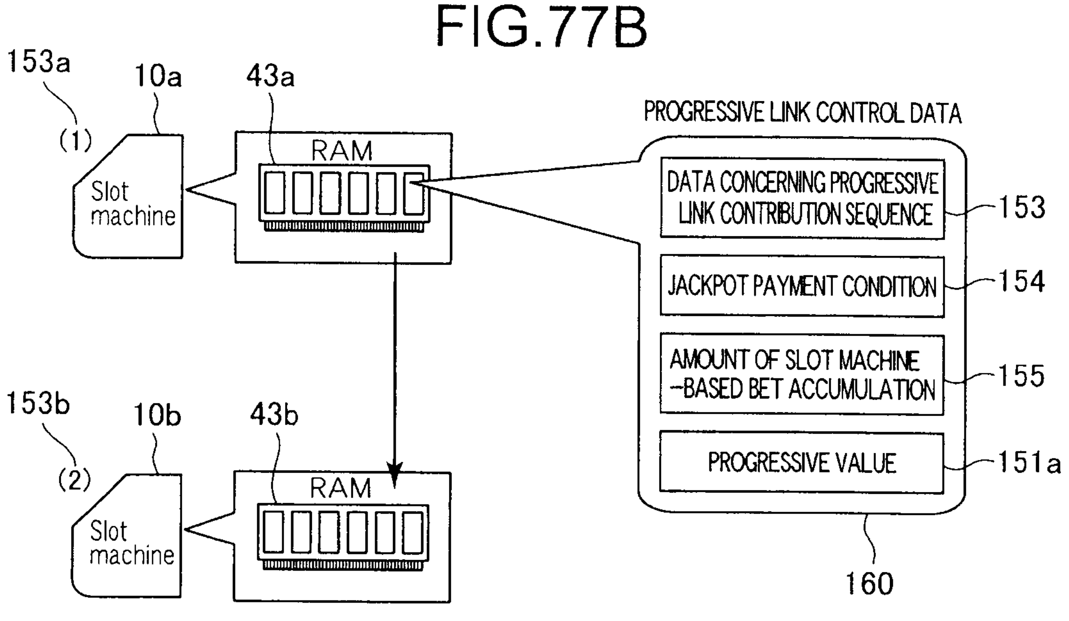
FIG. 77B is an explanatory view schematically showing the contents of a process of specifying a slot machine as a next host machine, the process being performed when a slot machine as a current host withdraws from a progressive link.

When a slot machine 10*a* as a current host withdraws from a progressive link 150, a main CPU 41 of the slot machine 10*a* judges whether or not there exists a slot machine having contributed to the progressive link 150 secondly of the slot machine 10*a*. When the judgment result is affirmative, that slot machine is determined as a next host machine. After that, as shown in FIG. 77B, the main CPU 41 of the host slot machine 10*a* transmits progressive link control data 160 to the slot machine determined as the next host machine. Further, having thus received the progressive link control data 160, a slot machine 10*b* as a next host machine stores progressive link control data in a RAM 43*b*, and serves as the host slot machine to start control of another slot machine participating in the progressive link 150.

Figure 78:
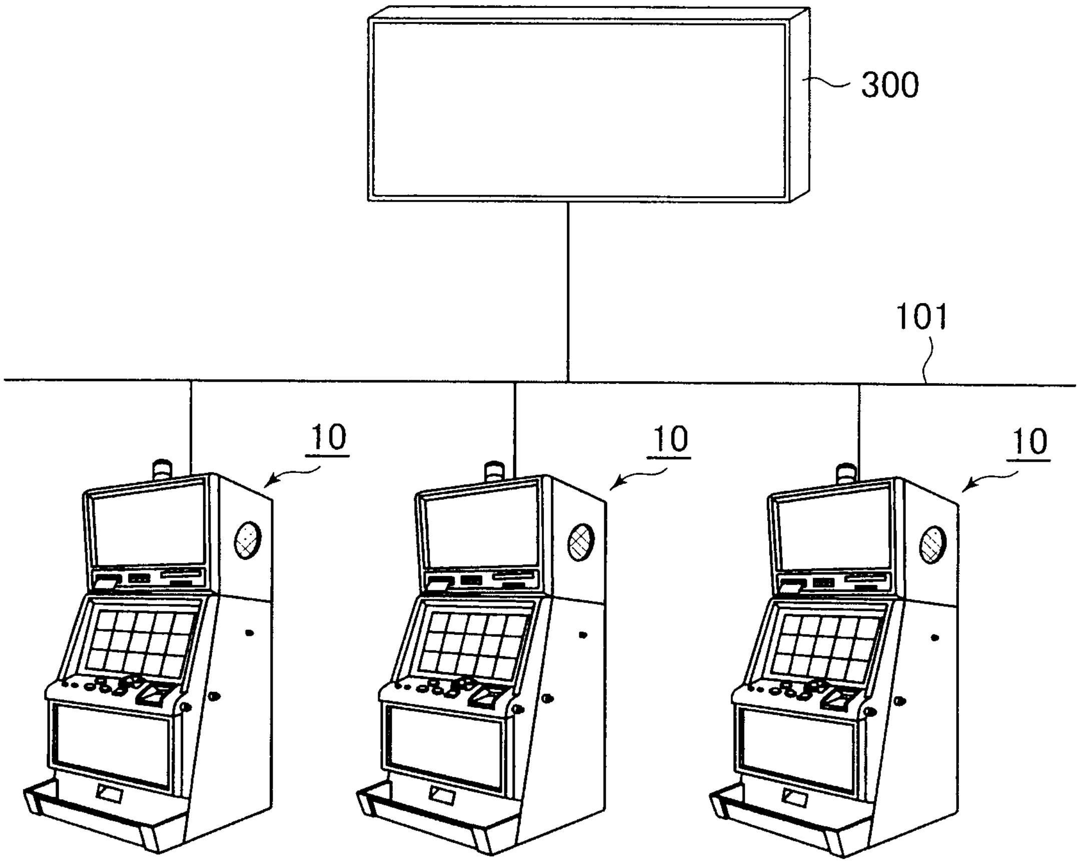
FIG. 78 is a schematic view showing an entire configuration of a game system.

Next, an entire configuration of a link system in the embodiment will be described. FIG. 78 is a schematic view showing an entire configuration of the link system. As shown in FIG. 78, this link system is provided with a plurality of slot machines 10 and a common display device 300. The common display device 300 is equivalent to a center display device according to the present invention.

The plurality of slot machines 10 and the common display device 300 are interconnected via a communication line 101. The plurality of slot machines 10 and the common display device 300 can receive/transmit data from/to each other via the communication line 101. The plurality of slot machines 10 are interconnected so that they can be communicated with each other via the communication line 101.

The common display device 300 is intended for displaying the amount of prize money for a jackpot in a progressive link to be described later, and is installed at a position at which the players at the plurality of slot machines 10 can visually recognize the device.

Figure 79:
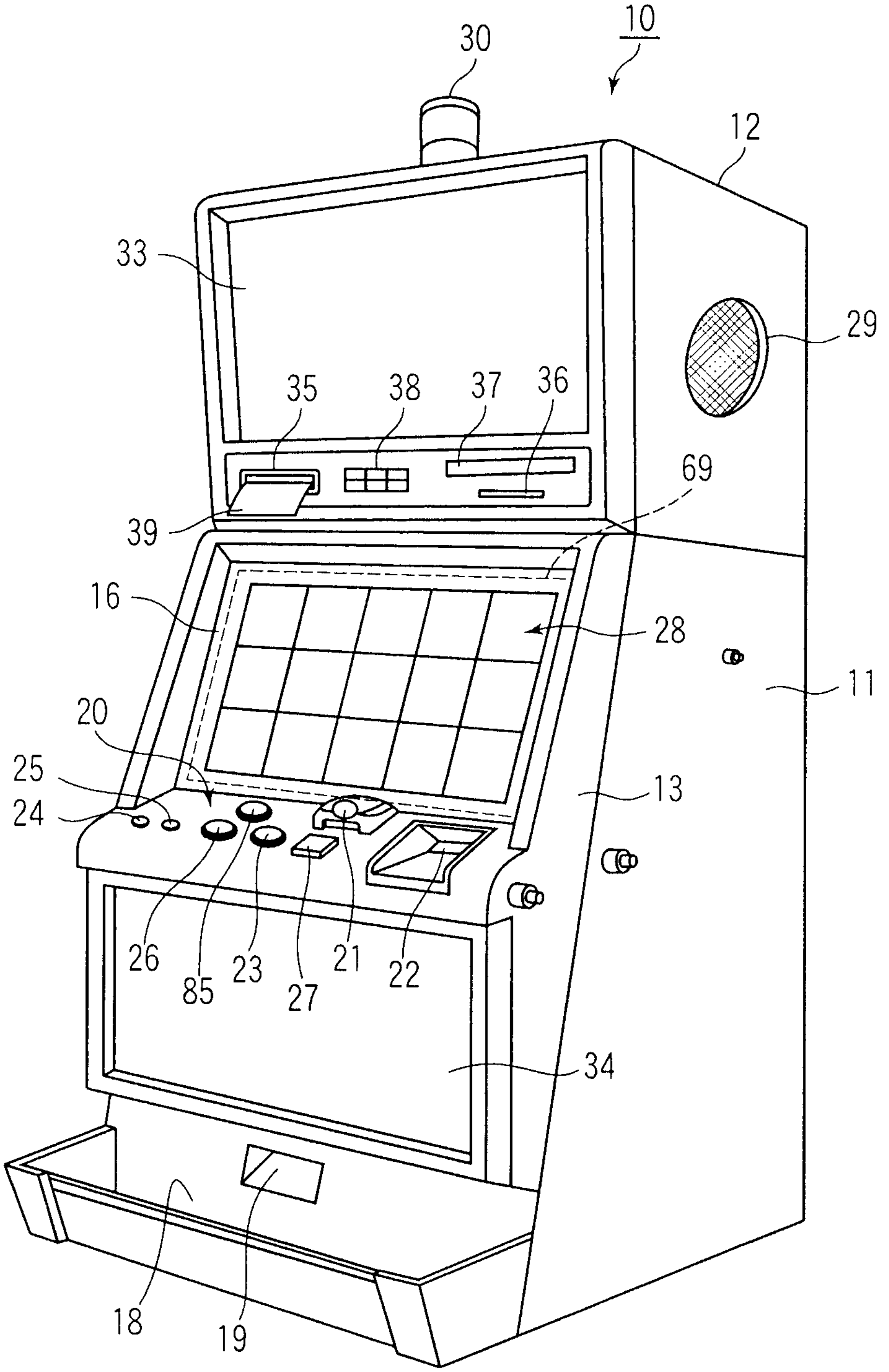
FIG. 79 is a perspective view schematically showing a slot machine.

FIG. 79 is a view schematically showing an appearance of a slot machine according to the embodiment of the present invention. The gaming media for use in the slot machine 10 include coins, bills, or electronic value information equivalent thereto. In the present invention, however, medals, tokens, electronic money, or tickets, for example, may be employed as gaming media without being limitative thereto in particular. The above tickets are not limitative in particular, and can include barcode-attached tickets or the like, as described later, for example.

The slot machine 10 is provided with: a cabinet 11; a top box 12 which is installed on an upper side of the cabinet 11; and a main door 13 which is provided on a front surface of the cabinet 11.

At the slot machine 10, a lower image display panel 16 as a display device is provided in front of a main door 13. The lower image display panel 16 is provided with a liquid crystal panel on which the symbol matrix 28 is displayed in three rows and five columns. One symbol is arranged in a respective one of the cells of a symbol matrix 28, and a maximum of 15 symbols are displayed. The touch panel 69 is provided at the player's side of the lower image display panel 16. An image such as an icon is displayed on the lower image display panel 16. A player touches a partial area of the touch panel 69 on the image, and it is judged that the image has been selected by the player, thereby acting as a touch panel button.

Provided on the lower side of the lower image display panel 16 at a center of the main door 13 is a control panel 20 on which a plurality of buttons 23 to 27 and 85 through which command regarding the process of the game is entered, a coin receiving slot 21 for receiving coins into the cabinet 11, and bill validator 22 are disposed.

On the control panel 20, a start button 23, a change button 24, a cashout button 25, a 1-BET button 26, a MAX-BET button 27, and a side-BET button 85 are provided. The start button 23 is intended for entering an instruction for starting a standalone game. The change button 24 is intended for use in asking an attendant of the gaming facility for change. The cashout button 25 is intended for entering a command for paying out the credited coins to a coin tray 18 through a coin payout exit 19.

The 1-BET button 26 is intended for entering a command for betting a credit corresponding to one coin. The MAX-BET button 27 is intended for entering a command for betting the maximum number (fifty in this embodiment) of coins that can be bet in each game. A side-BET button 85 is used to place a BET in a subsidiary game other than those in which symbols are rearranged in the symbol matrix 28, among standalone games. For example, if, in the embodiment, a predetermined credit is betted by means of a side-BET button 85, it is possible to control a "CHANCE" symbol to be rearranged in the symbol matrix 28. Part of the credits betted by these input means is accumulatively stored in a memory space set in a RAM 43, and is defined as a standard for determining the amount of payout if a jackpot is acquired in a progressive bonus game.

The bill validator 22 validates whether or not a bill is legitimate and accepts a legitimate bill into the cabinet 11. The bill validator 22 may be configured so that a barcode-attached ticket 39 described later is readable thereby. Provided on a lower front surface of the main door 13, that is, at a lower part of the control panel 20, is a berry glass 34 on which characters of the slot machine 10 and the like are depicted.

On the front face of the top box 12, an upper image display panel 33 is provided. The upper image display panel 33 has a liquid crystal panel displaying images for introducing the game contents or explaining game rules, for example.

Also, on the top box 12, a lamp 30 and a speaker 29 are provided. At the lower side of the upper image display panel 33, a ticket printer 35, a card reader 36, a data display 37, and a keypad 38 are provided. The ticket printer 35 prints, on tickets, bar codes containing coded data such as credit amount, date and time, or ID numbers of the slot machine 10, and the bar code-attached tickets 39 are output. A player causes another slot machine to read the bar-code-attached tickets 39, allowing the slot machine to perform games, or alternatively, allowing the exchange of barcode-attached tickets 39 with bills or the like at a predetermined site of a game facility (for example, at the cashier in a casino).

The card reader 36 reads/writes data from/into a smart card. The smart card is owned by the player, which stores data for identifying the player or data regarding the log of games executed by the player, for example. The smart card may store data equivalent to coins, bills, or credits. As an alternative of a smart card, a magnetic stripe card may be employed. The data display 37 is made up of a fluorescent display or the like, and stores data read by the card reader 36 or data input by a player via the keypad 38, for example. The keypad 38 is intended for entering the instructions or data pertinent to the issuance of tickets.

Figure 80:
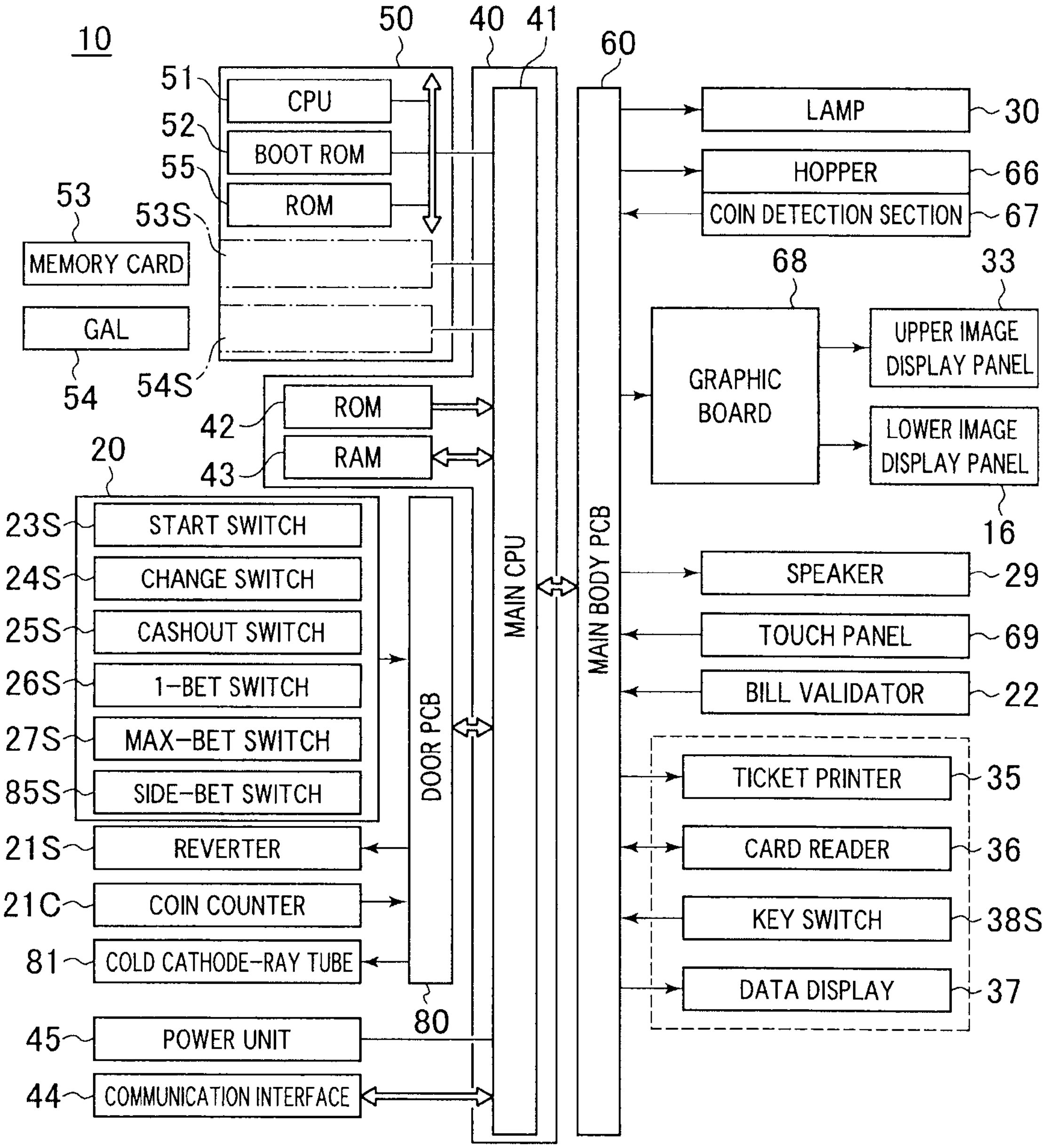
FIG. 80 is a view depicting an internal configuration of the slot machine.

FIG. 80 is a block diagram depicting the internal construction of the slot machine shown in FIG. 79. A gaming board 50 is provided with: a CPU (Central Processing Unit) 51, a ROM (Read Only Memory) 55, and a boot ROM 52, which are interconnected via an internal bus; a card slot 53S equivalent to a memory card 53; and an IC socket 54S equivalent to a GAL (Generic Array Logic) 54.

The memory card is internally provided with a nonvolatile memory, and stores game programs. The game programs include a symbol selection program. The aforementioned symbol selection program is intended for determining symbols rearranged in the symbol matrix 28. The symbol selection program includes symbol weighing data corresponding to a respective one of plural types of payout ratios (for example, 80%, 84%, and 88%). The symbol weighting data is indicative of the correspondence relationship between the respective symbols and one or more random numeric values which come under a predetermined numerical range (0 to 255). The payout rate is determined based upon payout rate setting data output from the GAL 54, and the symbols rearranged in the symbol matrix 28 are determined based upon the symbol-weighted data corresponding to the payout rate. Further, the game programs include table data indicating the correspondence relationship between a respective one of the symbols and a payout.

In addition, a card slot 53S is constituted to enable removable insertion of the memory card 53, and the card slot is connected to a motherboard 40 by means of an IDE bus. Therefore, the memory card 53 is removed from the card slot 53S, other game programs and game system programs are written into the memory card 53, and the memory card 53 is inserted into the card slot 53S, thereby making it possible to vary the types or contents of games performed at the slot machine 10. The game programs include those which are relevant to the operating procedures for performing games. Furthermore, the game program includes image data or sound data to be output during the game. The image data includes image data of symbols to be arranged in the symbol matrix 28.

The GAL 54 is a kind of PLD having an OR-fixed arrayed structure. The GAL 54 is provided with a plurality of IN ports and OUT ports. If predetermined items of data are input to the IN port, the corresponding data is output from the OUT port. The data output from the OUT port is equivalent to the above-described payout rate setting data. In addition, the IC socket 54S is constituted to enable removable insertion of the GAL 54, and is connected to a motherboard 40 by means of a PCI bus. Therefore, the GAL is replaced with another GAL 54, thereby making it possible to vary payout rate setting data.

The CPU 51, the ROM 55, and the boot ROM 52 that are interconnected via the internal bus are connected to the motherboard 40 via a PCI bus. The PCI bus not only performs signal transmission between the motherboard 40 and the gaming board 50, but also supplies power from the motherboard 40 to the gaming board 50.

The motherboard 40 is constituted using a commercially available motherboard (printed wiring board mounting basic parts of a personal computer), and is provided with: a main CPU (Central Processing Unit) 41; a ROM (Read Only Memory) 42; a RAM (Random Access Memory) 43; and a communication interface 44 for communicably interconnecting to a plurality of slot machines.

The ROM 42 stores thereon a program such as BIOS (Basic Input/Output System) executed by the main CPU 41, and permanent data. When the BIOS is executed by the main CPU 41, a process of initializing predetermined peripheral devices is carried out and a process of capturing game programs and game system programs stored in the memory card 53 through the gaming board 50 is started. In the embodiment of the present invention, the contents of the ROM 42 may be rewritable or not.

The RAM 43 stores data and programs used when the main CPU 41 is activated. Further, the RAM 43 stores: programs exercising overall control of progressive bonus games (jackpots) executed at the plurality of slot machines; and progressive link control data 160 inclusive of progressive link contribution sequence data 153 stored in a state in which payment information including a payment value (progressive value) of a jackpot stored in response to a BET input of a respective one of the unit games executed by a plurality of slot machine groups is associated with identification information by slot machine 10, a jackpot payment condition 154, a slot machine-based BET accumulation amount 155, and a progressive value 156 of a jackpot 151 as game history data. The overall control programs are stored in a ROM 42, and are loaded in a work area of the RAM 43 as required. Game programs can also be stored therein. Further, the RAM 43 stores data relating to the credit amount and the number of inserted coins or the number of paid-out coins in one game. In embodiments of the present invention, the RAM 43 stores bonus points cumulatively.

Both a main body PCB (Printed Circuit Board) 60 and a door PCB 80 are connected to the motherboard 40 by USB. A power supply unit 45 is also connected to the motherboard 40.

Equipment and devices, which generate input signals to be input to the main CPU 41, and equipment and devices, operations of which are controlled by a control signal output from the main CPU 41, are connected to the body PCB 60 and the door PCB 80. The main CPU 41 executes the game programs stored in RAM 43, based upon an input signal that was input to the main CPU 41, thereby performing a predetermined computational process. Then, this CPU 41 stores results thereof into RAM 43; and transmits control signals to equipment and devices as a control process relative to the equipment and devices.

Connected to the main body PCB 60 are a lamp 30, a hopper 66, a coin detection section 67, a graphic board 68, a speaker 29, a touch panel 69, a bill validator 22, a ticket printer 35, a card reader 36, a key switch 38S, and a data display 37. The lamp 30 lights in a predetermined pattern, based upon a control signal output from the main CPU 41.

The hopper 66 is installed in a cabinet 11, and the predetermined amount of coins are paid out from the coin payout opening 19 to the coin tray 18, based upon the control signal output from the main CPU 41. A coin detection section 67 is provided inside of the coin payout opening 19, and outputs an input signal to the main CPU 41, if it is detected that the predetermined amount of coins have been paid out from the coin payout opening 19.

A graphic board 68 controls the images to be displayed on the upper and lower image display panels 33 and 16, based upon the control signal output from the main CPU 41. The graphic board 68 is provided with: a VDP (Video Display Processor), which generates image data, based upon the control signal output from the main CPU 41; and a video RAM, etc., which temporarily stores image data generated by the VDP. The image data used when the image data is generated by the VDP is read out of the memory card 53, and thereafter, is included in the game programs stored in the RAM 43.

The bill validator 22 validates whether or not a bill is legitimate and accepts a legitimate bill into the cabinet 11. The bill validator 22, upon accepting a legitimate bill, outputs an input signal to the main CPU 41 based on the bill amount. The main CPU 41 stores in the RAM 43 the amount of credits responsive to the amount of bills transmitted by the input signal.

Based upon a control signal output from the main CPU 41, the ticket printer 35 prints on a ticket a barcode having encoded thereon data such as the credit amount, data and time, and the identification number of the slot machine 10 stored in the RAM 43. Further, this printer outputs the printed ticket as a barcode-attached ticket 39. The card reader 36 reads data from a smart card, thereby transmitting the read data to the main CPU 41 or writing data into the smart card, based upon the control signal from the main CPU 41. The key switch 38S is provided on the key pad 38, and outputs a predetermined input signal to the main CPU 41 when a player operates the key pad 38. The data display 37 displays, based upon a control signal output from the main CPU 41, the data read by the card reader 36 and the data input by a player through the key pad 38.

To the door PCB 80, a control panel 20, a reverter 21S, a coin counter 21C, and a cold cathode-ray tube 81 are connected. On the control panel 20, there are provided: a start switch 23S corresponding to a start button 23; a change switch 24S corresponding to a change button 24; a cashout switch 25S corresponding to a cashout button 25; a 1-BET switch 26S corresponding to a 1-BET button 26; a MAX-BET switch 27S corresponding to a MAX-BET button 27; and a side-BET switch 90S corresponding to a side-BET button 85. When the player operates the buttons 23 to 27, and 90 the corresponding switches 23S to 27S and 85S output the input signals to the main CPU 41, respectively.

The coin counter 21C is provided inside the coin receiving slot 21, and validates whether or not a legitimate coin is inserted into the coin receiving slot 21. Those other than the legitimate coins are discharged from the coin payout exit 19. The coin counter 21C outputs an input signal to the main CPU 41 when a legitimate coin is detected.

The reverter 21S is operable based upon the control signal output from the main CPU 41. This reverter distributes the coins recognized to be legitimate by the coin counter 21C, into a cashbox (not shown) or a hopper 66 which was installed in the slot machine 10. In other words, if the hopper 66 is filled with coins, the legitimate coins are distributed to the cashbox by means of the reverter 21S. In other words, if the hopper 66 is filled with coins, the legitimate coins are distributed to the cashbox by means of the reverter 21S. Otherwise, the legitimate coins are distributed to the hopper 66. The cold cathode-ray tube 81 functions as a backlight installed at the rear side of the lower and upper image display panels 16 and 33, and lights based upon the control signal that was output from the main CPU 41.

Figure 81A:
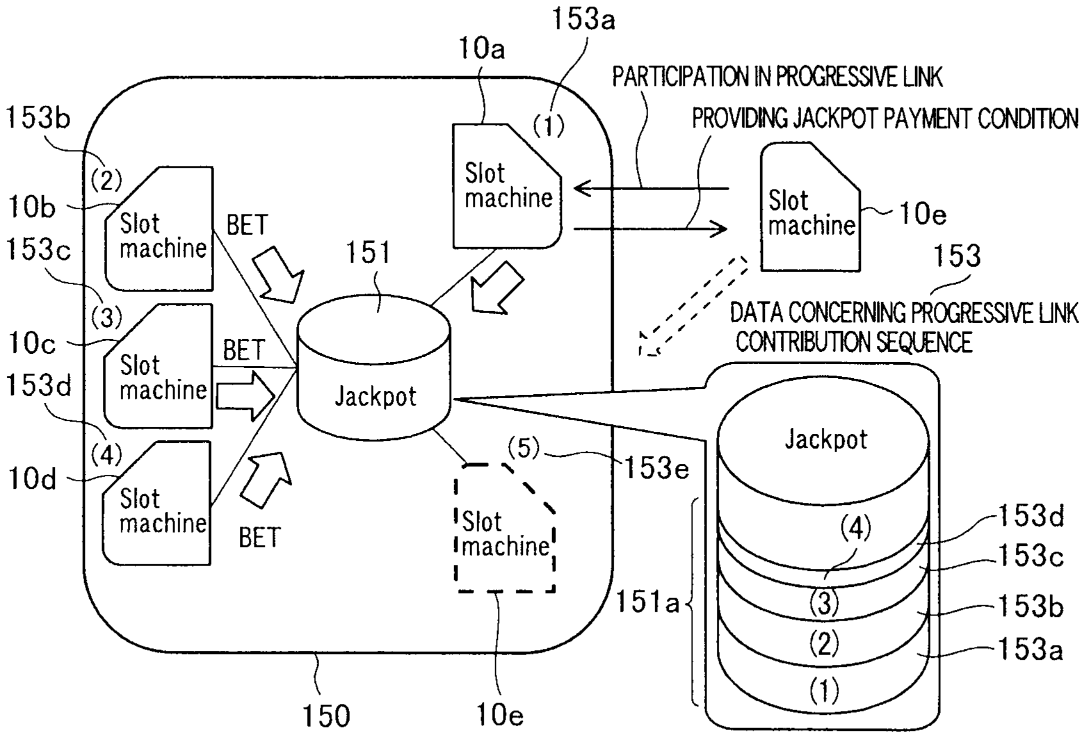
FIG. 81A is an explanatory view schematically showing an interrelationship between a plurality of slot machines sharing a jackpot.
Figure 81B:
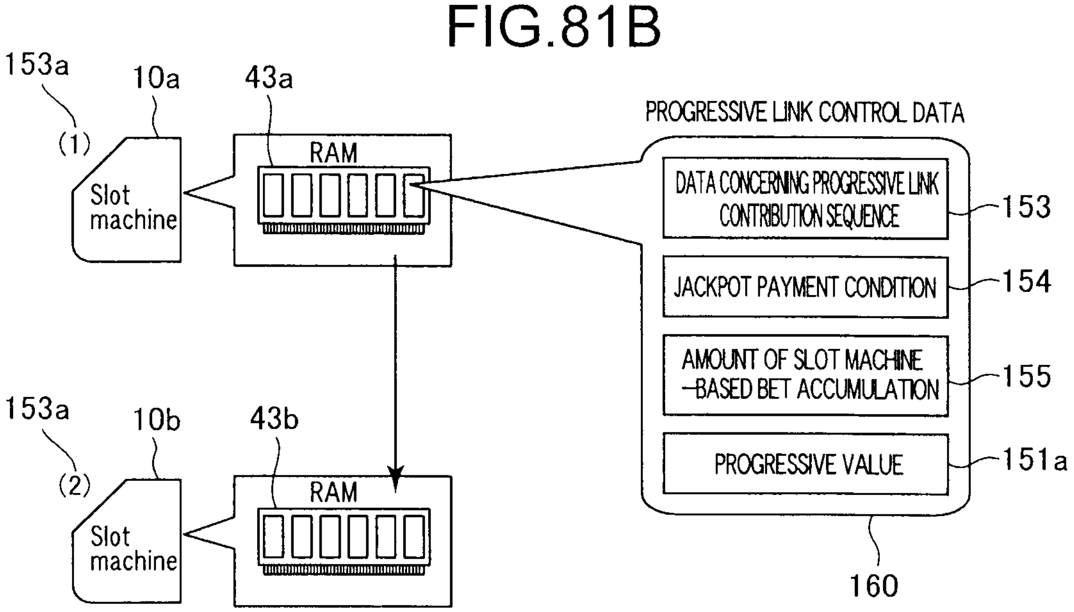
FIG. 81B is an explanatory view schematically showing the contents of a process of specifying a slot machine as a next host machine, the process being performed when a slot machine as a current host withdraws from a progressive link.

Next, a configuration of a progressive link in the embodiment will be described. FIGS. 81A and 81B are identical to FIGS. 77A and 77B, in which FIG. 81A is an explanatory view schematically showing an interrelationship between a plurality of slot machines sharing a jackpot. A plurality of slot machines 10*a*, 10*b*, 10*c*, 10*d* share a jackpot 151 as a progressive bonus game, and form a progressive link 150. The plurality of slot machines 10*a*, 10*b*, 10*c*, 10*d* participating in a progressive link are controlled by means of one host slot machine 10*a*, among those belonging to the progressive link. A RAM 43*a* of the host slot machine 10*a* stores progressive link contribution sequence data 153 which is payment information indicative of the sequences in which slot machines have contributed to a jackpot. Specifically, as to a currently accumulated progressive value 151*a*, items of information pertinent to slot machines are stored in association with a BET accumulation amount in sequential order from the largest BET accumulation amount. This storing is performed based upon a slot machine-based BET accumulation amount 155 which is indicative of the BET accumulation amount of a respective one of the slot machines participating in a progressive link, the amount being a payment value of a progressive game. The BET accumulation amount of the slot machine 10*a* is the largest, so that the slot machine 10*a* serves as a host slot machine which controls slot machines 10*b*, 10*c*, 10*d*.

Let us assume that a slot machine 10*e* newly participates in a progressive link 150 in order to share a jackpot 151 with the slot machines 10*a*, 10*b*, 10*c*, 10*d*. At this time, the slot machine 10*e* is presented with a jackpot payment condition from the host slot machine 10*a* through a communication line. After that, the slot machine 10*e* notifies the jackpot payment condition to a player; causes the player to determine whether or not the slot machine 10*e* is caused to participate in a progressive link, and transmits the contents of the determination to the slot machine 10*a*. When the slot machine 10*e* participates in the progressive link 150, an area is provided for storing the BET accumulation amount of the slot machine 10*e* to be included in the BET accumulation information stored in the RAM 43 of the slot machine 10*a*.

FIG. 81B is an explanatory view schematically showing the contents of a process of specifying a slot machine as a next host machine, the process being performed when a slot machine as a current host withdraws from a progressive link. The RAM 43*a* of the slot machine 10*a* as a current host stores progressive link control data 160 which is inclusive of: progressive link contribution sequence data 153; a jackpot payment condition 154; a slot machine-based BET accumulation amount 155; and a progressive value 151*a* of the jackpot 151. When the slot machine 10*a* withdraws from the progressive link 150, the main CPU 41 of the slot machine 10*a* determines a slot machine of which a degree of contribution is second to that of the slot machine 10*a*, referring to the progressive link contribution sequence data stored in the RAM 43. The degree of contribution used herein denotes the scale of the BET accumulation amount 155 of a respective one of the slot machines relative to a progressive value 11*a*. Specifically, the main CPU 41 of the slot machine 10*a* determines a slot machine (hereinafter, referred to as slot machine 10*b*) to be stored in association with sequence 2 of the contribution sequence data 153. The main CPU 41 of the slot machine 10*a* as a current host transmits progressive link control data 160 to the slot machine 10*b* as a next host machine. Having thus received the progressive link control data 160, the slot machine 10*b* as the next host machine stores the progressive link control data in a RAM 43*b*, and serves as a host slot machine which starts control of another slot machine participating in a progressive link 150. The progressive link contribution sequence data 153 is inclusive of the stored identification numbers of slot machines 10 in sequential order from the largest amount of BET accumulation 155, based upon the slot machine-based BET accumulation amount 155.

Figure 82A:
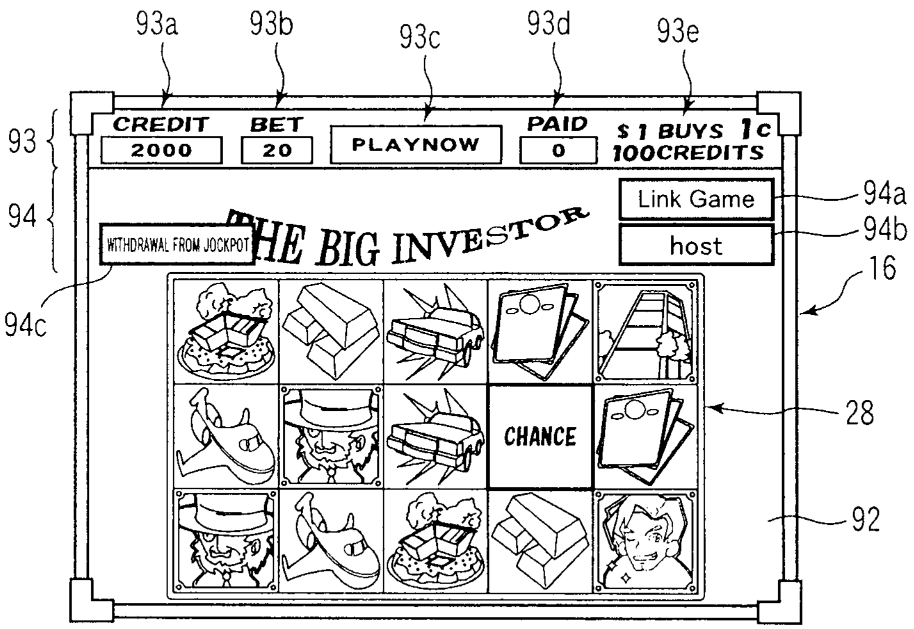
FIG. 82A is a view showing an exemplary image displayed at the slot machine shown in FIG. 79 while in a standalone game, the image being displayed at a host slot machine.

FIG. 82A through FIG. 86B are views each showing an exemplary image displayed at the display sections of the lower image display panel 16 of the slot machine 10 shown in FIG. 79. FIG. 82A is a view showing an exemplary image displayed at the slot machine shown in FIG. 79 while in a standalone game.

As shown in FIG. 82A, the lower image display panel 16 is made up of display (area) sections such as a display area section 92, an information display section 93, and an effect image display section 94. A symbol matrix 28 is displayed at the display area section 92. Further, icons displaying the number of betted coins are disposed at both sides of the symbol matrix 28, and the icons corresponding to the BET number are controlled to light. The information display section 93 is arranged upwardly of the display region 92, and is made up of a credit amount display section 93*a*, a BET amount display section 93*b*, a character information display section 93*c*, a PAID amount display section 93*d*, and a charge display section 93*e*.

The credit amount display section 93*a* displays the number of currently credited coins; and the BET amount display section 93*b* displays the number of coins betted in one standalone game. Further, the character information display section 93*c* displays character information which is indicative of current states of a standalone game and a progressive bonus game. While someone is playing a game, the "PLAY NOW" characters are displayed, and if not, the "GAME OVER" characters are displayed. Further, the PAID number display section 93*d* displays the number of coins paid out in one standalone game, and a charge display section 93*e* displays a credit conversion value relative to a predetermined amount of money.

The effect image display section 94 displays an effect image which is responsive to settings of a slot game. Therefore, the effect image display section 94 displays a progressive link participation icon 94*a* which is indicative of the fact that a jackpot is shared with a plurality of gaming machines, in other words, the fact that a slot machine participates in progressive link. A slot machine 10 having first participated in a machine-participating progressive link displays a host icon 94*b* which is indicative of a host which controls a plurality of other gaming machines participating in the same progressive link. Further, a jackpot withdrawal icon 94*c* is displayed as the one employed when a player attempts to withdraw from the participating progressive link. Specifically, the player touches the touch panel 69 on the jackpot withdrawal icon 94*c*, whereby the main CPU 41 performs a host's progressive link withdrawing process to be described later (see FIGS. 91A, 91B). Further, at the client's gaming machine as well, the client's progressive link withdrawing process to be described later is performed similarly (see FIG. 90).

Any of symbols "main animation character", "sub animation character", "office building", "bullion", "car", "stock certificate", "jet", "cottage", and "CHANCE" are rearranged in the symbol matrix 28 displayed on the lower image display panel 16, and a payout is determined depending upon the number of these symbols displayed in the symbol matrix.

FIG. 82A shows one example in which any of the symbols "main animation character", "sub animation character", "office building", "bullion", "car", "stock certificate", "jet", "cottage", and "CHANCE" have been rearranged in the symbol matrix 28 in a standalone game. Whether or not a game such as a free game is started is determined depending upon the display number of "CHANCE" symbols.

Figure 82B:
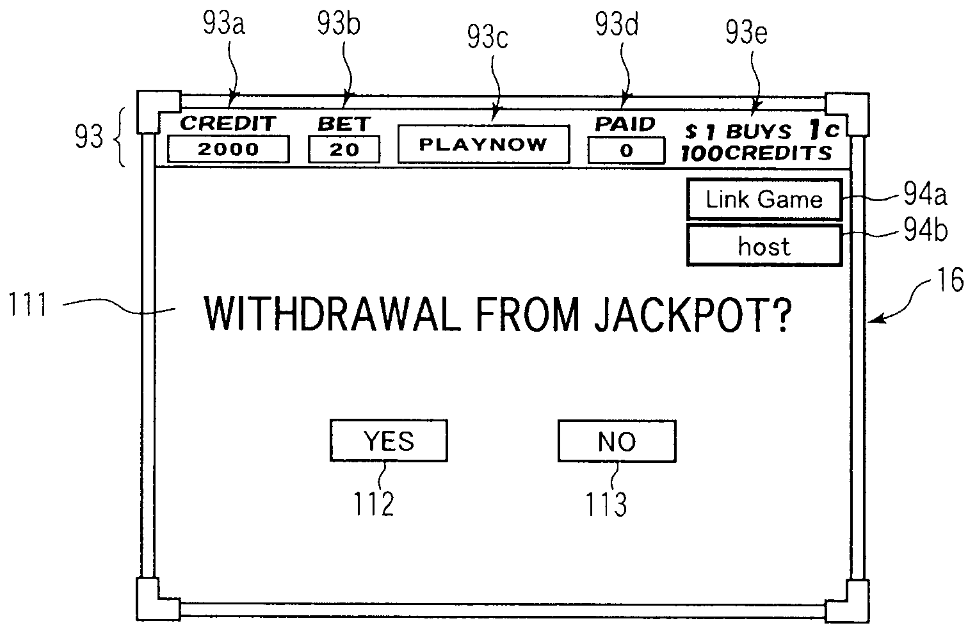
FIG. 82B is a view showing an exemplary image displayed after touching a touch panel on the jackpot withdrawal icon of FIG. 82A.

FIG. 82B is a view showing an exemplary image displayed by touching the touch panel 69 on the jackpot withdrawal icon 94*c* of FIG. 82A. As shown in FIG. 82B, a progressive link participation icon 94*a* and a host icon 94*b* are displayed on the lower image display panel 16, making it possible to recognize that a player participates as a host of a progressive link. In this case, the player has touched the touch panel 69 on the jackpot withdrawal icon 94*a* (see FIG. 82A), and a jackpot withdrawal verification display 111 appears which verifies whether or not to actually release from a progressive link. Downwardly of the jackpot withdrawal verification display 111, there are displayed: a YES icon 112 to be selected at the time of withdrawal from a progressive link; and a NO icon 113 to be selected if no withdrawal therefrom occurs. Like selection of the jackpot withdrawal icon 94, the YES icon 112 or the NO icon 113 is selected by the player touching the touch panel 69 on a respective one of the icons.

Figure 83A:
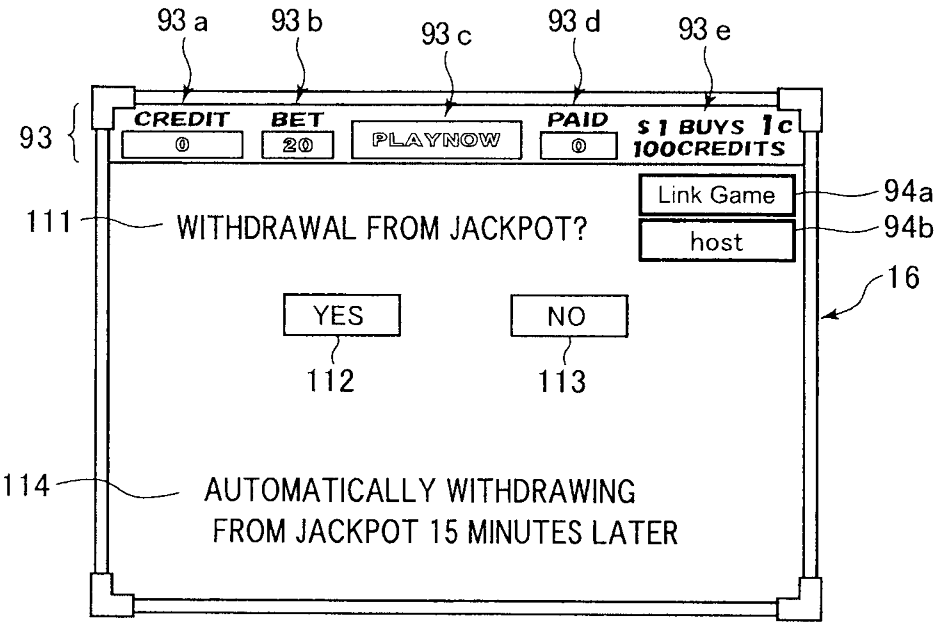
FIG. 83A is a view showing an exemplary image displayed on a lower image display panel when no credit is stored in a RAM.

FIG. 83A is a view showing an exemplary image displayed on the lower image display panel 16 when no credit is stored in the RAM 43. Here, a progressive link participation icon 94*a* and a host icon 94*b* are displayed, making it possible to recognize that a player participates in a host of a progressive link. When a jackpot withdrawal verification display 111 appears when the amount of credit in which there is a possibility that a player stops a game has become 0. Concurrently, downwardly of the jackpot withdrawal verification display 111, there are displayed: a YES icon 112 to be selected at the time of withdrawal from a progressive link; and a NO icon 113 to be selected if no withdrawal from a progressive link occurs. If a player selects neither of the YES and NO icons 112 and 113, a jackpot withdrawal time display 114 appears, indicating that the player will automatically withdraw from a progressive link 15 minutes later.

Figure 83B:
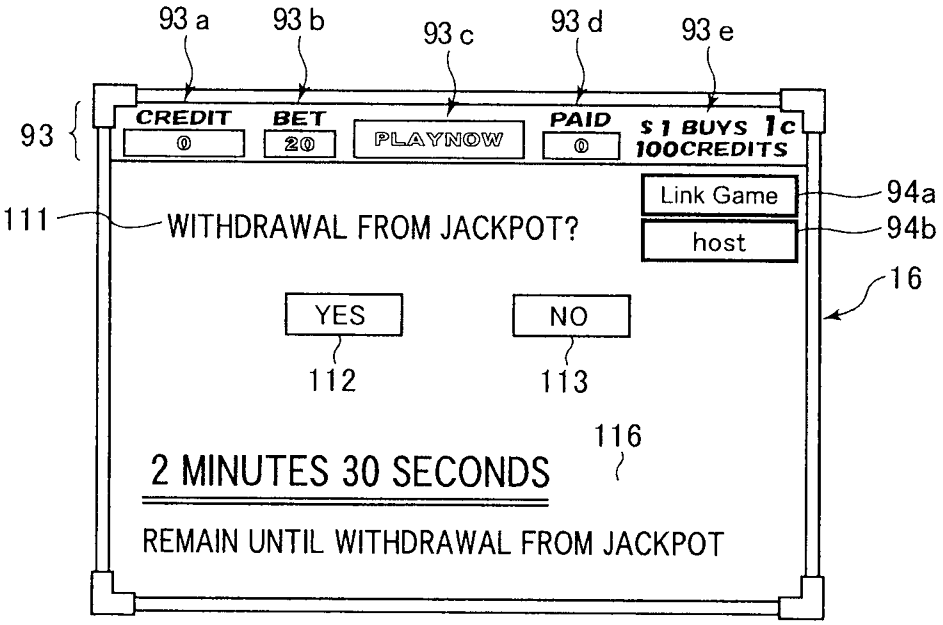
FIG. 83B is a view showing an exemplary image displayed on a lower image display panel after a specific time has elapsed in a state in which a player fails to select neither of a YES icon and a NO icon.

FIG. 83B is a view showing an exemplary image displayed on the lower image display panel 16 after an elapse of a specific time (12 minutes 30 seconds) in a state in which a player selects neither of the YES and NO icons 112 and 113, after the display of FIG. 83A has appeared. In the figure, no indication of intention is made as to withdrawal of a player from a progressive link, and thus, a withdrawal countdown display 116 appears indicating a time remaining until the player automatically withdraws from the progressive link, and countdown is started. This allows the player to be easily aware of a time remaining until the player automatically withdraws from the progressive link, and can prevent withdrawal from the progressive link in a state in which the player is not aware thereof.

Figure 84A:
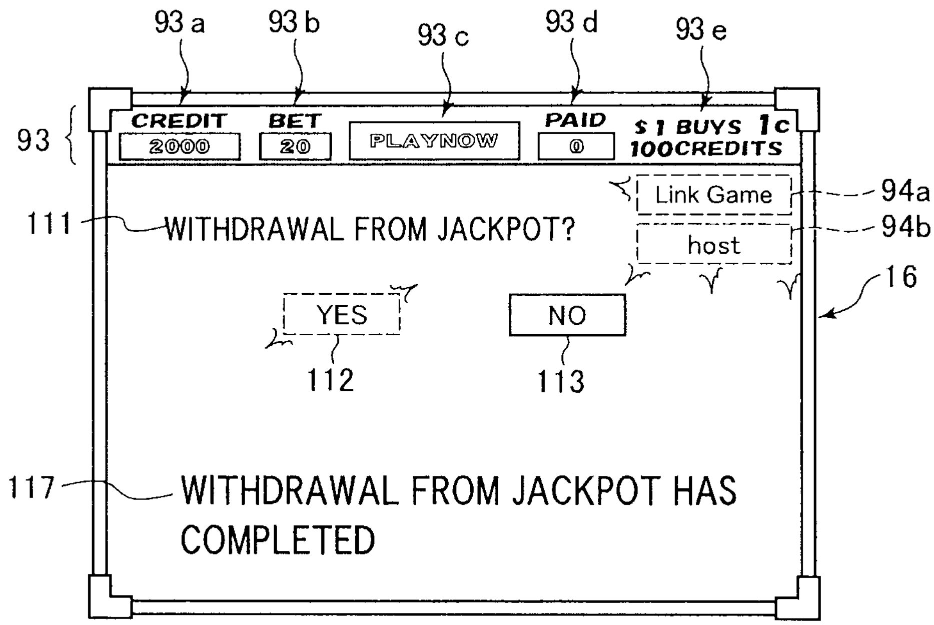
FIG. 84A is a view showing an exemplary image displayed on a lower image display panel when the player has selected the YES icon in FIG. 82B.

FIG. 84A is a view showing an exemplary image displayed on the lower image display panel 16 when the player has selected the YES icon 112 in FIG. 82B. The YES icon 112 selected by the player is displayed in a blinking state, indicating that the icon has been selected. After that, there appears a jackpot withdrawal display 117 notifying to the player that withdrawal from a progressive link occurs. At this time, a progressive link participation icon 94*a* and a host icon 94*b* are displayed in a blinking state, and thereafter, the display goes out, thereby indicating that no one participates in a progressive link and that no progressive link host is established. When the player has selected the YES icon 112 in FIGS. 83A and 83B as well, a similar image is displayed. A slot machine 10 is provided with a plurality of input devices for inputting the fact that someone withdraws from a progressive link of a jackpot executed by a plurality of gaming machine groups. While the input device used here was introduced as touch panel buttons on the display screen displayed when a credit becomes zero (see FIG. 91A: steps S47, S50), it may be a cashout button 25 for liquidating a credit (see FIG. 91A: step S52) or a card reader 36 for removably inserting an ID card for identifying a player (see FIG. 91A: step S44).

Figure 84B:
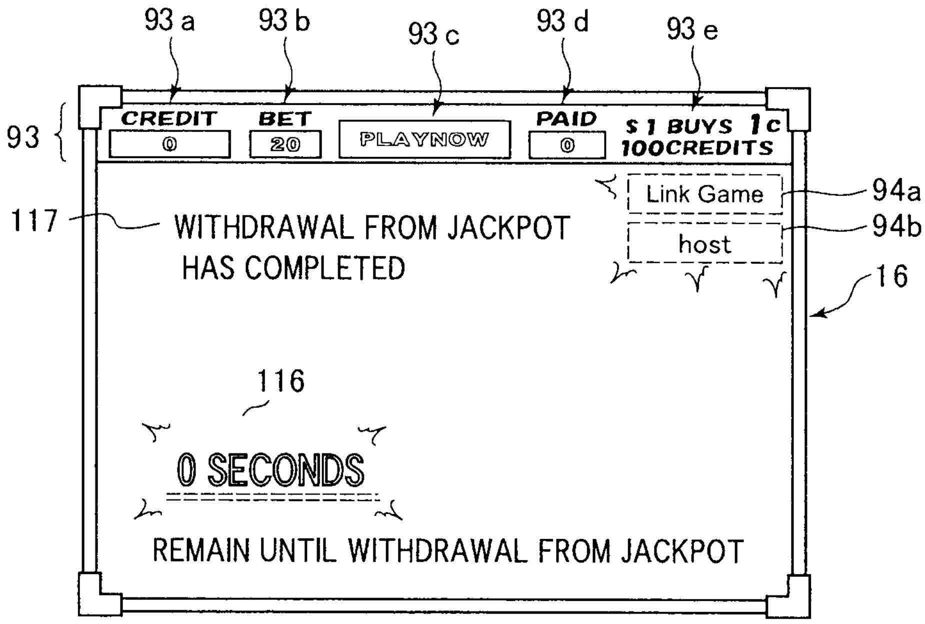
FIG. 84B is a view showing an exemplary image displayed on a lower image display panel when the withdrawal countdown display has become 0 seconds in FIG. 83B.

FIG. 84B is a view showing an exemplary image displayed on the lower image display panel 16 when a withdrawal countdown display has become 0 second in FIG. 83B. In FIG. 83B, in a state that the player selects neither of the YES and NO icons 112 and 113, when the countdown has become 0 second after an elapse of a predetermined time, an area for displaying the withdrawal countdown display 16 as 0 second is highlighted in a blinking state. After that, there appears a jackpot withdrawal display 117 notifying to a player that withdrawal from a progressive link occurs. At this time, a progressive link participation icon 94*a* and a host icon 94*b* is displayed in a blinking state, and thereafter, the display goes out, thereby indicating that no one participates in a progressive link and that no progressive link host is established.

Figure 85A:
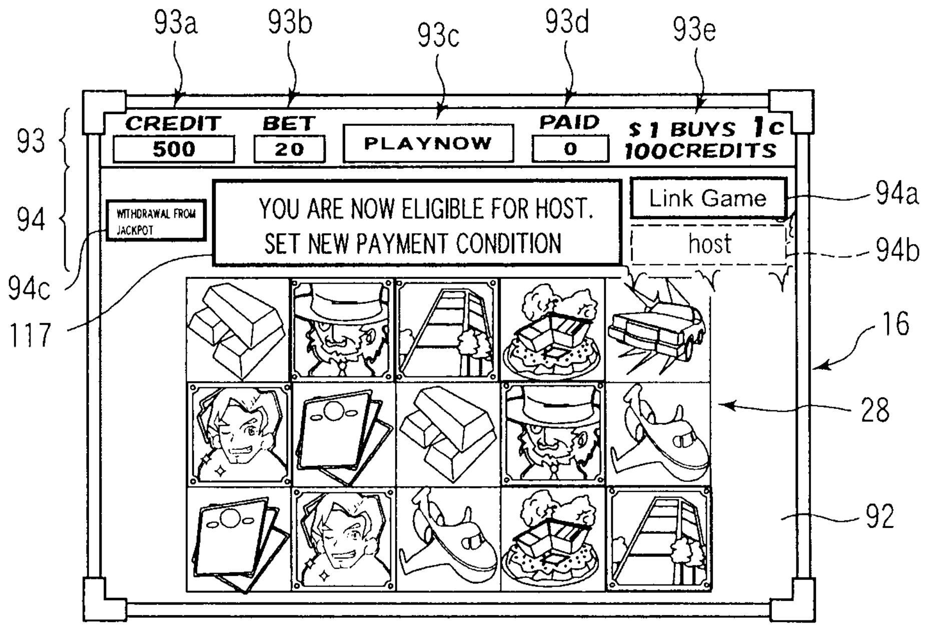
FIG. 85A is a view showing an exemplary image displayed on a lower image display panel of a slot machine as a new host, immediately after a previous host machine has withdrawn from a progressive link.

FIG. 85A is a view showing an exemplary image displayed on the lower image display panel 16 of a slot machine 10 as a new host machine, immediately after an existing host has withdrawn from a progressive link. Here, a slot machine 10 as a new host machine of a progressive link is a slot machine 10 having the second largest slot machine-based BET accumulation amount 155 to that of the existing host in progressive link, i.e., the second highest degree of contribution thereto. Specifically, a slot machine 10 is established as a new host machine storing the second largest BET amount to that of the slot machine 10 that has been the existing host. In other words, this slot machine is established as the one having a high progressive contribution rank. A progressive link participation icon 94*a* and a jackpot withdrawal icon 94*c* are displayed on the lower image display panel 16 of a slot machine 10 as a new host machine of a progressive link. After that, in a guide display area 117, a display appears indicating that the slot machine 10 is newly established as a host and a display appears which prompts setting of a payment condition of a new jackpot. Concurrently, a host icon 94*b*, which has not been displayed so far, is displayed in a blinking state, notifying to a player that the slot machine is established as a host, and thereafter, the host icon 94*b* is normally displayed. The jackpot payment condition can be varied by the player touching the touch panel 69 on the blinking host icon 94*b*. When the player, who plays the game at the slot machine 10 as a new host machine, does not desire to vary the jackpot payment condition, no jackpot payment condition is varied unless the player has touched the host icon 94*b*.

Figure 85B:
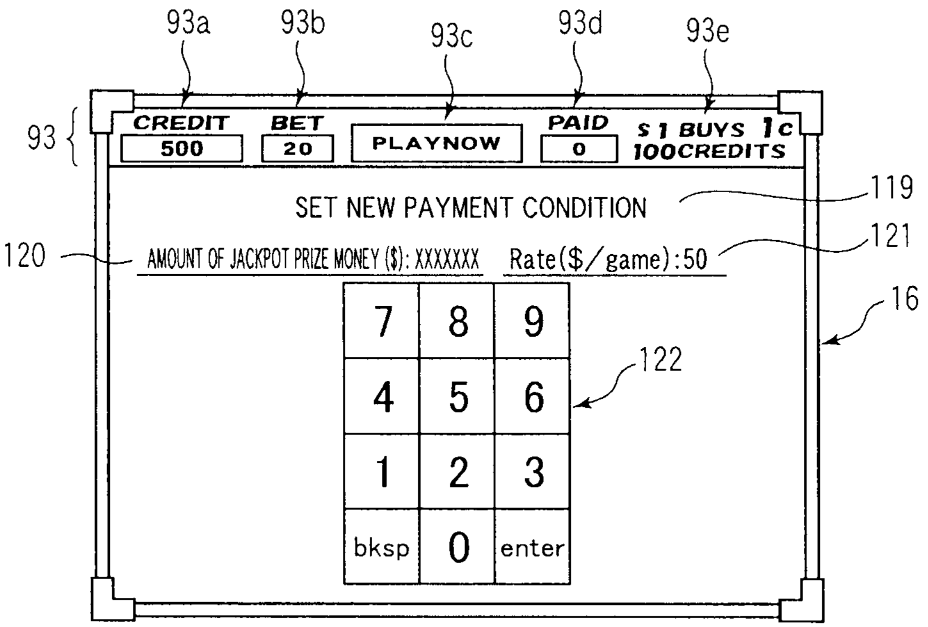
FIG. 85B is a view showing an exemplary image displayed on a lower image display panel when a player touched a touch panel a blinking host icon and a jackpot payment condition is set in FIG. 85A.

FIG. 85B is a view showing an exemplary image displayed on the lower image display panel 16 when a jackpot payment condition is set by a player touching a touch panel 69 on the blinking host icon 94*b* in FIG. 85A. FIG. 85B is a view showing an exemplary image displayed on the lower image display panel 16 when a jackpot payment condition is set by a player touching a touch panel 69 on a blinking host icon 94*b* in FIG. 85A. Further, on the lower area of the lower image display panel 16, a ten-key numeric keypad 122 is displayed as the one employed for a player to enter the amount of jackpot prize money and the minimum BET number in one standalone game as a BET input amount. The player inputs a desired number by touching it from the touch panel 69.

Figure 86A:
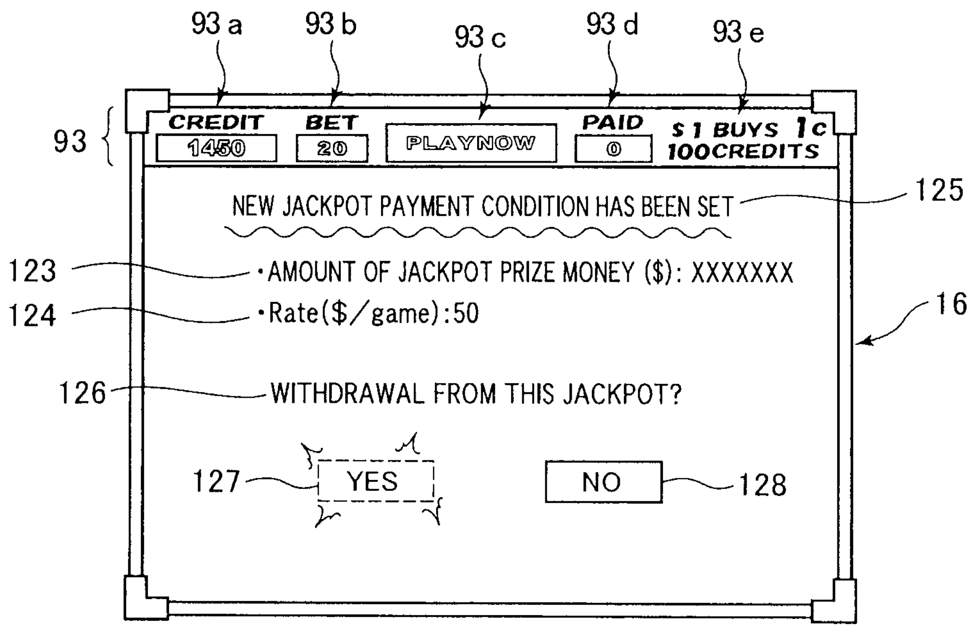
FIG. 86A is a view showing an exemplary image displayed a lower image display panel of a client's slot machine when a new jackpot payment condition has been set in FIG. 85B.

FIG. 86A is a view showing an exemplary image displayed on the lower image display panel 16 of a client slot machine 10 when a new jackpot payment condition is set in FIG. 85B. A display 125 indicating that a new jackpot payment condition is set is displayed in an upper area of the lower image display panel 16. Host-set new jackpot payment conditions 123, 124 are displayed downwardly of the display 125. Further, in the lower area of the lower image display panel 16, a jackpot participation verification display 126 appears which asks whether or not to continue a game after participation in a progressive link conforming to the host-set new jackpot payment condition. Furthermore, a YES icon 127 to be selected at the time of withdrawal from a progressive link and a NO icon 128 to be selected if no withdrawal therefrom occurs are displayed.

Figure 86B:
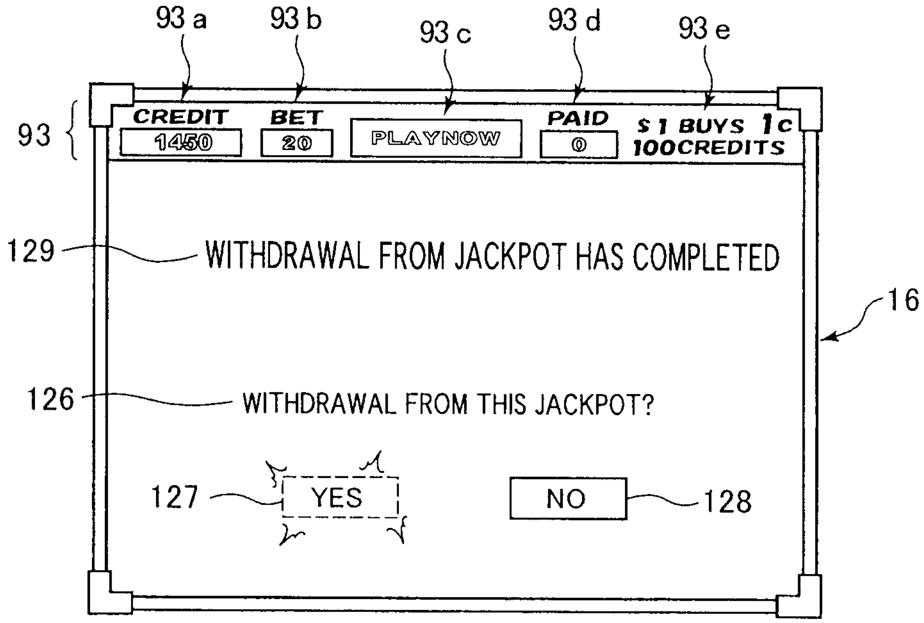
FIG. 86B is a view showing an exemplary image displayed on a lower image display panel of a client's slot machine when a player has selected the YES icon in FIG. 86A.

FIG. 86B is a view showing an exemplary image displayed on the lower image display panel 16 of the client slot machine 10 when the player has selected the YES icon 127 in FIG. 86A. A jackpot withdrawal display 129 notifying to a player that someone has withdrawn from a progressive link appears in the upper area of the lower image display panel 16. After that, the YES icon 127 is displayed in a blinking state of the lower image display panel 16, which indicates that the icon has been selected.

Next, a process executed in the slot machine 10, according to the embodiment of the present invention, will be described in detail with reference to the drawings.

Hereinafter, an outline of games will be described. A slot machine 10 can perform: standalone games which are played alone by the players at the slot machines 10; and link games (hereinafter, referred to as progressive bonus games) which are played by a plurality of players at other slot machines 10. Further, the players at the slot machines 10 can arbitrarily play link games while playing standalone games.

The main CPU 41 controls a game progress by reading and executing the game program from the RAM 43. Further, the main CPU 41 as a host slot machine exercises overall control of a link system by reading and executing a predetermined program from the RAM. Main CPUs of slot machines 10*a* and 10*b* are designated by reference numerals 41*a* and 41*b*, respectively.

Figure 87:
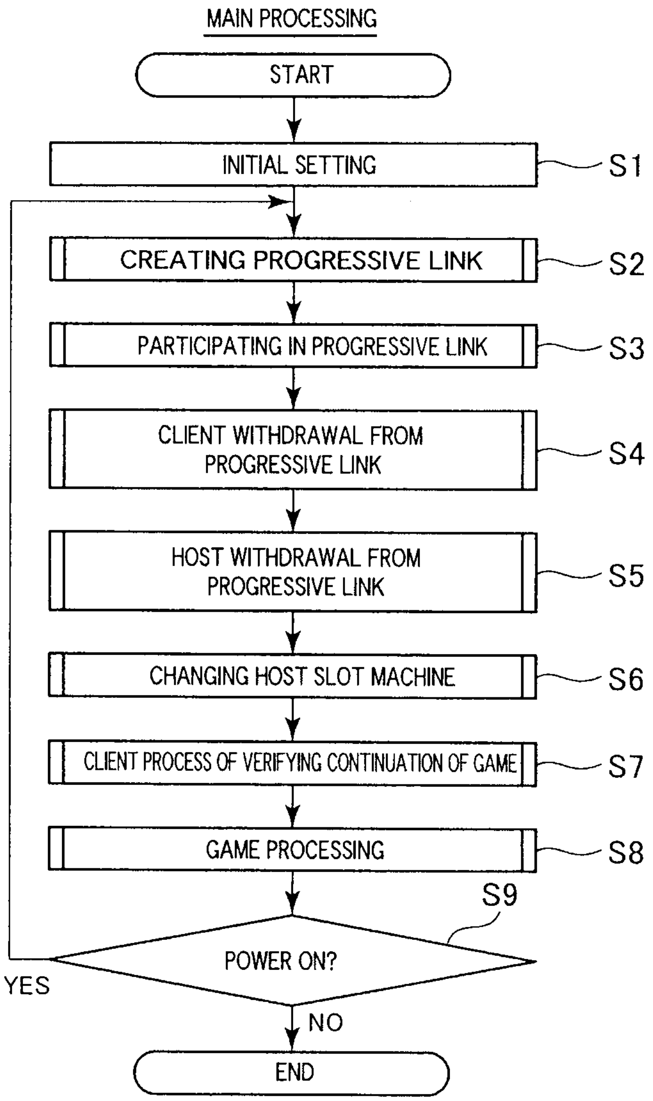
FIG. 87 is a flowchart showing a subroutine of main processing in a slot machine.

FIG. 87 is a flowchart showing a subroutine of main processing in a slot machine 10. In main processing of the slot machine 10, first, when a power switch is turned ON (when power is supplied), a motherboard 40 and a gaming board 50 are started up, respectively, and the CPU 41 executes an initial setting process (step S1). Specifically, a main CPU 41 executes BIOS stored in the ROM 42; decompresses to the RAM 43 the compressed data incorporated in the BIOS; executes the BIOS decompressed to the RAM 43; and diagnoses and initializes peripherals. The main CPU 41 writes game programs or the like from memory card 53 into the RAM 43, and retrieves data for setting a payout ratio and country-identification information. The main CPU 41 also performs an authentication process for each program during execution of the initial setting process. Further the main CPU 41 sets to OFF a host flag indicative of a host slot machine stored in the main RAM 43, or alternatively, a client slot machine participating in a progressive link.

Figure 88:
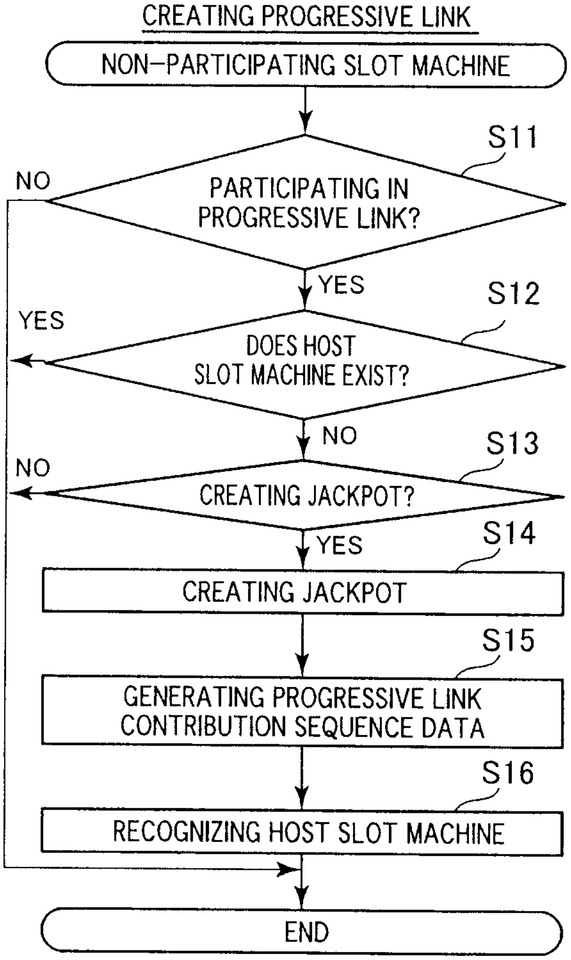
FIG. 88 is a flowchart showing a subroutine of a progressive link creation process in a slot machine.

Next, the main CPU 41 performs a progressive link creation process to be described later referring to FIG. 88 (step S2). In this progressive link creation process, the main CPU 41 of the slot machine 10 newly creates a progressive link and determines whether or not to establish a host slot machine, if no progressive link is present.

Figure 89:
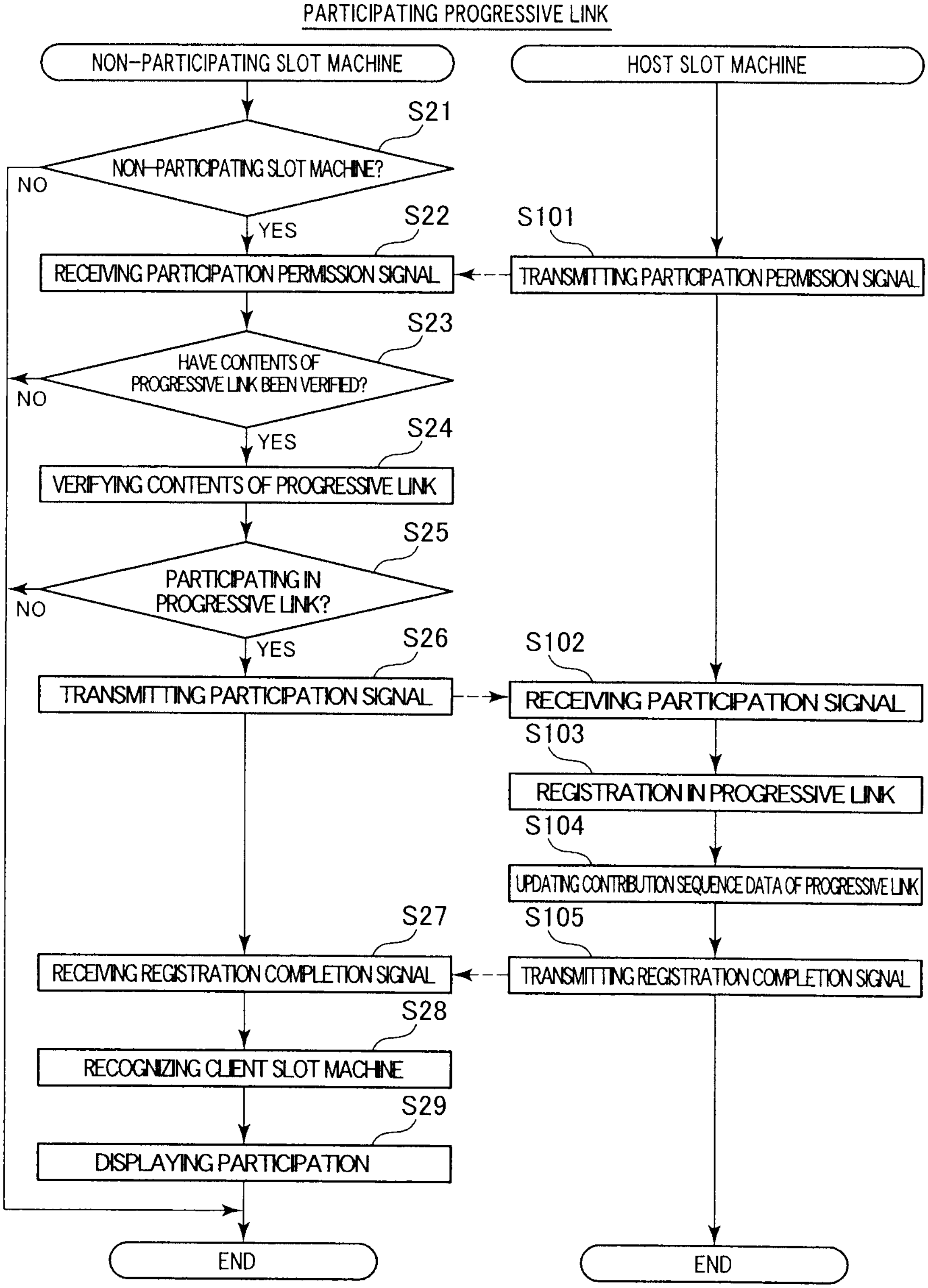
FIG. 89 is a flowchart showing a subroutine of a progressive link participation process in a slot machine.

Next, the main CPU 41 performs a progressive link participation process to be described later referring to FIG. 89 (step S3). In this progressive link participation process, the main CPU 41 of the slot machine 10 failing to participate in a progressive link performs a process of participating in a progressive link provided by a host slot machine.

Figure 90:
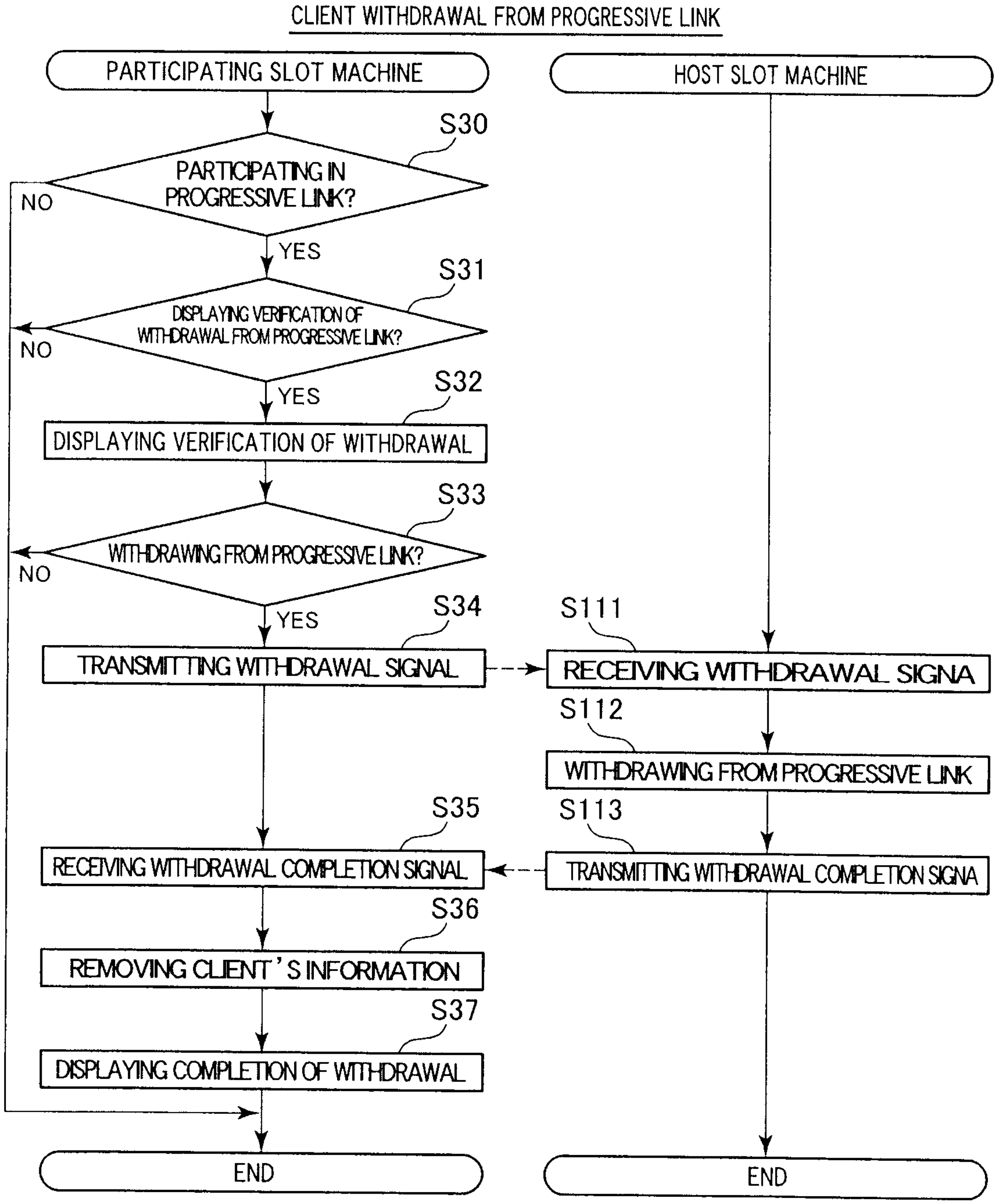
FIG. 90 is a flowchart showing a subroutine of a client's progressive link withdrawing process in a slot machine.

Next, the main CPU 41 performs a client's progressive link withdrawing process to be described later referring to FIG. 90 (step S4). In this client's progressive link withdrawal process, the main CPU 41 of the client's slot machine 10 performs a process of withdrawal from a machine-participating progressive link.

Figure 91A:
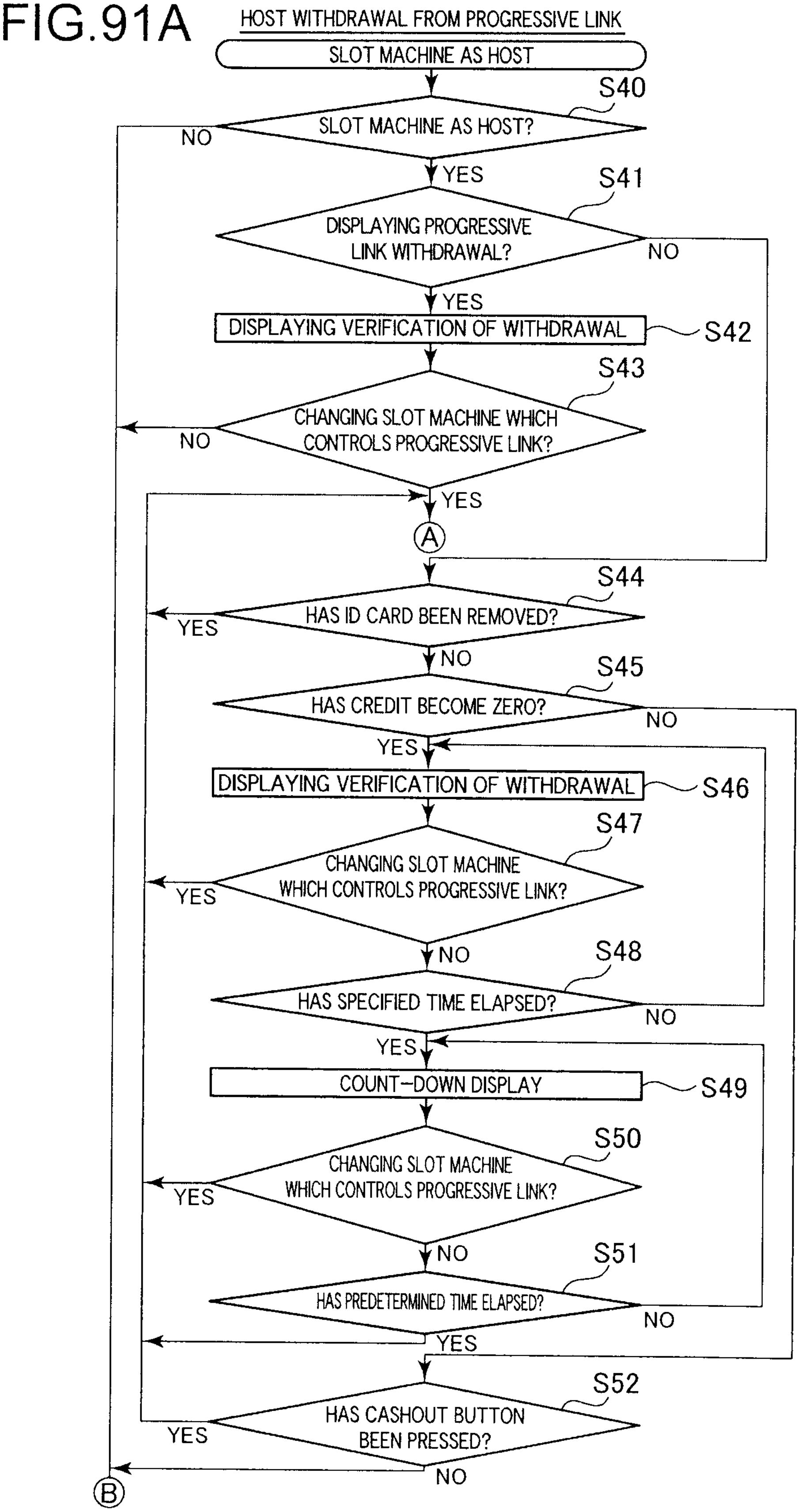
FIG. 91A is a flowchart showing a subroutine of a host's progressive link withdrawing process in a slot machine.
Figure 91B:
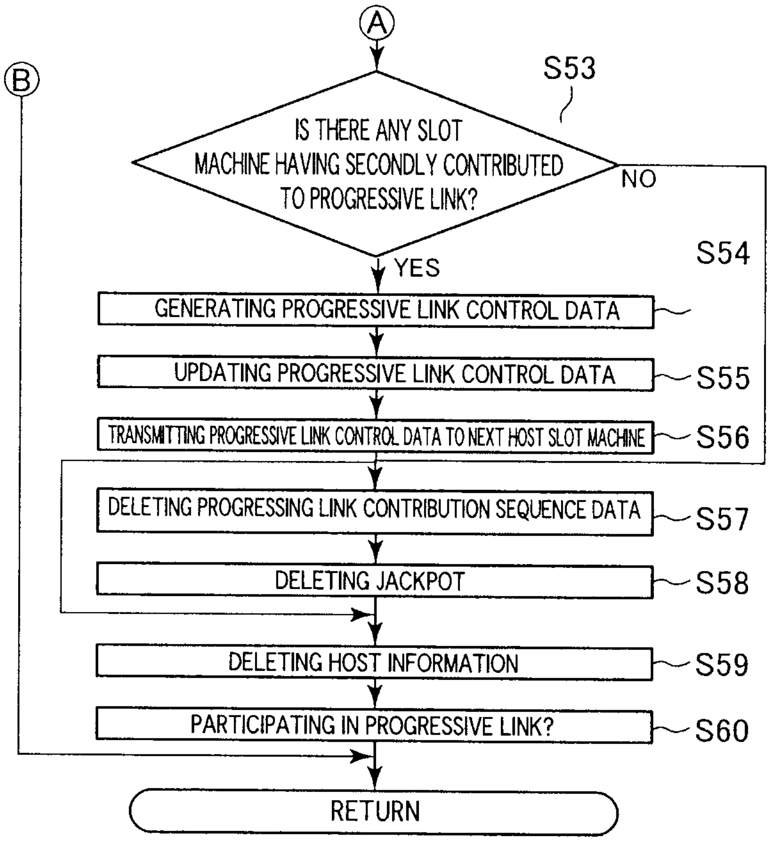
FIG. 91B is a flowchart showing a subroutine of a host's progressive link withdrawing process in a slot machine.

The main CPU 41 performs a host's progressive link withdrawing process to be described later referring to FIGS. 91A and 91B (step S5). In this host progressive link withdrawing process, the main CPU 41 of the host slot machine 10 performs a process of withdrawal from a machine-participating progressive link.

Figure 92:
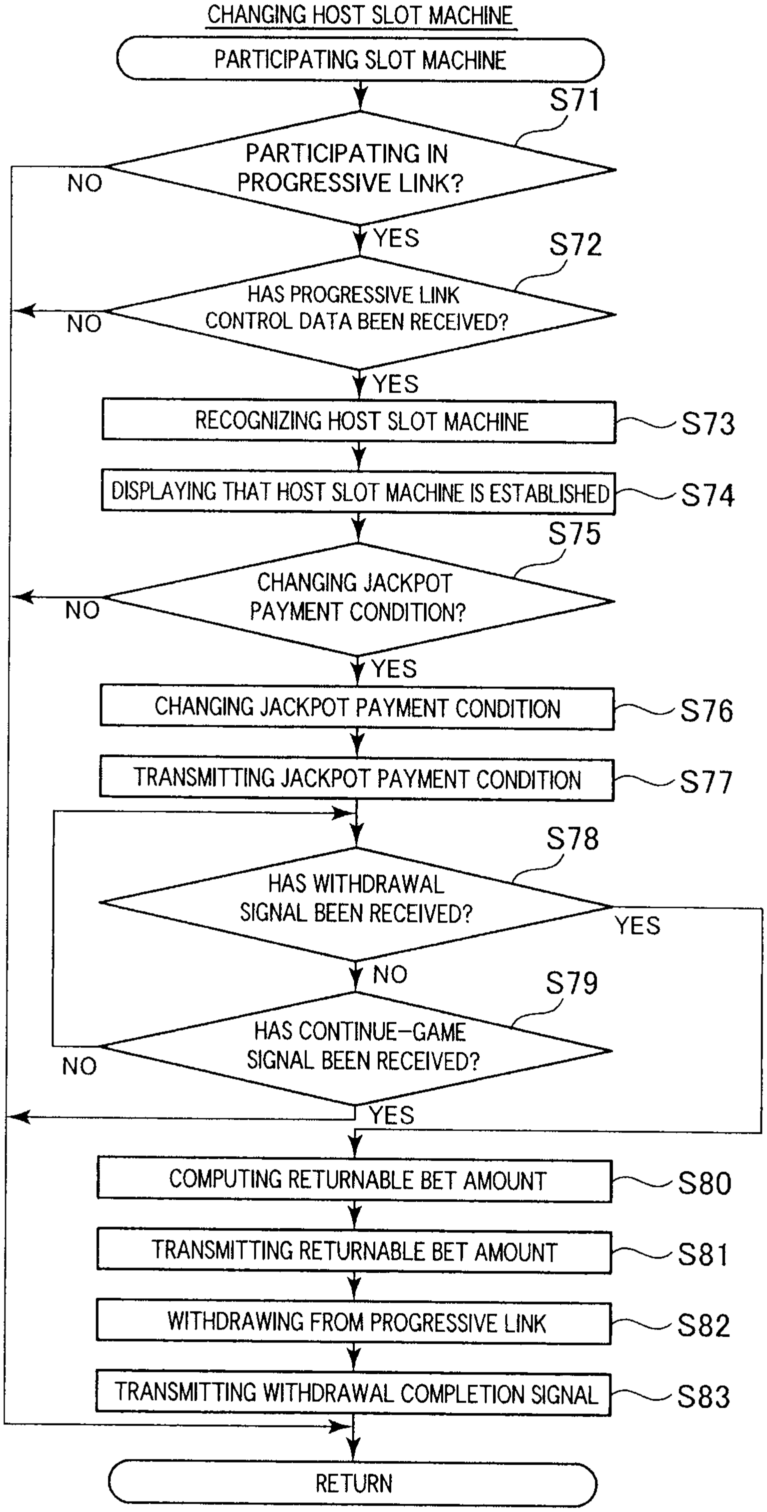
FIG. 92 is a flowchart showing a subroutine of a host change process in a slot machine.

The main CPU 41 performs a host change process to be described later referring to FIG. 92 (step S6). In this host change process, the main CPU 41 of the slot machine 10 as a next host machine receives progressive link control data from a slot machine 10 as a current host, and serves as the host slot machine which starts control of another slot machine.

Figure 93:
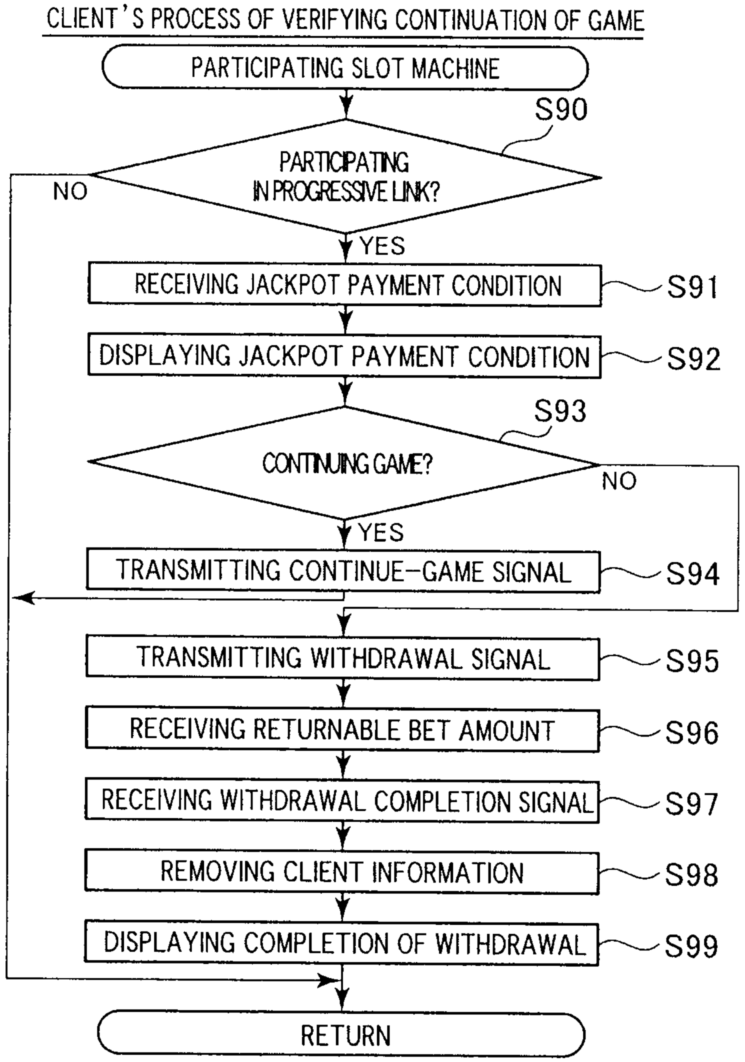

Next, the main CPU 41 performs a client's process of verifying whether or not to continue a game to be described later referring to FIG. 93 (step S7). In the client's process of verifying whether or not to continue a game, when a player as a new host machine has changed a jackpot payment condition, it is verified as to whether or not a player at another slot machine continues a game in accordance with a new jackpot payment condition.

Figure 94:
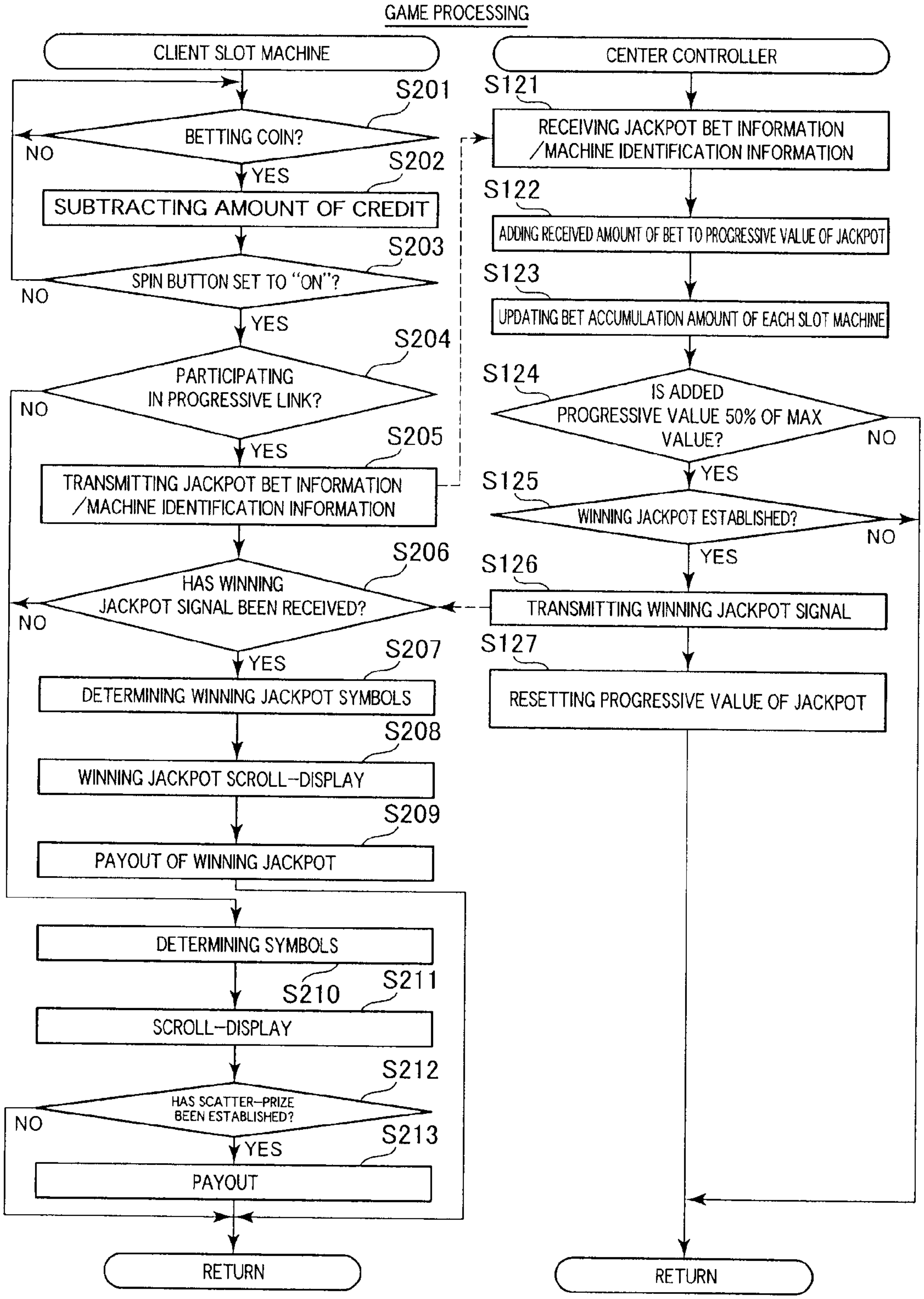

The main CPU 41 performs game processing to be described later referring to FIG. 94 (step S8). In this game processing, the main CPU 41 sequentially reads and executes game programs or the like from the RAM 43, and performs a game execution process. After game processing has terminated, while power is supplied to a slot machine 10 (step S9: YES), the main CPU 41 reverts to a progressive link creation process at step S2. When no power is supplied to the slot machine 10 (step S9: NO), the main CPU 41 terminates main processing.

Next, a progressive link creation process will be described. FIG. 88 is a flowchart showing a subroutine of the progressive link creation process invoked and executed at step S2 in the main process of the slot machine 10 shown in FIG. 87. First, the main CPU 41 judges whether or not someone participates in a progressive link (step S11). Specifically, the main CPU 41 judges whether or not a host flag or a client flag is set to ON by verifying the host flag that is indicative of whether or not a host slot machine stored in the RAM 43 is established or the client flag that is indicative of whether or not a client slot machine is established. Upon judging that someone participates in a progressive link, in other words, upon judging that either of the host flag and the client flag is set to ON (step S11: NO), the main CPU 41 terminates a progressive link creation process.

Upon judging that no one participates in a progressive link, in other words, upon judging that the host flag or the client flag is set to OFF (step S11: YES), the main CPU 41 judges whether or not any host exists (step S12). Specifically, the main CPU 41 judges whether or not slot machines 10 interconnected via the communication line 101 include any slot machine in which the host flag stored in the RAM 43 is set to ON. Upon judging that any host exists (step S12: YES), the main CPU 41 terminates a progressive link creation process.

Upon judging that no host exists (step S12: NO), the main CPU 41 judges whether or not to create a jackpot (step S13). Specifically, the main CPU 41 judges whether or not indication of intention has been for a player to newly set a jackpot payment condition. Upon judging that no jackpot is created (step S13: NO), the main CPU 41 terminates a progressive link creation process.

Upon judging that a jackpot is created (step S13: YES), the main CPU 41 creates the jackpot (step S14). Specifically, the main CPU 41 creates data pertinent to a jackpot such as "jackpot payment condition 154", "slot machine-based BET accumulation amount 155", "progressive value 151*a*", and stores the created data in the RAM 43.

Next, the main CPU 41 creates progressive link contribution sequence data (step S15). Specifically, the main CPU 41 creates progressive link contribution sequence data 153 (see FIG. 81), which is indicative of contribution sequences of slot machines participating in a progressive link, and stores the created data in the RAM 43.

The main CPU 41 performs a process of recognizing a host slot machine (step S16). Specifically, the main CPU 41 sets the host flag stored in the RAM 43 to ON. After executing the process at step S16, the main CPU 41 terminates a progressive link creation process.

Next, a progressive link participation process will be described. FIG. 89 is a flowchart showing a subroutine of the progressive link participation process invoked and executed at step S3 in the main processing of the slot machine 10 shown in FIG. 87. Hereinafter, the progressive link participation process will be described by way of example in which a slot machine 10*e* failing to participate in a progressive link participates in a progressive link 150. In this case, the progressive link participation process is performed under cooperative operation between a main CPU 41*e* of the slot machine 10*e* failing to participate in a progressive link and a main CPU 41*a* of a host slot machine 10*a*.

First, an operation of the slot machine 10*e* failing to participate in a progressive link will be described. The main CPU 41*e* of the slot machine 10*e* performs processes at steps S21 to S29 that follow. At step S21, the main CPU 41*e* of the slot machine 10*e* judges whether or not there is a slot machine failing to participate in a progressive link (step S21). Specifically, the main CPU 41*e* judges whether or not a host flag indicative of a host stored in the main RAM 43*e* or a client flag indicative of a client is set to OFF. Upon judging that there exists no slot machine failing to participate in a progressive link (step S21: NO), the main CPU 41*e* terminates a progressive link participation process.

Upon judging that there exists a slot machine failing to participate in a progressive link (step S21: YES), the main CPU 41*e* performs a process of receiving a participation permission signal (step S22). In this process, the main CPU 41*e* receives a participation permission signal transmitted from a host slot machine 10*a* at step S101 to be described later, and stores, in a RAM 43*e*, a jackpot payment condition 154 included in a participation permission signal.

Next, the main CPU 41*e* judges whether or not an operation of verifying the contents of progressive links has been made (step S23). Specifically, the main CPU 41*e* verifies whether or not a player has made an operation of verifying the jackpot payment condition 154 or the like stored in the RAM 43*e*. Upon judging that the above verifying operation has not been made (step S23: NO), the main CPU 41*e* terminates a progressive link participation process.

Upon judging that the above verifying operation has been made (step S23: YES), the main CPU 41*e* displays the contents of progressive links (step S24). The contents of the jackpot payment condition 154 or the like stored in the RAM 43*e* are displayed for a player.

Next, the main CPU 41*e* judges whether or not to participate in a progressive link (step S25). Specifically, the main CPU 41*e* judges whether or not a player has made an operation of participation entry from the touch panel 69. Upon judging that no one participates in a progressive link (step S25: NO), the main CPU 41*e* terminates a progressive link participation process.

Upon judging that someone participates in a progressive link (step S25: YES), the main CPU 41*e* performs a process of transmitting a progressive link participation signal (step S26). In this process, the main CPU 41*e* transmits a participation signal including machine identification information or the like to a host slot machine 10*a*.

Next, the main CPU 41*e* performs a process of receiving a signal indicative of completion of registration in a progressive link (step S27), and subsequently, performs a process of recognizing a client (step S28). Specifically, upon receipt of the registration completion signal from the host slot machine 10*a*, the main CPU set to ON a client flag indicative of whether or not a client stored in the RAM 43*e* of the slot machine 10*e* exists.

The main CPU 41*e* performs a process of displaying progressive link participation on the lower image display panel 16*e* (step S29). After this process has terminated, the main CPU terminates this subroutine.

Next, an operation of a host slot machine 10*a* will be described. The CPU 41*a* of the host slot machine 10*a* performs processes at steps S101 to S105 that follow. At step S101, the CPU 41*a* of the host slot machine 10*a* transmits a participation permission signal to a slot machine 10*e* failing to participate in a progressive link. In this process, the CPU 41*a* transmits to the slot machine 10*e* a participation permission signal which is inclusive of the jackpot payment condition 154 or the like.

The main CPU 41*a* performs a process of receiving the progressive link participation signal transmitted from the slot machine 10*e* at step S26 (step S102). The main CPU 41*a* performs a process of registration in a progressive link (step S103). Specifically, the main CPU 41*a* performs a process of providing an area or the like of storing data indicative of a BET accumulation amount of the slot machine 10*e* to be included in data of the slot machine-based BET accumulation amount 155 stored in the RAM 43*a*.

The main CPU 41*a* then updates progressive link contribution sequence data (step S104). Specifically, the main CPU 41*a* adds data of the slot machine 10*e* to progressive link control data 160 stored in the RAM 43*a*. For example, the CPU 41*a* stores data corresponding to the slot machine 10*e* at the end of contribution sequences of the progressive link contribution sequence data 153 stored in the RAM 43*a*. A slot machine 10*c* has newly participated in a progressive link 150 when four slot machines 10*a*, 10*b*, 10*c*, 10*d* form the progressive link 150. Thus, the data of the slot machine 10*e* that has not been betted is stored in an area corresponding to a fifth place of progressive link contribution sequence data.

The main CPU 41*a* then performs a process of transmitting a signal indicative of completion of registration in a progressive link (step S105). This main CPU transmits to the slot machine 10*e* a progressive link registration completion signal which was received by the slot machine 10*e* at step S27. After this process has terminated, the main CPU terminates this subroutine.

Next, a client's progressive link withdrawing process will be described. FIG. 90 is a flowchart showing a subroutine of the client's progressive link withdrawing process invoked and executed at step S4 in the subroutine of the slot machine 10 shown in FIG. 87. The client's progressive link withdrawing process described hereinafter is performed under cooperative operation between a main CPU 41 of the client's slot machine 10 and a main CPU 41*a* of a host slot machine 10*a*. Hereinafter, the client's progressive link withdrawing process will be described by way of example of a process performed when the client's slot machine 10*c* withdraws from the progressive link 150.

First, an operation of a slot machine 10*c* will be described. A main CPU 41*c* of the slot machine 10*c* performs processes at steps S30 to S37 that follow. The main CPU 41*c* of the slot machine 10*c* judges whether or not someone participates in a progressive link (step S30). In this process, the main CPU 41*c* judges whether or not a client flag indicative of a client slot machine stored in a RAM 43*c* is set to ON. Upon judging that the client flag is set to OFF (step S30: NO), the main CPU 41*c* terminates this subroutine.

Upon judging that the client flag is set to ON (step S30: YES), the main CPU 41*c* judges whether or not to perform progressive link withdrawal verification display (step S31). Specifically, the main CPU 41*c* judges whether or not the player has made an operation of withdrawal display entry from the touch panel 69, in other words, whether or not the player has touched the touch panel 69 on a jackpot withdrawal icon 94*c*. Upon judging that no progressive link withdrawal verification display is provided (step S31: NO), the main CPU 41*c* terminates this subroutine.

Upon judging that progressive link withdrawal verification display is provided (step S31: YES), the main CPU 41*c* performs the corresponding verifying process (step S32).

The main CPU 41*c* judges whether or not to withdraw from a progressive link (step S33). In this process, the main CPU 41*c* judges whether or not the player has made an operation of withdrawal entry from the touch panel 69. Upon judging that no withdrawal from a progressive link occurs (step S33: NO), the CPU 41*c* terminates this subroutine, or alternatively, when it does (step 33: YES), the CPU proceeds to step S34.

The main CPU 41*c* of the slot machine 10*c* performs a process of transmitting a progressive link withdrawal signal (step S34). In this process, the main CPU 41 transmits a withdrawal signal including machine identification information to a host slot machine 10*a*.

The main CPU 41*c* performs a process (step S35) of receiving a signal indicative of completion of withdrawal from progressive link withdrawal completion, and then, performs a process (step S36) of eliminating client information. Specifically, upon receipt of the withdrawal completion signal from the host slot machine 10*a*, the main CPU sets to OFF a client flag indicative of whether or not a client stored in the RAM 43*c* of the slot machine 10*c* is established.

The main CPU 41*c* of the slot machine 10*c* performs a process of displaying withdrawal from a progressive link on a lower image display panel 16*c* (step S37). After this process has terminated, the main CPU terminates this subroutine.

An operation of a host slot machine 10*a* will be described. A main CPU 41*a* of the host slot machine 10*a* performs processes at steps S111 to S113 that follow. First, the main CPU 41*a* of the host slot machine 10*a* performs a process of receiving a progressive link withdrawal signal transmitted from the slot machine 10*c* at step S34 (step S111).

The main CPU 41*a* then performs a progressive link withdrawing process, based upon the received progressive link withdrawal signal (step S112). Here, data pertinent to the slot machine 10*c* is deleted from among the progressive link control data 160 stored in the RAM 43*a* of the host slot machine 10*a*.

The main CPU 41*a* then performs a process of transmitting a signal indicative of completion of withdrawal from a progressive link (step S113). This withdrawal completion signal, which was received by the slot machine 10*c* at step S35, is transmitted to the slot machine 10*c*. After this process has terminated, the main CPU terminates this subroutine.

Next, a host's progressive link withdrawing process will be described. FIGS. 91A and 91B are flowcharts showing a subroutine of a host's progressive link withdrawing process invoked and executed at step S5 in a subroutine of the slot machine 10 shown in FIG. 87. Hereinafter, the host's progressive link withdrawing process will be described by way of example of a process performed when the host slot machine 10*a* withdraws from the progressive link 150.

At step S40, the main CPU 41*a* of the slot machine 10*a* judges whether or not a host slot machine is established. In this process, the main CPU 41*a* judges whether or not a host flag indicative of a host slot machine stored in the RAM 43*a* is set to ON. Upon judging that the host flag is set to OFF (step S40: NO), the main CPU 41*a* terminates this subroutine.

Upon judging that a host slot machine is established, in other words, upon judging that a host flag is set to ON (step S40: YES), the main CPU 41*a* judges whether or not to perform progressive link withdrawal verification display (step S41). Specifically, the main CPU 41*a* judges whether or not a player makes an operation of withdrawal display entry from the touch panel 69, i.e., whether or not the player has touched the touch panel 69 on the jackpot withdrawal icon 94*c* (see FIG. 82A). When the judgment result is negative (step S41: NO), the main CPU 41*a* proceeds to step S44.

When the judgment result is affirmative (step S41: YES), the main CPU 41*a* performs a process of perform a progressive link withdrawal verification display (step S42). Specifically, the main CPU 41*a* causes a lower image display panel 16 to display a message asking the player as to whether or not to withdraw from a jackpot shown in FIG. 82B.

Next, the main CPU 41*a* judges whether or not to change a slot machine controlling a progressive link (step S43). Specifically, the main CPU 41*a* judges whether or not the player has made entry indicative of withdrawal from a progressive link by means of the touch panel 69. Upon judging that the slot machine controlling the progressive link is not changed (step S43: NO), the CPU 41*a* terminates this subroutine, or alternatively, upon judging that the above slot machine is changed (step S43: YES), this CPU proceeds to step S53.

Upon judging that no progressive link withdrawal verification display is provided at step S41 (step S41: NO), the main CPU 41*a* judges whether or nor an ID card has been removed (step S44). Specifically, the main CPU 41*a* judges whether or not the ID card (smart card) storing data or the like for identifying a player read by a card reader 36 has been removed. Upon judging that the ID card has been removed (step S44: YES), the main CPU 41*a* proceeds to step S53.

Upon judging that no ID card has been removed (step S44: NO), the main CPU 41*a* judges whether or not the amount of credit is 0 (step S45). Specifically, the main CPU 41*a* reads the remaining amount of credit used for the play of a game, stored in the main RAM 43*a*, and judges whether or not the remaining amount is 0.

When the judgment result is negative (step S45: NO), the main CPU 41*a* proceeds to step S52 and the main CPU 41*a* judges whether or not a cashout button has been pressed (step S52). When the judgment result is affirmative (step S52: YES), the main CPU 41*a* proceeds to step S53. When the judgment result is negative (step S52: NO), the main CPU 41*a* terminates this subroutine.

Upon judging that the amount of credit is 0 (step S45: YES), the main CPU 41*a* performs withdrawal verification display (step S46). The main CPU 41*a* causes the lower image display panel 16 to display a message asking a player as to whether or not to withdraw from a jackpot (see FIG. 83A).

Next, the main CPU 41*a* judges whether or not to change a slot machine controlling a progressive link (step S47). In this process, the main CPU 41*a* judges whether or not a player has made an operation from the touch panel 69 for entry indicative of withdrawal from a progressive link. Specifically, this CPU judges whether or not the player has touched the touch panel 69 on the YES icon of FIG. 83A. Upon judging that the slot machine controlling the progressive link is changed, in other words, upon judging that the player has touched the touch pane 69 on the YES icon 112 of FIG. 83A (step S47: YES), the CPU 41*a* proceeds to step S53.

Upon judging that no slot machine controlling the progressive link is changed, in other words, upon judging that the player has touched the touch panel 69 on the NO icon 113 of FIG. 83A (step S47: NO), the main CPU 41*a* judges whether or not a specified time has elapsed after withdrawal verification display has been performed at step S46 (step S48). When the judgment result is negative (step S48: NO), the main CPU 41*a* proceeds to step S46.

When the judgment result is affirmative (step S48: YES), the main CPU 41*a* performs countdown display (step S49). Specifically, the main CPU 41*a* causes the lower image display panel 16 to display a time required until the slot machine controlling the progressive link is changed, i.e., a time required until withdrawal from the progressive link (see FIG. 83B).

The main CPU 41*a* judges whether or not to change a slot machine controlling a progressive link (step S50). In this process, the main CPU 41*a* judges whether or not the player has made entry from the touch panel 69, which is indicative of withdrawal from the progressive link, i.e., whether or not the player has touched the touch panel 69 on the YES icon 112 of FIG. 83B. Upon judging that the slot machine controlling the progressive link is changed (step S50: YES), the CPU 41*a* proceeds to step S53.

Upon judging that no slot machine controlling the progressive link is changed (step S50: NO), the main CPU 41*a* judges whether or not a predetermined time (15 minutes) has elapsed after withdrawal verification display has been performed at step S46 (step S51). When the judgment result is negative (step S51: NO), the main CPU 41*a* proceeds to step S49. When the judgment result is affirmative (step S51: YES), the main CPU 41*a* proceeds to step S53.

Upon judging that the slot machine controlling the progressive link is changed (step S43: YES, step S47: YES, step S50: YES), upon judging that the IC card has been removed (step S44: YES), upon judging that a predetermined time has elapsed after withdrawal verification display has been performed (step S51: YES), and when the cashout button has been pressed (step S53: YES), the main CPU 41*a* judges whether or not there exists a slot machine having secondly contributed to a progressive link (step S53). The main CPU 41*a* performs a process of specifying identification information of a slot machine of which the bet amount relative to an entire progressive value is second to a bet amount (slot machine-based BET accumulation amount which is a contribution value relative to a progressive link) relative to an entire progressive value of the slot machine 10*a* exercising centralized control of jackpots, in response to the progressive value stored in the RAM 43*a*, upon receipt of entry of withdrawal from the cashout switch 24S, and the card reader 36, the touch panel 69. Specifically, the main CPU 41*a* judges whether or not there exists a slot machine 10 having contributed to a progressive link secondly of the slot machine 10*a*, referring to the progressive link contribution sequence data stored in the main RAM 41*a*. When the judgment result is affirmative (step S53: YES), the main CPU 41*a* performs a process of creating progressive link data 160 (step S54). The progressive link control data 160 includes data such as "progressive link contribution sequence data 153", "a jackpot payment condition 154", "slot machine-based BET accumulation amount 155", and "a progressive value 151*a*" (see FIG. 81B).

The main CPU 41*a* updates progressive link control data (step S55). In this process, the main CPU 41*a* deletes information of the slot machine 10*a*, from the program link contribution sequence data 153 and slot machine-based BET accumulation amount 155 which are included in the progressive link control data.

The main CPU 41*a* performs a process of transmitting the progressive link control data 160 to a next host machine (step S56). In this process, in order to store data in a memory of a slot machine corresponding to identification information of the specified next host machine, the main CPU 41*a* executes a process of transferring to that slot machine, via a communication interface 44*a*, the programs and payment information stored in the RAM 43*a* (progressive link control data 160 including an entire progressive value and slot machine-based BET accumulation amount). Specifically, the main CPU 41*a* transmits progressive link control data to the slot machine 10*b* storing the progressive link contribution data referenced at step S53, the slot machine 10*b* having contributed to the progressive link secondly of the slot machine 10*a* as a current host.

When it is judged that there is no slot machine having secondly contributed to a progressive link (step S53: NO), the main CPU 41*a* deletes the progressive link contribution sequence data created at step S15 and stored in the RAM 43*a* (step S57). Next, the main CPU 41*a* deletes a jackpot (step S58). Specifically, the main CPU 41*a* deletes data pertinent to jackpots such as "jackpot payment condition 154", "slot machine-based BET accumulation amount 155", and "progressive value 151*a*" created at step S14 and stored in the RAM 43*a*.

When the process at step S56 or S58 terminates, the main CPU 41*a* deletes host information (step S59). Specifically, the main CPU 41*a* sets to OFF, a host flag indicative of a host slot machine stored in the RAM 43*a*.

The main CPU 41*a* displays withdrawal from a progressive link (step S60). Specifically, the main CPU causes the lower image display panel 16 to display a message notifying withdrawal from a jackpot to a player (see FIGS. 84A and 84B). After this process has terminated, the CPU terminates this subroutine.

Next, a host change process will be described. FIG. 92 is a flowchart showing a subroutine of a host change process invoked and executed at step S6 of the subroutine in the slot machine 10 shown in FIG. 87. Hereinafter, the host change process will be described by way of example of a process performed in a case where a slot machine 10*b* becomes a next host machine.

First, a main CPU 41*b* of the slot machine 10*b* judges whether or not any slot machine participates in a progressive link (step S71). In this process, the main CPU 41*b* judges whether or not a client flag indicative of a client slot machine stored in the RAM 43*b* is set to ON. Upon judging that the client flag is set to OFF (step S71: NO), the main CPU 41*b* terminates this subroutine.

Upon judging that the client flag is set to ON (step S71: YES), the main CPU 41*b* judges whether or not progressive link control data has been received (step S72). In this process, the main CPU 41*b* judges whether or not there has been received the progressive link control data 160 inclusive of the programs and progressive value 151*a* that were transmitted from a slot machine as a previous host machine at step S56. When the judgment result is negative (step S72: NO), the main CPU 41*b* terminates this subroutine, or when it is affirmative (step S72: YES), the main CPU proceeds to step S73.

Next, the main CPU 41*b* performs a process of recognizing a host slot machine (step S73). Specifically, the main CPU 41*b* performs a process of setting to ON a host flag indicative of the host slot machine stored in the RAM 43*b*.

Next, the main CPU 41*b* performs a process of displaying the fact that the host slot machine is established (step S74). Specifically, the main CPU 41*b* displays the fact that the slot machine 10 has become a new host machine in indication of a host icon 94*b* and the guidance display area 118 on the lower image display panel 16 of the slot machine 10*b*, and notifies to a player, who plays a game at the slot machine 10*b*, that the new host machine is established (see FIG. 85A).

Next, the main CPU 41*b* of the slot machine 10*b* judges whether or not to change a jackpot payment condition (step S75). In other words, upon judging that a program and a progressive value 151*a* has been received, the main CPU 41*b* causes the lower image display panel 16 to display a screen for setting numeric data such as a BET input amount of the progressive game (i.e., BET amount in one standalone game) or the amount of jackpot payment. After that, the main CPU judges whether or not the player at slot machine 10*b* has made an operation of changing a jackpot payment condition. When the judgment result is negative (step S75: NO), the main CPU 41*b* terminates this subroutine, or alternatively, when it is affirmative (step S75: YES), the main CPU proceeds to step S76.

The main CPU 41*b* of the slot machine 10*b* performs a process of changing a jackpot payment condition (step S76). Specifically, the main CPU 41*b* changes a jackpot bet input amount or a jackpot payment amount in accordance with screen input information. The main CPU 41*b* causes the lower image display panel 16 to display a screen for setting a jackpot payment condition and causes a player to enter a jackpot payment condition (see FIG. 85B).

The main CPU 41*b* of the slot machine 10*b* performs a process of transmitting a jackpot payment condition (step S77). In this process, the main CPU 41*b* transmits the jackpot payment condition newly set at step S76 to another slot machine 10 participating in an identical progressive link.

Next, the main CPU 41*b* of the slot machine 10*b* judges whether or not a progressive link withdrawal signal has been received from another slot machine (step S78). This main CPU judges whether or not a withdrawal signal transmitted from another slot machine has been received at step S95 mentioned below, because no game is continued under a new jackpot payment condition at another slot machine having transmitted the new jackpot payment condition at step S77.

Upon judging that no withdrawal signal has been received, the main CPU 41*b* proceeds to step S79, and judges whether or not a continue-game signal has been received (step S79). This main CPU judges whether or not the continue-game signal transmitted from another slot machine has been received at step S94 mentioned below, because no game is continued under a new jackpot payment condition at another slot machine having transmitted the new jackpot payment condition at step S77. Upon judging that the continue-game signal has been received (step S79: YES), the main CPU **41*b* terminates this subroutine, or alternatively, upon judging that no continue-game signal has been received (step S79: NO), this main CPU reverts to step S78**.

Upon judging that the withdrawal signal has been received (step S78: YES), the main CPU **41*b* performs a returnable BET amount calculation process (step S80). In this process, the main CPU 41*b* reads from the RAM 43*b* the slot machine-based BET accumulation amount 155 having transmitted the withdrawal signal, and calculates the returnable BET amount. After that, this main CPU transmits information pertinent to the conversion BET amount to the corresponding slot machine (step S81**).

Next, the main CPU **41*b* of the slot machine 10*b* performs a progressive link withdrawal process (step S82). This main CPU deletes data pertinent to a slot machine 10 having transmitted a withdrawal signal from among the progressive link control data 160 that is stored in the RAM 43*b* of the host slot machine 10*b***.

The main CPU **41*b* of the slot machine 10*b* performs a process of transmitting a withdrawal completion signal from a progressive link (step S83). This main CPU transmits to the corresponding slot machine 10 the withdrawal completion signal from a progressive link received by a slot machine 10 having transmitted the withdrawal signal at step S97**. After this process has terminated, the main CPU terminates this subroutine.

Next, a client's process for verifying continuation of a game will be described. FIG. 93 is a flowchart showing a subroutine in the client's process of verifying continuation of a game, invoked and executed at step S7 in the subroutine of the slot machine 10 shown in FIG. 87. The main CPU 41 of the slot machine 10 judges whether or not to participate in a progressive link (step S90). Specifically, the main CPU 41 judges whether or not the client flag stored in the RAM 43 is set to ON. Upon judging that the client flag is set to ON, the main CPU 41 proceeds to step S91, or alternatively, upon judging that it is set to OFF, the main CPU terminates this subroutine.

The main CPU 41 of the slot machine 10 performs a process of receiving a jackpot payment condition (step S91). Specifically, the main CPU 41 receives the jackpot payment condition transmitted from the slot machine **10*b* that has newly become a host at step S77** mentioned above.

The main CPU 41 of the slot machine 10 causes the lower image display panel 16 to display the jackpot payment condition (step S92). In this process, the main CPU 41 displays an image indicative of the jackpot payment condition determined at step S76 for a player who plays a game at the slot machine, and notifies the contents thereof (see FIG. 86A).

The main CPU 41 of the slot machine 10 judges whether or not to continue a game (step S93). In this process, the main CPU 41 judges whether or not the player has made an operation of continuing a game under the jackpot payment condition displayed on the lower image display panel 16 at step S92 (see FIG. 86A). Upon judging that the game has been continued (step S93: YES), the main CPU 41 performs a process of transmitting a continue-game signal (step S94). In this process, the main CPU 41 performs a process of transmitting a continue-game signal received by a host slot machine **10*b* at step S79**. When this process has terminated, the main CPU terminates this subroutine.

Upon judging that no game has been continued (step S93: NO), the main CPU 41 performs a process of transmitting a withdrawal signal (step S95). In this process, the main CPU 41 performs a process of transmitting a progressive link withdrawal signal received by the slot machine **10*b* at step S78**.

Next, the main CPU 41 of the slot machine 10 performs a process of receiving a returnable BET amount (step S96). In this process, the main CPU 41 receives information pertinent to the returnable BET amount transmitted by the slot machine **10*b* at step S81. After that, the main CPU 41 returns to this player at least part of the progressive value betted by the player at the slot machine 10**, based upon the information indicated by the returnable BET amount.

The main CPU 41 performs a process of receiving a progressive link withdrawal completion signal (step S97), and thereafter, performs a process of eliminating client information (step S98). Specifically, upon receiving the withdrawal completion signal from the host slot machine **10*b*, this main CPU sets OFF a client flag indicating whether or not there exists a client stored in the RAM 43 of the slot machine 10**.

The main CPU 41 of the slot machine 10 performs a process of displaying withdrawal from a progressive link on the lower image display panel 16 (step S99). After this process has terminated, the main CPU terminates this subroutine.

Next, game processing will be described. FIG. 94 is a flowchart showing a subroutine in game processing, invoked and executed at step S8 in the subroutine of the slot machine 10 shown in FIG. 87. The game process described here is performed under cooperative operation between the main CPU 41 of the client's slot machine 10 and the main CPU **41*a* of the host slot machine 10*a*. Hereinafter, game processing will be described by way of example in which a slot machine 10*c*** is the client's slot machine.

The main CPU **41*c* of the slot machine 10*c* performs the processes at steps S201 to S213 that follow. First, the main CPU 41*c* judges whether or not coins have been betted (step S201). In this process, the main CPU 41*c* judges whether or not there has been received an input signal output from a 1-BET switch 26*s* when a 1-BET button 26 has been operated or an input signal output from a MAX-BET switch 27S when a MAX-BET button 27 has been operated. Upon judging that no coin has been betted (step S201: NO), the main CPU 41*c* reverts to step S201, or alternatively, upon judging that coins have been betted (step S201: YES), the main CPU proceeds to step S202**.

The main CPU **41*c* of the slot machine 10*c* performs a process of subtracting the amount of credit stored in the RAM 43*c*, in response to the number of betted coins (step S202). The main CPU 41*c* stores in the RAM 43*c*** the amount of credit after subtracted.

The main CPU **41*c* of the slot machine 10 judges whether or not the spin button 23 has been set to ON (step S203). Specifically, the main CPU 41*c* judges whether or not there has been received an input signal output from a spin switch 23S when a spin button 23 has been depressed. Upon judging that the spin button 23 has not been set to ON (step S203: NO), the main CPU 41*c* reverts to step S201, or alternatively, upon judging that the spin button 23 is set to ON, the main CPU proceeds to step S204. Upon judging that the spin button 23 has not been set to ON (for example, if an instruction for terminating a game has been entered without setting the spin button 23 to ON), the main CPU 41*c* cancels subtraction of the amount of credit which was performed at step S202**.

The main CPU **41*c* of the slot machine 10*c* judges whether or not to participate in a progressive link (step S204). Specifically, the main CPU 41*c* judges whether or not the client flag stored in the RAM 43*c* has been set to ON in the progressive link participation process performed in FIG. 89 mentioned previously. Upon judging that any one participates in the progressive link (step S204: YES), the main CPU 41*c*** proceeds to step S205, or alternatively, upon judging that no one participates in the progressive link (step S204: NO), the main CPU proceeds to step S210.

The main CPU 41*c* of the slot machine 10*c* transmits to the slot machine 10*a* a BET amount betted on a jackpot among the number of coins that were betted at step S201 and identification information of the slot machine 10*c* that was stored in the ROM 42*c* altogether (step S205).

The main CPU 41*c* of the slot machine 10*c* judges whether or not a winning jackpot signal has been received (step S206). The main CPU 41*a* of the host slot machine 10*a* randomly select one or more slot machines acquiring a jackpot from among a plurality of slot machines participating in a progressive link, and transmits a winning jackpot signal to only the selected slot machines. Namely, only the slot machines acquiring a jackpot can receive the winning jackpot signal. Upon judging that the winning jackpot signal has been received (step S206: YES), the main CPU 41*c* proceeds to step S207, or alternatively, upon judging that no winning jackpot signal has been received (step S206: NO), the main CPU proceeds to step S210.

The main CPU 41*c* of the slot machine 10*c* performs a process of determining a winning jackpot symbol (step S207). Specifically, upon judging that the spin button 23 has been set to ON at step S203, the main CPU 41*c* executes the symbol determination program stored in the RAM 43*c*, and determines code No. which is indicative of a winning jackpot at the time of symbol stoppage, upon receiving the winning jackpot signal at step S206.

The main CPU 41*c* of the slot machine 10*c* performs a process of scroll-displaying a winning jackpot (step S208). Specifically, the main CPU 41*c* exercises display-control so that the symbols indicated by code Nos. indicating the winning jackpot determined at step S207 are displayed in a stopped state in the symbol matrix 28 concurrently with stoppage of scroll-display after a predetermined time has elapsed after starting scroll-display of plural types of symbols.

The main CPU 41*c* of the slot machine 10*c* performs a process of paying out a winning jackpot (step S209). Specifically, the main CPU 41*c* pays out coins, based upon the payout amount included in the winning jackpot signal received at step S206.

The main CPU 41*c* of the slot machine 10*c* performs a symbol determination process (step S210). Specifically, upon judging that the spin button 23 has been set to ON at step S203, the main CPU 41 determines code Nos. at the time of symbol stoppage, by executing the symbol determination program stored in the RAM 43. The embodiments described a case in which one or more prizes are determined from among plural types of prizes by determining symbols displayed in a stopped state. However, the present invention is not limitative thereto, and, for example, may be applicable to a case in which one or more prizes selected from among the plural types of prizes are determined, and then, the combinations of symbols displayed in a stopped state are determined based upon the above-mentioned prizes.

The main CPU 41*c* of the slot machine 10 performs a scroll-display process (step S211). Specifically, the main CPU 41*c* exercises display-control so that the symbols indicated by the code Nos. determined at step S210 are displayed in a stopped state in the symbol matrix 28 concurrently with stoppage of scroll-display after a predetermined time has elapsed after starting scroll-display of plural types of symbols.

The main CPU 41*c* of the slot machine 10*c* judges whether or not a scatter prize is established (step S212). Specifically, the main CPU 41*c* judges whether or not a scatter prize is established after three or more trigger symbols for a scatter prize have been displayed in a stopped state in any cells of the symbol matrix 28. Upon judging that the scatter prize is established (step S212: YES), the main CPU 41*c* proceeds to step S213 to perform a coin payout process. Upon judging that no scatter prize is established (step S212: NO), the main CPU 41*c* terminates this subroutine without paying out coins.

If the main CPU 41*c* judges that no winning jackpot signal has been received (step S206: NO) and if the main CPU judges that no scatter prize is established (step S212: NO), it is determined to be a "loser". The word "loser" used here denotes that no coin is paid out.

Next, an operation of a host slot machine 10*a* will be described. The main CPU 41*a* of the host slot machine 10*a* performs the processes at steps S121 to S127 that follow. First, the main CPU 41*a* receives the jackpot BET information and machine identification information transmitted from the slot machine 10*c* at step S205 mentioned above (step S121). The main CPU 41*a* stores the jackpot BET amount in the RAM 43*a*, based upon the received jackpot BET information. The RAM 43*a* stores the jackpot BET amount by slot machine 10, and the main CPU 41*a* stores the jackpot BET amount in a memory space of the RAM 43*a* in corresponding slot machine 10, based upon machine identification information. The main CPU 41*a* receives the machine identification information transmitted from the slot machine 10 at step S205 mentioned above, and stores the received information in a predetermined memory space of the RAM 43*a* while the received count is defined as a standalone game count (hereinafter, referred to as a game count) in which a payment for a progressive bonus game has occurred. The RAM 43*a* stores a game count by slot machine 10, and the main CPU 41*a* causes a game count to be stored in the memory space of the corresponding slot machine 10 in the RAM 43*a*, based upon machine identification information.

The main CPU 41*a* of the host slot machine 10*a* performs a process of adding a progressive value of a jackpot (step S122). Specifically, the main CPU 41*a* performs a process of storing numeric data associated with a payment for a jackpot received via a communication interface 44 as game history data (progressive value), in response to unit game-based BET entries executed by a plurality of slot machines 10. In other words, the main CPU 41*a* adds a respective one of the jackpot BET amounts of slot machines 10 stored in the RAM 43*a* at step S121, adds up the jackpot BET amounts of all of the slot machines participating in a progressive link, and stores a progressive value in the RAM 43*a*. For example, after two slot machines have participated in a progressive link, if the jackpot BET numbers invested by the two slot machines are 500 BETS and 300 BETS, respectively, the host slot machine 10*a* adds up these BET numbers (500+300), and causes the RAM 43*a* to store the added up progressive value of "800".

The main CPU 41*a* of the host slot machine 10*a* performs a process of adding up a game count (step S123). Specifically, the main CPU 41*a* adds up a respective one of the game counts of the slot machines stored in the RAM 43*a* at step S121 mentioned above and causes the RAM 43*a* to store the added up value of a total game count of all of the slot machines participating in a progressive link. For example, if the game counts of two slot machines 10 are 10 times and 25 times, respectively, the host slot machine 10*a* adds up these game counts (10+25), and causes the RAM 43*a* to store the added up value of "35".

The main CPU 41*a* of the host slot machine 10*a* judges whether or not the progressive value added at step S122 reaches 50% of the maximum value of the jackpot payout set in the progressive link creation process mentioned above (step S124). For example, when the maximum value of the set jackpot payout is $1,000,000, the main CPU 41*a* judges whether or not the progressive value stored in the RAM 43*a* is $500,000 or more. Upon judging that the progressive value reaches 50% of the maximum value of jackpot payout (step S124: YES), the main CPU 41*a* proceeds to step S125, or alternatively, if not (step S124: NO), the main CPU terminates this subroutine.

The main CPU 41*a* of the host slot machine 10*a* judges whether or not a winning jackpot is established (step S125). Specifically, the main CPU 41*a* assigns a specific number to a slot machine having transmitted jackpot BET information and machine identification information at step S205, and extracts a random number from a predetermined numeric range including such specific number. After that, the main CPU 41*a* judges whether or not the extracted random number matches the specific number. Upon judging that a winning jackpot is established (step S125: YES), the main CPU 41*a* proceeds to step S126, or alternatively, if not (step S125: NO), the main CPU terminates this subroutine.

The main CPU 41*a* of the host slot machine 10*a* transmits a winning jackpot signal (step S126). Specifically, where the random number extracted at step S125 matches a specific number, the main CPU 41*a* transmits a winning jackpot signal, as a winning jackpot, to a slot machine to which the specific number has been assigned.

Next, the main CPU 41*a* of the host slot machine 10*a* resets a progressive value of a jackpot (step S127). Specifically, the main CPU 41*a* resets a progressive value of a winning jackpot stored in the RAM 43*a* and values of jackpot BET amounts by slot machines 10, a total game count, and game counts by slot machines 10. After this process has terminated, the main CPU terminates this subroutine.

The embodiment described a case in which a host slot machine 10*a* withdraws from a progressive link and a slot machine 10*b* becomes a next host machine. However, in the present invention, like the abovementioned embodiment, even when a slot machine 10*b* newly becomes a host withdraws from a progressive link, the host slot machine 10*b* can transfer its host functionality to another slot machine participating in the same progressive link. In other words, an operation of specifying a new host machine when a host slot machine withdraws is continuously repeated, and jackpots are constantly provided to players.

According to the embodiment of the present invention, a game system can be provided which is capable of maintaining a jackpot smoothly even if a host gaming machine managing a jackpot withdraws from the jackpot.

While the embodiment described a case in which a plurality of slot machines 10 and a common display device 300 are connected by a wire, the present invention is not limitative thereto. Data may be transmitted or received wirelessly. In other words, the communication lines according to the present invention include wired and wireless transmission channels.

While the embodiment described a case in which a game system 100 is installed in one gaming place or the like, slot machines 10 may be installed separately in other gaming places in the present invention.

While the embodiment described a case in which slot machines are employed as gaming machines, card game machines may be employed in the present invention.

While the embodiment described a case in which one link game is executed, a plurality of link games may be executed in the present invention.

While the embodiment according to the present invention has been described, the description presents only some of the specific examples and is not intended to limit the present invention in any way and specific constructions of each means and the like can be properly changed in terms of design. Moreover, the effects described in the embodiment of the present invention are only the most preferable effects generated from the present invention and the effects to be caused by the present invention is not limitative thereto.

What is claimed is:

1. A control method of a game system which comprises:

(i) a plurality of first gaming machines which execute a first game for obtaining a first progressive bonus;

(ii) a plurality of second gaming machines which execute a second game for obtaining a second progressive bonus;

(iii) a memory which stores a first progressive value for the first progressive bonus and a second progressive value for the second progressive bonus; and (iv) a center controller which is inter-communicable with the pluralities of the first and second gaming machines via a network, wherein:

the center controller is configured to execute the steps of:

(a) receiving BET information pertinent to the first or second game from any of the gaming machines of respective ones of the first and second gaming machines;

(b) updating the first or second progressive value stored in the memory, based upon the BET information received in the process (a);

(c) when it is determined that the first and second progressive values stored in the memory satisfy a preset predetermined condition as a result of repeatedly executing the processes (a) and (b), merging the first and second games with each other to form a merged game, and adding up the first and second progressive values to form a merged progressive bonus;

(d) randomly determining whether or not to award the merged progressive bonus in the process (c) to any of the gaming machines participating in the merged game in the process (c); and (e) awarding the merged progressive bonus to the gaming machine determined in the process (d), wherein the preset predetermined condition comprises each of the first and second progressive values reaching a predetermined value and the first and second progressive values being within a preset predetermined difference.

2. The control method of the game system, according to claim 1, further comprising a count memory which counts the number of first games executed and the number of second games executed, wherein the center controller further comprises the steps of: judging whether the number of first games executed and the number of second games executed reaches a predetermined value, by referring to the count memory, and executing the process (c) where it is judged that the number of first games executed and number of second games executed reaches the predetermined value as a result of the judgment.

3. The control method of the game system, according to claim 1, further comprising a display device which displays the progressive values stored in the memory and which is communicable with the center controller, wherein the center controller further comprises the steps of: updating the progressive values stored in the memory, based upon the merged progressive value added up in the process (c); and causing the display device to display the merged progressive value.

* * * * *